(12) United States Patent
Fukui

(10) Patent No.: US 6,404,987 B1
(45) Date of Patent: Jun. 11, 2002

(54) FLASH SYSTEM

(75) Inventor: Hajime Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/388,292

(22) Filed: Sep. 1, 1999

(30) Foreign Application Priority Data

| Sep. 7, 1998 | (JP) | 10-252588 |
| Sep. 7, 1998 | (JP) | 10-253084 |
| Sep. 7, 1998 | (JP) | 10-253085 |
| Sep. 7, 1998 | (JP) | 10-253086 |
| Sep. 7, 1998 | (JP) | 10-253087 |
| Sep. 7, 1998 | (JP) | 10-253088 |
| Sep. 11, 1998 | (JP) | 10-258534 |

(51) Int. Cl.[7] ............................................. G03B 15/05
(52) U.S. Cl. .................... 396/56; 396/106; 396/173; 396/182; 396/201
(58) Field of Search .................. 396/106, 56, 57, 396/173, 182, 201, 202, 203

(56) References Cited

U.S. PATENT DOCUMENTS

| 5,640,623 A | 6/1997 | Sasaki ........................ 396/180 |
| 5,721,971 A | 2/1998 | Sasaki ........................ 396/56 |
| 6,088,542 A | * 7/2000 | Yanai et al. ............ 396/182 X |

FOREIGN PATENT DOCUMENTS

| DE | 40 22 536 | 1/1991 |
| GB | 2 150 709 | 7/1985 |
| GB | 2 154 341 | 9/1985 |

* cited by examiner

Primary Examiner—W. B. Perkey
(74) Attorney, Agent, or Firm—Robin, BLecker & Daley

(57) ABSTRACT

In a flash system, information on a light emission mode, etc., is communicated to a slave flash device through pulse light emitted from a master flash device, and, after completion of communication of the information, the master flash device makes light emission, which causes the slave flash device to start to make light emission in an operative mode according to the communicated information.

58 Claims, 95 Drawing Sheets

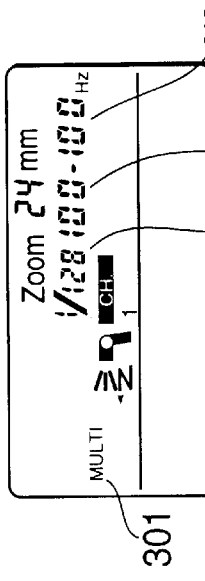
FIG. 8(a)
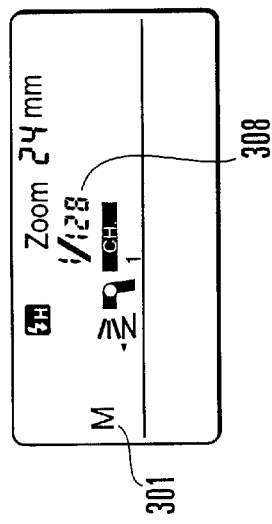
FIG. 8(d)
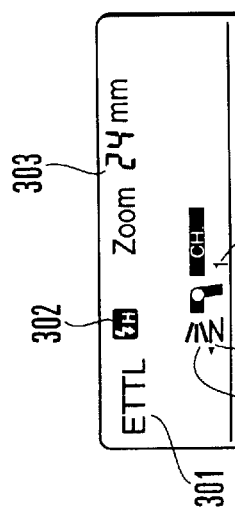
FIG. 8(g)
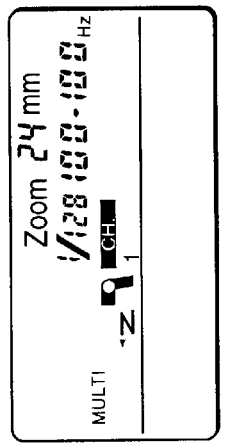
FIG. 8(b)
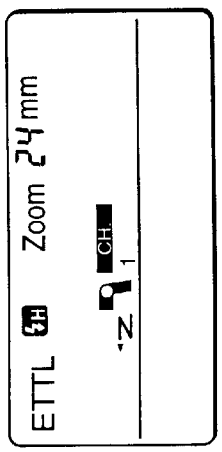
FIG. 8(e)
FIG. 8(h)
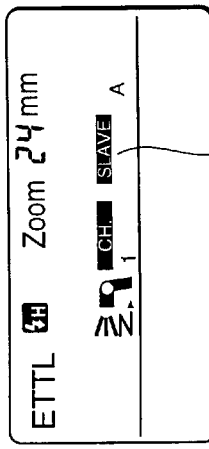
FIG. 8(c)
FIG. 8(f)
FIG. 8(i)

FIG. 12

| NUMBER | COMMAND NAME | FIRST BYTE ||||||||| SECOND BYTE | THIRD BYTE | FOURTH BYTE | FIFTH BYTE |
|---|---|---|---|---|---|---|---|---|---|---|---|---|---|
| | | D7 | D6 | D5 | D4 | D3 | D2 | D1 | D0 | | | | |
| 1 | IDENTICAL PRELIMINARY LIGHT EMISSION | FS | 0 | 0 | 0 | 0 | T2 | T1 | T0 | AMOUNT OF LIGHT EMISSION | | | |
| 2 | PRELIMINARY LIGHT EMISSION A | FS | 0 | 0 | 0 | 1 | T2 | T1 | T0 | AMOUNT OF LIGHT EMISSION | | | |
| 3 | PRELIMINARY LIGHT EMISSION B | FS | 0 | 0 | 1 | 0 | T2 | T1 | T0 | AMOUNT OF LIGHT EMISSION | | | |
| 4 | PRELIMINARY LIGHT EMISSION C | FS | 0 | 0 | 1 | 1 | T2 | T1 | T0 | AMOUNT OF LIGHT EMISSION | | | |
| 5 | IDENTICAL MAIN LIGHT EMISSION | FS | 0 | 1 | 0 | 0 | T2 | T1 | T0 | AMOUNT OF LIGHT EMISSION | | | |
| 6 | MAIN LIGHT EMISSION AB | FS | 0 | 1 | 0 | 1 | T2 | T1 | T0 | AMOUNT OF LIGHT EMISSION A | AMOUNT OF LIGHT EMISSION B | | |
| 7 | MAIN LIGHT EMISSION ABC | FS | 0 | 1 | 1 | 0 | T2 | T1 | T0 | AMOUNT OF LIGHT EMISSION A | AMOUNT OF LIGHT EMISSION B | AMOUNT OF LIGHT EMISSION C | |
| 8 | IDENTICAL MANUAL LIGHT EMISSION | FS | 1 | 0 | 0 | 0 | T2 | T1 | T0 | AMOUNT OF LIGHT EMISSION | | | |
| 9 | MANUAL LIGHT EMISSION AB | FS | 1 | 0 | 0 | 1 | T2 | T1 | T0 | AMOUNT OF LIGHT EMISSION A | AMOUNT OF LIGHT EMISSION B | | |
| 10 | MANUAL LIGHT EMISSION ABC | FS | 1 | 0 | 1 | 0 | T2 | T1 | T0 | AMOUNT OF LIGHT EMISSION A | AMOUNT OF LIGHT EMISSION B | AMOUNT OF LIGHT EMISSION C | |
| 11 | IDENTICAL MULTIPLE LIGHT EMISSION | 0 | 1 | 0 | 1 | 1 | 0 | 0 | 0 | AMOUNT OF LIGHT EMISSION A | F/C | | |
| 12 | MULTIPLE LIGHT EMISSION AB | 0 | 1 | 1 | 0 | 0 | 0 | 0 | 0 | AMOUNT OF LIGHT EMISSION A | AMOUNT OF LIGHT EMISSION B | F/C | |
| 13 | MULTIPLE LIGHT EMISSION ABC | 0 | 1 | 1 | 0 | 1 | 0 | 0 | 0 | AMOUNT OF LIGHT EMISSION A | AMOUNT OF LIGHT EMISSION B | AMOUNT OF LIGHT EMISSION C | F/C |

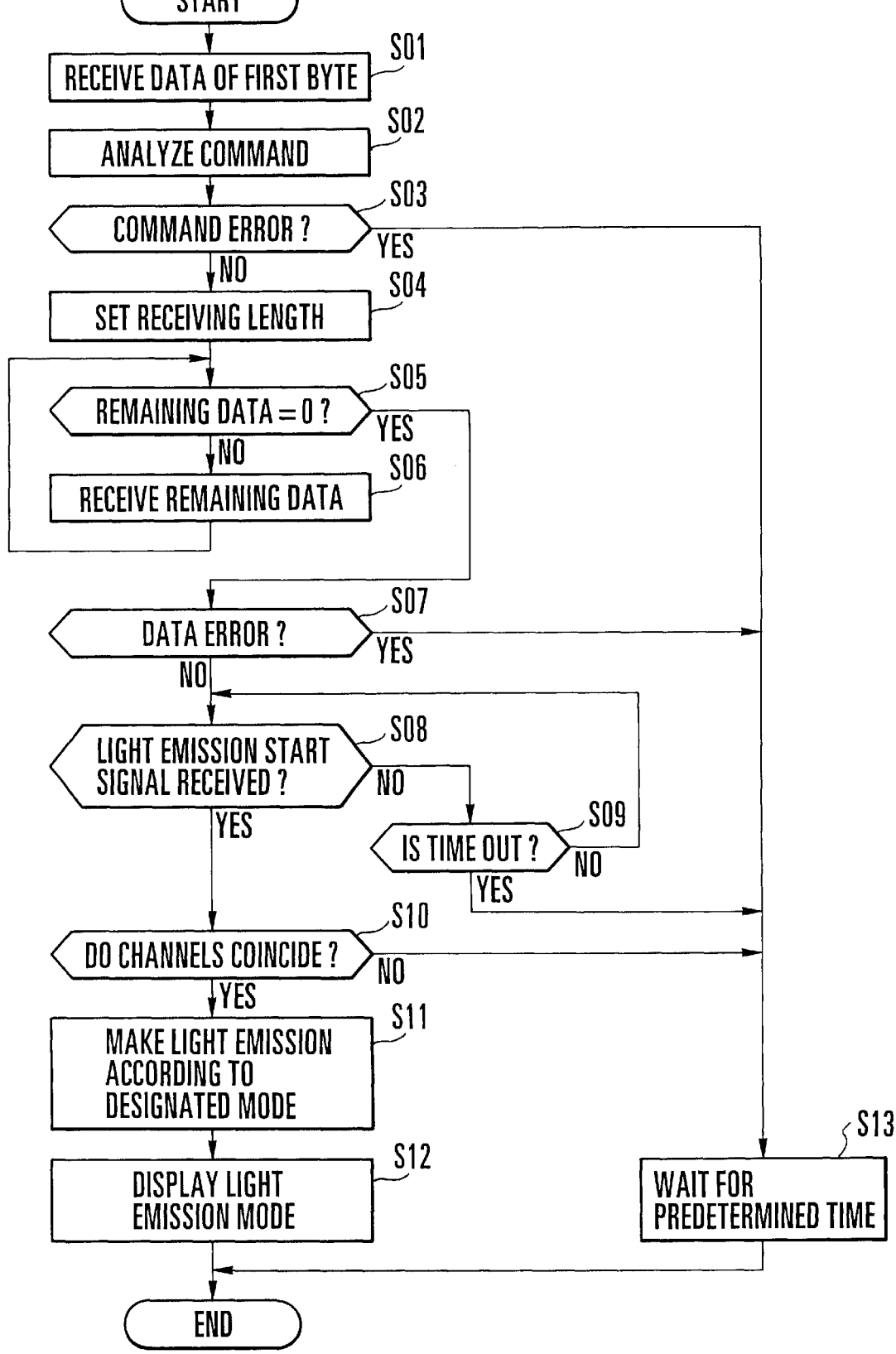

FIG. 17

| INDICATION OF A:B | INTERMEDIATE VALUE | CORRECTION VALUE FOR A | CORRECTION VALUE FOR B |
|---|---|---|---|
| 8:1 | | -0.17F | -3.17F |
| | 5.6:1 | -0.23F | -2.73F |
| 4:1 | | -0.32F | -2.32F |
| | 2.8:1 | -0.44F | -1.94F |
| 2:1 | | -0.58F | -1.58F |
| | 1.4:1 | -0.77F | -1.27F |
| 1:1 | | -1F | -1F |
| | 1:1.4 | -1.27F | -0.77F |
| 1:2 | | -1.58F | -0.58F |
| | 1:1.8 | -1.94F | -0.44F |
| 1:4 | | -2.32F | -0.32F |
| | 1:1.6 | -2.73F | -0.23F |
| 1:8 | | -3.17F | -0.17F |

LIGHT CONTROL NG

LIGHT CONTROL OK

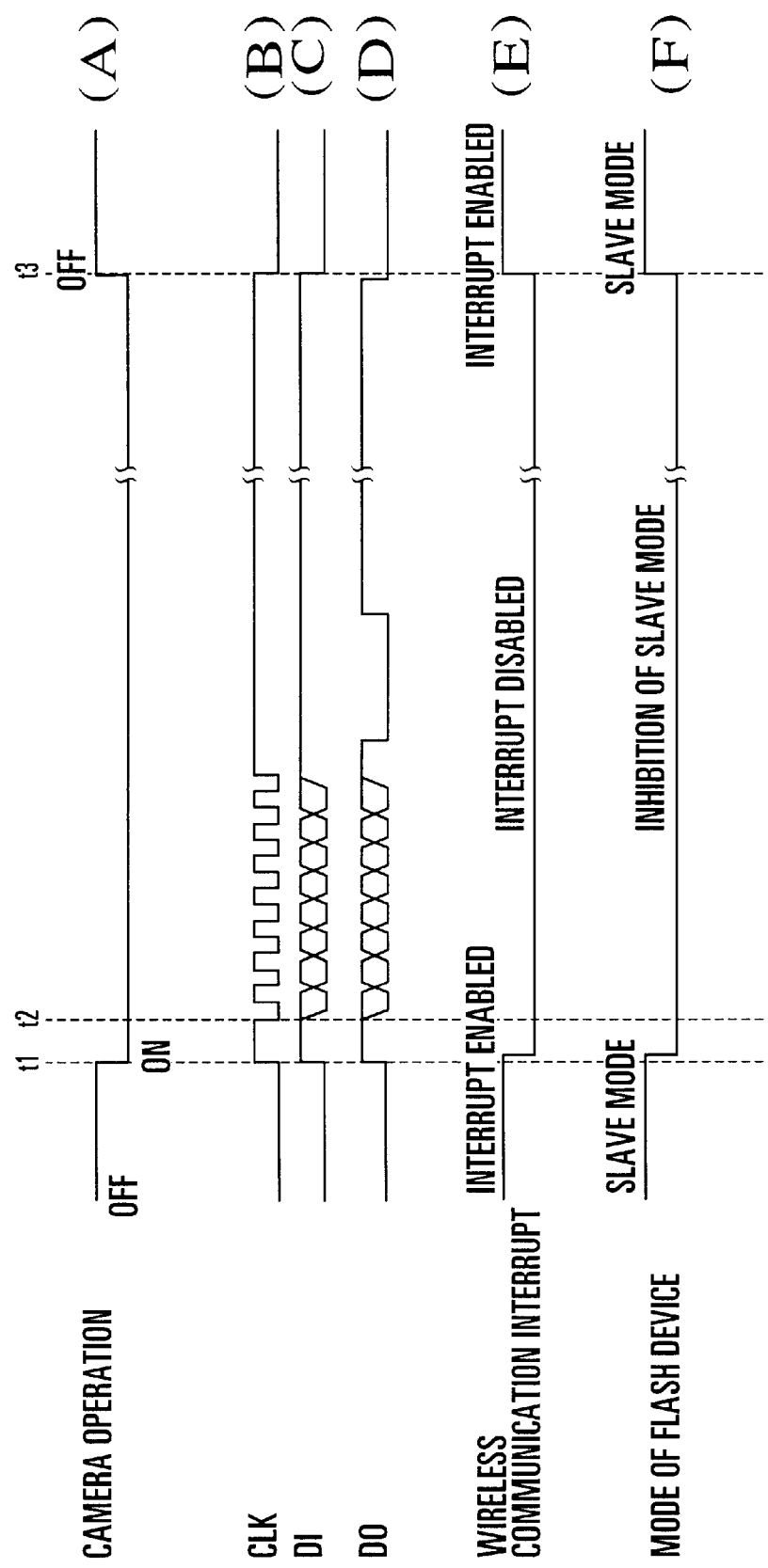

FIG. 55

| NUMBER | COMMAND NAME | FIRST BYTE ||||||||| SECOND BYTE | THIRD BYTE | FOURTH BYTE | FIFTH BYTE |
| | | D7 | D6 | D5 | D4 | D3 | D2 | D1 | D0 | | | | |
|---|---|---|---|---|---|---|---|---|---|---|---|---|---|
| 1 | IDENTICAL PRELIMINARY LIGHT EMISSION | FS | 0 | 0 | 0 | 0 | T2 | T1 | T0 | AMOUNT OF LIGHT EMISSION | | | |
| 2 | PRELIMINARY LIGHT EMISSION A | FS | 0 | 0 | 0 | 1 | T2 | T1 | T0 | AMOUNT OF LIGHT EMISSION | | | |
| 3 | PRELIMINARY LIGHT EMISSION B | FS | 0 | 0 | 1 | 0 | T2 | T1 | T0 | AMOUNT OF LIGHT EMISSION | | | |
| 4 | PRELIMINARY LIGHT EMISSION C | FS | 0 | 0 | 1 | 1 | T2 | T1 | T0 | AMOUNT OF LIGHT EMISSION | | | |
| 5 | IDENTICAL MAIN LIGHT EMISSION | FS | 0 | 1 | 0 | 0 | T2 | T1 | T0 | AMOUNT OF LIGHT EMISSION | | | |
| 6 | MAIN LIGHT EMISSION AB | FS | 0 | 1 | 0 | 1 | T2 | T1 | T0 | AMOUNT OF LIGHT EMISSION A | AMOUNT OF LIGHT EMISSION B | | |
| 7 | MAIN LIGHT EMISSION ABC | FS | 0 | 1 | 1 | 0 | T2 | T1 | T0 | AMOUNT OF LIGHT EMISSION A | AMOUNT OF LIGHT EMISSION B | AMOUNT OF LIGHT EMISSION C | |
| 8 | IDENTICAL MANUAL LIGHT EMISSION | FS | 0 | 1 | 1 | 1 | T2 | T1 | T0 | AMOUNT OF LIGHT EMISSION | | | |
| 9 | MANUAL LIGHT EMISSION AB | FS | 1 | 0 | 0 | 0 | T2 | T1 | T0 | AMOUNT OF LIGHT EMISSION A | AMOUNT OF LIGHT EMISSION B | | |
| 10 | MANUAL LIGHT EMISSION ABC | FS | 1 | 0 | 0 | 1 | T2 | T1 | T0 | AMOUNT OF LIGHT EMISSION A | AMOUNT OF LIGHT EMISSION B | AMOUNT OF LIGHT EMISSION C | |
| 11 | IDENTICAL MULTIPLE LIGHT EMISSION | 0 | 1 | 0 | 1 | 0 | 0 | 0 | 0 | AMOUNT OF LIGHT EMISSION | F/C | | |
| 12 | MULTIPLE LIGHT EMISSION AB | 0 | 1 | 0 | 1 | 1 | 0 | 0 | 0 | AMOUNT OF LIGHT EMISSION A | AMOUNT OF LIGHT EMISSION B | F/C | |
| 13 | MULTIPLE LIGHT EMISSION ABC | 0 | 1 | 1 | 0 | 0 | 0 | 0 | 0 | AMOUNT OF LIGHT EMISSION A | AMOUNT OF LIGHT EMISSION B | AMOUNT OF LIGHT EMISSION C | F/C |
| 14 | TEST LIGHT EMISSION | 0 | 1 | 1 | 0 | 1 | 0 | 0 | 0 | TEST MODE | | | |

| TEST LIGHT EMISSION MODE TABLE | TEST MODE |
|---|---|
| IDENTICAL TEST LIGHT EMISSION | F0H |
| TEST LIGHT EMISSION A : B | F1H |
| TEST LIGHT EMISSION A : B : C | F2H |

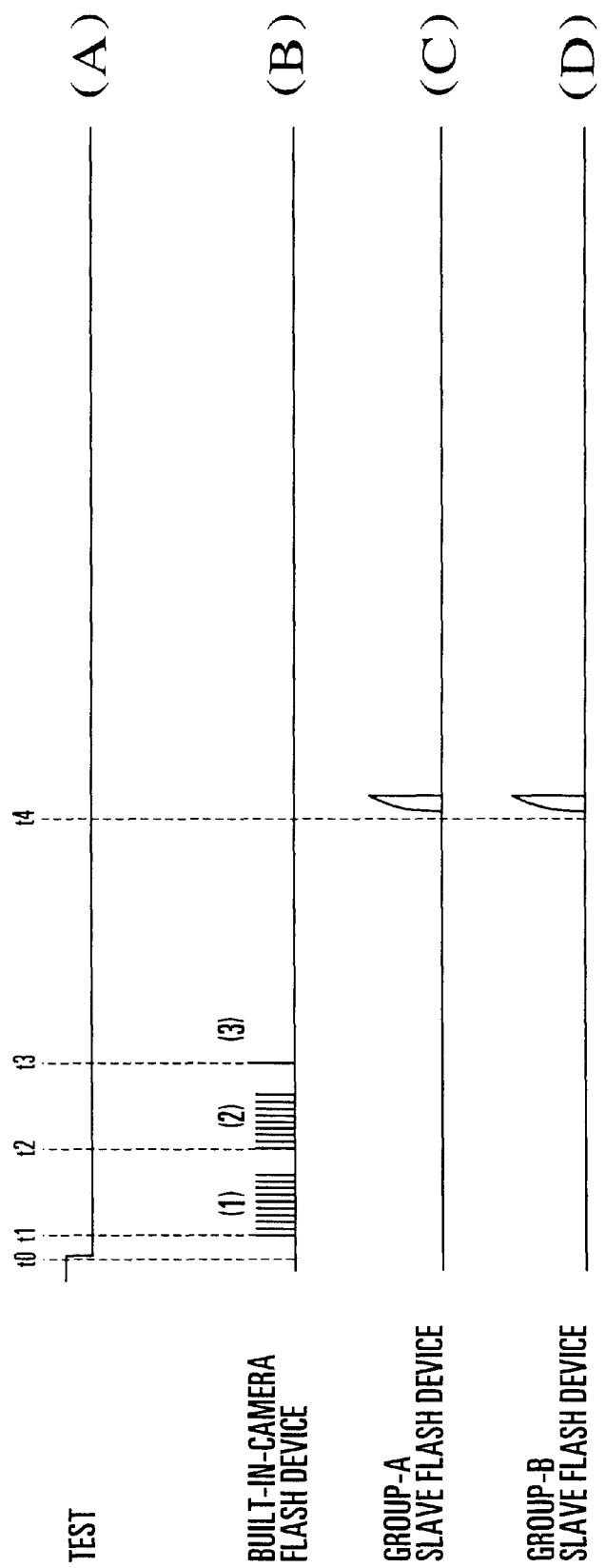

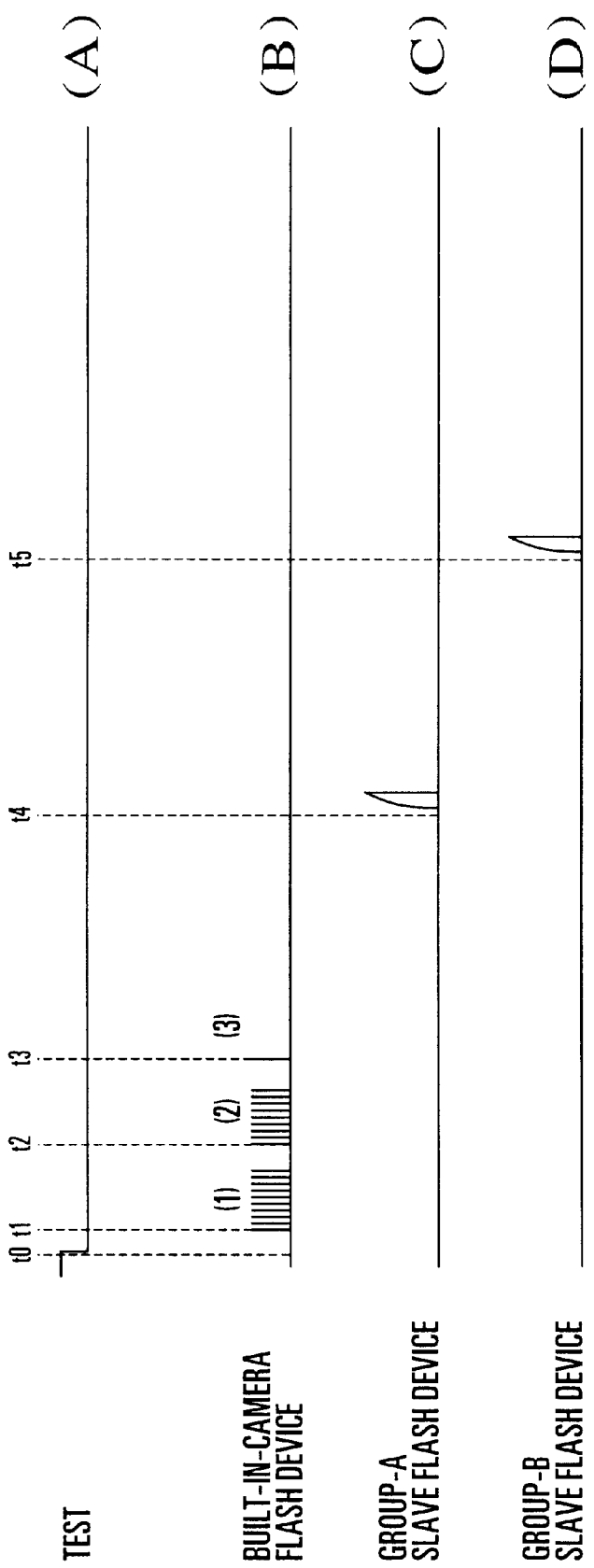

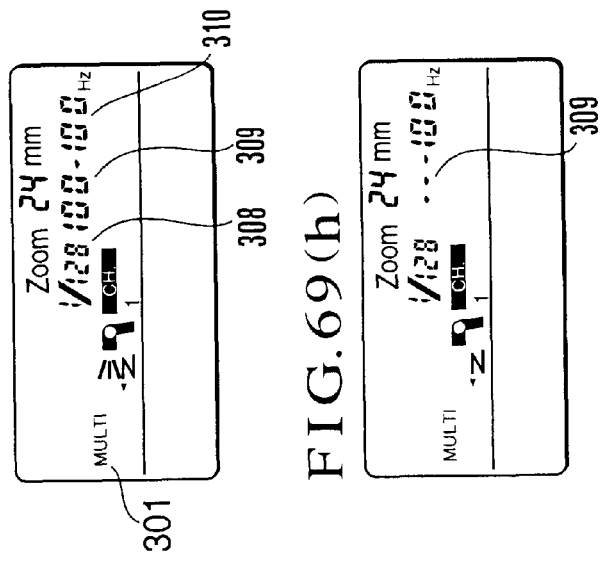
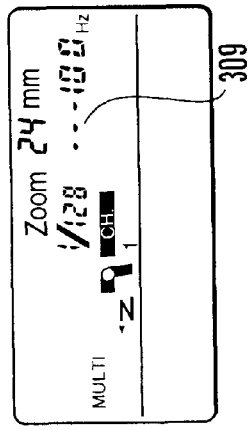
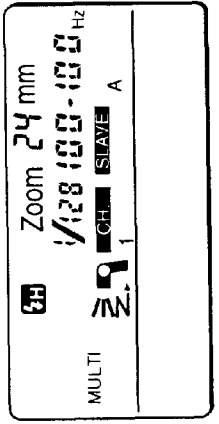
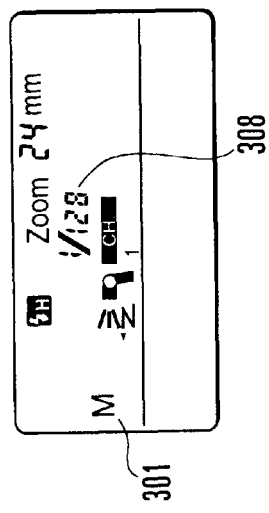
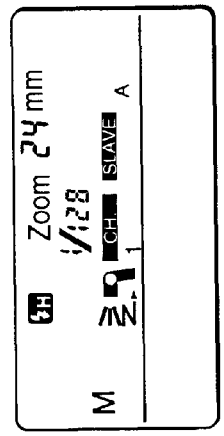
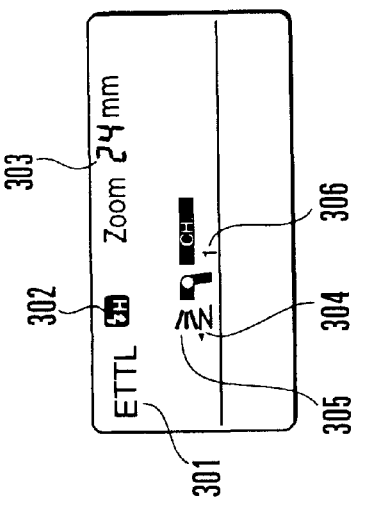
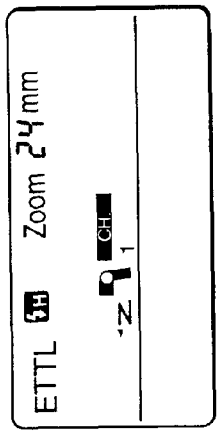
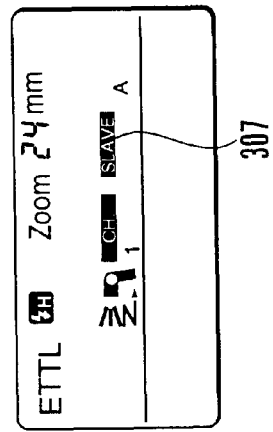
FIG. 69(a) FIG. 69(b) FIG. 69(c) FIG. 69(d) FIG. 69(e) FIG. 69(f) FIG. 69(g) FIG. 69(h) FIG. 69(i)

FLASH SYSTEM

BACKGROUND OF THE INVENTION

1. Field of the Invention

The present invention relates to a flash system, and more particularly to a flash system in which a flash device incorporated in or connected to, for example, a camera is used as a master transmission device to control the light emission of a slave flash device located in a remote position.

2. Description of Related Art

Heretofore, there have been known the following wireless flash systems, each of which uses a wireless flash device located in a position distant from a camera.

As a first example, in Japanese Laid-Open Patent Application No. Hei 4-343341, there is disclosed a wireless flash system, in which a flash device mounted on a camera body transmits to a slave flash device a light-emission start signal composed of a plurality of light pulse signals of a predetermined interval, the slave flash device repeats intermittent light emission upon receipt of the light-emission start signal, a light control circuit of the camera integrates reflected light from an object resulting from the light emission of the slave flash device, and when the result of the integration becomes a predetermined amount of light, the flash device mounted on the camera again transmits to the slave flash device a light-emission stop signal during the absence of the light emission of the slave flash device, thereby ending the light emission.

Further, as a second example, in Japanese Laid-Open Patent Application No. Hei 6-180472, there is disclosed a wireless flash system, in which a camera makes communication with a wireless slave flash device by means of an infrared light signal from the camera, a preliminary infrared light emission is performed a predetermined number of times by an infrared light emitting diode incorporated in the wireless slave flash device, and the camera integrates reflected infrared light from an object, computes the amount of light emission for a main light emission and gives to the wireless slave flash device instructions for the amount of light emission for the main light emission and the timing of light emission for the main light emission, so that a photograph is taken with the main light emission of the wireless slave flash device.

However, in the above first example of wireless flash system, there is a drawback that it is impossible to heighten the flash synchronizing speed due to the intermittent light emission, and there is a possibility that a photograph which is to be taken with a small amount of light emission at a near distance becomes overexposed.

Further, since it is impossible to perform wireless flash photography with a long-time light emission, called "flat emission", used for taking a photograph at a high shutter speed exceeding the flash synchronizing speed, there is a drawback that it is impossible to perform daylight wireless flash photography for which a relatively high shutter speed.

Further, there is a drawback that the guide number of the flash device is lowered by the switching loss occurring in a control circuit due to the intermittent light emission.

In the above second example of wireless flash system, light measurement is performed with the infrared preliminary light emission of the slave flash device and an actual photograph is taken with daylight. Therefore, there is a possibility that an exposure is inaccurately performed due to the difference in reflection factor of infrared ray of an object.

Further, since an infrared light emitting part is required in each of the camera and the slave flash device, there is a drawback that the production cost of the system increases.

In addition, such an infrared light emitting device that uses the infrared light emitting diode can not produce a sufficiently strong light output, and, therefore, the slave flash device can not be located in a distant position, so that a limit is set to the shooting range.

Further, in the above first and second examples of wireless flash systems, there is a description of an automatic light control mode. However, since an exposure is sometimes made uneven depending on the condition of an object if only the automatic light control mode is used in the flash photography, there are provided, other than the automatic light control mode, a manual light emission mode for setting the amount of light emission of the flash device to a fixed setting value, a multiple light emission mode for catching and photographing continuous motions of a moving object, etc., which can not be executed in the above first and second examples.

BRIEF SUMMARY OF THE INVENTION

It is an object of the invention to provide a flash system capable of changing over between a highspeed photography using a shutter speed higher than a flash synchronizing speed and a flash photography using a shutter speed lower than the flash synchronizing speed even in a wireless photography in a camera using a focal plane shutter.

It is another object of the invention to provide a flash system capable of selecting one of a plurality of flash light emission modes, including an automatic light control mode, a manual light emission mode, a multiple light emission mode, etc., and capable of concentrically managing the operation of a slave flash device by means of a master transmission device mounted on or incorporated in a camera.

It is a further object of the invention to provide a flash system capable of enabling confirmation as to whether a command from a master transmission device has been received by a slave flash device.

To attain the above objects, in accordance with one aspect of the invention, there is provided a flash system composed of a camera having a focal plane shutter and a slave flash device located at a distance from the camera, the camera comprising selection means for selecting a light emission mode from between a flash light emission mode and a flat light emission mode according to a controlled shutter speed, and transmission means for transmitting flash-device control information including the light emission mode to the slave flash device, the slave flash device comprising receiving means for receiving the flash-device control information, flash light emission means, and light emission control means for controlling the flash light emission means in the flash light emission mode or the flat light emission mode according to the received flash-device control information. The flash-device control information includes information for selecting one of the flash light emission mode and the flat light emission mode, and, if the flat light emission mode is selected, a shutter speed and a light emission time depending on a shutter blade speed.

In accordance with one aspect of the invention, there is provided a flash system composed of a camera and a slave flash device located at a distance from the camera, the camera comprising selection means for selecting a flash-device exposure mode according to a photo-taking condition, and transmission means for transmitting information on the selected flash-device exposure mode according to a photo-taking operation of the camera, the slave flash device comprising receiving means for receiving the information, flash light emission means, and light emission control means for controlling light emission of the flash light emission means according to the received information on the flash-device exposure mode.

In accordance with one aspect of the invention, there is provided a flash system composed of a camera and a slave flash device located at a distance from the camera, the camera comprising selection means for selecting a flash-device exposure mode according to a photo-taking condition, and transmission means for transmitting information on the selected flash-device exposure mode according to a photo-taking operation of the camera, the slave flash device comprising receiving means for receiving the information, flash light emission means, and display means for displaying information corresponding to the received information on the flash-device exposure mode.

In accordance with one aspect of the invention, there is provided a flash system in which optical communication from a master transmission device to a slave flash device is made so as to control the slave flash device, the master transmission device transmitting a plurality of groups of data, each group of data being composed of a digitally-coded light pulse string of a predetermined length, the plurality of groups of data being transmitted time-serially as a series of information.

In accordance with one aspect of the invention, there is provided a flash system in which transmission of information to a plurality of slave flash devices is performed by optical communication from a master flash device, a series of data composed of data for designating a particular slave flash device among the plurality of slave flash devices and data indicative of an amount of light emission of the designated slave flash device being transmitted by optical communication, and the designated slave flash device controlling an amount of light emission thereof according to the data indicative of the amount of light emission of the designated slave flash device.

In accordance with one aspect of the invention, there is provided a flash system in which optical communication is performed from a master flash device to a slave flash device having a plurality of receiving channels, the master flash device transmitting data indicative of a particular designated channel and data indicative of light emission information of the slave flash device, the slave flash device determining the data indicative of the designated channel received from the master flash device and, if coincidence of channels is determined, making light emission according to the light emission information.

In accordance with one aspect of the invention, there is provided a flash device releasably mountable on a camera, the flash device comprising mounting means for releasably mounting the flash device on the camera, flash light emission means, setting means for setting a slave mode, receiving means for receiving wireless control information, light emission control means for controlling the flash light emission means according to the received control information, detection means for detecting an operating state of the camera through a communication terminal with the camera, and setting canceling means for, when the operating state of the camera is detected by the detection means with the flash device set to the slave mode by the setting means and mounted on the camera, canceling the setting of the slave mode and enabling the flash light emission means to make light emission according to an instruction received from the camera through the communication terminal.

In accordance with one aspect of the invention, there is provided a flash system having a master transmission device including a camera, and one or a plurality of slave flash devices located at distances from the master transmission device, in which the slave flash device is controlled through communication from the master transmission device, the master transmission device comprising transmission means for transmitting control information including at least preliminary light emission information for giving an instruction for preliminary light emission to the slave flash device, the slave flash device comprising receiving means for receiving the control information from the master transmission device, light emission control means for controlling light emission of flash light emission means according to the received control information, preliminary light emission determining means for determining whether the flash light emission means can normally make preliminary light emission when the control information for the preliminary light emission has been received, and light emission inhibiting means for inhibiting main light emission when the preliminary light emission determining means determines that the flash light emission means can not normally make preliminary light emission.

In accordance with one aspect of the invention, there is provided a flash system having a master transmission device including a camera, and one or a plurality of slave flash devices located at distances from the master transmission device, in which the slave flash device is controlled through communication from the master transmission device, the master transmission device comprising transmission means for transmitting control information including at least preliminary light emission information for giving an instruction for preliminary light emission to the slave flash device, the slave flash device comprising receiving means for receiving the control information from the master transmission device, light emission control means for controlling light emission of flash light emission means according to the received control information, preliminary light emission determining means for determining whether the flash light emission means has normally made preliminary light emission when the control information for the preliminary light emission has been received, and light emission inhibiting means for inhibiting main light emission when the preliminary light emission determining means determines that the flash light emission means has not normally made preliminary light emission.

In accordance with one aspect of the invention, there is provided a flash system composed of a wireless flash-device control device and slave flash devices, the wireless flash-device control device being incorporated in or mounted on a camera and comprising test response command means, transmission means for transmitting flash-device control information to the slave flash devices, and setting means for setting number of groups to be controlled of the slave flash devices as being grouped, each of the slave flash devices comprising receiving means for receiving the flash-device control information, test response means, and test response control means for controlling the test response means according to the received flash-device control information, in which, in response to an operation of the test response command means, the wireless flash-device control device transmits to the slave flash devices through the transmission means flash-device control information related to a test response corresponding to the set number of groups, and the slave flash devices perform a test response according to the received flash-device control information related to the test response and the set number of groups.

In accordance with one aspect of the invention, there is provided a flash system composed of a wireless flash-device control device and a slave flash device, the wireless flash-device control device being incorporated in or mounted on a camera and comprising transmission means for transmitting flash-device control information to the slave flash device, the slave flash device comprising receiving means for receiving control information, flash light emission means, and light emission control means for controlling the flash light emission means according to the received control information, in which the wireless flash-device control device further comprises setting means for setting a frequency of multiple light emission and number-of-times-of-light-emission computing means for computing the number of times of light emission on the basis of a set shutter opening time and the frequency of multiple light emission, and transmits to the slave flash device through the transmission means flash-device control information including information related to the number of times of light emission computed by the number-of-times-of-light-emission computing means, and the slave flash device makes multiple light emission composed of a number of times of light emission designated on the basis of the information related to the number of times of light emission included in the received flash-device control information.

In accordance with one aspect of the invention, there is provided a flash system composed of a wireless flash-device control device and a slave flash device, the wireless flash-device control device being incorporated in or mounted on a camera and comprising transmission means for transmitting flash-device control information to the slave flash device, the slave flash device comprising receiving means for receiving control information, flash light emission means, and light emission control means for controlling the flash light emission means according to the received control information, in which the wireless flash-device control device further comprises setting means for setting a frequency of multiple light emission, transmits, prior to traveling of a shutter, to the slave flash device through the transmission means flash-device control information including information related to the frequency of multiple light emission, and transmits a light emission stop signal upon completion of a photo-taking operation, and the slave flash device makes multiple light emission with the light emission control means on the basis of the information related to the frequency of multiple light emission, and stops the multiple light emission upon receipt of the light emission stop signal.

In accordance with one aspect of the invention, there is provided a photo-taking apparatus arranged to control a predetermined operating state in response to a wireless signal from a master transmission device, the photo-taking apparatus comprising a computer arranged to control the operating state and having a first operation mode and a second operation mode in which the computer operates in a lower electric power consumption state than in the first operation mode, and a receiving circuit arranged to receive the wireless signal, in which the computer operates in the first operation mode during a first period of time, and, if the wireless signal is not received by the receiving circuit during the first period of time for the first operation mode, the computer shifts to the second operation mode.

In accordance with one aspect of the invention, there is provided a flash system composed of a camera having a focal plane shutter and a slave flash device located at a distance from the camera, the camera comprising selection means for selecting one of flash light emission and flat light emission, and transmission and light emission means for transmitting light-emission control information to the slave flash device and for making light emission according to the light-emission control information, the slave flash device comprising receiving means for receiving the light-emission control information, and flash light emission means, and being arranged to make preparation for light emission of the flash light emission means according to the received light-emission control information and to make light emission according to the light-emission control information in synchronism with light emission of the camera, in which, when the flat light emission is selected, the light emission of the transmission and light emission means is controlled by light emission control means for varying initial light emission intensity of the flat light emission.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 8(a) to 8(i) are diagrams showing examples of displays made on a display part of the flash device in the first embodiment.

FIG. 12 is a diagram for explaining wireless communication commands in the first embodiment.

FIG. 13 is a flow chart for explaining the operation of the slave flash device in the first embodiment.

FIG. 17 is a diagram for explaining light-amount-ratio setting correction amounts in the first embodiment.

FIG. 43 is a timing chart for explaining the operations of a camera and a flash device according to a fifth embodiment of the invention.

FIG. 55 is a diagram for explaining wireless communication commands in the eighth embodiment.

FIG. 67 is a timing chart for explaining the operations of the camera and the flash devices in the tenth embodiment.

FIG. 68 is a timing chart for explaining the operations of the camera and the flash devices in the tenth embodiment.

FIGS. 69(a) to 69(i) are diagrams showing examples of displays made on a display part of a flash device in an eleventh embodiment of the invention.

DETAILED DESCRIPTION OF THE INVENTION

Hereinafter, preferred embodiments of the invention will be described in detail with reference to the drawings.

Figure 1:
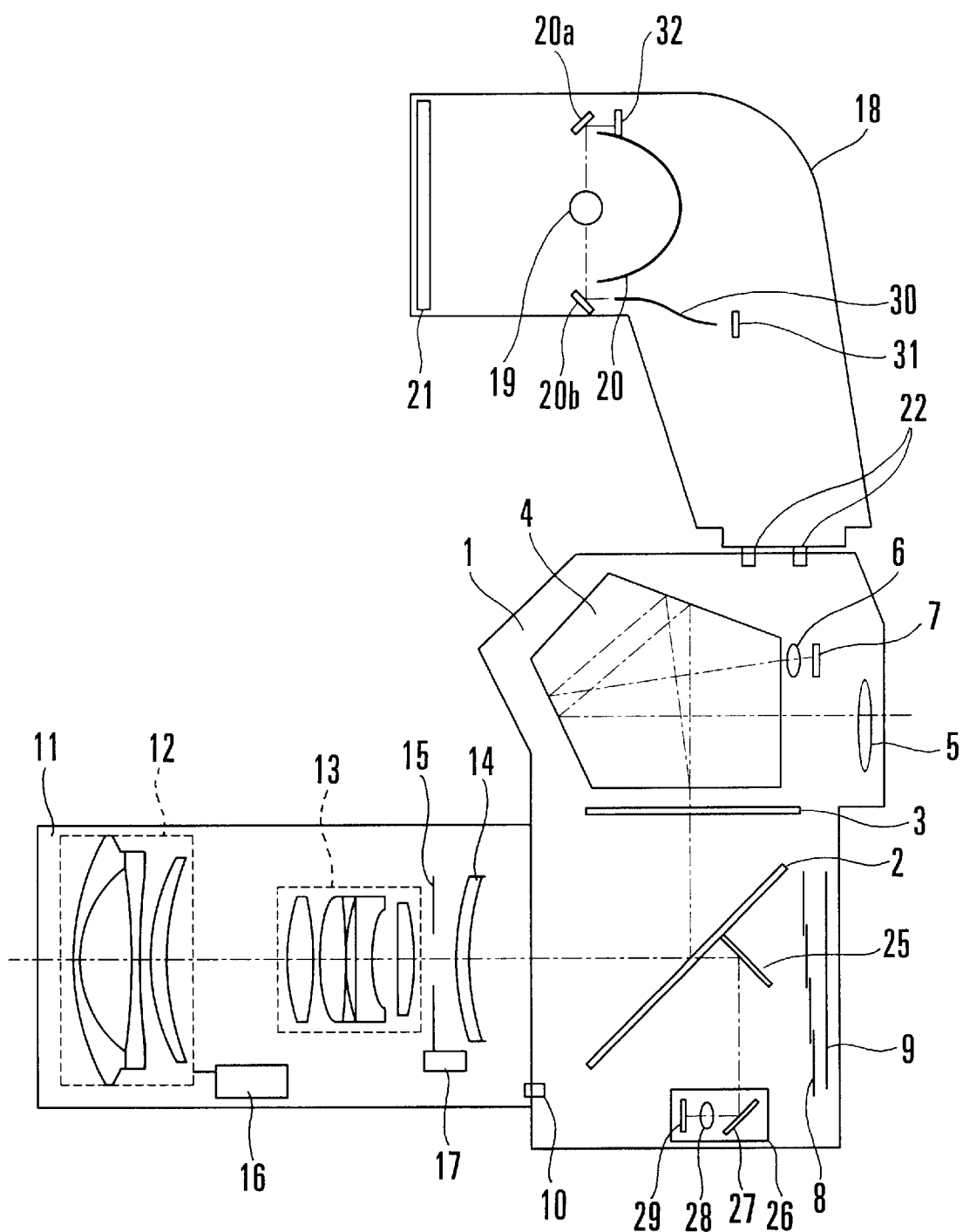
FIG. 1 a side sectional view of a camera system according to a first embodiment of the invention.

FIG. 1 is a sectional view showing mainly the optical arrangement of a flash system according to a first embodiment of the invention as applied to a single-lens reflex camera.

In FIG. 1, reference numeral 1 denotes a camera body. Optical and mechanical parts, electric circuits, a film, etc., are arranged in the camera body 1 to permit a photo-taking operation. A main mirror 2 is arranged to be obliquely set or retracted in or from a photo-taking optical path according to whether the camera is in a photo-taking state or in an observing state. The main mirror 2 is a half mirror which allows about one half of light coming from an object of shooting to pass there to come to a focus detecting optical system. A focusing screen 3 is disposed on a prescribed image forming plane of a photo-taking lens which is composed of lens groups 12 to 14. A pentagonal prism 4 is provided for varying a viewfinder optical path. An eyepiece 5 is arranged to enable the user of the camera to observe a photo-taking image plane by seeing the focusing screen 3 through a window provided at the eyepiece 5.

An image forming lens 6 and a light measuring sensor 7 are provided for measuring the luminance of the object obtained on the observing image plane. The image forming lens 6 is arranged to make the focusing screen 3 and the light measuring sensor 7 conjugate to each other through a reflection light path within the pentagonal prism 4. Reference numeral 8 denotes a shutter. Reference numeral 9 denotes a photosensitive member which is composed of a silver-halide film or the like. A sub-mirror 25 is arranged to lead the light coming from the object to a focus detecting unit 26 by bending it downward.

The focus detecting unit 26 includes a secondary image forming mirror 27, a secondary image forming lens 28, a focus detecting line sensor 29, etc. The secondary image forming mirror 27 and the secondary image forming lens 28 jointly form a focus detecting optical system. The focus detecting optical system is arranged to have a secondary image forming plane of the photo-taking optical system located on the focus detecting line sensor 29.

The focus detecting unit 26 is thus arranged to act as an automatic focus detecting device by detecting the focused state of the object as obtained from within the photo-taking image plane in accordance with a known phase-difference detecting method and by controlling the focus adjusting mechanism of the photo-taking lens.

A mount contact group 10 is arranged to act as an interface between the camera and the lens. A lens barrel 11 is mounted on the camera body 1. Of the lens groups 12 to 14 which form the photo-taking lens, the first lens group 12 is arranged to permit adjustment of the focus position of the photo-taking image plane by moving it back and forth on an optical axis. The second lens group 13 is arranged to permit the magnification of the photo-taking image plane to vary and to make the focal length of the photo-taking lens variable by moving it back and forth on the optical axis. The third lens group 14 is arranged to be a fixed lens. The photo-taking lens is provided with a lens diaphragm 15.

A motor 16 is arranged to drive the first lens group 12. With the first lens group 12 moved back and forth by the motor 16 according to an automatic focusing action, the focus position of the photo-taking lens can be automatically adjusted. A motor 17 is arranged to drive the photo-taking lens diaphragm 15. The diaphragm 15 can be driven to move to a desired aperture diameter position by means of the lens diaphragm driving motor 17.

An external flash device 18 is mounted on the camera body 1. The light emission from the flash device 18 is arranged to be controlled according to a signal from the camera. A xenon tube 19 is a light emitting tube and is arranged to convert an electric current energy into a light emission energy. A reflection plate (mirror) 20 and a Fresnel lens 21 are arranged respectively to efficiently converge the light emission energy toward the object. A flash device contact group 22 is arranged to serve as an interface between the camera body 1 and the external flash device 18.

Photoconducting means 30 is an optical fiber part or the like. The optical fiber 30 is arranged to lead the light emitted by the xenon tube 19 to a light receiving element 31 which is a photodiode or the like arranged as first light receiving means to monitor the light emitted from the xenon tube 19. The amount of the preliminary light emission and that of the main light emission of the flash device are thus measured directly by the light receiving element 31. Another light receiving element 32 which is a photodiode or the like is arranged as second light receiving means also to monitor the light emitted by the xenon tube 19. Flat light emission is controlled by limiting the light emission current of the xenon tube 19 according to the output of the light receiving element 32. Light guides 20a and 20b are arranged in one body with the reflection mirror 20 to reflect and guide the light of the xenon tube 19 to the light receiving elements 32 and 31.

Figure 2:
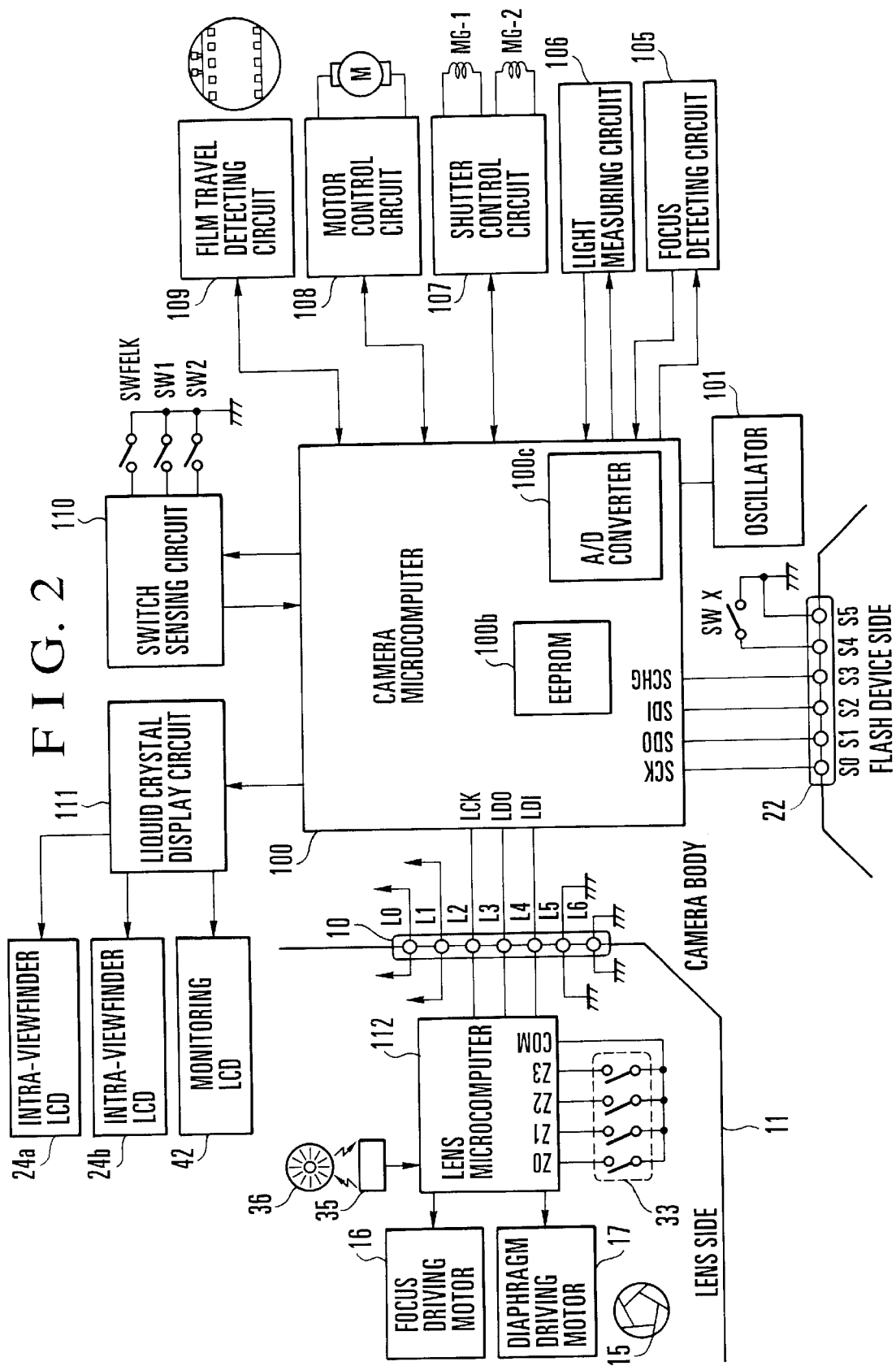
FIG. 2 is a block diagram showing the circuit arrangement of the camera system according to the first embodiment.
Figure 3:
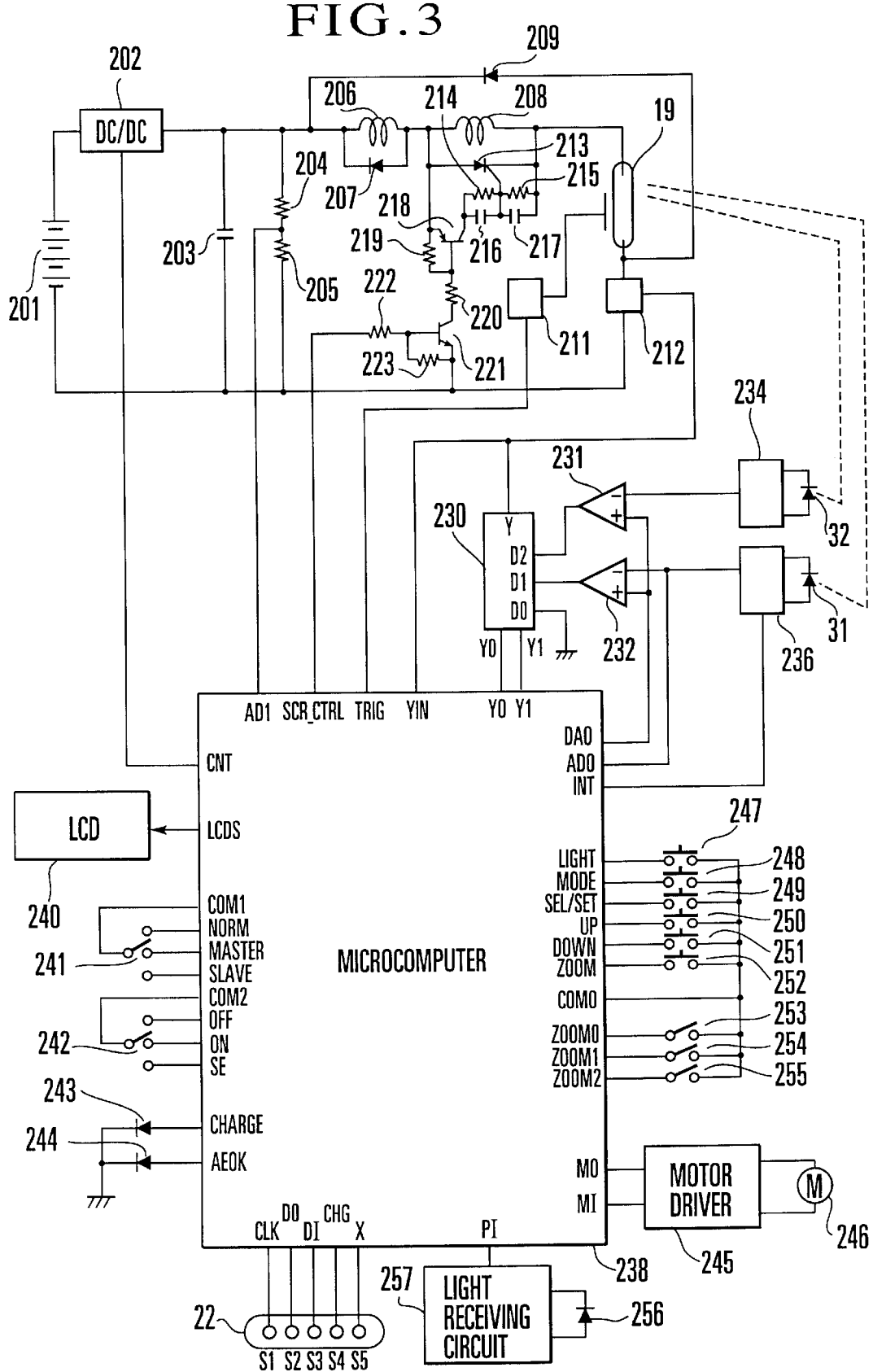
FIG. 3 is a block diagram showing the circuit arrangement of a flash device in the camera system according to the first embodiment.

FIGS. 2 and 3 are block diagrams showing the electric circuit arrangement of the first embodiment of the invention. In FIGS. 2 and 3, members corresponding to the members shown in FIG. 1 are indicated by the same reference numerals as in FIG. 1.

A camera microcomputer 100 is control means disposed on the side of the camera body. The camera microcomputer 100 performs its internal actions on the basis of a clock signal formed by an oscillator 101. The camera microcomputer 100 includes an EEPROM 100b which is arranged as storage means to be capable of storing photo-taking information of varied kinds including a film counter value, etc., and an analog-to-digital (A/D) converter 100c which is arranged to convert analog signals coming from a focus detecting circuit 105 and a light measuring circuit 106 into digital signals. Then, the camera microcomputer 100 sets various states by performing signal processing actions on the A/D converted values.

To the camera microcomputer 100 are connected the focus detecting circuit 105, the light measuring circuit 106, a shutter control circuit 107, a motor control circuit 108, a film travel detecting circuit 109, a switch sensing circuit 110, a liquid crystal display circuit 111, etc. The camera microcomputer 100 transmits signals through the mount contact group 10 to a lens microcomputer 112 which is disposed within the photo-taking lens as a lens control circuit and through the flash device contact group 22 to a flash device microcomputer 238 which is disposed within the external flash device 18 as signal processing means.

The focus detecting circuit 105 is arranged to control the storing and reading actions on the CCD line sensor 29 and to send information on each of pixels of the line sensor 29 to the camera microcomputer 100. The camera microcomputer 100 then A/D converts the information and detects focus by the known phase-difference detecting method on the basis of the A/D converted information.

With the focus thus detected, the camera microcomputer 100 adjusts the focus of the lens, according to information on the focus detection, by exchanging signals with the lens microcomputer 112.

The light measuring circuit 106 is arranged to send, to the camera microcomputer 100, the output of the light measuring sensor 7 as an object luminance signal.

Further, the light measuring circuit 106 sends a luminance signal obtained both in a normal state in which no preliminary light emission is made toward the object from the flash device and in a state in which preliminary light emission is made from the flash device. The camera microcomputer 100 then A/D converts the luminance signal and computes, on the basis of the A/D converted value, an aperture value for photo-taking exposure adjustment, a shutter speed and the amount of main light emission to be made from the flash device at the time of exposure.

The shutter control circuit 107 is arranged to carry out an exposure, in accordance with signals from the camera microcomputer 100, by operating a leading-shutter-blade driving magnet MG-1 and a trailing-shutter-blade driving magnet MG-2, which form the focal plane shutter 8.

The motor control circuit 108 is arranged to control a motor, in accordance with signals from the camera microcomputer 100, to move the main mirror 2 up and down, to charge the shutter and to transport the film.

The film travel detecting circuit 109 is arranged to detect, when the film is transported, whether or not one frame portion of the film is wound up and to send a detection signal to the camera microcomputer 100.

A switch SW1 is arranged to be turned on by the first stroke of a release button which is not shown to cause light measuring and AF (automatic focusing) actions to begin. A switch SW2 is arranged to be turned on by the second stroke of the same release button to cause an exposure action to begin. A switch SWFELK is arranged to permit a preliminary light emitting action to be carried out independently. The switch SWFELK is used in making a check for light control before a photo-taking operation and in fixing an flash exposure in a case where the object of shooting is not in a central part of an image plane. Signals from the switches SW1, SW2, SWFELK and other camera operation members which are not shown are detected and sent by the switch sensing circuit 110 to the camera microcomputer 100.

The liquid crystal display circuit 111 controls, in accordance with signals from the camera microcomputer 100, displays made by the intra-viewfinder LCDs 242a and 242b and the monitor LCD 42. A switch SWX is a flash-device light-emission start switch and is arranged to turn on at the same time as the completion of the travel of a leading blade of the shutter.

Interface terminals which are disposed between the camera microcomputer 100 and the flash device are next described below.

The camera microcomputer 100 is provided with a synchronizing clock signal output terminal SCK for serial communication with the flash device, a serial data output terminal SDO for the serial communication with the flash device, a data input terminal SDI which is also for the serial communication, an input terminal SCHG which is for detecting the possibility of light emission from the flash device, a synchronizing clock signal output terminal LCK for serial communication with the lens 11, a serial data output terminal LDO for the serial communication with the lens 11, and a data input terminal LDI which is also for the serial communication with the lens 11.

The arrangement of the lens is as follows.

The camera body and the lens are electrically connected with each other through a lens mount contact group 10. The lens mount contact group 10 is composed of a power supply contact L0 for the focus driving motor 16 and the diaphragm driving motor 17 which are disposed inside of the lens, a power supply contact L1 for the lens microcomputer 112 which is lens control means, a clock signal contact L2 for making serial data communication in a known manner, a data sending contact L3 for sending data from the camera (body) to the lens, a data sending contact L4 for sending data from the lens to the camera, a grounding contact L5 for power to be supplied to the above-stated motors, and a grounding contact L6 which is for power to be supplied to the lens microcomputer 112.

The lens microcomputer 112 is connected to the camera microcomputer 100 through the lens mount contact group 10. The lens microcomputer 112 controls a focus adjusting action on the lens and an aperture position of the diaphragm. A photo detector 35 and a pulse plate 36 are arranged to enable the lens microcomputer 112 to obtain information on the position of the first lens group 12 by counting the number of pulses, so that the focus of the lens can be adjusted as desired.

The arrangement of the flash device is next described below with reference to FIG. 3.

In FIG. 3, reference numeral 201 denotes a battery used as a power source. A DC-DC converter 202 is arranged in a know manner to boost the voltage of the battery 201 up to several hundred volts. A main capacitor 203 is arranged to accumulate light emission energy there. Resistors 204 and 205 are arranged to divide the voltage of the main capacitor 203 in a predetermined ratio.

A first coil 206 is arranged to limit a light emission current. A first diode 207 is arranged to absorb a back electromotive voltage generated when light emission comes to a stop. A second coil 208 is arranged to limit a light emission current. A second diode 209 is arranged to absorb a back electromotive voltage generated in the coil 208 when light emission comes to a stop.

The xenon tube 19 is arranged not only to emit light but also to output and send control information to a slave flash device. A trigger generating circuit 211 is arranged to generate a trigger signal. A light emission control circuit 212 is an IGBT or the like. A thyristor 213 is a switching element for bypassing the coil 208.

A light emission current is allowed to bypass the coil 208 to allow no current to flow through the coil 208 in cases where wireless communication is conducted with a slave flash device by using the xenon tube 19 to generate short light pulses from the xenon tube 19 and also where the light emission stopping control is to be improved in bringing flash light emission to a top.

A resistor 214 is provided for turning on the thyristor 213 by allowing a current to flow to a gate which is a control electrode of the thyristor 213. A resistor 215 is a gate potential stabilizing resistor and is arranged to prevent the thyristor 213 from being turned on by any noise applied to its gate when it is in an off-state.

A capacitor 216 is provided for quickly turning the thyristor 213 on. A noise absorbing capacitor 217 is arranged to prevent the thyristor 213 from being turned on by any noise applied to its gate while it is off.

A transistor 218 is provided for switching the gate current of the thyristor 213. Reference numerals 219, 220, 222 and 223 denote resistors. A transistor 221 is provided for switching the transistor 218.

A data selector 230 is arranged to output data Y by selecting one of terminals D0, D1 and D2 according to the combination of two inputs Y0 and Y1.

A comparator 231 is provided for control over the light emission intensity (luminance) of flat light emission. A comparator 232 is provided for control over the amount of light emission in the case of flash light emission. A photodiode 32 is a light (photo) receiving sensor used for monitoring the light output of the xenon tube 19 for flat light emission control.

A light measuring circuit 234 is arranged to amplify a minute current flowing through the photodiode 32 and to convert the photocurrent into a voltage. A photodiode 31 is a light receiving sensor used in monitoring, for flash light emission control, the light output of the xenon tube 19 which is light emission means.

A light measuring integration circuit 236 is arranged to logarithmically compress a photocurrent which flows through the photodiode 31 and also to compress and integrate the amount of light emission from the xenon tube 19. The microcomputer 238 is arranged to control actions of the whole flash device. A contact group 22 is arranged at a hot shoe for communication with the camera body.

A liquid crystal display 240 is a display means for displaying the operating state of the flash device.

A wireless mode selection switch 241 is arranged to set the flash device into a wireless operating state. A power supply switch 242 is arranged to turn on and off the power supply of the flash device. An LED 243 is arranged to show completion of a charging action on the flash device. An LED 244 is arranged to show that a photo-taking operation has been carried out with an apposite amount of light emission from the flash device. A motor control circuit (motor driver) 245 is arranged in a known manner. A motor 246 is arranged to move the xenon tube 19 and the reflection mirror 20 for the purpose of setting an illumination angle according to the focal length of the lens mounted on the camera body.

A back-light lighting switch 247 is provided for illuminating the liquid crystal display 240. A mode switch 248 is provided for selecting a light emission mode of the flash device. A switch 249 is provided for selecting a parameter (such as a light emission amount in the event of manual light emission, or the like) which is incidental to the light emission mode. An up switch 250 is provided for increasing a setting value of the above-stated parameter. A down switch 251 is provided for decreasing the setting value of the parameter. A zoom switch 252 is provided for manually setting an illumination angle of the flash device.

Encoders 253, 254 and 255 are arranged to indicate an illumination angle position. A photodiode 256 is signal receiving means for receiving control information from the camera. A light receiving circuit 257 is arranged to amplify a photocurrent flowing through the photodiode 256 and to convert it into a voltage.

Each of terminals provided at the microcomputer 238 is next described.

A control output terminal CNT is provided for control over the charging action of the DC/DC converter 202. A wiring group LCDS is provided for lighting up the displays of the liquid crystal display 240. A control output terminal COM1 corresponds to the ground potential of the switch 241. An input terminal NORM is arranged to be selected when the operating state of the flash device is in a normal photo-taking state, i.e., when the flash device is not in a wireless operation mode.

An input terminal MASTER is arranged to be selected in controlling a wireless slave flash device and is connected to the camera through the flash device contact group 22. An input terminal SLAVE is arranged to be selected when the operating state of the flash device is in a wireless slave mode, in which light emission of a slave flash device is set away from the camera body and light emission of the flash device is controlled by receiving a light emission control light signal from the master flash device at the light receiving element 256.

A control output terminal COM2 corresponds to the ground potential of the switch 242. An input terminal OFF is arranged to be selected when the power supply of the flash device is in an off-state. An input terminal ON is arranged to be selected when the power supply of the flash device is in an on-state. An input terminal SE is arranged to be selected in a case where the power supply of the flash device turns off after the lapse of a predetermined period of time.

A synchronizing-clock-signal input terminal CLK is provided for the serial communication between the camera and the flash device. A terminal DO is a serial data output terminal for transfer of serial data from the flash device to the camera in synchronism with a synchronizing clock signal. A terminal DI is a serial data input terminal for transfer of serial data from the camera to the flash device in synchronism with the synchronizing clock signal. A terminal X is an input terminal provided for the X contact of the camera. A terminal PI is an input terminal which is provided for the light receiving circuit 257.

Output terminals M0 and M1 are provided for control over four different actions of the motor driver 245 to be performed on the motor 246, including CW driving, CCW driving, turning off and braking the motor. Input terminals ZOOM0, ZOOM1 and ZOOM2 are arranged to receive the outputs of the encoders 253, 254 and 255 indicating the above-stated zoom positions. A terminal COM0 is an output terminal corresponding to the ground potential of the zoom encoders.

A terminal ZOOM is an input terminal provided for the above-stated zoom position setting switch 252. A terminal DOWN is an input terminal for the down switch 251 which is provided for decreasing the above-stated light emission parameter. A terminal UP is an input terminal for the up switch 250 which is provided for increasing the light emission parameter. A terminal SEL/SET is an input terminal for the above-stated data selection switch 249. A terminal MODE is an input terminal for the above-stated light emission mode selection switch 248. A terminal LIGHT is an input terminal for the above-stated back-light lighting switch 247. A terminal YIN is an input terminal provided for detecting the output state of the data selector 230. A terminal INT is an integral control output terminal for the light measuring integration circuit 236. A terminal AD0 is an A/D conversion input terminal provided for reading an integral voltage which shows the light emission amount of the light measuring integration circuit 236. A terminal DA0 is a D/A output terminal provided for outputting comparison voltages of the comparators 231 and 232.

Terminals Y0 and Y1 are output terminals for setting the selection state of the data selector 230. A terminal TRIG is an output terminal for generating a light emission trigger signal. A terminal SCR_CTRL is an output terminal for control over the thyristor 213.

Figure 4A:
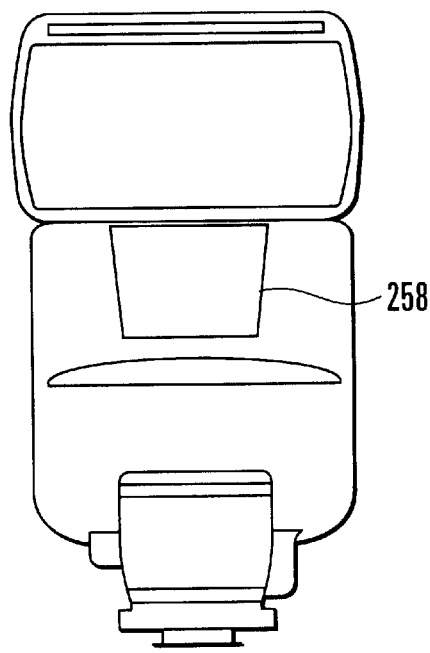
FIGS. 4(a) and 4(b) are a front view and a back view, respectively, showing the appearance of the flash device shown in FIG. 3.
Figure 4B:
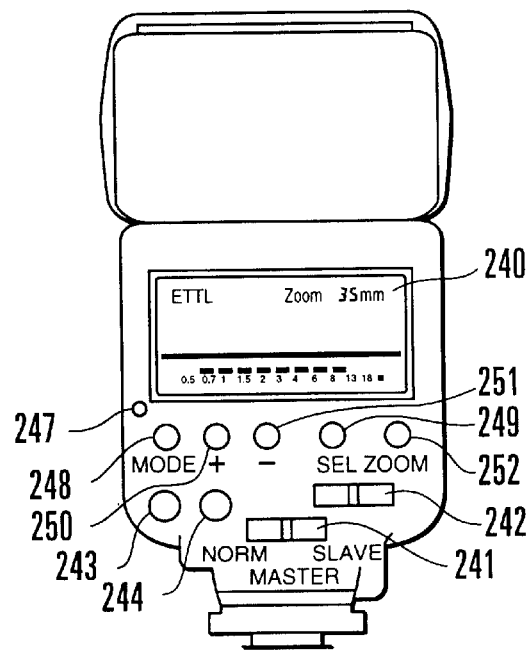

FIGS. 4(a) and 4(b) are front and back views showing the appearance of the flash device arranged as the first embodiment of the invention. In FIGS. 4(a) and 4(b), switches, a display, etc., are indicated by the same reference numerals as those used for corresponding parts shown in FIG. 1 and described above. Therefore, the details of them are omitted from the description. In FIG. 4(a), reference numeral 258 denotes the light receiving window of the photodiode 256 which is information receiving means. The photodiode 256 is disposed inside of the light receiving window 258. In FIG. 4(b), reference numeral 243 denotes a part where the charge completion display LED is shown. Reference numeral 244 denotes a part where the light control display LED is shown.

Figure 5:
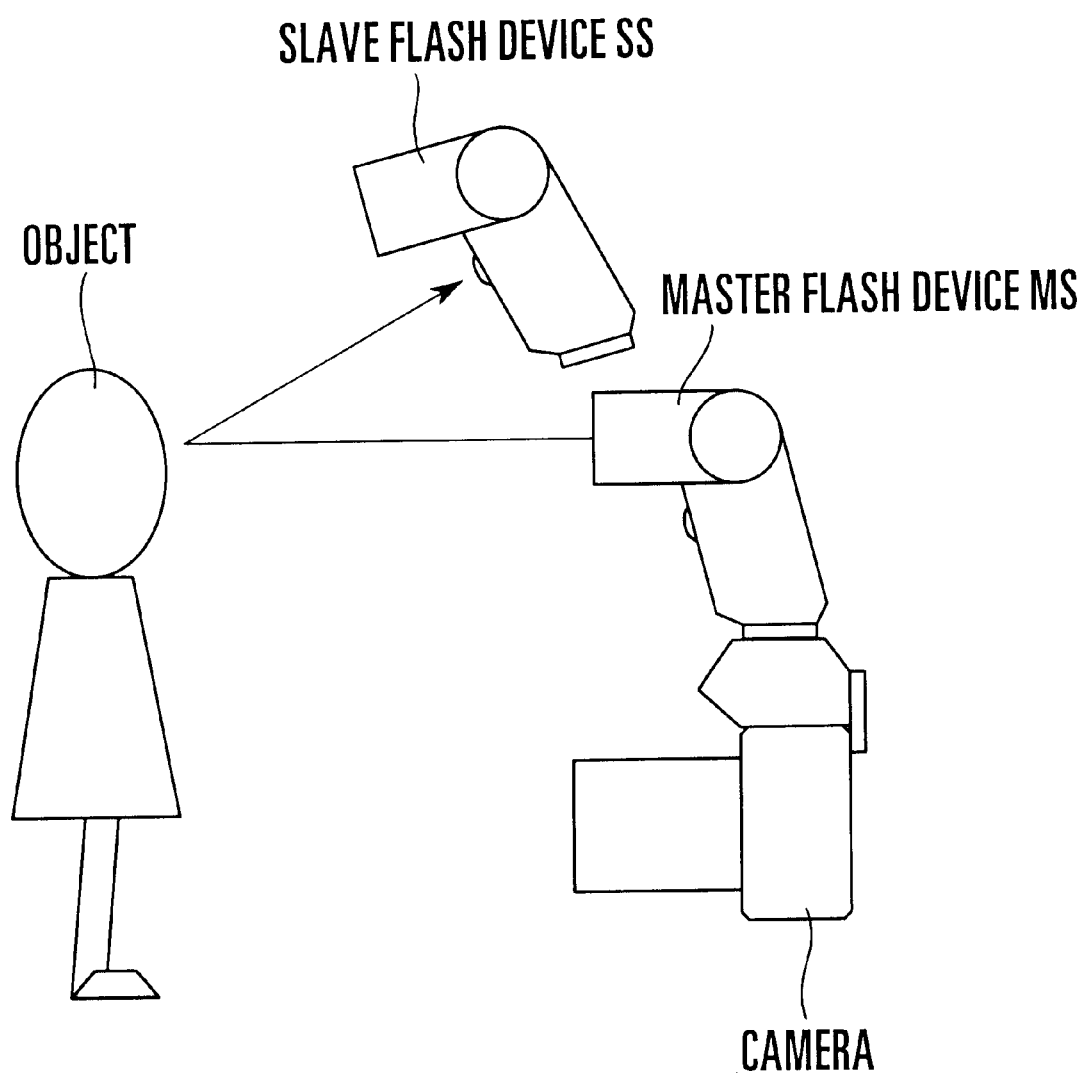
FIG. 5 is a schematic diagram showing the positional relation between a master flash device and a slave flash device in the first embodiment.

FIG. 5 shows by way of example a wireless photo-taking system using a master flash device MS, one slave flash device SS and the camera 1.

The master flash device MS which is arranged as shown in FIG. 3 is connected to the camera 1. In the master flash device MS, the above-stated wireless mode selection switch 241 is set in a position for the input terminal MASTER. In the slave flash device SS which is arranged also as shown in FIG. 3, the wireless mode selection switch 242 is set in a position for the input terminal SLAVE.

The light-emission control light of the master flash device MS is reflected by a photo-taking object. The reflected light is received through the light receiving window 258 of the slave flash device SS to control light emission of the slave flash device SS.

The master flash device MS can be set in two different light emission modes which are called "a master light emission mode" and "a control-only mode". In the master light emission mode, the master flash device MS emits light from itself. In the control-only mode, the flash device MS only controls the light emission of the slave flash device SS. In the case of FIG. 5, if the master flash device MS is set in the master light emission mode, light is emitted from both the master flash device MS and the slave flash device SS. However, a light-emission-quantity ratio between the two flash devices is not controlled to allow them to emit light in equal amounts (hereinafter this will be called a ratio-off mode).

Figure 6A:
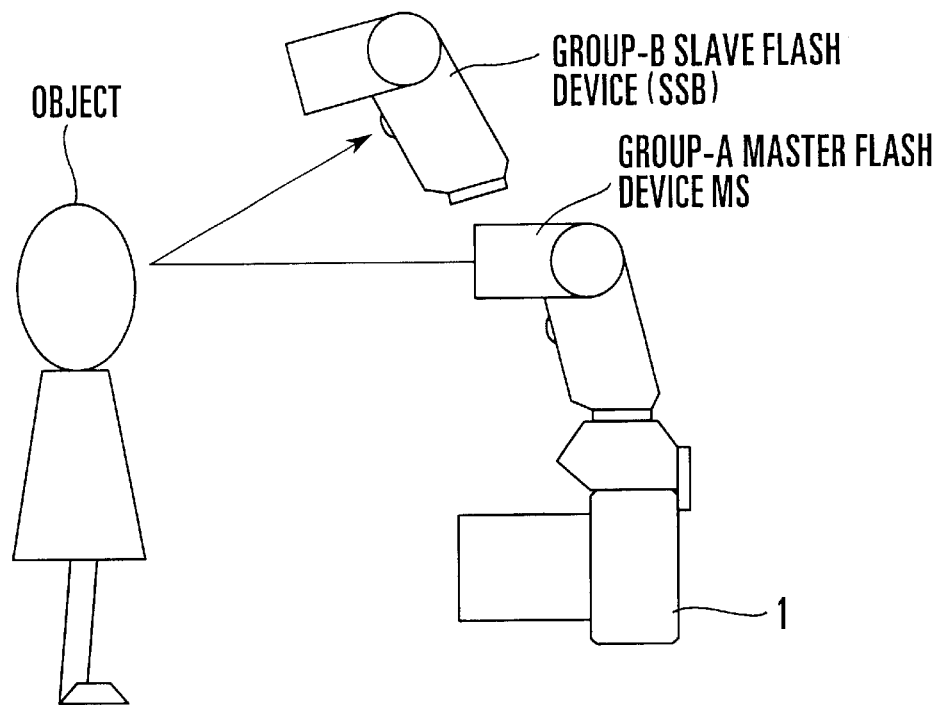
FIGS. 6(a) and 6(b) are schematic diagrams showing the positional relations between the master flash device and the slave flash device or slave flash devices in the first embodiment.

FIG. 6(a) shows a wireless photo-taking example in which a master flash device MS is set in the master light emission mode as a master transmission device, and a slave flash device SSB is set in a group B.

In this case, the master flash device MS is not only arranged to control the slave flash device SSB but also can be arranged to emit light in an arbitrary light-emission-quantity ratio between the master flash device MB and the slave flash device SSB.

Figure 6B:
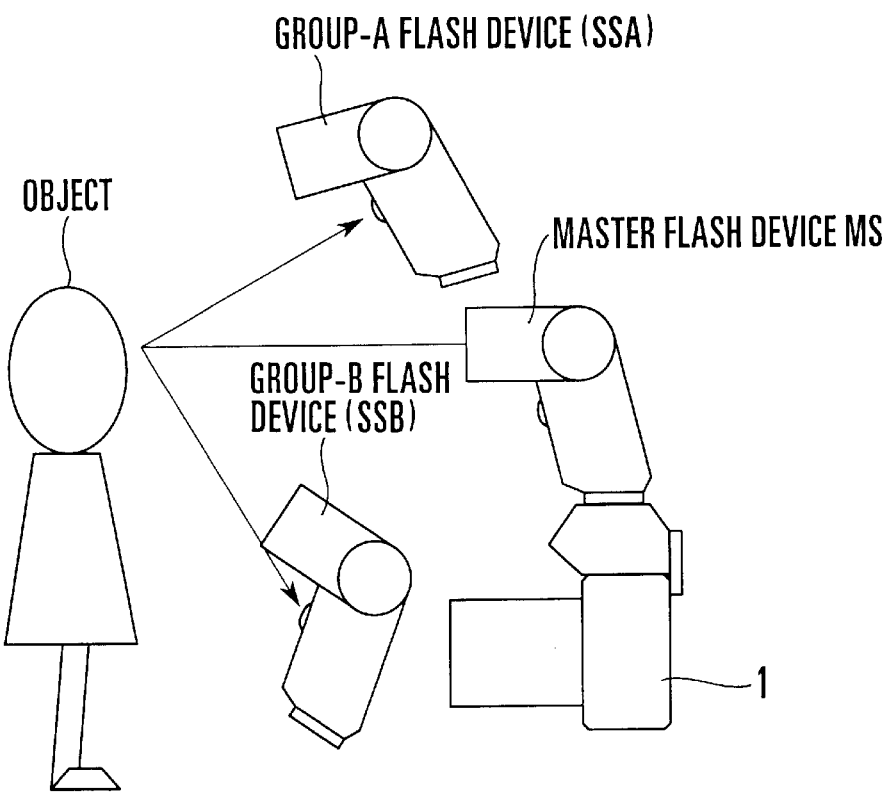

FIG. 6(b) shows another wireless photo-taking example in which a master flash device MS is set in the control-only mode as a master transmission device, and two slave flash devices SSA and SSB are respectively set as flash devices of a group A and a group B. The master flash device MS can be set to allow the group-A slave flash device SSA and the group-B slave flash device SSB to emit light in an arbitrary light-quantity ratio.

Figure 7A:
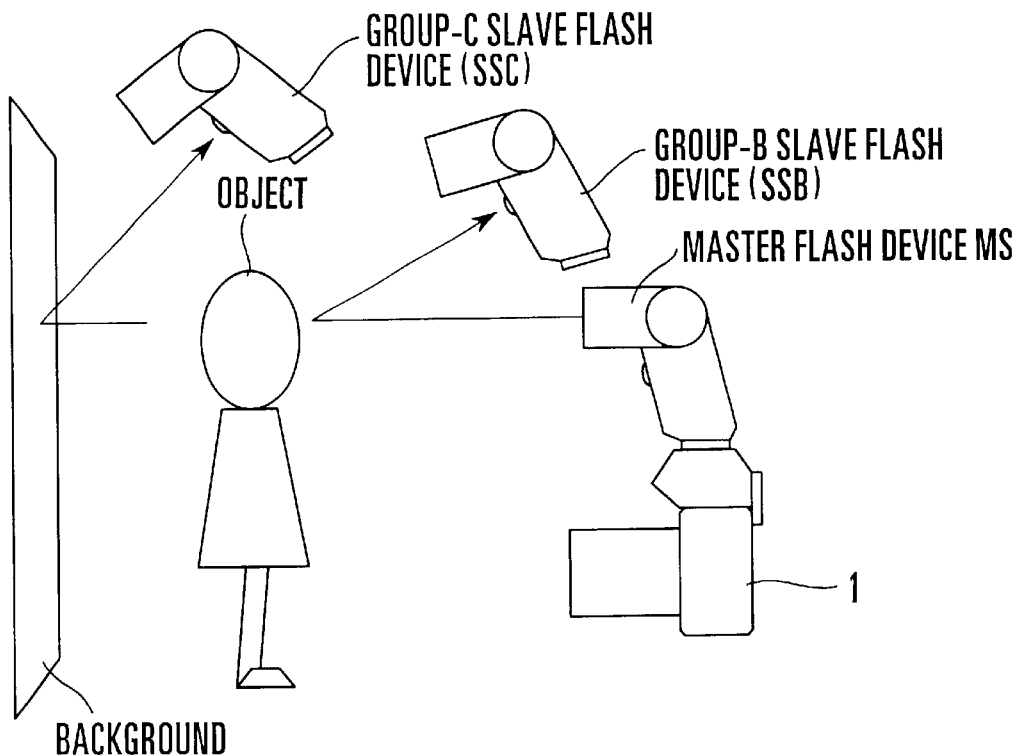
FIGS. 7(a) and 7(b) are schematic diagrams showing the positional relations between the master flash device and the slave flash devices in the first embodiment.

FIGS. 7(a) shows a further wireless photo-taking example in which a master flash device MS is set in the master light emission mode, a slave flash device SSB is set to be of a group B, and another slave flash device SSC is set to be of a group C.

The master flash device MS is arranged to control the slave flash devices SSB and SSC and can be set to emit light by itself and to allow the group-B and group-C slave flash devices SSB and SSC to emit light in an arbitrary light-quantity ratio to the quantity (amount) of light emitted by the master flash device MS.

Figure 7B:
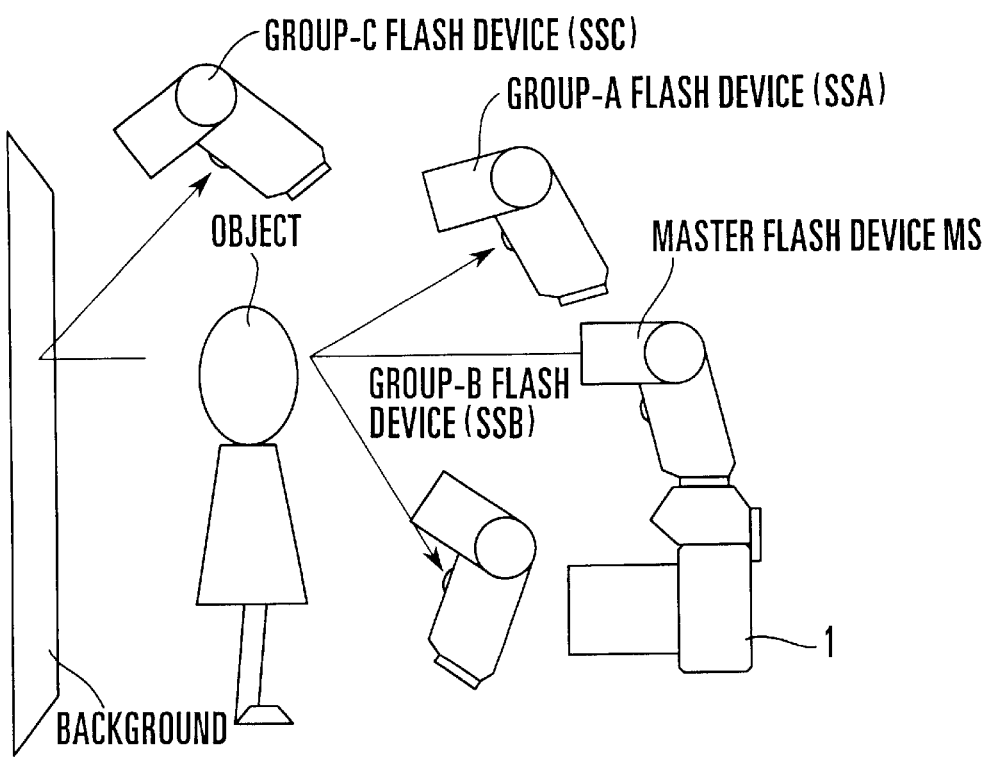

FIG. 7(b) shows a case where a master flash device MS is set in the control-only mode while three slave flash devices SSA, SSB and SSC are used.

The three slave flash devices are respectively set to be of groups A, B and C. The master flash device MS can be set to allow the group-A slave flash device, the group-B slave flash device and the group-C slave flash device to emit light in an arbitrary light quantity ratio.

FIGS. 8(a) to 8(i) show examples of display made by the liquid crystal display 240 in the case of the wireless photo-taking with a single-lighting arrangement described above with reference to FIG. 5.

Among these display examples, FIGS. 8(a), 8(b) and 8(c) show displays made in an automatic light control operation mode. FIGS. 8(d), 8(e) and 8(f) show displays made in a manual light emission operation mode. FIGS. 8(g), 8(h) and 8(i) show displays made in a multiple light emission operation mode.

In the case of the displays of FIGS. 8(a), 8(d) and 8(g) shown in the first row, the master flash device MS is in the master light emission mode. In the case of the displays of FIGS. 8(b), 8(e) and 8(h) shown in the second row, the master flash device is in the control-only mode. In the case of the displays of FIGS. 8(c), 8(f) and 8(i) shown in the third row, the displays are made in a slave mode.

In FIGS. 8(a) to 8(i), reference numeral 301 denotes a display of flash device light emission mode.

In the cases of the master flash device (shown in the first and second rows), one of the automatic light control mode (ETTL), the manual light emission mode (M) and the multiple light emission mode (MULTI) is selected and displayed according to the light emission mode. In the slave mode (shown in the third row), on the other hand, a light emission mode designated by the master flash device is displayed.

Reference numeral 302 denotes a display icon indicating a flash light emission photo-taking. This display is made when flat light emission is allowed in the master mode and when a command for flat light emission is issued from the master flash device in the slave mode.

Reference numeral 303 denotes a zoom display indicating a set zoom position. Reference numeral 304 denotes an icon which indicates wireless mode. The display icon 304 is directed outward in the master mode and inward in the case of the slave mode.

Reference numeral 305 is a front light emission mark of the wireless mode. The front light emission mark 305 is displayed in the master light emission mode shown in the first row. In the control-only mode shown in the second row, the front light emission mark 305 is put out to visually indicate the control-only mode.

Reference numeral 306 denotes a channel display. In a case where the wireless flash device system of this embodiment is used simultaneously by a plurality of users, a channel set is displayed to prevent confusion.

Reference numeral 307 denotes a slave mode display which is made when the slave mode is selected. In the case of this embodiment, the slave mode display is made in any of three states including A, B and C states.

Reference numeral 308 denotes a light quantity setting value display. The display 308 indicates a manual light emission amount in the manual light emission mode, a light emission amount per shot in the multiple light emission mode, a value set by the master flash device in the master mode (the first and second rows), and a value designated by the master flash device in the slave mode (the third row).

Reference numeral 309 denotes a display of the number of times of light emission set in the multiple light emission mode. The display 309 indicates a value set by the master flash device in the master mode (the first and second rows) and a value designated by the master flash device in the case of the slave mode (the third row).

Reference numeral 310 denotes a display of a frequency set in the multiple light emission mode. The display 310 indicates a value set by the master flash device in the master mode (the first and second rows) and a value designated by the master flash device in the slave mode (the third row).

FIGS. 9(a) to 9(i) show examples of displays to be made by the liquid crystal display 240 of the flash device in the case of wireless photo-taking mode in which a light quantity ratio is set between two flash devices as described in the foregoing with reference to FIGS. 6(a) and 6(b). Since these displays are similar in part to the displays shown in FIGS. 8(a) to 8(i), only such parts that differ from the displays of FIGS. 8(a) to 8(i) are described below.

In FIGS. 9(a) to 9(i), reference numeral 320 denotes a display of a light quantity ratio setting mode. The display 320 indicates that flash devices of two groups A and B are controllable.

Reference numeral 321 denotes a light-quantity ratio display which indicates a light quantity ratio between the group-A flash device and the group-B flash device in the automatic light control mode. In the case of this embodiment, the light quantity ratio A:B can be set by ½ steps continuously from 8:1 to 1:8. The set light quantity ratio can be visually recognized by the lighted up position of a mark 322 which indicates the display position of the light quantity ratio display 321.

Since the display is possible only for one group in the case of this embodiment, the light emission amount of one of the groups A and B indicated by flickering at the light quantity ratio setting mode display 320 is displayed by the light emission amount display 308 when the master flash device is in the manual light emission mode. Further, when the master flash device is in the multiple light emission mode, the light emission amount display 308 also shows the light emission amount by flickering either "A" or "B" at the light quantity ratio setting mode display 320.

Figure 9A:
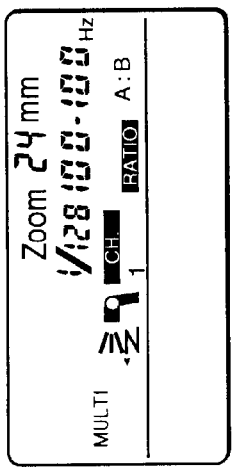
FIGS. 9(a) to 9(i) are diagrams showing examples of displays made on the display part of the flash device in the first embodiment.
Figure 9B:
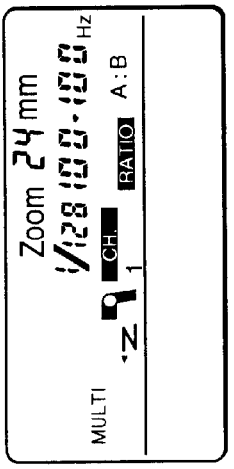
Figure 9C:
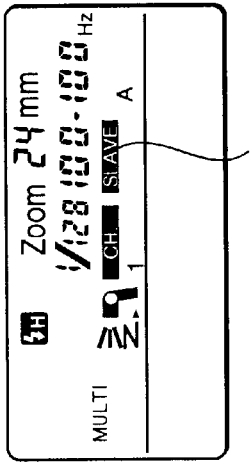
Figure 9D:
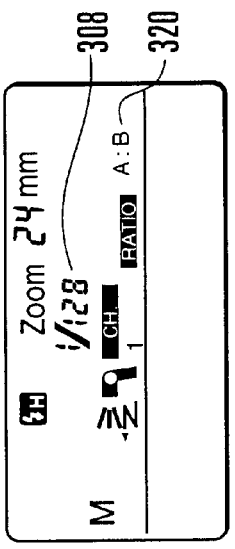
Figure 9E:
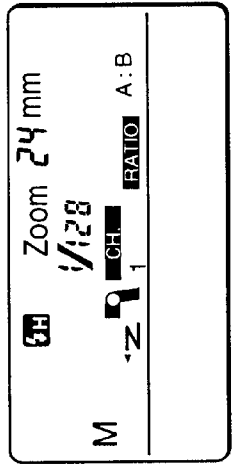
Figure 9F:
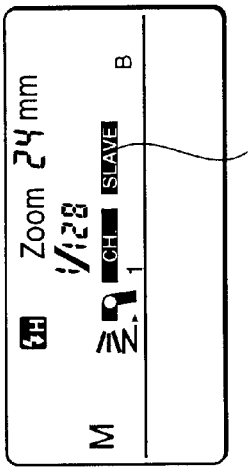
Figure 9G:
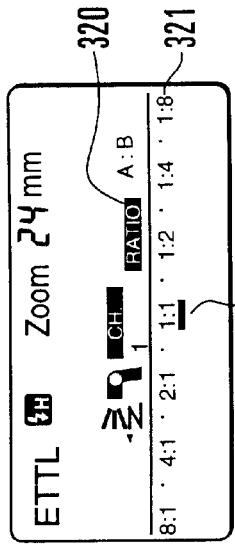
Figure 9H:
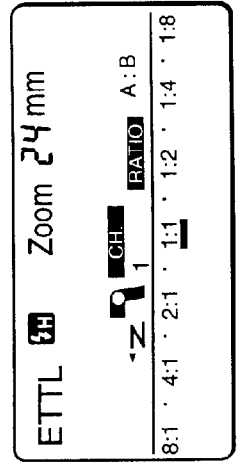
Figure 9I:
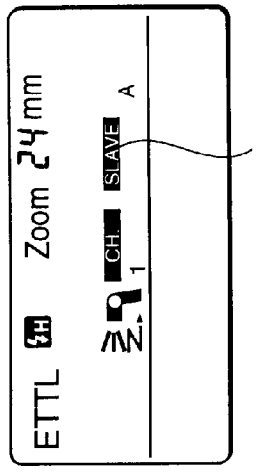

The slave mode display 307 shows that the group A is set, in the display examples of FIGS. 9(c) and 9(i), and the group B is set in the case of FIG. 9(f).

FIGS. 10(a) to 10(i) show examples of displays to be made by the liquid crystal display 240 of the flash device in the case of wireless photo-taking mode in which a light quantity ratio is set among three flash devices as described in the foregoing with reference to FIGS. 7(a) and 7(b). Since these displays are similar in part to the displays shown in FIGS. 8(a) to 8(i) and in FIGS. 9(a) to 9(i), only such parts that differ from the displays of FIGS. 8(a) to 8(i) and 9(a) to 9(i) are described below.

In FIGS. 10(a) to 10(i), reference numeral 320 denotes a display of a light quantity ratio setting mode. The display 320 indicates that flash devices of three groups A, B and C are controllable.

Reference numeral 323 denotes a display of the light control level of the group C. As apparent from FIGS. 7(a) and 7(b), the group-C flash device is used for illuminating the background of the object. In view of this, the embodiment is arranged to allow an amount of correction for an apposite light control level of the group C to be set and displayed independently of the flash devices of other groups A and B.

Figure 10G:
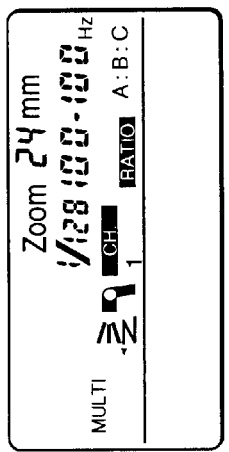
FIGS. 10(a) to 10(i) are diagrams showing examples of displays made on the display part of the flash device in the first embodiment.
Figure 10H:
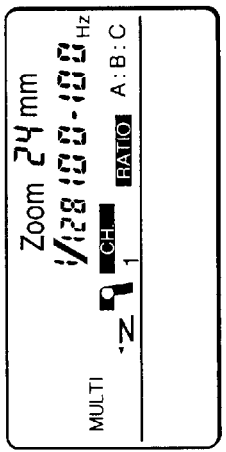
Figure 10I:
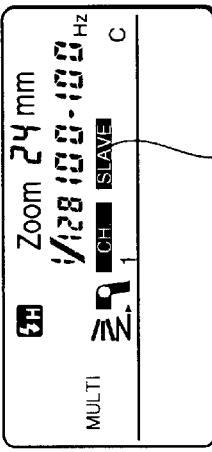
Figure 10D:
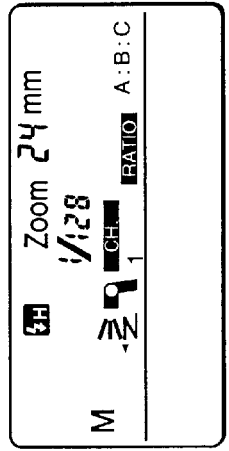
Figure 10E:
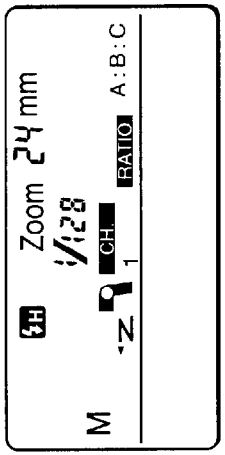
Figure 10F:
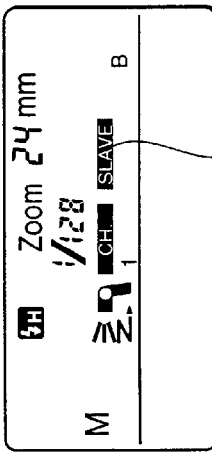
Figure 10A:
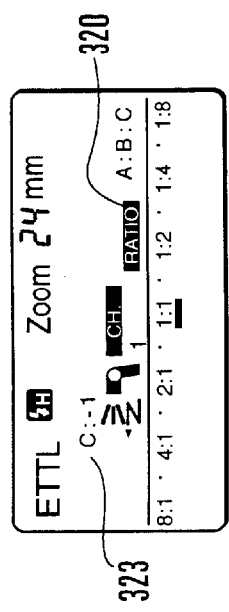
Figure 10B:
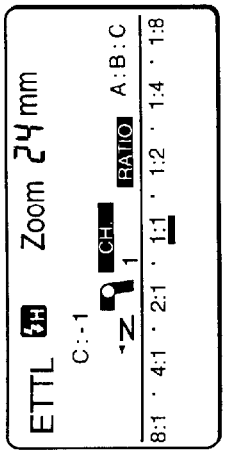
Figure 10C:
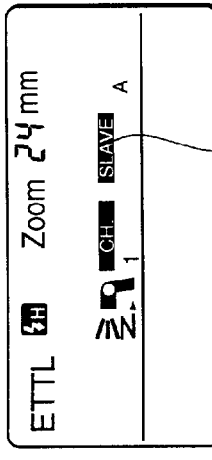

The slave mode display 307 is showing that the group A is set, in the display examples of FIGS. 10(c), that the group B is set in the case of FIG. 10(f) and that the group C is set in the case of FIG. 10(i).

Further, in the liquid crystal display examples shown in FIGS. 8(a) to 8(i) and 10(a) to 10(i), the automatic light control mode, the manual light emission mode and the multiple light emission mode can be selectively set by pushing a MODE button 248 shown in FIG. 4(b). The values of control over the slave flash devices (ratio-off, A:B, A:B:C), a manual light emission amount, the number of times of multiple light emission, a multiple light emission frequency, a light quantity ratio A:B, the light control level of the group C, a controlling channel, the control-only mode, etc., can be set by selecting the applicable item by pushing a SEL button 249 shown in FIG. 4(b). The item thus selected can be set by operating a + button 250 and a − button 251 which are also shown in FIG. 4(b).

Further, a normal mode, a wireless master mode and a wireless slave mode can be selected by operating a switch 241 shown in FIG. 4(b) from one switch position over to another.

Description of Wireless Communication

Information about light emission is transmitted from the master flash device to the slave flash device by wireless communication. The wireless communication is next described below with reference to FIG. 11.

Figure 11:
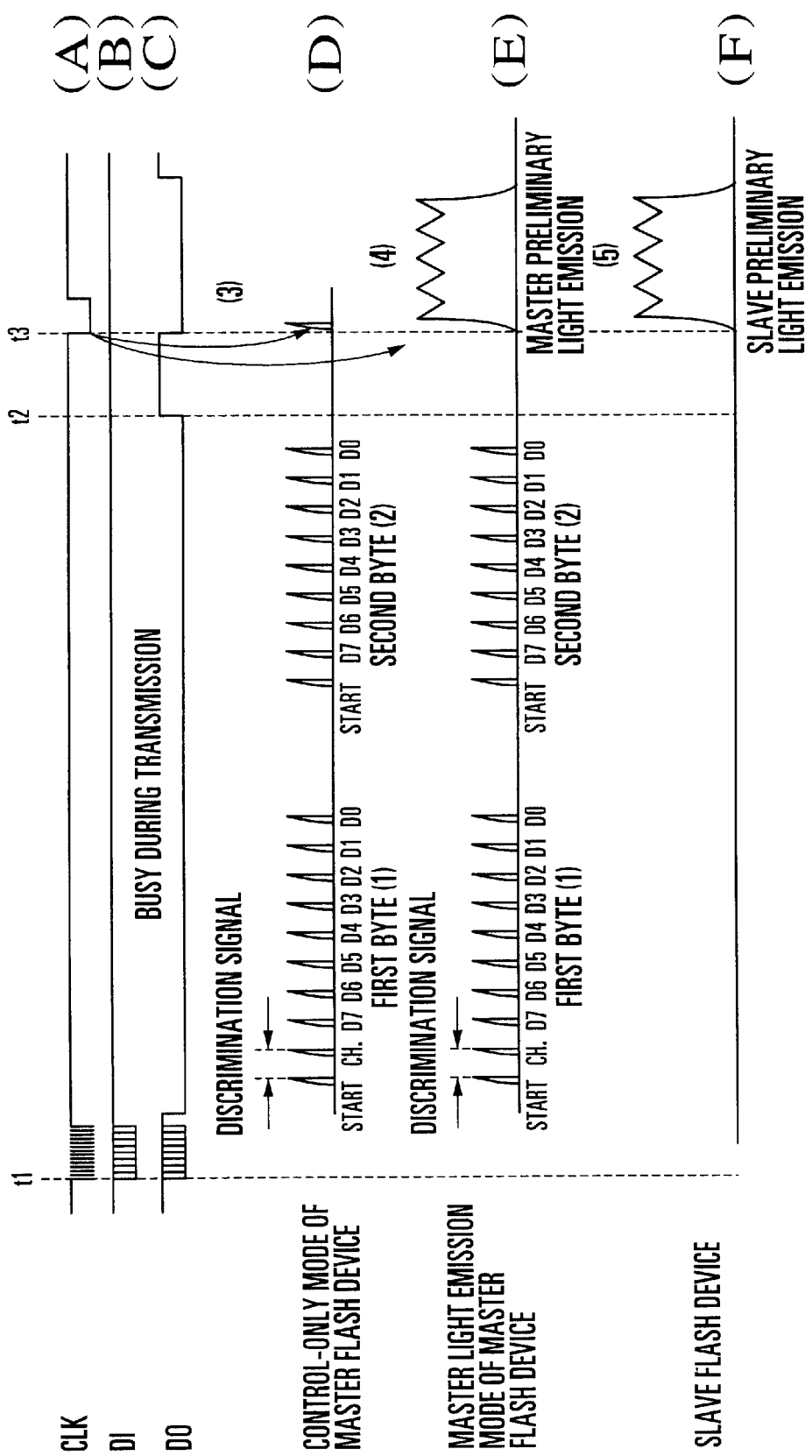
FIG. 11 is a timing chart for explaining wireless communication in the first embodiment.

FIG. 11 shows wireless light control signals generated by the master flash device MS in causing the slave flash device to make preliminary light emission.

In FIG. 11, a part (A) shows a synchronizing clock signal for serial communication from the camera to the flash device. A part (B) shows a data output signal from the camera to the flash device. A part (C) shows a data output signal from the flash device to the camera.

Parts (D) and (E) of FIG. 11 show wireless light communication signals intermittently emitted in a pulse like manner from the xenon tube 19 of the master flash device to the slave flash device. The signal of the part (D) is emitted when the master flash device in the control-only mode. The signal of the part (E) is emitted when the master flash device is in the master light emission mode. A part (F) shows light emission made by the slave flash device.

Referring to FIG. 11, when a preliminary light emission command is sent from the camera to the master flash device through the serial communication line, the master flash device generates the wireless light communication signal shown in the part (D) or (E).

The first byte of the signal is data composed of a total of ten bits including a pulse START, a pulse CH and pulses D7 to D0. An interval between the pulse START and the pulse CH is a channel discrimination signal. The pulses (or bits) D7 to D0 which are spaced at intervals of a predetermined distance after the channel discrimination signal form data of one byte.

The one-byte data which is a combination of the light pulses D7 to D0 is formed by compressing information on a light emission mode (a preliminary light emission, main light emission, manual light emission or multiple light emission mode), a flash or flat light emission mode, light emission time in the case of the flat light emission mode, etc. The details of this command will be described later herein.

In each of subsequent bytes, including a second byte, etc., data of one byte is composed of a start pulse START and pulses D7 to D0 which are spaced at intervals of a predetermined distance indicating the amount of light emission according to the light emission mode.

The communication data length of the wireless light communication is predetermined according to the light emission mode. In the case of preliminary light emission shown in FIG. 11, the communication data has the length of two bytes. The channel discrimination signal is included only in the first byte and is excluded from each subsequent byte for the purpose of shortening the length of communication.

The master flash device MS is arranged to lower the level of the communication line of its terminal D0 while data transmission is in process and to bring it back to a high level upon completion of transmission.

The camera finds the return of the communication line D0 to its high level at a point of time t2. At a point of time t3, the camera sends a command for a start of preliminary light emission by lowering the level of a signal line CLK.

The master flash device MS detects the lowering of the communication line CLK. Then, the master flash device MS generates a light emission start pulse as shown at a part (3) in FIG. 11 in the case of the control-only mode. In the case of the master light emission mode, the master flash device MS makes light emission with a predetermined light emission intensity for a predetermined period of time as designated by the camera as shown at a part (4) in FIG. 11.

Meanwhile, the slave flash device receives from the master flash device MS the first and second bytes of the wireless light communication pulses. The slave flash device then decodes the information on the channel number, the light emission mode, the light emission time, the light emission amount, etc. The slave flash device makes the preliminary light emission at a predetermined light quantity shown at a part (5) in FIG. 11 and for a predetermined period of time of light emission.

Next, typical commands of the above-stated wireless communication are described with reference to FIG. 12 which is a communication table.

FIG. 12 shows typical modes of the wireless communication to be conducted by the first embodiment of the invention. In the table, a first byte is used for a command. Every bit of the first byte is shown in the table to show the command in detail. The bits D7 to D0 correspond to the pulses D7 to D0 shown in FIG. 11. The symbol FS at the first bit D7 shows either flash light emission or flat light emission. The bit D7 is at "0" in the case of flash light emission and "1" in the case of flat light emission. Since the multiple light emission is made in the mode of flash light emission, the bit D7 is at "0" in that case.

The bits D2 to D0 show light emission time, as T2, T1 and T0. The light emission time can be indicated in eight different values by combining the three bits T2, T1 and T0. These bits show preliminary light emission time for flat preliminary light emission and show flat light emission time according to the shutter speed and the shutter blade speed in the case of main light emission.

Second to fifth bytes are data following each of light emission commands. The data has a length according to the command and indicates a light emission amount, the frequency of multiple light emission, the number of times of multiple light emission, etc.

Reference symbol F/C shown in the third to fifth bytes, in the case of the multiple light emission, denotes data indicating the frequency of the multiple light emission and the number of times of light emission.

Control over the light emission of the slave flash device is performed by the above-stated combination of commands and data.

Among the names of commands shown in the table of FIG. 12, a name "identical preliminary light emission" means that light emission amounts of preliminary light emission from all slave flash devices are equal to each other.

The operation of the slave flash device is next described referring to FIG. 13 which is a flow chart.

At a step S01: Upon receipt of a wireless information signal from the master flash device at the photodiode 256 which is arranged to be signal receiving means, the slave flash device amplifies and filters the signal through the light receiving circuit 257. As a result, only such a quick rising signal as a light pulse is allowed to be inputted to the terminal PI of the microcomputer 238. The input signal then enters into an internal buffer.

At a step S02: In the first byte received, an interval between a leading start pulse and a channel pulse indicates a channel. Therefore, an applicable channel is discriminated from others by measuring the distance of the interval. At the same time, the remaining pulses are analyzed to find if the data D7 to D0 coincide with any of the commands shown in FIG. 12.

At a step S03: If the command defined by the first byte received is found to be not coinciding with any part of the command table of FIG. 12, the input signal is judged to have a command error, and the flow of operation branches to a step S13.

At a step S04: A remaining length of signal to be received is set according to the command received.

At a step S05: A check is made to find if the remaining data to be received is zero. If so, the data receiving process of the slave flash device comes to an end. The flow then branches to a step S07.

At a step S06: The remaining data is received.

At the step S07: A check is made to find if the data received is in error. If so, the flow branches to the step S13 without executing any light emission process.

At a step S08: If a light emission start signal is received from the master flash device, the flow proceeds to a step S10. If not, the flow proceeds to a step S09.

At the step S09: If no light emission start signal is received for a predetermined length of waiting time, the flow branches to the step S13 with the waiting time considered to have expired.

At the step S10: The channel found at the step S02 is checked to find if it coincide with the channel of the slave flash device. If not, the flow branches to the step S13 without executing any light emission process.

At a step S11: A light emission process is executed according to the command and data received.

At a step S12: The state of light emission, including the type of light emission such as flash or flat light emission, the light emission mode such as automatic light control, manual light emission and multiple light emission, and light emission parameters such as the amount of light emission, the number of times of light emission, the light emission frequency, etc., is displayed on the liquid crystal display 240.

At the step S13: In the event of a command error, a data error or the like, no light emission process is executed, and the flow waits for a predetermined period of time for the next arrival of data.

Figure 15:
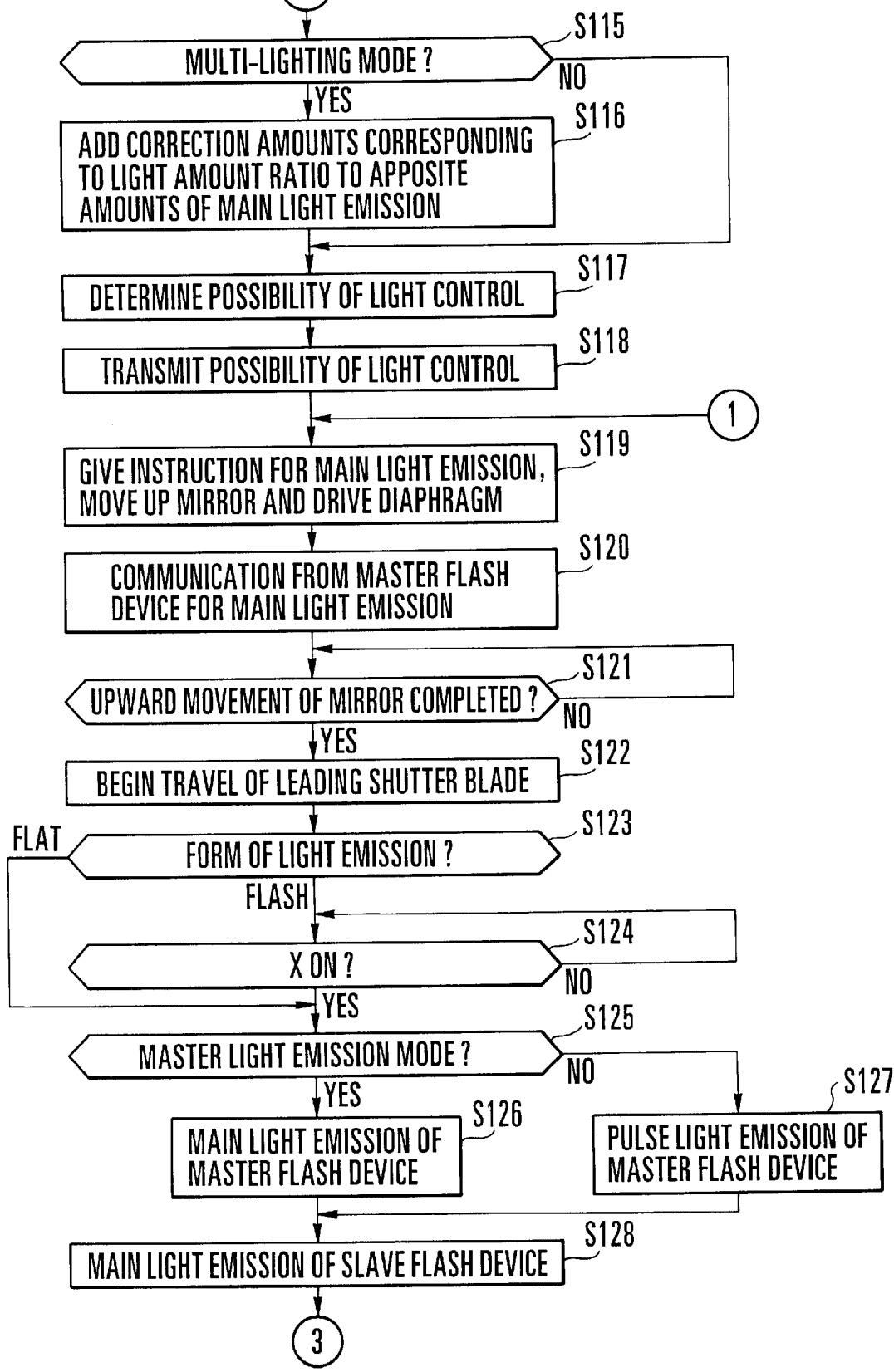
FIG. 15 is a flow chart for explaining the operations of the camera and the flash devices in the first embodiment.
Figure 16:
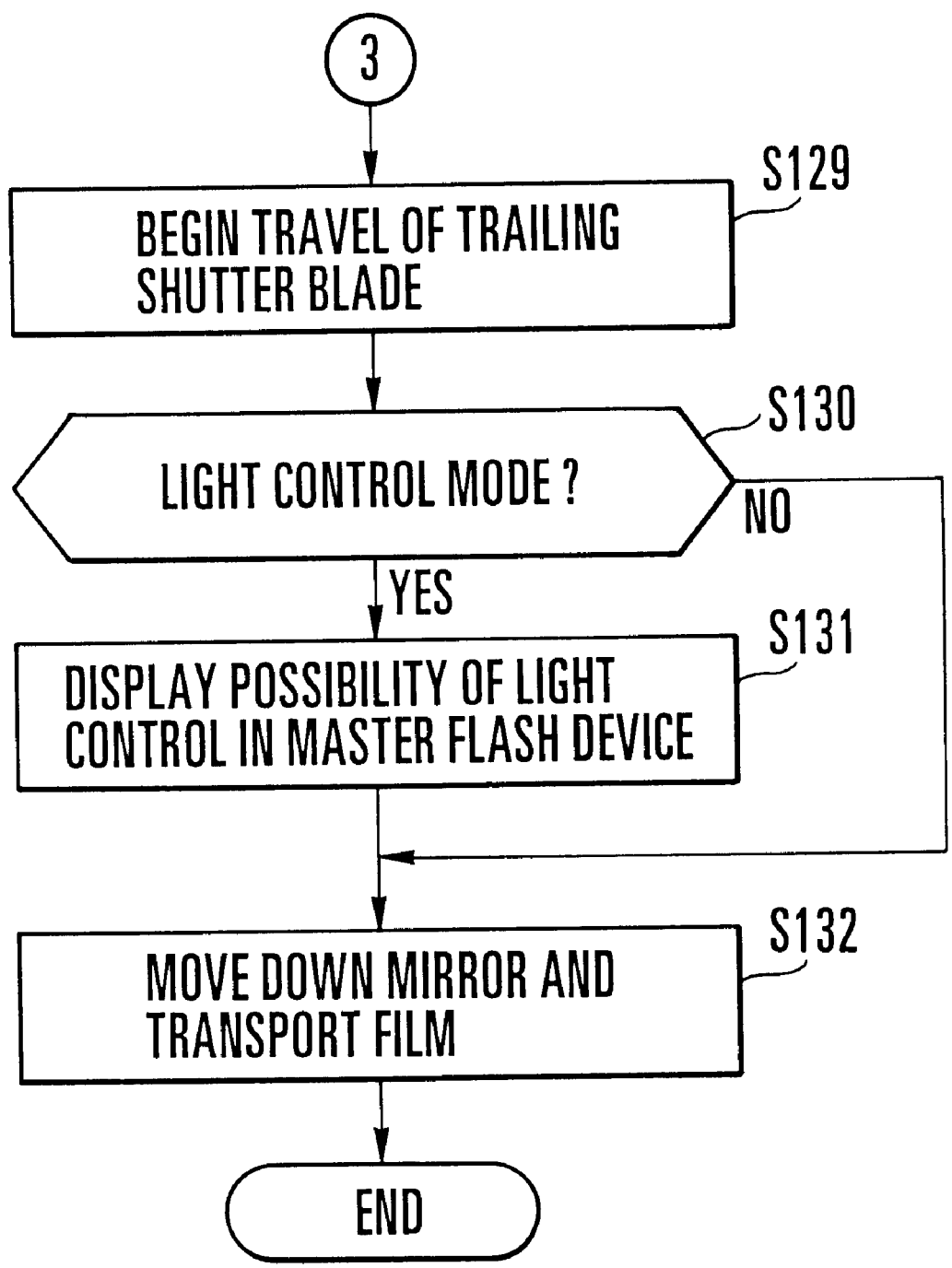
FIG. 16 is a flow chart for explaining the operations of the camera and the flash devices in the first embodiment.

The actions of the camera and the light emitting actions of the flash device to be carried out for a wireless photo-taking operation are next described with reference to FIGS. 14, 15 and 16 which are flow charts. As for automatic light control photo-taking operations in a normal mode which involves no wireless control over any slave flash device, such operations are performed in the same manner as the methods disclosed, for example, in Japanese Laid-Open Patent Application No. HEI 9-061909 and Japanese Laid-Open Patent Application No. HEI 9-33992 and are, therefore, omitted from the description given here.

Figure 14:
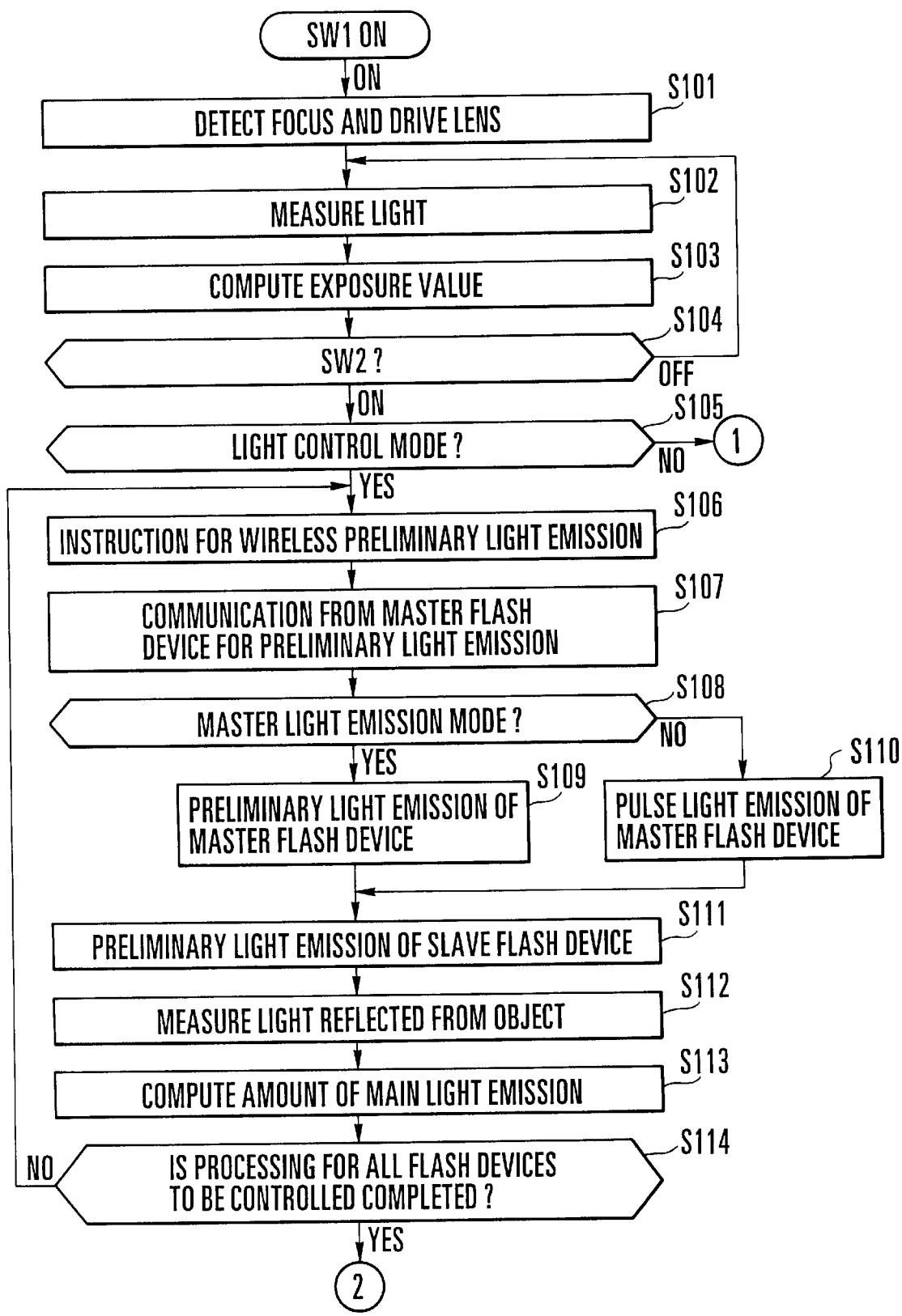
FIG. 14 is a flow chart for explaining the operations of the camera and the flash devices in the first embodiment.

At a step S101 of FIG. 14: When the switch SW1 is turned on after the camera is started, a focus detecting action is performed in a known phase-difference detecting method by the focus detecting circuit 105 of the camera. The camera commands the lens microcomputer 112 to drive the focusing lens for focus adjustment.

At a step S102: The luminance value Bv of the object obtained under natural light is measured by the light measuring circuit 106.

At a step S103: An apposite amount of exposure EvS is decided on the basis of the luminance of the object and the sensitivity of a film in use (EvS=Tv+Av). Then, in accordance with a set exposure mode, a shutter speed and an aperture are decided.

At a step S104: If the release start switch SW2 is found to be in its on-state, the flow of operation proceeds to a step S10S. If not, the flow returns to the step S102 to repeat the above stated processes.

At the step S105: A check is made for the light emission mode of the flash device. If the mode is the automatic light control mode, the flow proceeds to a step S106. If not (in the event of a mode such as the manual light emission mode or the multiple light emission mode), the flow branches to a step S119 (FIG. 15) as it is not necessary for the camera to decide the amount of main light emission by measuring the result of preliminary light emission from the flash device.

At the step S106: In the automatic light control mode, the camera commands the master flash device to make preliminary light emission by sending information on a predetermined amount of light emission and light emission time to the master flash device through the serial communication line (CLK, DI or DO).

At a step S107: Upon receipt of the command for preliminary light emission from the camera, the master flash device sends to the slave flash device the command for preliminary light emission and data of intensity of the preliminary light emission as described above with reference to FIGS. 11 and 12. In this instance, the command 1 and the preliminary light emission intensity data which are as shown in FIG. 12 are sent in the case of the ratio-off mode, or one of commands 2, 3 and 4 is selected according to an applicable slave flash device and is sent together with the preliminary light emission intensity data in the ratio mode, i.e., in a case where there are a plurality of slave flash devices.

At a step S108: A check is made to find if the master flash device MS is in the master light emission mode. If so, the flow proceeds to a step S109. If it is found to be the control-only mode, the flow branches to a step S110.

At the step S109: With the master flash device MS in the master light emission mode, the master flash device MS makes preliminary light emission in a manner as commanded by the camera, as shown at the part (4) in FIG. 11. Further, even in the master light emission mode, a pulse is emitted to cause an applicable slave flash device to make light emission, with the exception of preliminary light emission by the group-A slave flash device.

At the step S110: With the master flash device MS found at the step S108 to be in the control-only mode, the master flash device MS emits a pulse to cause the slave flash device to begin to emit light as shown at the part (3) in FIG. 11.

At a step S111: In synchronism with the light emission of the master flash device MS, the slave flash device makes preliminary light emission (5), as shown in FIG. 11, for the light emission time and at the light emission intensity as required by the command from the master flash device MS. Then, in the event of the ratio mode, the flash devices of groups designated by the command are caused to make the preliminary light emission.

At a step S112: The camera measures, with the light measuring sensor 7, reflection light of the object caused by the preliminary light emission of the master flash device or that of the slave flash device to obtain a value of object luminance BvF. The camera then obtains an exposure amount EvF of the preliminary light emission from the object luminance BvF and the film sensitivity SV. In order to measure only such a part of the reflection light of the object that results from the preliminary light emission of the flash device, excluding any natural ambient light, a measured value of object light obtained immediately before the preliminary light emission is subtracted from the reflection light of the object.

At a step S113: The camera computes an apposite main light emission amount (GAIN) by which an exposure value obtained by the preliminary light emission amount at the step S112 can be made into an apposite exposure amount EVS. A method for computing the apposite light emission amount of the flash device is the same as a method disclosed in detail in Japanese Laid-Open Patent Application No. HEI 9-33992. Therefore, the details of the computing method are omitted herein. However, in short, a difference between the object reflection light caused by the preliminary light emission and an apposite exposure amount is obtained, and then, the difference thus obtained is used as the main light emission amount relative to the preliminary light emission.

In the case of a multi-lighting control, apposite main light emission amounts are obtained as many times as the number of times for which slave flash devices are controlled. In the case of a two-lighting mode (A:B), the flow of operation twice loops the steps S106 to S114. By the first looping, an apposite light emission amount (A-GAIN) for the group A is obtained by causing the group-A flash device to make preliminary light emission. By the second looping, an apposite light emission amount (B-GAIN) for the group B is obtained by causing the group-B flash device to make preliminary light emission. In case of a three-lighting mode (A:B:C), the same looping is repeated three times. Then, by the third looping, an apposite light emission amount (C-GAIN) for the group C is obtained by causing the group-C flash device to make preliminary light emission.

At a step S114: As mentioned for the step S113 above, the flow returns to the step S106 to repeat the light emission and light measuring processes until the preliminary light emission and light measurement are carried out a necessary number of times. Upon completion of the looping processes, the flow proceeds to a step S115.

At the step S115 (FIG. 15): A check is made to find if the system is in the multi-lighting mode. If so, the flow proceeds to a step S116. If not, the flow proceeds to a step S117.

At the step S116: If the multi-lighting mode is, for example, a two-lighting mode, the light emission correction amounts of groups A and B set according to a set light quantity ratio A:B as shown in FIG. 17 are added respectively to the apposite main light emission amounts of the groups (A-GAIN and B-GAIN) to obtain the main light emission amounts of these groups. In the event of three-lighting mode, in addition to the above-stated process, the group-C light emission correction amount shown at the display part 323 of the liquid crystal display of FIG. 10(a) or 10(b) is further added to the apposite main light emission amount of the group C (C-GAIN). The main light emission amounts for all groups are thus obtained.

FIG. 17 is a table showing the light quantity correction amounts of groups A and B required for having the light emission amounts of them in a predetermined light quantity ratio. Referring to FIG. 17, the first column "indication of A:B display" of the table shows light quantity ratios to be displayed at the light-quantity-ratio display part 321 and the light-quantity-ratio setting-value display part 322 of the liquid crystal display 240. The second column "intermediate value" shows intermediate values of the light quantity ratios. The third column "correction value for A" shows light quantity correction values of the group-A flash device. The fourth column "correction value for B" shows light quantity correction values of the group-B flash device. In other words, a sum of the light amounts of the group-A and group-B flash devices in illuminating one and the same object with these flash devices can be made apposite to the object by adding the light emission correction values of FIG. 17 respectively to the apposite light emission amounts of the flash devices of the groups A and B.

At the step S117: A decision is made as to whether or not light control can be made with the main light emission amount obtained in the above-stated manner.

If light emission is made with the preliminary light emission amount defined to be 1/n of a maximum amount of light emission, it is apparent that the maximum light emission amount of the slave flash device or the master flash device is n times as much as the preliminary light emission amount. Therefore, with an apposite light emission amount compared with the maximum light emission amount of the flash device, the light control is decided to be impossible, if the apposite light emission amount is found to be larger than the maximum light emission amount by more than a predetermined value, and to be possible if the former is less than the latter. In the case of the multi-lighting mode, if the main light emission amount of any of the flash device groups is thus found insufficient, the light control can be decided to be impossible.

At a step S118: The camera communicates the result of the decision made at the step S117 to the master flash device MS.

At a step S119: The camera communicates to the master flash device MS information on the main light emission, i.e., the light emission mode corresponding to the synchronizing shutter speed, such as a flat or flash light emission mode, the amount of main light emission, and light emission time in the event of flat light emission. Upon completion of sending the command to the flash device for the main light emission, the camera moves the main mirror 2 and the sub-mirror 25 upward to retract them from the photo-taking optical path. At the same time, the camera commands the lens microcomputer 112 to drive the diaphragm as necessary.

At a step S120: The master flash device communicates, for the main light emission, the command and data shown in FIG. 12 to the slave flash device on the basis of the received information, the light emission mode set at the master flash device (an automatic light control mode, a manual light emission mode or a multiple light emission mode) and the number of slave flash devices under control, in the same manner as in the case of the above-stated transmission for preliminary light emission. For example, in the automatic light control mode, the master flash device sends, according to the number of slave flash devices under control, the command 5 and one byte of data for the single-lighting control (no light-quantity ratio), the command 6 and two bytes of data for two-lighting control, and the command 7 and three bytes of data for the three-lighting control.

In the manual light emission mode, the master flash device sends one of the commands 8, 9 and 10 and a length of data corresponding to the number of slave flash devices under control. In the multiple light emission mode, the master flash device sends, to each applicable slave flash device, one of the commands 11, 12 and 13 and a length of data corresponding to the number of slave flash devices under control.

Upon receipt of the communication from the master flash device for the main light emission, the slave flash device analyzes the command and prepares for the main light emission according to the designated mode and amount of light emission.

At a step S121: The flow waits for complete retraction of the mirrors from the optical path. Upon completion of it, the flow proceeds to a step S122.

At the step S122: With the main mirror 2 and the sub-mirror 25 having been retracted from the photo-taking optical path, an exposure action is allowed to begin by driving the leading shutter blade to travel.

At a step S123: In the case of the flat light emission mode, light emission is allowed to begin before the shutter is open by the travel of the leading shutter blade. If the light emission mode is found to be the flat light emission mode, therefore, the flow branches to a step S125. If the mode is the flash light emission mode, the flow proceeds to a step S124.

At the step S124: In the case of the flash light emission mode, the flow waits until an X contact comes to turn on with the leading shutter blade completely opened after the leading shutter blade is driven.

At the step S125: A check is made to find if the light emission mode of the master flash device is the master light emission mode. If so, the flow proceeds to a step S126. If the mode is found to be a transmission-only mode (the control-only mode mentioned above), the flow branches to a step S127.

At the step S126: With the master flash device in the master light emission mode while the system is in the automatic light control mode, the master flash device makes the main light emission in the light emission mode designated by the camera, which is either the flat light emission mode or the flash light emission mode. In the case of the manual light emission mode, the master flash device makes the main flash emission in a mode designated by the camera (flat or flash light emission mode) and at a light emission amount set at the master flash device. In the event of the multiple light emission mode, the master flash device makes the main light emission at a light emission amount, the number of times of light emission and a light emission frequency set by the master flash device.

At the step S127: With the master flash device found to be in the control-only mode, the master flash device generates a light emission start signal (pulse light emission from the xenon tube 19) for causing the slave flash device to begin to emit light.

At a step S128: In synchronism with the start of light emission by the master flash device at the step S126 or S127, the slave flash device makes main light emission according to information on the light emission mode and the light emission amount designated at the step S120. With the main light emission made in a normal manner, the slave flash device displays, at the liquid crystal display 240, information about the main light emission. For example, information on the light emission mode, such as automatic light control, manual light emission or multiple light emission mode, is displayed at the display part 301. In the case of the flat light emission, the display part 302 is lighted up. In the case of the manual light emission mode, a light emission amount designated is displayed at the display part 308. In the case of the multiple light emission mode, a light emission amount, the number of times of light emission and the light emission frequency designated are displayed respectively at the display parts 308, 309 and 310 of the liquid crystal display 240.

These displays are made or updated by the slave flash device when the main light emission is carried out in a normal manner. The displays permit confirmation of that the information from the master flash device is correctly received by the slave flash device.

At a step S129 (FIG. 16): After the lapse of a predetermined shutter opening time, the camera allows the trailing shutter blade to travel to bring the photo-taking operation to an end.

At a step S130: A check is made for the light emission mode set at the master flash device. If the mode is decided to be the automatic light control mode, the flow proceeds to a step S131. If not (in the case of the manual light emission mode or the multiple light emission mode), the flow branches to a step S132.

At the step S131: In the case of the automatic light control mode, the master flash device displays the result of decision made about light control by causing the light control confirming LED 244 to light up or to be extinct for a predetermined period of time after the end of light emission. The intra-viewfinder LCD 24*b* is also caused to make the confirmation display either by being lighted up or by being put.

At the step S132: Upon completion of the exposure action, the main mirror 2 and the sub-mirror 25 are moved down. One frame portion of the film is wound up by the motor control circuit 108 and the film travel detecting circuit 109 to terminate the photo-taking operation.

The details of the processes of the flow of operation described above are described next by using timing charts.

Figure 18:
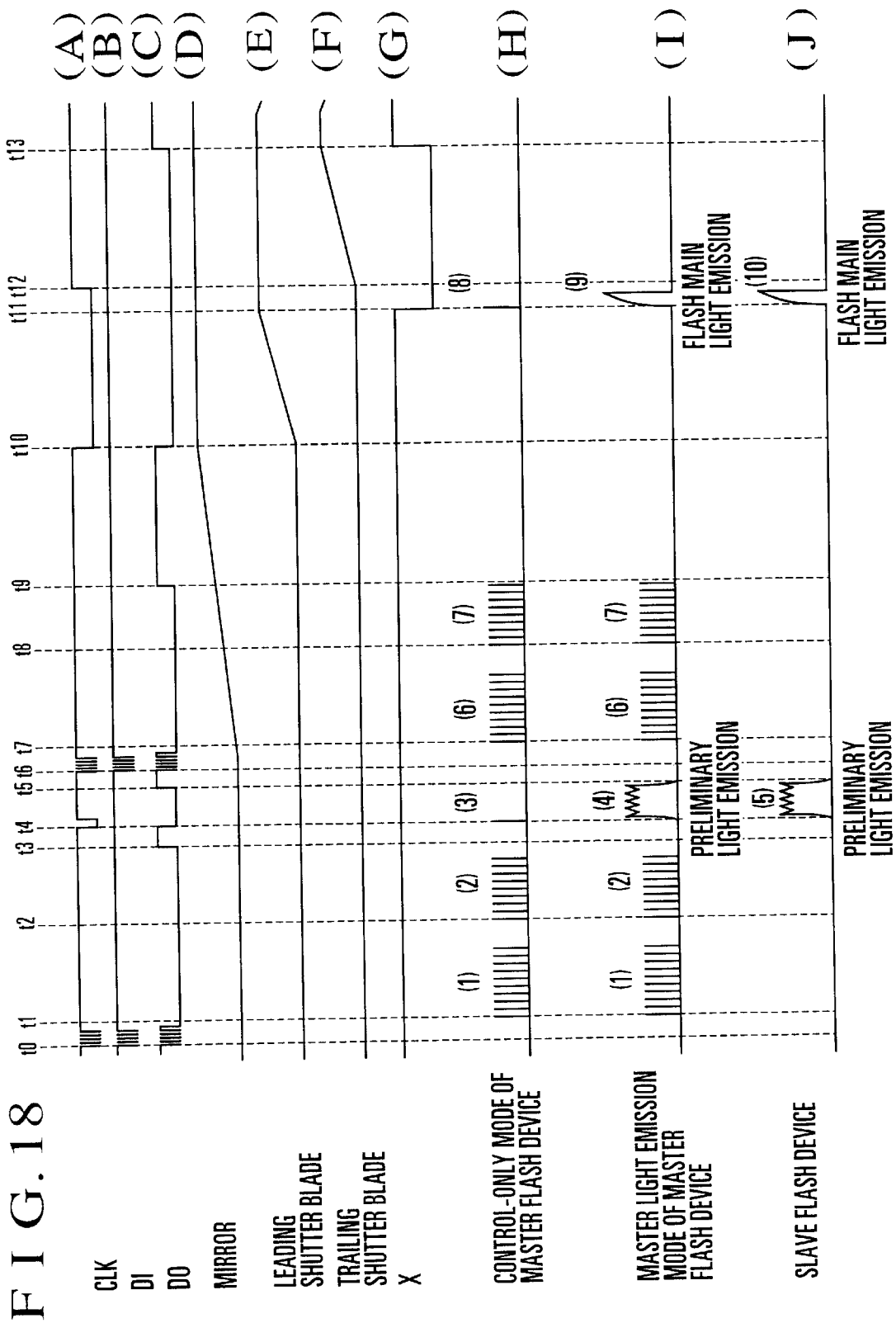
FIG. 18 is a timing chart for explaining the operations of the camera and the flash devices in the first embodiment.
Figure 19:
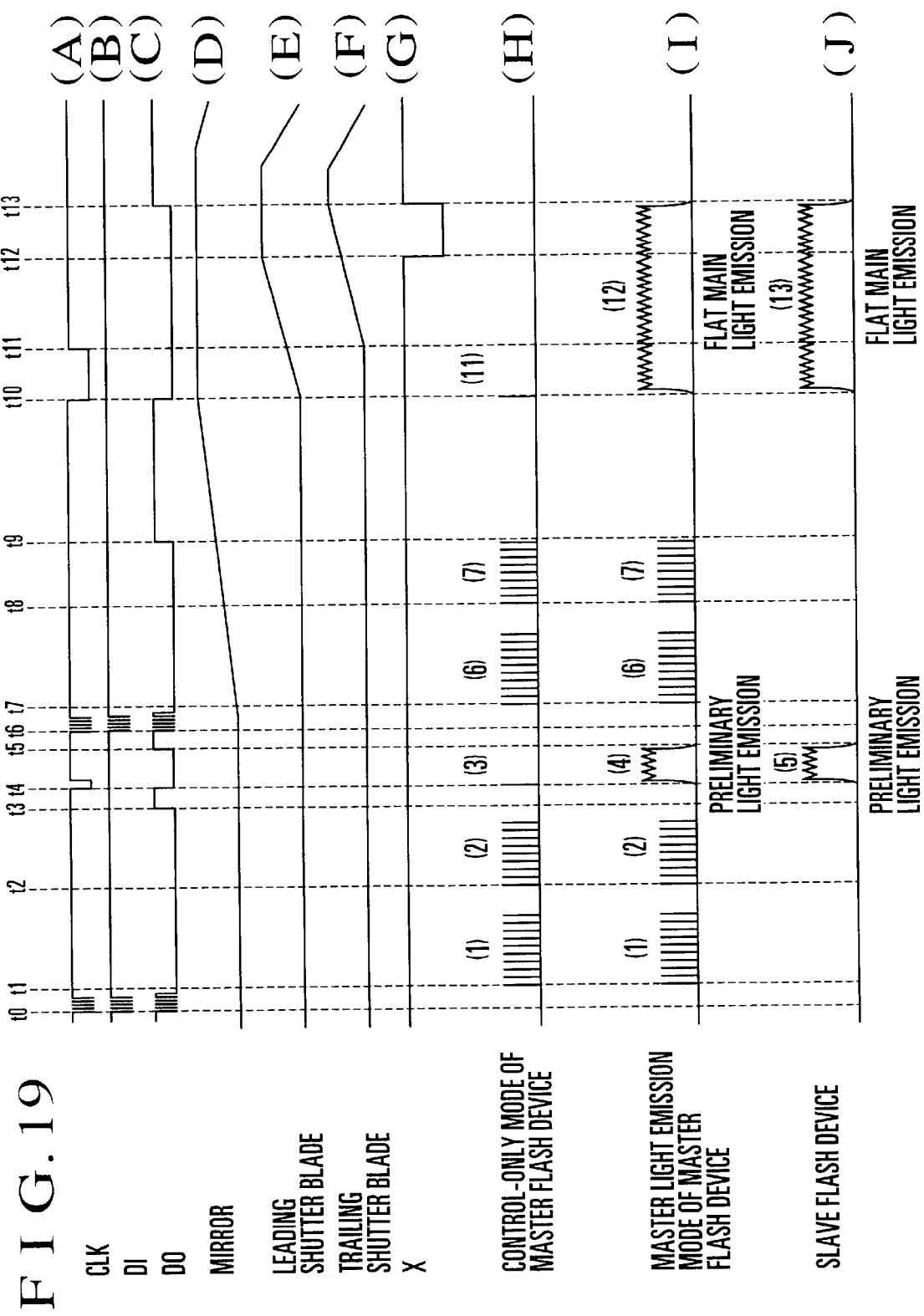
FIG. 19 is a timing chart for explaining the operations of the camera and the flash devices in the first embodiment.

FIGS. 18 to 23 are timing charts showing automatic light control actions. Of these timing charts, FIG. 18 shows a case where the main light emission is flash light emission in the single-lighting mode (no light-quantity ratio). FIG. 19 shows another case where the main light emission is flat light emission.

Figure 20:
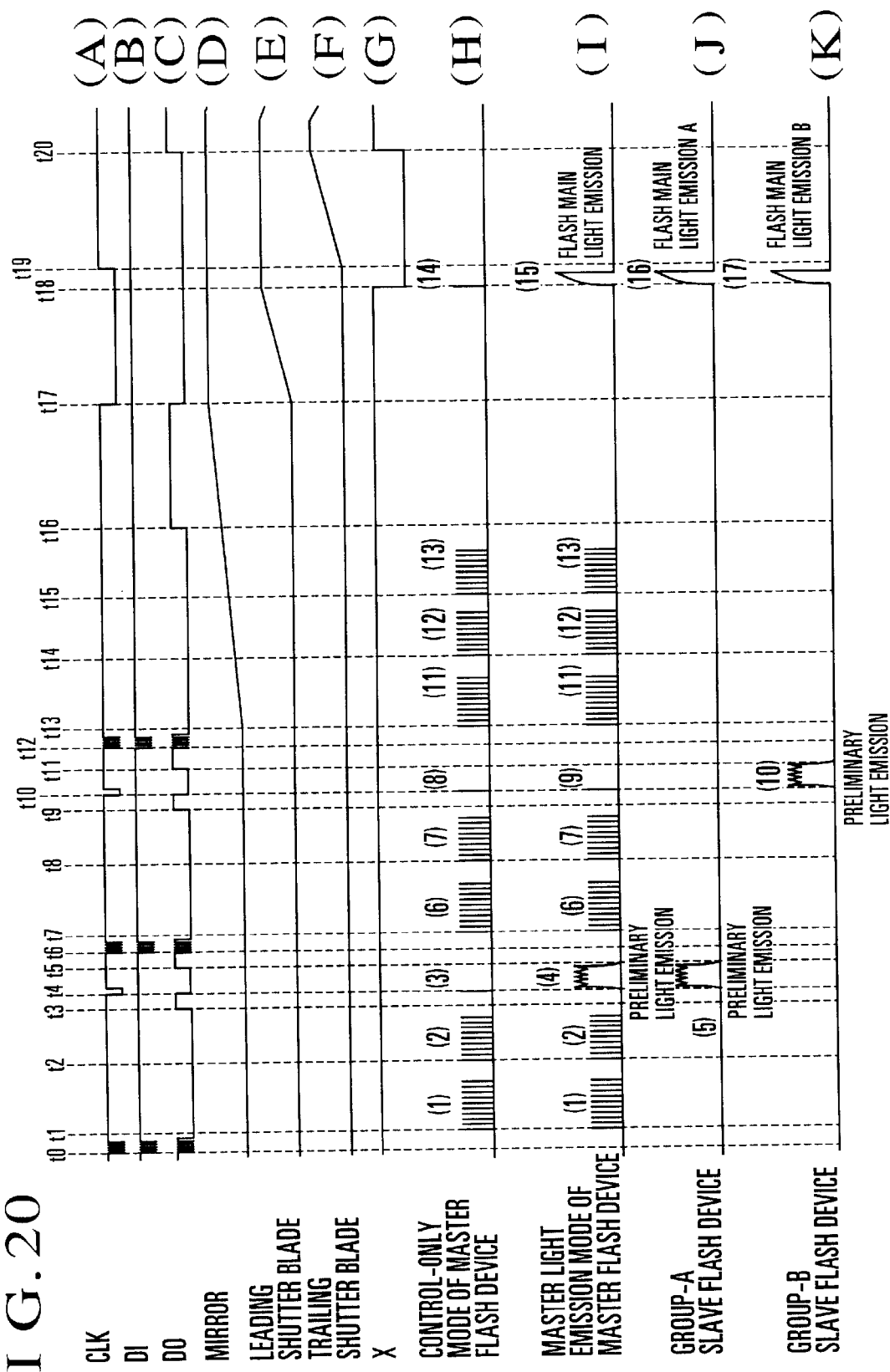
FIG. 20 is a timing chart for explaining the operations of the camera and the flash devices in the first embodiment.
Figure 21:
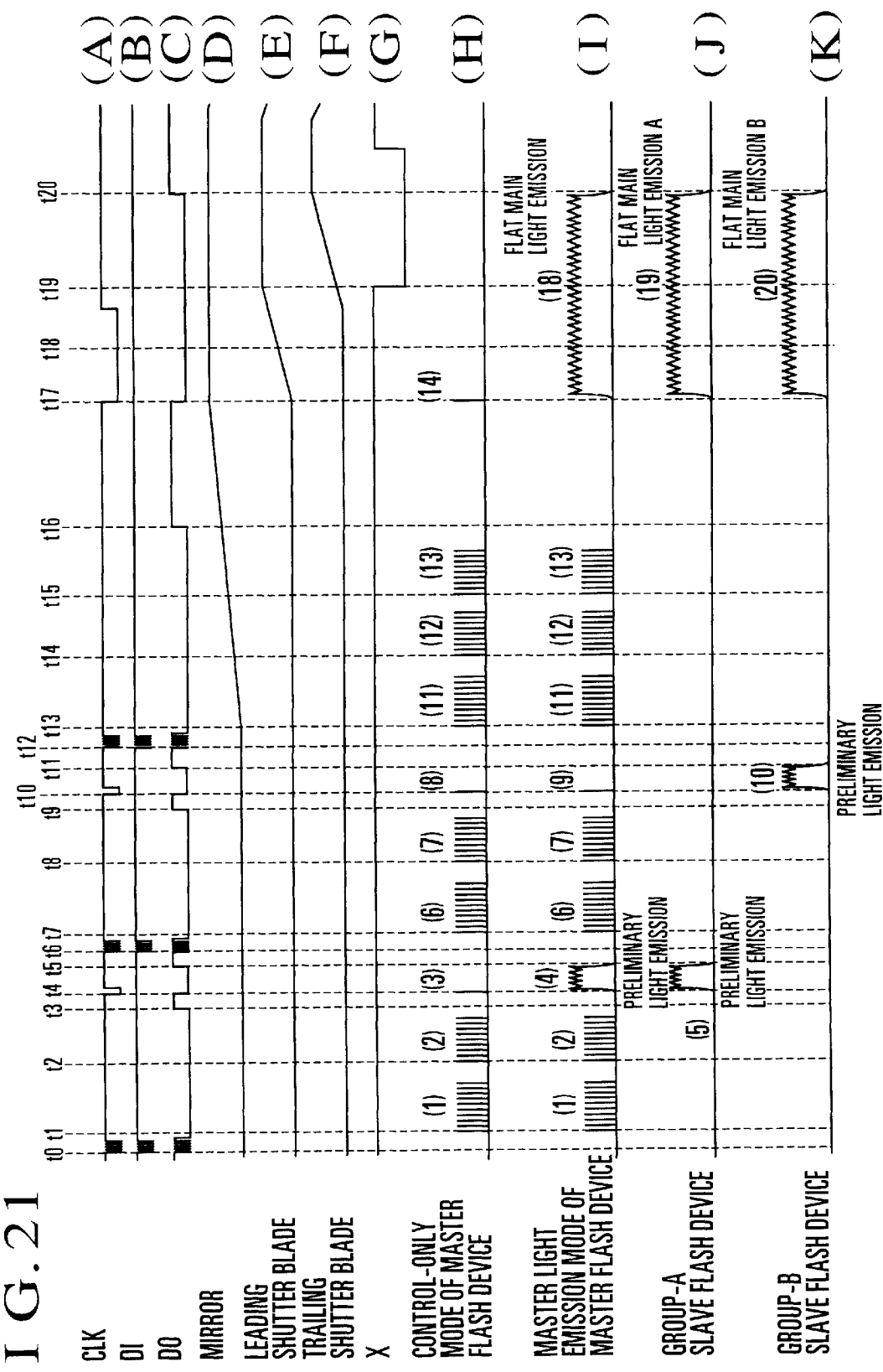
FIG. 21 is a timing chart for explaining the operations of the camera and the flash devices in the first embodiment.

FIG. 20 shows a further case where the main light emission is flash light emission under two-lighting light-quantity ratio control. FIGS. 21 shows a case where the main light emission is flat light emission.

Figure 22:
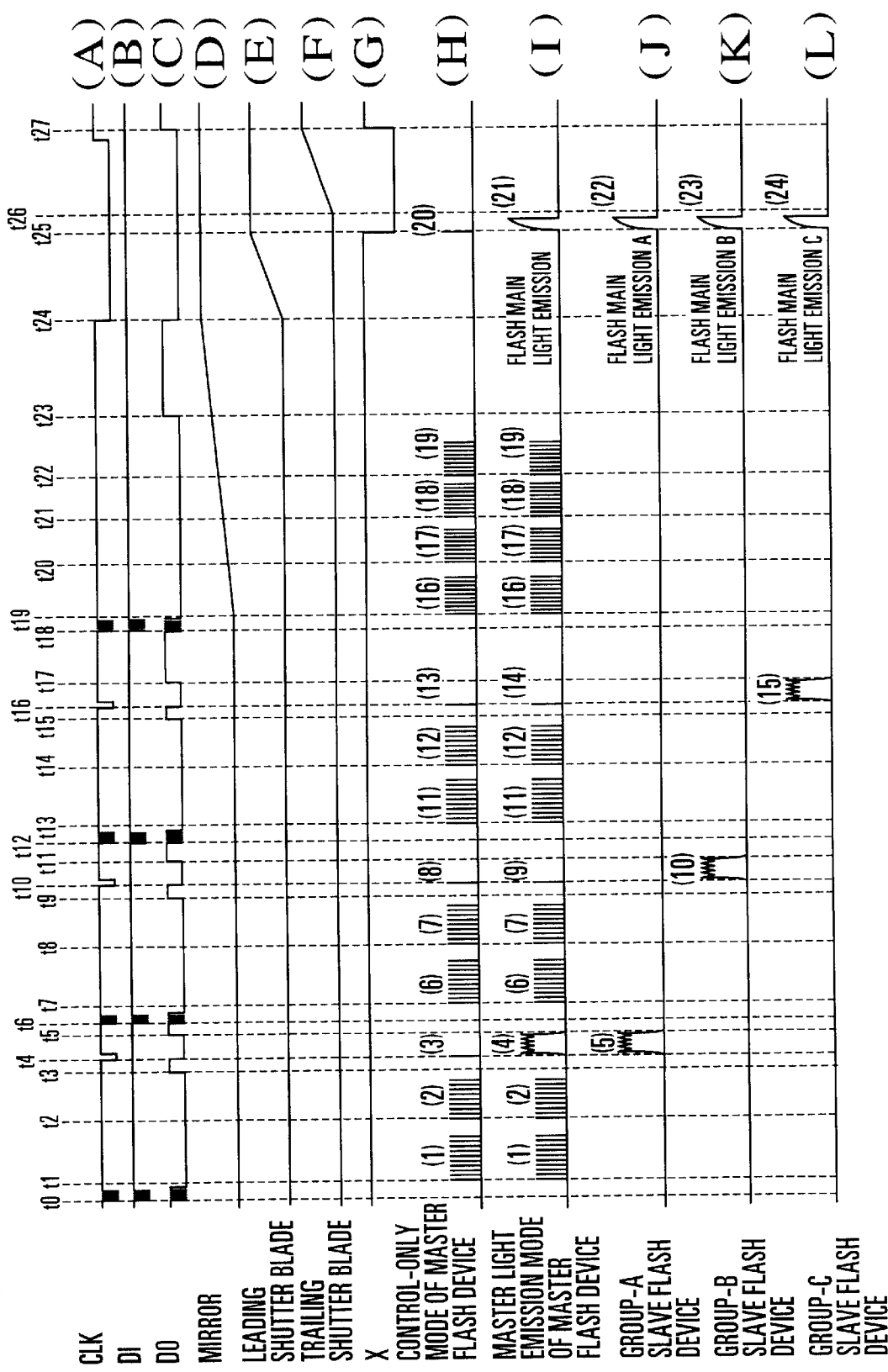
FIG. 22 is a timing chart for explaining the operations of the camera and the flash devices in the first embodiment.
Figure 23:
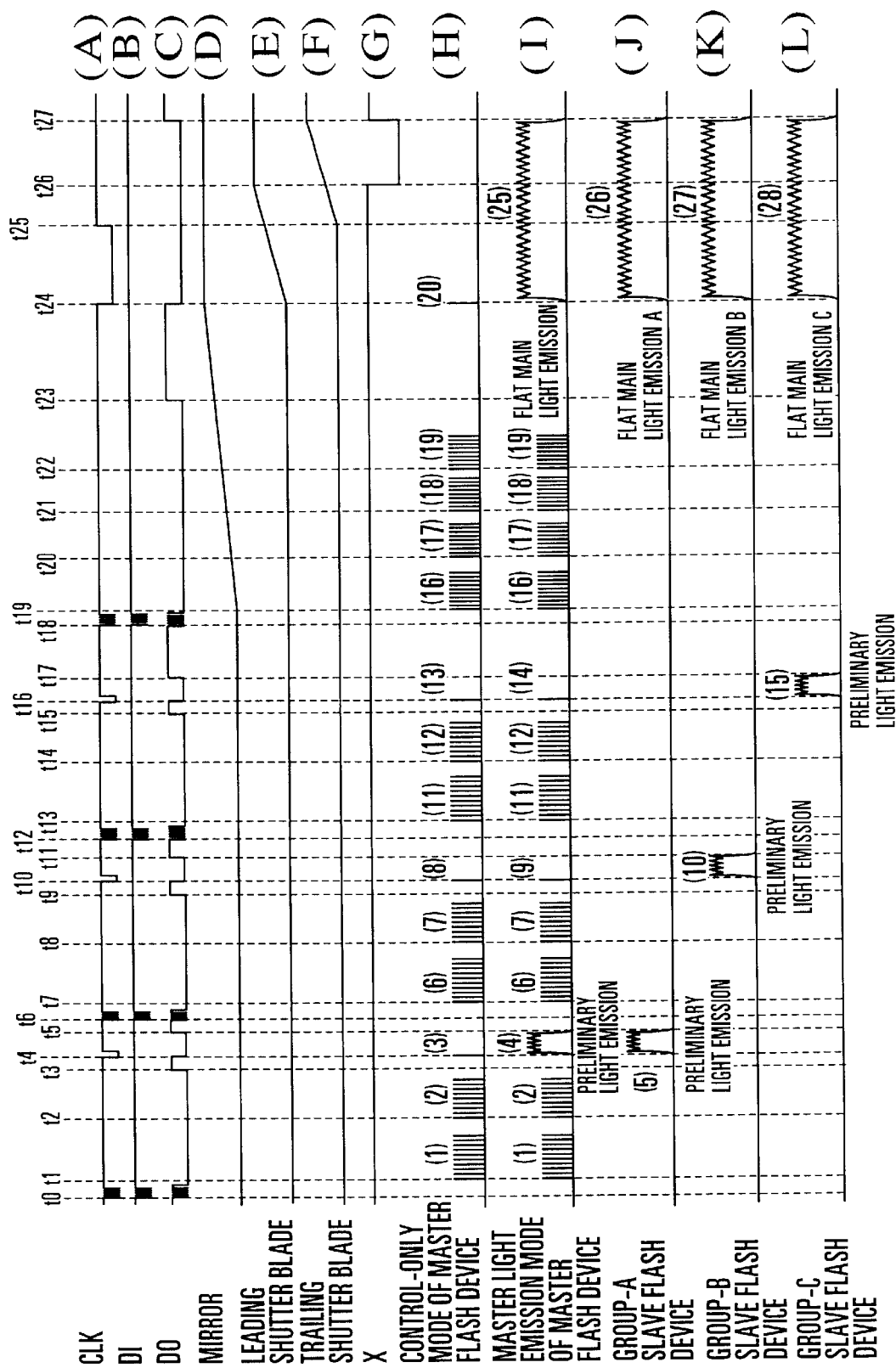
FIG. 23 is a timing chart for explaining the operations of the camera and the flash devices in the first embodiment.

FIG. 22 shows a case where the main light emission is flash light emission under three-lighting light-quantity ratio control. FIG. 23 shows a case where the main light emission is flat light emission.

Figure 24:
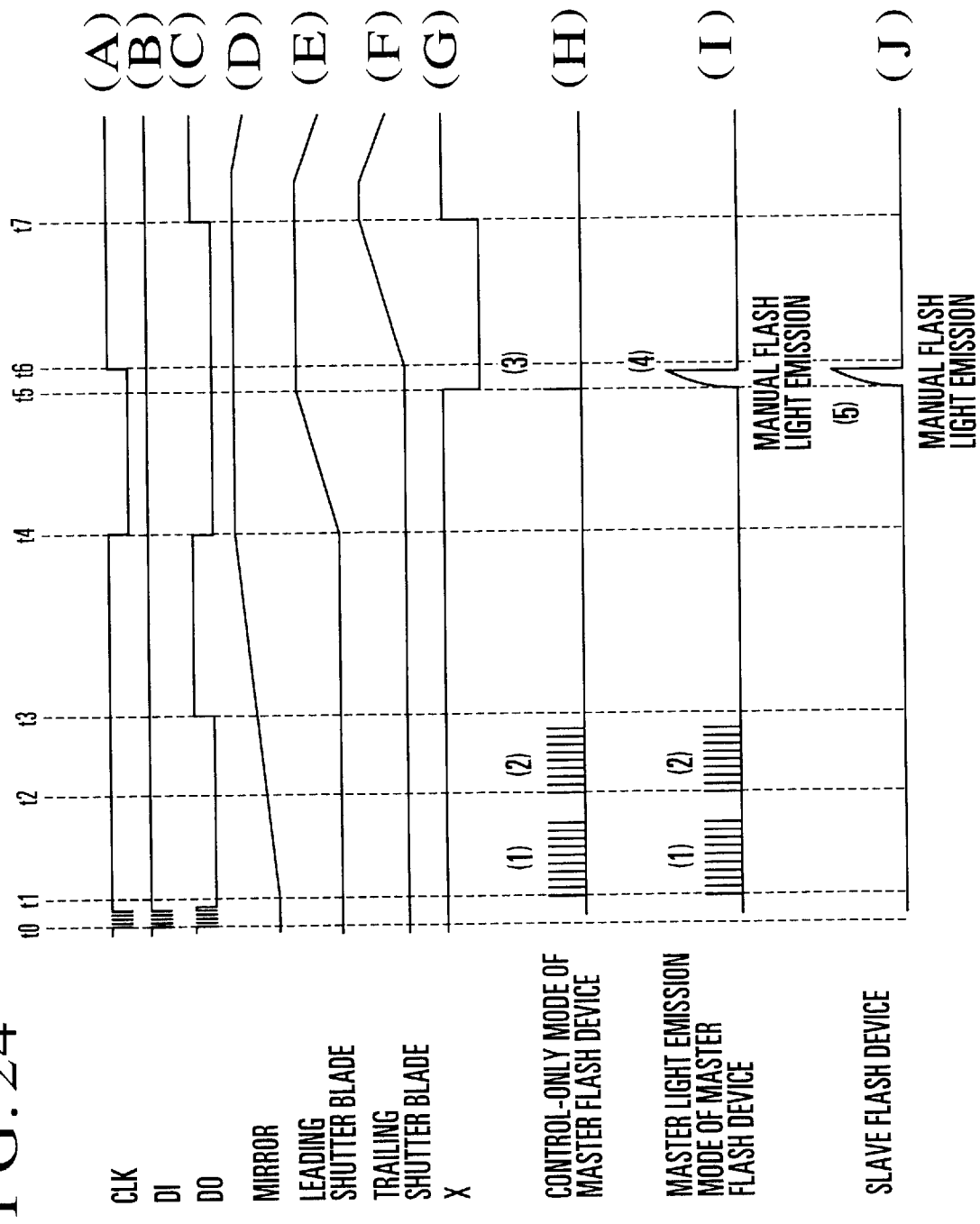
FIG. 24 is a timing chart for explaining the operations of the camera and the flash devices in the first embodiment.
Figure 25:
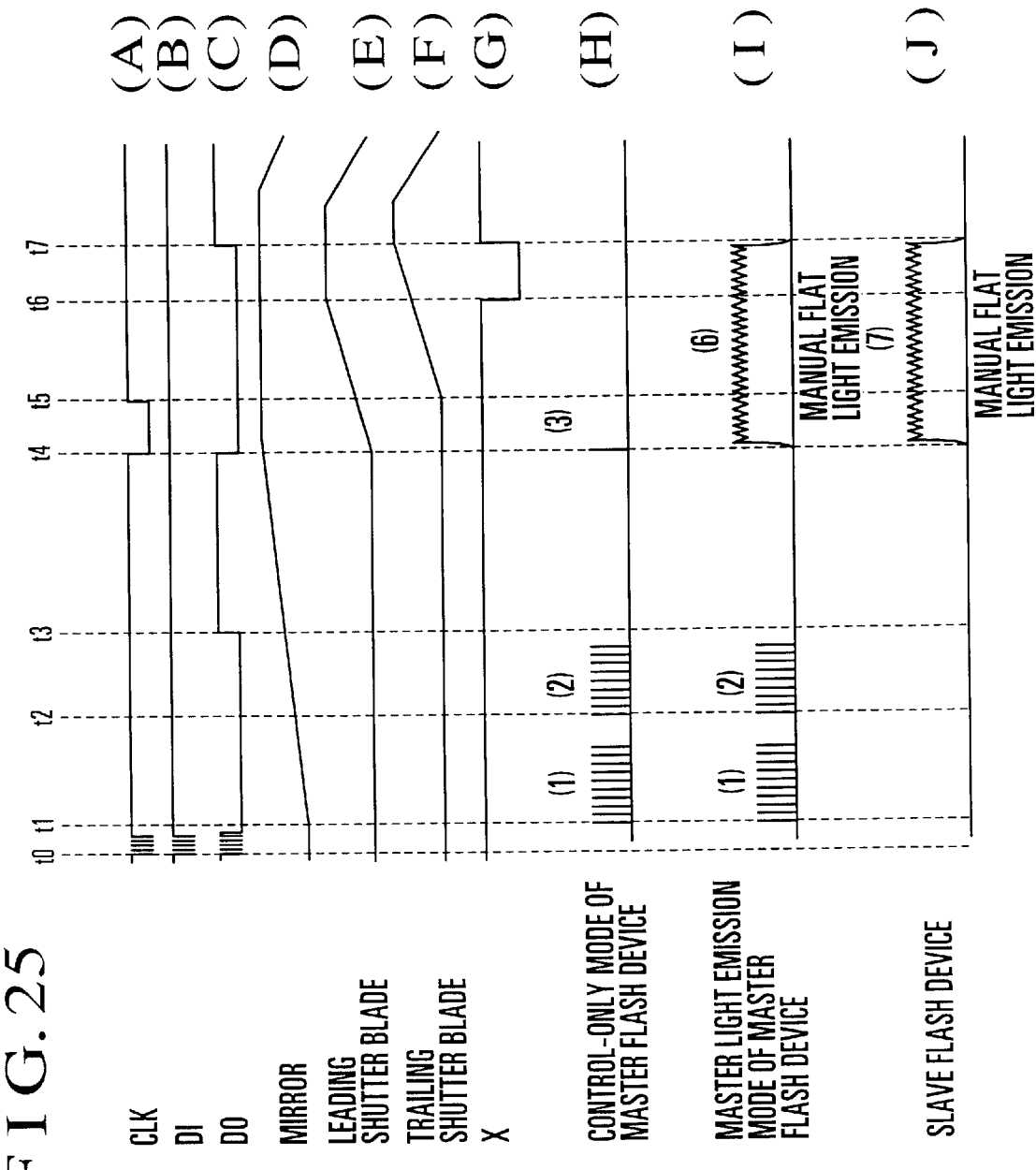
FIG. 25 is a timing chart for explaining the operations of the camera and the flash devices in the first embodiment.

FIG. 24 is a timing chart showing actions to be performed in a case where the main light emission is manual flash light emission in the single-lighting mode (ratio off, i.e., no light-quantity ratio). FIG. 25 is a timing chart showing actions to be performed in the manual flat light emission mode.

Figure 26:
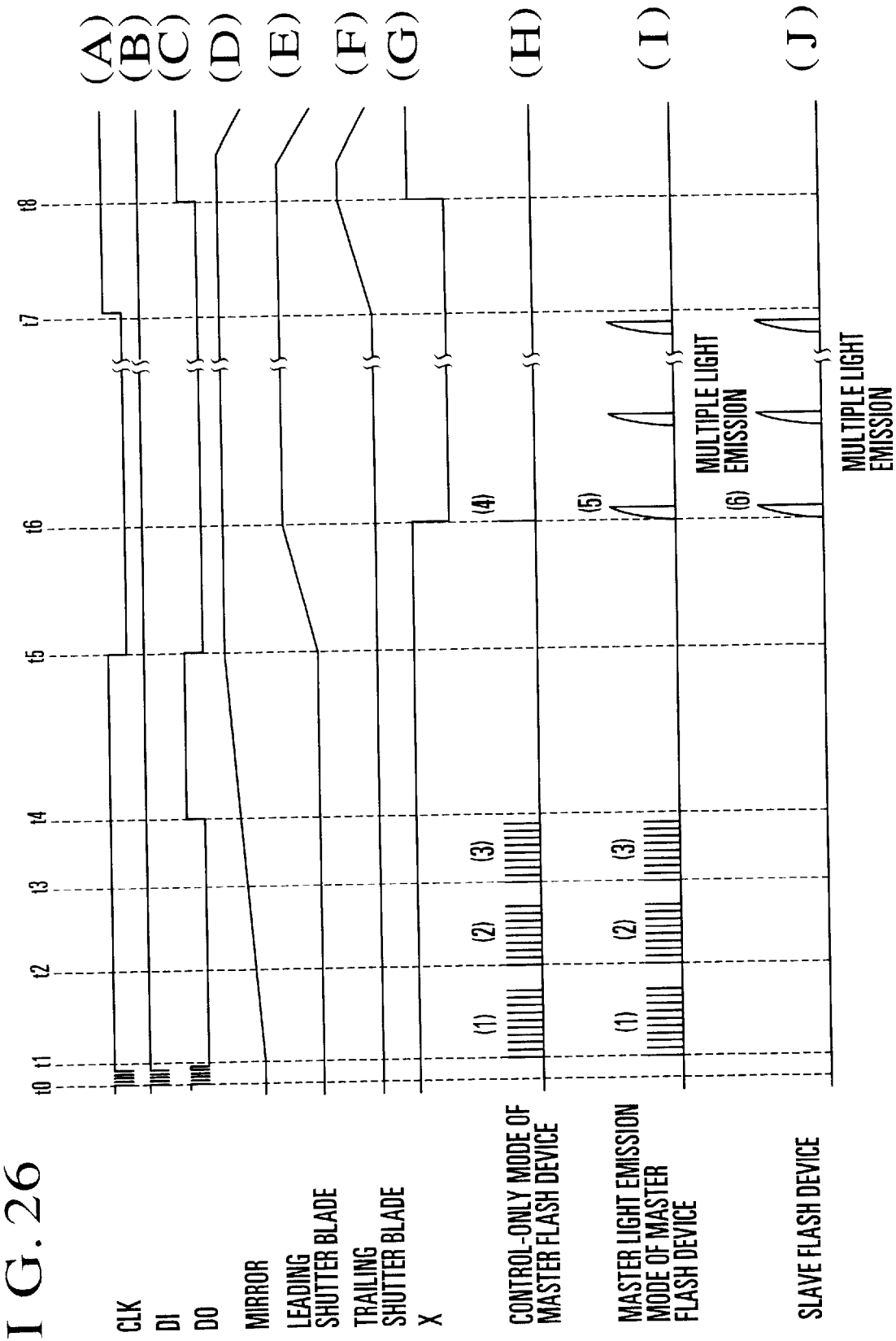
FIG. 26 is a timing chart for explaining the operations of the camera and the flash devices in the first embodiment.

FIG. 26 is a timing chart showing actions to be performed in the multiple light emission mode and in the single-lighting mode (no light-quantity ratio).

These actions are described below one by one.

Single-lighting Automatic Light Control Photo-taking

FIG. 18 shows in a timing chart the actions performed by flash light emission in the single-lighting automatic light control mode. FIG. 19 shows in a timing chart the actions performed with flat light emission in the single-lighting automatic light control mode.

In FIGS. 18 and 19, parts (A), (B) and (C) are serial communication lines between the camera and the flash device. These parts are identical with the parts of FIG. 11 described in the foregoing and are, therefore, omitted from the description here. A part (D) shows in a curve the action of the mirror 2 of the camera body. The low level of the curve shows the mirror 2 as moved down. The high level of the curve shows the mirror 2 as moved up. A part (E) shows in a curve the travel of the leading shutter blade. A part (F) shows in a curve the travel of the trailing shutter blade. The low level of the curve indicates the trailing shutter blade as in a state before the travel while the high level of the curve indicates it as in a state obtained after the travel. A part (G) shows the state of the X contact of the camera body in a line. The high level of the line indicates the X contact as in an open state while the low level of the line indicates the X contact as in a short-circuiting state. The short-circuiting state is obtained when the leading shutter blade opens. The open state is obtained upon completion of the travel of the trailing shutter blade.

A part (H) shows the waveform of the wireless communication obtained when the master flash device is set in the control-only state. A part (I) shows the waveform of wireless communication, that of the preliminary light emission and that of the main light emission obtained with the master flash device set in the master light emission mode. A part (J) shows waveforms of light emission made from the slave flash device.

Further, since the flash light emission shown in FIG. 18 and the flat light emission shown in FIG. 19 are identical with each other except that they differ only in light emission start timing and in light emission mode, the following description is given by referring to these figures in common.

At a point of time t0 (shown in FIGS. 18 or 19):

The camera conducts serial communication with the master flash device to command the master flash device to make wireless preliminary light emission.

At a point of time t1: The master flash device MS causes the xenon tube 19 to emit pulse light (1) to send the command 1 shown in FIG. 12.

At a point of time t2: The master flash device MS likewise sends data of light emission intensity (2).

At a point of time t3: Upon completion of transmission, the master flash device MS brings the level of the terminal DO back to a high level.

At a point of time t4: To cause preliminary light emission to begin, the camera causes the level of the terminal CLK to be at a low level for a predetermined period of time. Meanwhile, the master flash device MS detects the low level of the terminal CLK and generates a light emission start pulse (3) if it is in the control-only mode. In the case of the master light emission mode, the master flash device MS makes preliminary light emission (4) for a predetermined light emission time and at a predetermined light emission intensity as designated by the camera.

In synchronism with the light emission of the main flash device MS, the slave flash device makes preliminary light emission (5) at a predetermined light emission intensity and for a predetermined light emission time designated by the master flash device. The camera in the meantime measures reflection light of the object while the master flash device or the slave flash device is making the preliminary light emission.

At a point of time t5: Upon completion of the preliminary light emission, the master flash device MS brings the level of the terminal DO back to a high level.

At a point of time t6: The camera sends to the master flash device, by serial communication, information about whether the light control for main light emission is possible or not, the mode of main light emission (flash light emission or flat light emission) and the amount of light emission, in the case of flash light emission, or the intensity and time of light emission in the case of flat light emission. The camera begins to move the mirror upward for the commencement of photo-taking.

At a point of time t7: The master flash device MS transmits the command 5 shown in FIG. 12 by causing the xenon tube 19 to make pulse light emission (6).

At a point of time t8: The master flash device MS also transmits the data of light emission amount (7) in the same manner.

At a point of time t9: Upon completion of transmission, the master flash device MS bring the level of the terminal DO back to a high level.

At a point of time t10: Upon completion of the upward mirror moving action, the camera allows the leading shutter blade to begin to travel. The camera then informs the master flash device of the start of travel of the leading shutter blade by dropping the level of the terminal CLK to a low level.

In the case of the flat light emission mode, if the master flash device is in the control-only mode at this point of time as shown in FIG. 19, the master flash device generates light emission start pulse (11). If the master flash device MS is in the master light emission mode, the master flash device makes flat main light emission (12) for a predetermined light emission time and at a predetermined light emission intensity designated by the camera. Then, in synchronism with the light emission of the master flash device MS, the slave flash device also makes flat main light emission (13) for a predetermined light emission time and at a predetermined light emission intensity designated by the master flash device.

At a point of time t11: The X contact of the camera becomes conductive upon completion of travel of the leading shutter blade. Then, in the case of the flash light emission mode as shown in FIG. 18, the master flash device generates a light emission start pulse (8), in the control-only mode, or makes a flash main light emission (9) at a predetermined light emission amount designated by the camera in the master light emission mode at this point of time. In synchronism with this light emission of the master flash device MS, the slave flash device also makes flash main light emission (10) at a predetermined light emission amount designated by the master flash device.

At a point of time t12: After a predetermined shutter time, the camera causes the trailing shutter blade to begin to travel.

At a point of time t13: Upon completion of the travel of the trailing shutter blade at the camera, the conduction of the X contact is cut off. Then, a series of actions such as film winding, shutter charging and downward mirror-moving actions are carried out.

Two-lighting Automatic Light Control Photo-taking

FIG. 20 shows in a timing chart the actions to be performed for two-lighting automatic light control photo-taking in the flash light emission mode. FIG. 21 shows in a timing chart also two-lighting automatic light control photo-taking actions to be performed in the flat light emission mode.

In FIGS. 20 and 21, the waveforms shown at parts (A) to (I) are the same as the corresponding waveforms obtained in the single-lighting automatic light control photo-taking actions described above. These parts are, therefore, omitted from the description. In each of FIGS. 20 and 21, a part (J) shows the waveform of light emission from a slave flash device set in the group A. A part (K) shows the waveform of light emission from a slave flash device set in the group B.

Further, since the flash light emission and the flat light emission are similar to each other except that they differ from each other only in light emission start timing and light emission mode, the actions of FIGS. 20 and 21 are described in common below.

At a point of time t0 (shown in FIGS. 20 or 21):

The camera conducts serial communication with the master flash device to command the master flash device to cause the group-A flash device to make wireless preliminary light emission.

At a point of time t1: The master flash device MS causes the xenon tube 19 to emit pulse light to send the command 2 shown in FIG. 12, as shown at a part (1).

At a point of time t2: The master flash device MS likewise sends data of light emission intensity (2).

At a point of time t3: Upon completion of transmission, the master flash device MS brings the level of the terminal D0 back to a high level.

At a point of time t4: To cause preliminary light emission to begin, the camera causes the level of the terminal CLK to be at a low level for a predetermined period of time. Meanwhile, the master flash device detects the low level of the terminal CLK and generates a light emission start pulse (3) if it is in the control-only mode. In the case of the master light emission mode, the master flash device makes preliminary light emission (4) for a predetermined light emission time and at a light emission intensity designated by the camera.

In synchronism with the light emission of the main flash device MS, the group-A slave flash device makes preliminary light emission (5) at a predetermined light emission intensity and for a predetermined light emission time designated by the master flash device. The camera, in the meantime, measures reflection light of the object while the master flash device or the slave flash device is making the preliminary light emission.

At a point of time t5: Upon completion of the preliminary light emission, the master flash device MS brings the level of the terminal D0 back to a high level.

At a point of time t6: The camera commands the master flash device by serial communication to cause the group-B slave flash device to make wireless preliminary light emission.

At a point of time t7: The master flash device MS transmits the command 3 shown in FIG. 12 by causing the xenon tube 19 to make pulse emission (6).

At points of time t8 to t11: The data of light emission amount for the group-B slave flash device is transmitted to cause the group-B slave flash device to make preliminary light emission, and a light measuring action is performed by processes similar to the processes of the points of time t2 to t5.

At a point of time t12: The camera obtains main light emission amounts by adding, to the main light emission amounts of the groups A and B, correction values according to a light quantity ratio between the groups A and B received from the flash device. The camera then sends to the master flash device, by serial communication, information about whether main light emission light can be controlled or not, the mode of main light emission, i.e., flash light emission or flat light emission, a main light emission amount in the flash light emission mode, and the intensity and time of light emission in the case of flat light emission mode. The camera begins to perform the mirror upward moving action for photo-taking.

At a point of time t13: The master flash device MS transmits the command 6 shown in FIG. 12 by causing the xenon tube 19 to emit pulse light (11).

At a point of time t14: The master flash device MS likewise transmits data of a light emission amount of the group-A slave flash device (12).

At a point of time t15: The master flash device MS likewise transmits data of a light emission amount of the group-B slave flash device (13).

At a point of time t16: Upon completion of transmission, the master flash device brings the level of the terminal DO back to a high level.

At points of time t17 to t21: Processes are performed in the same manner as the processes performed at the points of time t10 to t13 of the single-lighting automatic light control photo-taking described in the foregoing. A photo-taking operation is carried out by causing the group-A flash device and the group-B flash device to emit light in an arbitrary light-quantity ratio designated by the master flash device MS.

Three-lighting Automatic Light Control Photo-taking

FIG. 22 shows in a timing chart actions to be performed for three-lighting automatic light control photo-taking in the flash light emission mode. FIG. 23 shows in a timing chart also three-lighting automatic light control photo-taking actions to be performed in the flat light emission mode.

In FIGS. 22 and 23, the waveforms shown at parts (A) to (K) are the same as the corresponding waveforms obtained in the two-lighting automatic light control photo-taking actions described above. These parts are, therefore, omitted from the description. In each of FIGS. 22 and 23, a part (L) shows the waveform of light emission from a slave flash device set in the group C.

Further, since the flash light emission and the flat light emission are similar to each other except that they differ from each other only in light emission start timing and light emission mode, the actions of FIGS. 22 and 23 are described in common below.

At points of time t0 to t11: The same processes are performed as in the two-lighting automatic light control photographing. Preliminary light emission is made and light measuring actions are performed for the group-A slave flash device and the group-B slave flash device.

At points of time t12 to t17: By using the command 4 shown in FIG. 12, preliminary light emission is made and light measuring actions are performed for the group C in the same manner as at the points of time t1 to t5.

At a point of time t18: The camera obtains main light emission amounts by adding, to the main light emission amounts of the groups A and B, correction values according to a light quantity ratio between the groups A and B received from the flash device and, further, by adding to the main light emission amount of the group C the group-C light correction amount as mentioned in the foregoing. The camera then sends to the master flash device, by serial communication, information about whether main light emission light can be controlled or not, the mode of main light emission, i.e., flash light emission or flat light emission, a main light emission amount in the flash light emission mode, and the intensity and time of light emission in the case of flat light emission mode. The camera begins to perform the mirror upward moving action for photo-taking.

At a point of time t19: The master flash device MS transmits the command 7 shown in FIG. 12 by causing the xenon tube 19 to emit pulse light (16).

At a point of time t20: The master flash device MS likewise transmits data of a light emission amount (17) of the group-A slave flash device.

At a point of time t21: The master flash device MS likewise transmits data of a light emission amount (18) of the group-B slave flash device.

At a point of time t22: The master flash device MS likewise transmits data of a light emission amount (19) of the group-C slave flash device.

At a point of time t23: Upon completion of transmission, the master flash device brings the level of the terminal DO back to a high level.

At points of time t24 to t27: Processes are performed in the same manner as the processes performed at the points of time t10 to t13 of the single-lighting automatic light control photo-taking described in the foregoing. A photo-taking operation is carried out by causing the group-A slave flash device, the group-B slave flash device and the group-C slave flash device to emit light in an arbitrary light-quantity ratio designated by the master flash device MS.

Single-lighting Manual Light Emission

FIG. 24 shows in a timing chart actions to be performed for single-lighting manual light emission in the flash light emission mode. FIG. 25 shows in a timing chart single-lighting manual light emission actions to be performed in the flat light emission mode.

In FIGS. 24 and 25, signals shown at parts (A) to (J) are the same as the corresponding parts shown in FIG. 18 described above. These parts are, therefore, omitted from the description. Further, since the flash light emission and the flat light emission are similar except that they differ from each other only in light emission start timing and light emission mode, the actions of FIGS. 22 and 23 are described in common below.

At a point of time t0: The camera transmits by serial communication information about the mode of main light emission (the flash light emission or the flat light emission) and the intensity and time of light emission in the case of the flat light emission mode. The camera then performs the upward mirror moving action for the commencement of photo-taking.

At a point of time t1: The master flash device MS transmits the command 8 shown in FIG. 12 by causing the xenon tube 19 to make pulse light emission (1).

At a point of time t2: The master flash device MS likewise transmits data of light emission amount (2).

At a point of time t3: Upon completion of transmission, the master flash device MS brings the level of the terminal DO back to a high level.

At points of time t4 to t7: Processes are performed in the same manner as the processes of the points of time t10 to t13 of the single-lighting automatic light control photo-taking. The slave flash device emits light at a light emission amount set by the master flash device.

Actions to be performed in a two-lighting manual light emission mode and actions to be performed in a three-lighting manual light emission mode are the same except in the following point. The master flash device MS communicates the command 9, the manual light emission amount of the group-A slave flash device and that of the group-B slave flash device, in the two-lighting mode, and communicates the command 10, the manual light emission amount of the group-A slave flash device, that of the group-B slave flash device and that of the group-C slave flash device in the three-lighting mode. Therefore, these actions are omitted from the timing charts and the description.

Single-lighting Multiple Light Emission

FIG. 26 shows in a timing chart actions to be performed in a single-lighting multiple light emission mode. Signals shown at parts (A) to (J) in FIG. 26 are the same as the signals shown in FIG. 18 and, therefore, are omitted from the following description.

At a point of time t0: The camera transmits to the master flash device, by serial communication, information about the mode of main light emission (flash light emission) and a shutter speed. The camera then begins to perform the upward mirror moving action for photo-taking.

At a point of time t1: The master flash device MS causes the xenon tube 19 to emit pulse light (1) to send the command 11 shown in FIG. 12.

At a point of time t2: The master flash device MS likewise transmits light emission amount data (2).

At a point of time t3: The master flash device MS likewise transmits data of light emission frequency and the number of times of light emission (3).

At a point of time t4: Upon completion of transmission, the master flash device MS brings the level of the terminal DO back to a high level.

At points of time t5 to t8: Processes similar to the processes of the points of time t10 to t13 of the single-lighting automatic light control photo-taking are performed. The slave flash device is caused to emit light at a light emission frequency, a light emission amount and the number of times of light emission as set by the master flash device.

Further, actions to be performed in a two-lighting multiple light emission mode and actions to be performed in a three-lighting multiple light emission mode are the same except in the following point. The master flash device MS communicates the command 12, the manual light emission amount of the group-A slave flash device, that of the group-B slave flash device and a light emission frequency and the number of times of light emission, in the two-lighting mode, and communicates the command 13, the manual light emission amount of the group-A slave flash device, that of the group-B slave flash device, that of the group-C slave flash device and a light emission frequency and the number of times of light emission in the case of three-lighting mode. Therefore, these actions are omitted from the timing charts and the description.

The circuit actions of the master and slave flash devices are next described with reference to FIG. 3.

Wireless Communication Light Emitting Action

Referring to FIG. 3, upon receipt of a command from the camera for wireless communication, the master flash device microcomputer 238 generates from its output terminal DA0 a predetermined voltage according to the light quantity of light pulses necessary for wireless optical communication.

Next, the terminal Y0 is set at a low level and the terminal Y1 at a high level to select the input D2 of the data selector 230. Since no light is emitted from the xenon tube 19 at this instance, no photocurrent flows at the sensor 32. The output of the light measuring circuit 234 is at a low level. The output of the comparator 231 is, therefore, at a high level. The light emission control circuit 211 is thus rendered conductive.

When the terminal SCR_CTRL is set at a high level to turn on the transistors 221 and 218, a gate current flows to the gate of the thyristor 231 through the transistor 218 and the resistor 214. The thyristor 213 is thus turned on. When a high level signal is sent out from the terminal TRIG for a predetermined period of time, since the light emission control circuit 212 is in a conductive state, the xenon tube 19 begins to emit light. Then, a current flowing to the xenon tube 19 flows through the capacitor 203, the coil 206 and the thyristor 213. In other words, a light pulse signal of a sharp rise required for high-speed wireless communication can be obtained by bypassing the coil 208 by means of the thyristor 213.

With a current flowing to the xenon tube 19 to start light emission, the light quantity gradually increases. When the output of the sensor 32 which monitors the light emission reaches a predetermined voltage, the level of the output of the comparator 231 turns from a high level into a low level. The output thus obtained comes through the terminals D2 and Y to cut off the light emission control circuit 212. The light emission is thus brought to a stop. At the same time, the microcomputer 238 which monitors the level of the output Y through its terminal YIN detects turning of the output Y into a low level. The microcomputer 238 then forcibly brings the light emission to a stop by setting the terminals Y1 and Y0 at a low level.

With the operation carried on in this manner, the first transmission byte generates a channel discrimination signal CH after the lapse of a predetermined time. This channel discrimination signal is provided for the purpose of preventing any confusion of communication by selecting an applicable channel in a case where a plurality of slave flash devices are in use. Following this, necessary bits of data, bits D7 to D0, are emitted at equal intervals according to the contents of the transmission data.

In each of the second byte and subsequent bytes of communication, necessary bits of data bits D7 to D0 after the start pulse are emitted at equal intervals according to the contents of the transmission data.

Preliminary Light Emission Action

In a case where the flash device is in the master mode, the microcomputer 238 sets the output terminal DA0 at a predetermined voltage by which an apposite light emission intensity can be obtained according to information on the light emission intensity designated by the camera. If the flash device is in the slave mode, the output terminal DA0 is set at a predetermined voltage by which an apposite light emission intensity according to information on the light emission intensity can be obtained.

Next, when the output terminal SCR_CTRL is set at a low level, the transistors 221 and 218 turn off to turn off the thyristor 213. At the same time, a low level signal is outputted from the terminal Y0 and a high level signal from the terminal Y1 to select the input terminal D2 of the data selector 230. Since no light is emitted from the xenon tube 19 at this point of time, the photocurrent of the light receiving element 32 does not flow. The output of the light receiving circuit 234 to be inputted to the inverting input terminal of the comparator 231 is not generated. Therefore, the output of the comparator 231 is at a high level to render the light emission control circuit 212 conductive.

When a trigger signal is sent out from the terminal TRIG, the trigger circuit 211 generates a high voltage to excite the xenon tube 19 to begin to emit light. This light emission current flows from the capacitor 203 to the xenon tube 19 through the coils 206 and 208.

Meanwhile, after the lapse of a predetermined time, the microcomputer 238 commands the light measuring integration circuit 236 to start its integrating action. The light measuring integration circuit 236 begins to integrate the logarithmically compressed photoelectric output of the light receiving element 31 provided for integrating the light quantity. At the same time, an internal timer which is not shown but is disposed inside the microcomputer 238 is caused to start counting a predetermined time.

The start of the integrating action is arranged to delay after the generation of the trigger signal for the following reasons. The light measuring integration circuit can be prevented from integrating any noise other than the light signal by the delay. Besides, there is a delay of ten-odd usec before the substantial light emission.

The photocurrent of the light receiving element 32 increases when preliminary light emission is made. The output of the light receiving circuit 234 then rises. When the output comes to exceed a predetermined comparing voltage set at the non-inverting input of the comparator 231, the level of the output of the comparator turns into a low level. The light emission control circuit 212 then cuts off the light emission current of the xenon tube 19 to cut off the electric discharge loop. However, a circulating current loop is formed jointly by the diode 209 and the coil 208. By virtue of this, the light emission current comes to gradually decrease after an overshoot caused by a circuit delay settles.

Since the light emission intensity decreases accordingly as the light emission current decreases, the photocurrent of the light receiving element 32 also decreases to lower the output of the light receiving circuit 234. Then, when the output of the light receiving circuit 234 becomes lower than the comparing level, the level of the output of the comparator 231 again becomes high. The high level output of the comparator 231 again renders the light emission control circuit 212 conductive to form the discharge loop of the xenon tube 19. The light emission current then increases to increase the light emission intensity. The light emission intensity thus repeats to increase and decrease in a short cycle with respect to the comparing voltage preset at the terminal DA0. As a result, control can be adequately carried out over a flat light emitting operation whereby light emission is allowed to continue at about a constant light emission intensity as desired.

After the lapse of a predetermined preliminary light emission time as counted by the light emission timer, the microcomputer 238 sets the terminals Y1 and Y0 at a low level to select the low level input terminal D0 of the data selector 230. The output of the data selector 230 is thus forcibly set at a low level to cause the light emission control circuit 212 to cut off the discharge loop of the xenon tube 19. The light emission is thus terminated.

Upon termination of the light emission, the microcomputer 238 reads through the A/D input terminal AD0 the output of the light measuring integration circuit 236 obtained by integrating the result of preliminary light emission. The output thus read is A/D-converted and the integral value, i.e., the light emission amount obtained at the time of preliminary light emission, is stored in a digital value as a reference value for a light emission amount of the main light emission.

Flash Main Light Emission

In a case where the flash device is in the master mode, the microcomputer 238 sets a predetermined voltage at the output terminal DA0 in such a way as to obtain an apposite light emission amount according to information on a light emission amount designated by the camera. If the flash device is in the slave mode, the microcomputer 238 sets a predetermined voltage at the output terminal DA0 for an apposite light emission amount according to information on a light emission amount received from the master flash device. This predetermined voltage is obtained by adding or subtracting a voltage corresponding to a relative light emission amount to and from an integral output read from the terminal AD0 at the end of the preliminary light emission.

Next, high and low level signals are outputted from the terminals Y1 and Y0 to select the input terminal D1 of the data selector 230. At this time, since the light measuring integration circuit 236 is in a state of being inhibited from operating, the output of the light measuring integration circuit 236 to be inputted to the inverting input terminal of the comparator 232 is not generated and the output of the comparator 232 is at a high level. The light emission control circuit 212 is, therefore, in a conductive state.

When a trigger signal is outputted from the terminal TRIG, the trigger circuit 211 generates a high voltage. The high voltage excites the xenon tube 19 to begin to emit light. Further, the microcomputer 238 of the flash device sets the integration start terminal INT to be at a low level several usec after the start of the actual light emission which takes place when a trigger noise caused by the application of the trigger signal settles. With the terminal INT set at the low level, the light measuring integration circuit 236 integrates the output of the sensor 31.

When the integral output of the light measuring integration circuit 236 reaches a predetermined voltage set at the terminal DA0, the comparator 232 is inverted to cut off the conduction of the light emission control circuit 212 through the data selector 230. This brings the light emission to a stop. The microcomputer 238 of the flash device, in the meantime, monitors the state of the terminal YIN. When the light emission comes to a stop with the terminal YIN inverted, the microcomputer 238 forcibly sets a light emission inhibiting state by setting the terminals Y1 and Y0 at a low level. Then, the integration start terminal INT is inverted to terminate the integrating action, and the light emission process comes to an end.

Flat Main Light Emission

If the flash device is in the master mode, the microcomputer 238 sets a predetermined voltage at the output terminal DA0 in such a way as to obtain an apposite light emission amount according to information on a light emission amount designated by the camera. If the flash device is in the slave mode, the microcomputer 238 sets a predetermined voltage at the output terminal DA0 for an apposite light emission amount according to information on a light emission amount received from the master flash device. This predetermined voltage is obtained by adding or subtracting a voltage corresponding to a relative light emission amount to and from an integral output read from the terminal AD0 at the time of the preliminary light emission.

After the above processes, flat light emission is carried out at a predetermined light emission intensity and for a predetermined light emission time in the same manner as the above-stated processes for the preliminary light emission.

Manual Flash Light Emission

Upon receipt of a main light emission command, the microcomputer 238 sets, in the case of the master mode, the terminal DA0 at a predetermined voltage corresponding to a light emission amount set when the flash device is in the master mode. If the flash device is in the slave mode, the microcomputer 238 sets the terminal DA0 at a predetermined voltage which gives an apposite light emission amount according to information on light emission amount received from the master flash device.

To obtain the predetermined voltage mentioned above, an integral output read from the terminal AD0, for every zooming position, when light is fully emitted in adjusting the flash device is stored in a rewritable storage device such as an EEPROM, a flash ROM or the like which is not shown but is disposed within the microcomputer 238 of the flash device. At the time of manual flash light emission, a desired light quantity can be obtained by setting at the output terminal DA0 a voltage which corresponds to a set light emission amount on the basis of the above-stated full-light-emission integral output.

All actions to be performed after the above-stated process are omitted from the description as they are the same as the actions performed for the flash light emission described in the foregoing.

Manual Flat Light Emission

When a main light emission command is received, the microcomputer 238 sets the terminal DA0 at a predetermined voltage which corresponds to a light emission amount set if the flash device is in the master mode. If the flash device is in the slave mode, the microcomputer 238 sets the terminal DA0 at a predetermined voltage which gives an apposite light emission amount according to information on light emission amount received from the master flash device.

To obtain the predetermined voltage mentioned above, a voltage output of the terminal DA0 at which a maximum flat light emission intensity is obtained in adjusting the flash device is stored, for every zooming position, in a rewritable storage device such as an EEPROM, a flash ROM or the like which is not shown but is disposed within the microcomputer 238 of the flash device. At the time of manual flat light emission, a desired amount of light can be obtained by setting at the output terminal DA0 a voltage corresponding to a set light emission amount on the basis of the terminal DA0 setting voltage obtained at the above-stated maximum light emission intensity.

All actions to be performed after the above-stated process are omitted from the description as they are the same as the actions performed for the flat light emission described in the foregoing.

The first embodiment described above has the following advantages.

1) In a flash system composed of a camera having a focal plane shutter and a slave flash device located at a distance from the camera, the camera includes light emission mode selection means for selecting a flash light emission mode or a flat light emission mode according to a controlled shutter speed, and transmission means for transmitting, to the slave flash device, flash-device control information including information on the selected light emission mode. The slave flash device includes receiving means for receiving the flash-device control information, and flash light emission means. The slave flash device is provided with light emission control means for controlling the flash light emission means either in the flash light emission mode or in the flat light emission mode according to the flash-device control information received. The arrangement enables the system to synchronize light emission with all shutter speeds even in a wireless mode.

2) In a flash system composed of a camera and a slave flash device located at a distance from the camera, the camera includes selection means for selecting a flash-device-using exposure mode according to the photo-taking condition of the camera, and transmission means for transmitting information on the flash-device-using exposure mode selected according to the photo-taking action of the camera. The slave flash device includes receiving means for receiving the flash-device-using exposure mode information and flash light emission means. The slave flash device is provided with light emission control means for controlling light emission of the flash light emission means according to the flash-device-using exposure made information received. One of modes including an automatic light control mode, a manual light emission mode and a multiple light emission (lighting) mode is selected as the flash-device-using exposure mode. The arrangement enables the flash device system to carry out flash photography in various light emission modes.

3) In a flash system composed of a camera and a slave flash device located at a distance from the camera, the camera includes selection means for selecting a flash-device-using exposure mode according to the photo-taking condition of the camera, and transmission means for transmitting control information on flash-device light emission according to the photo-taking action of the camera. The slave flash device includes receiving means for receiving the control information and flash light emission means. The slave flash device is provided with display means for displaying information according to the flash-device light-emission control information received. The flash system is thus arranged to enable the user to know whether the slave flash device has correctly acted after receiving the information communicated from the camera.

A flash system according to a second embodiment of the invention is arranged to control a slave flash device which is set away from a camera with slave-flash-device control signals generated by a built-in flash device which is disposed inside of the camera.

Figure 27:
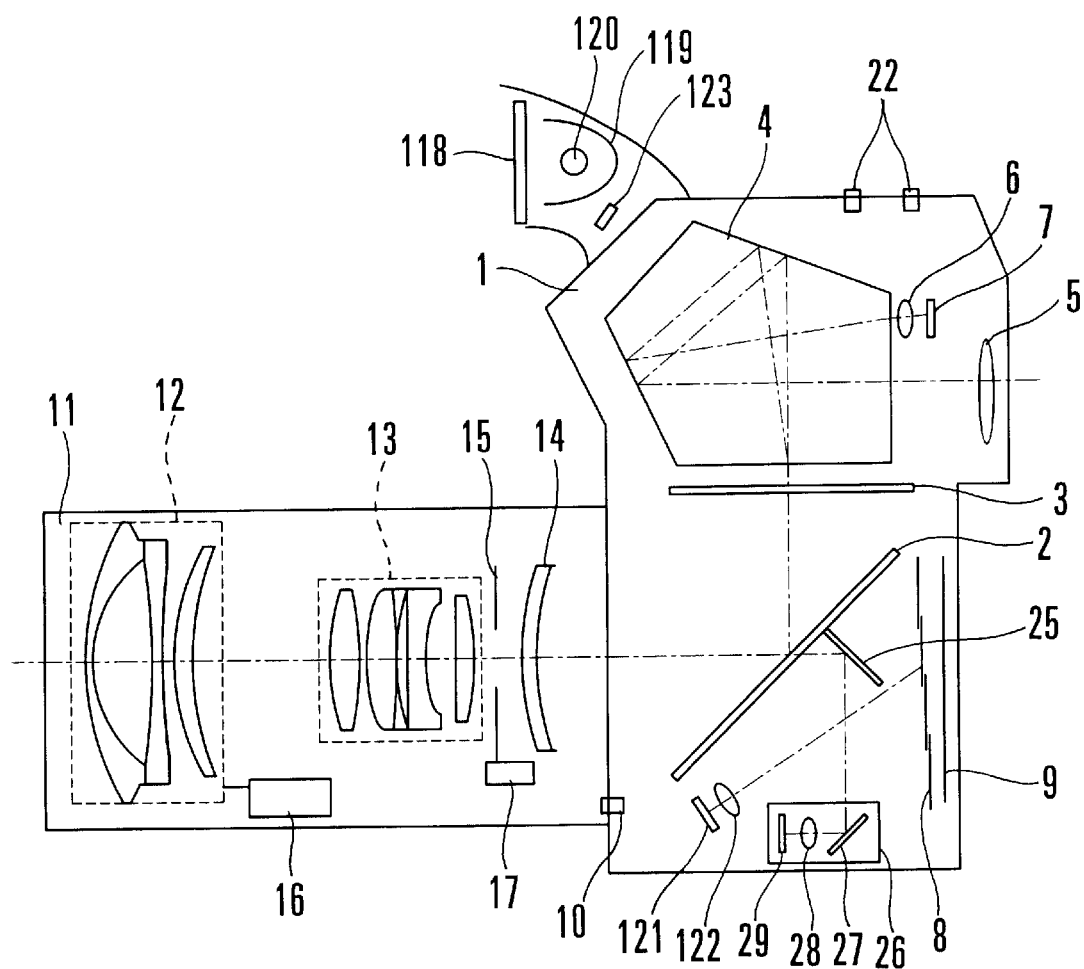
FIG. 27 is a side sectional view of a camera system according to a second embodiment of the invention.

FIG. 27 is a transverse sectional view showing the camera of the second embodiment. All parts that are the same as the corresponding parts in FIG. 1 are indicated by the same reference numerals and the details of them are omitted from the following description.

In FIG. 27, reference numerals 118 and 119 denote respectively a Fresnel lens and a reflection plate which are arranged to efficiently converge light emission energy toward a photo-taking object. A xenon tube 120 is arranged as light emission means.

A light control sensor 121 is arranged to monitor the reflection light of a film surface for the purpose of performing TTL automatic light control over the built-in flash device. A lens 122 is arranged to form an image of the film surface on the light control sensor 121. A light receiving element 123 is arranged to directly monitor the light emission amount of the xenon tube 120.

Figure 28:
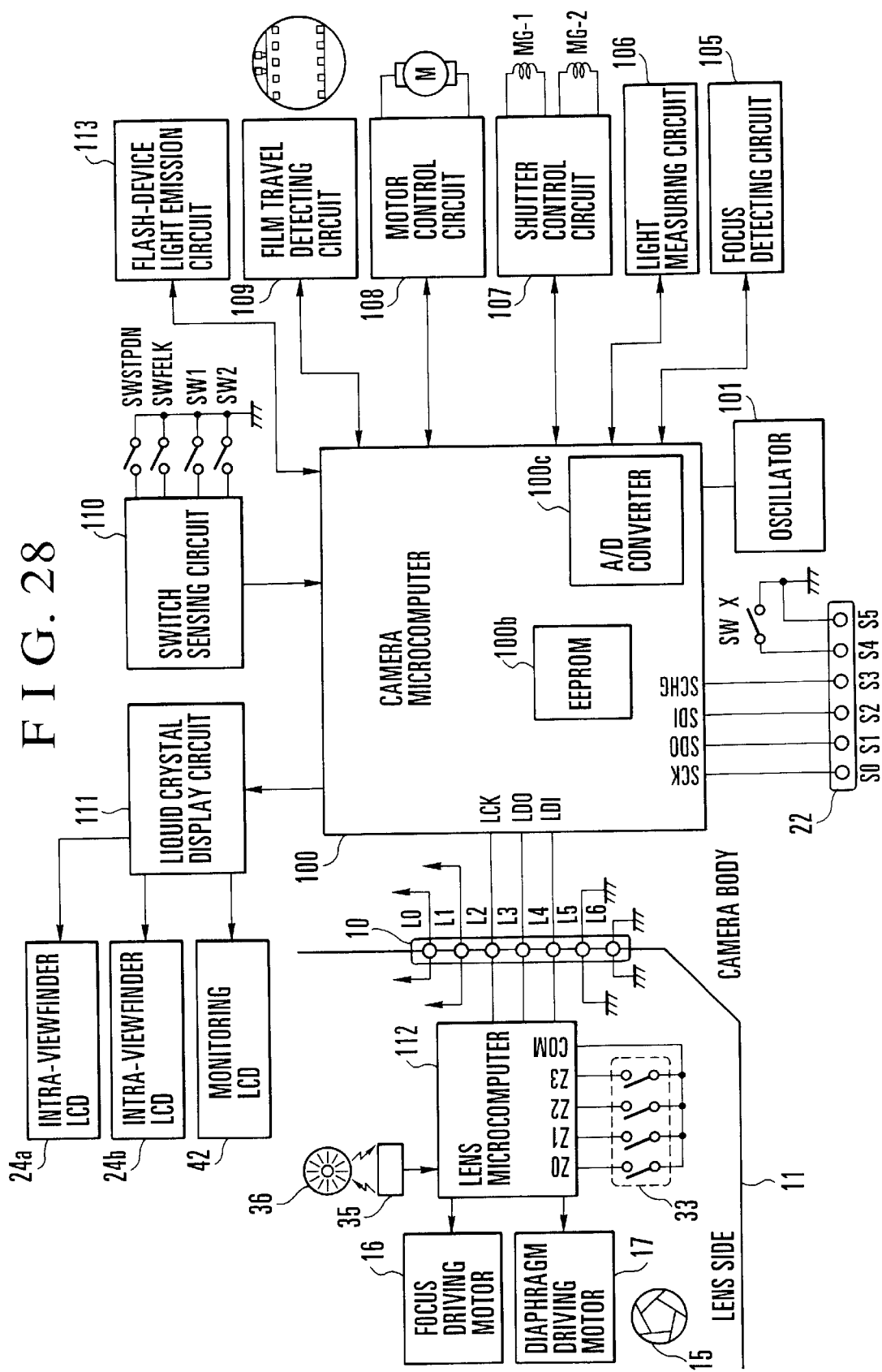
FIG. 28 is a block diagram showing the circuit arrangement of the camera system shown in FIG. 27.

FIG. 28 is a block diagram showing the circuit arrangement of the second embodiment. In FIG. 28, parts corresponding to the parts shown in FIG. 2 are indicated by the same reference numerals. Reference numeral 113 denotes a flash-device light emission circuit. The details of the flash-device light emission circuit 113 are shown in FIG. 29, which shows the internal arrangement of the circuit 113.

Figure 29:
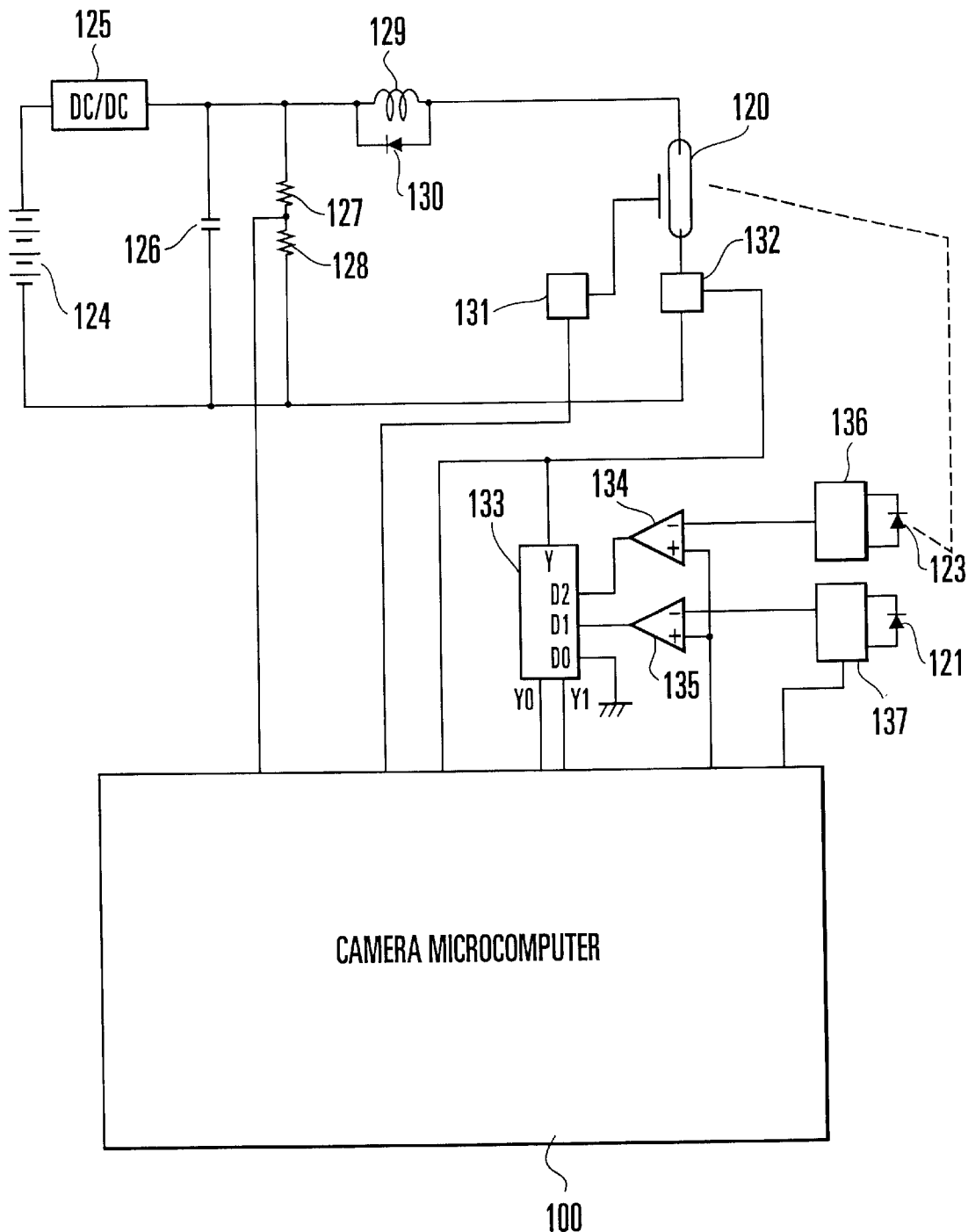
FIG. 29 is a block diagram showing the circuit arrangement of a flash-device light emission circuit included in the camera system according to the second embodiment.

Referring to FIG. 29, a light receiving sensor 121 is provided for TTL light control and is arranged to receive film-surface reflection light resulting from light emission by the flash device. A light receiving sensor 123 is arranged to directly monitor the light emission from the xenon tube 120. A battery 124 is used as a power source. A DC-DC converter 125 is arranged in a known manner to boost the voltage of the battery 124 up to several hundred volts.

A main capacitor 126 is arranged to accumulate light emission energy. Resistors 127 and 128 are arranged to divide the voltage of the main capacitor 126 in a predetermined ratio. A coil 130 is arranged to absorb a back electromotive voltage generated at the coil 129 when light emission comes to a stop. A trigger generation circuit 131 is arranged to generate a trigger signal. A light emission control circuit 132 is an IGBT or the like. A data selector 133 is arranged to output data selectively from a terminal D0, D1 or D2 according to a combination of two inputs from terminals Y0 and Y1. A comparator 134 is provided for adjusting the amount of light emission from the xenon tube 120 in making wireless pulse light emission. A comparator 135 is provided for adjusting to a predetermined amount the amount of light emitted from the xenon tube 120 in performing TTL light control. A light measuring circuit 136 is arranged to amplify a minute current flowing to the light receiving sensor 123 and to convert a photocurrent into a voltage. An integration circuit 137 is arranged to integrate reflection light of a photo-taking object received by the light receiving sensor 121.

Figure 30:
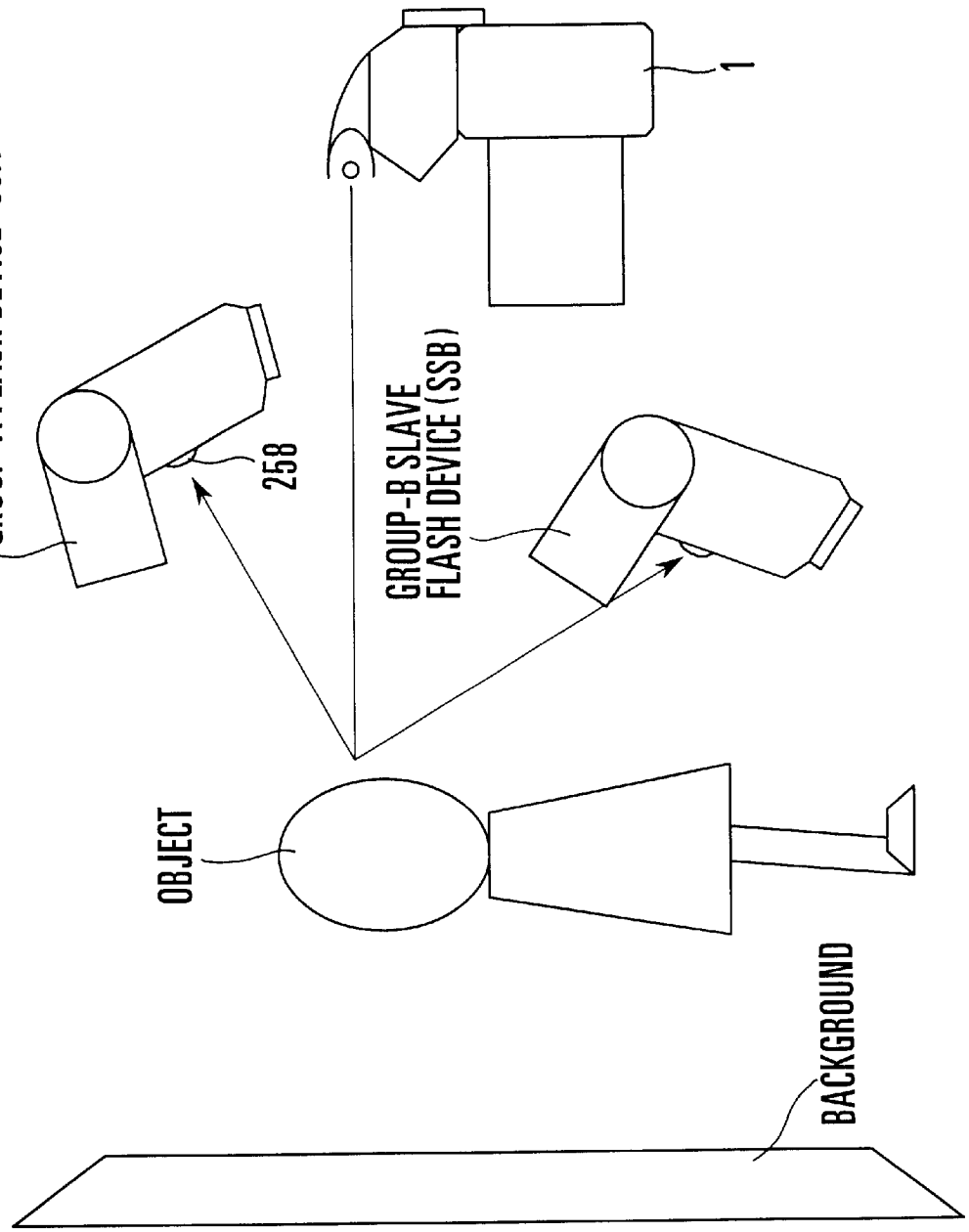
FIG. 30 is a diagram showing an example of photo-taking operation in the second embodiment.

FIG. 30 shows by way of example a case where a wireless flash-device system is used in taking a picture with the second embodiment. In this system, two slave flash devices of groups A and B are used for taking a picture in a two light-quantity ratio.

To control the two slave flash devices of the groups A and B, the built-in flash device of the camera generates wireless light signals in the same manner as in the case of the first embodiment. Control information thus obtained is transmitted to the slave flash devices of the groups A and B allocated away from the camera body. Under the control of the control information, the picture can be taken with the group-A slave flash device and the group-B slave flash device allowed to emit light in an arbitrary light quantity ratio.

Figure 31A:
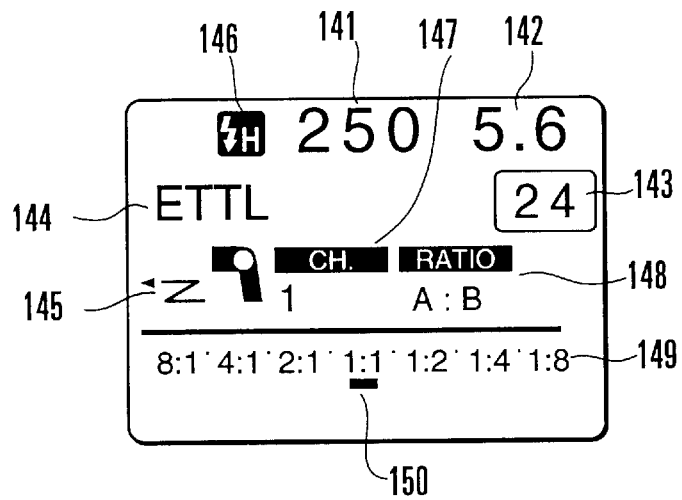
FIGS. 31(a) to 31(c) are diagrams showing examples of displays made on a display part of the camera in the second embodiment.
Figure 31B:
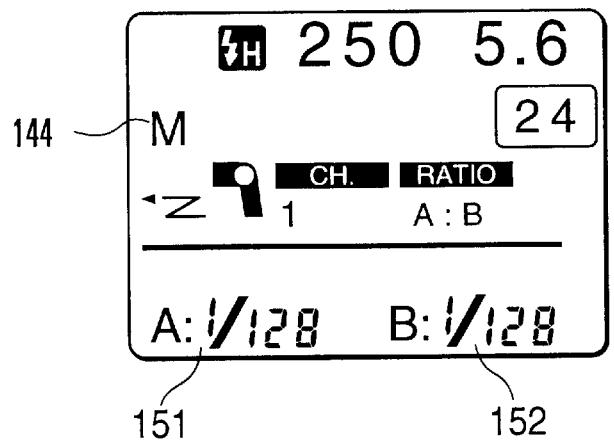
Figure 31C:
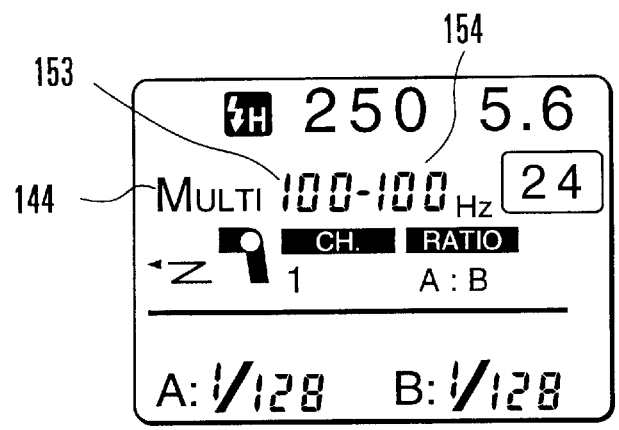

FIGS. 31(*a*) to 31(*c*) show examples of displays made by the monitoring LCD 42 of the camera in different wireless flash-device control modes. FIG. 31(*a*) shows a display made in a two-lighting automatic light control mode. FIG. 31(*b*) shows a display made in a two-lighting manual light emission mode. FIG. 31(*c*) shows a display made in a two-lighting multiple light emission mode.

Referring to FIGS. 31(*a*) to 31(*c*), a display part 141 shows a setting value of shutter speed. A display part 142 shows a setting value of aperture. A display part 143 shows a number of photographing frames of film. A display part

144 shows a light emission mode. A display part 145 shows the wireless mode. A display part 146 shows a high-speed synchronizing mark. A display part 147 shows a channel. A display part 148 shows an A:B light-quantity ratio setting mode. A display part 149 shows a setting value of the A:B light-quantity ratio.

A display part 151 shows the light emission amount of the group-A slave flash device in a flash-device manual light emission mode. A display part 152 shows the light emission amount of the group-B slave flash device in the flash-device manual light emission mode. In the event of a flash-device multiple light emission mode, the display part 151 shows a light emission amount per shot of the multiple light emission of the group-A slave flash device, and the display part 152 likewise shows a light emission amount per shot of the group-B slave flash device.

A display part 153 shows the number of times of light emission in the mode of multiple light emission of flash device. A display part 154 shows a light emission frequency.

The actions of the camera and the flash devices in the second embodiment are next described with reference to FIGS. 32 and 33, which are flow charts.

Figure 32:
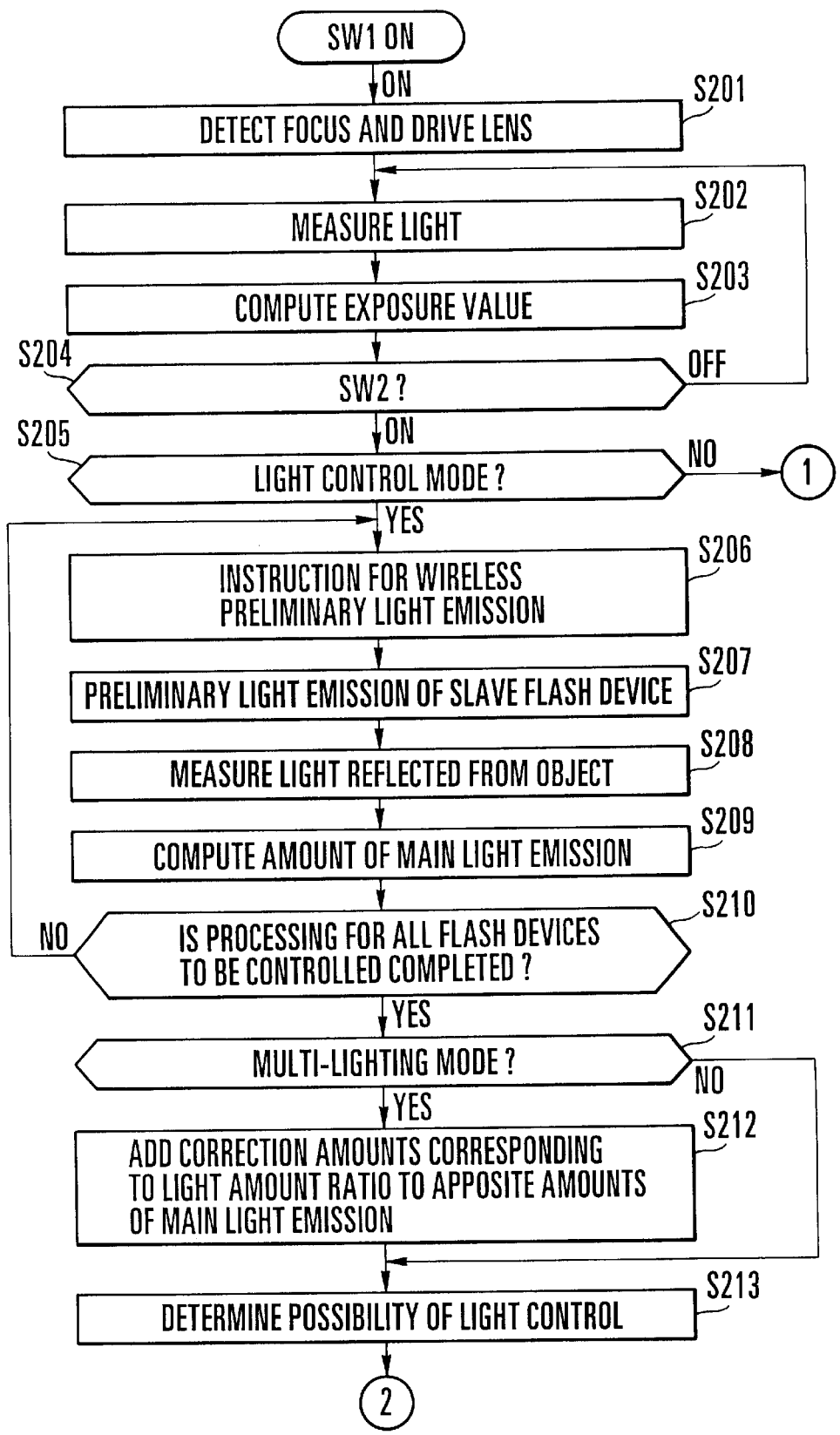
FIG. 32 is a flow chart for explaining the operations of the camera and the flash devices in the second embodiment.
Figure 33:
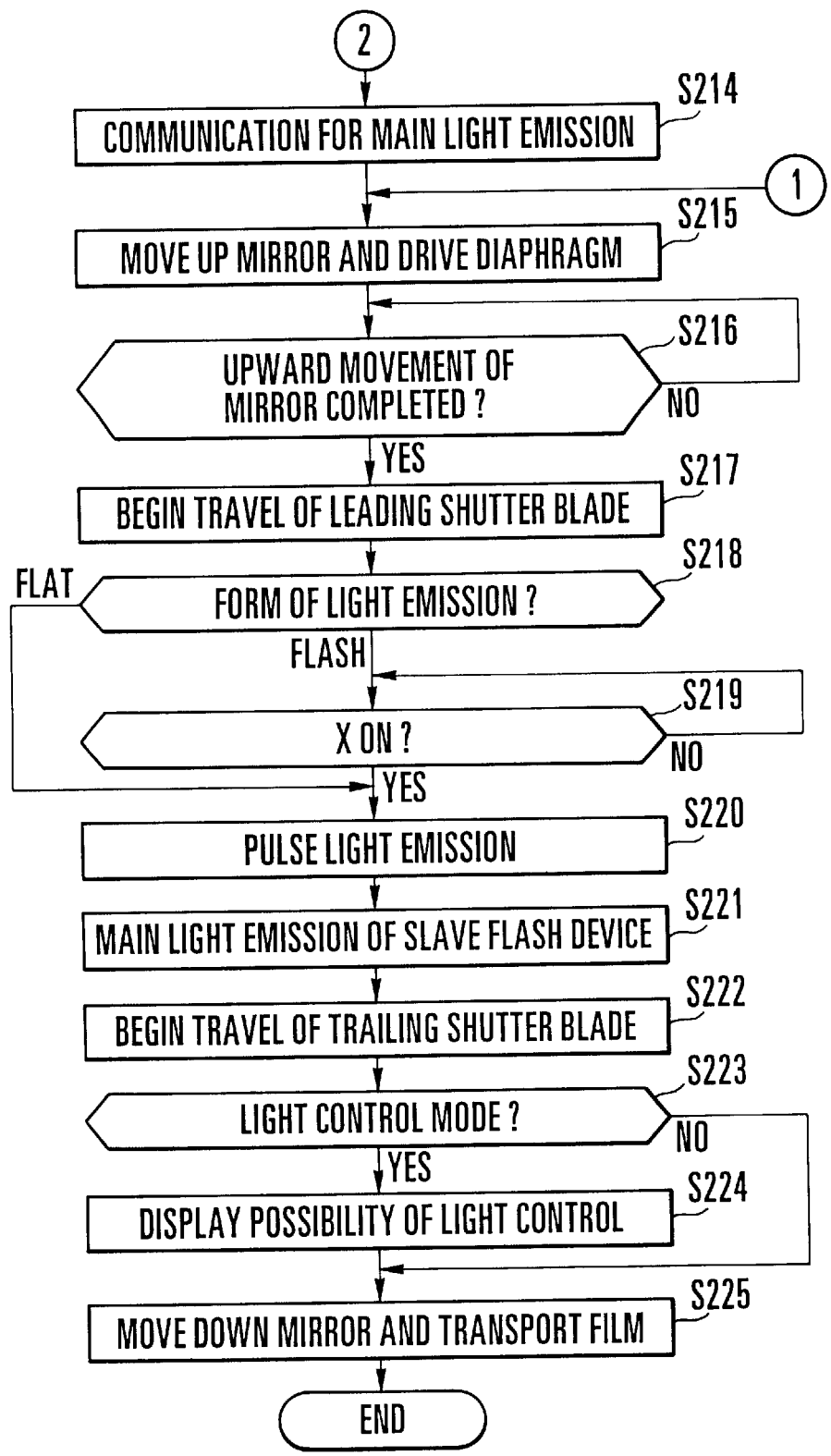
FIG. 33 is a flow chart for explaining the operations of the camera and the flash devices in the second embodiment.

At a step S201 of FIG. 32: When the switch SW1 which is for causing light-measuring and distance-measuring actions to begin is turned on, after the camera is started, a focus detecting action is performed in a known phase-difference detecting method by the focus detecting circuit 105 of the camera and focus is adjusted.

At a step S202: The luminance value Bv of the object obtained under a natural light condition is measured by the light measuring circuit 106.

At a step S203: An apposite amount of exposure EvS is decided on the basis of the luminance of the object and the sensitivity of a film in use (EvS=Tv+Av). Then, in accordance with a set exposure mode, a shutter speed and an aperture are decided.

At a step S204: If the release start switch SW2 is found to be in its on-state, the flow of operation proceeds to a step S205. If not, the flow returns to the step S202 to repeat the above stated processes.

At a step S205: A check is made for the light emission mode of the flash device. If the mode is the automatic light control mode, the flow proceeds to a step S206. If not (in the event of a mode such as the manual light emission mode or the multiple light emission mode), the flow branches to a step S215 (FIG. 33) as it is not necessary for the camera to decide the amount of main light emission by measuring the result of preliminary light emission from the flash device.

At the step S206: In the automatic light control mode, the camera sends to the slave flash device the preliminary light emission command and the data of preliminary light emission intensity described in the foregoing with reference to FIGS. 11 and 12. In this instance, the command 1 and the preliminary light emission intensity data are sent, if the system is in the ratio-off mode. If the system is in the ratio mode, i.e., in a case where a plurality of slave flash devices are to be controlled, one of the commands 2, 3 and 4 is selected according to each of the slave device groups and is sent together with the preliminary light emission intensity data. Then, pulse light emission is made to cause the slave flash devices to begin to emit light.

At a step S207: In synchronism with the light emission start signal of the camera, the slave flash device makes preliminary light emission for a predetermined light emission time and at a light emission intensity designated by the camera.

At a step S208: The camera measures with the light measuring sensor 7 the reflection light of the object caused by the preliminary light emission of the slave flash device. Then, the camera uses an object luminance value BvF thus obtained and a film sensitivity value SV to obtain an exposure value EvF of the preliminary light emission. Further, in order to measure object reflection light caused only by the preliminary light emission by excluding any other external light, the object light measured immediately before under natural light is subtracted from the object reflection light obtained by the preliminary light emission.

At a step S209: In the same manner as in the case of the first embodiment, the camera computes, for the necessary number of times of slave-flash-device control, an apposite main light emission amount (GAIN) by which an exposure value obtained by the preliminary light emission amount at the step S208 can be made into an apposite exposure amount EvS.

At a step S210: The flow returns to the step S206 to repeat the light emission and light measuring processes until the preliminary light emission and light measurement are carried out the necessary number of times.

At a step S211: A check is made to find if the system is in the multi-lighting mode. If so, the flow proceeds to a step S212. If not, the flow branches to a step S213.

At the step S212: In the case of the multi-lighting mode, the light emission correction amount of each group is added to the apposite main light emission amount of the group, in the same manner as in the case of the first embodiment.

At the step S213: A decision is made as to whether or not light control is possible according to the main light emission amount obtained as described above in the same manner as in the case of the first embodiment.

At a step S214: The camera communicates, to the slave flash device, information on main light emission (flat or flash light emission mode, main light emission amount and light emission time in the case of flat light emission), and the applicable command shown in FIG. 12 and data on the basis of information on the set light emission mode (automatic light control, manual light emission or multiple light emission) and the number of slave flash devices to be controlled, in the same manner as in the case of the first embodiment.

At the step S215: Upon completion of commanding the slave flash devices to make main light emission, the camera moves the main mirror 2 and the sub-mirror 25 upward to retract them from the photo-taking optical path. At the same time, the lens microcomputer 112 is commanded to drive the diaphragm.

Meanwhile, each slave flash device receives the communication for main light emission from the camera, analyzes the command received, and prepares for the main light emission according to the mode and amount of light emission designated by the camera.

At a step S216: The flow waits for completion of the process of retracting the mirrors from the optical path. Upon completion of the mirror retraction process, the flow proceeds to a step S217.

At the step S217: When the main mirror 2 and the sub-mirror 25 are retracted from the photo-taking optical path, an exposure action begins by driving the leading shutter blade to travel.

At a step S218: If the light emission mode is flat light emission, the flow proceeds to a step S220 before the commencement of light emission with the shutter opened by the travel of the leading shutter blade. In the case of flash light emission, the flow proceeds to a step S219.

At the step S219: In the flash light emission mode, the flow waits until the X contact turns on with the leading shutter blade completely opened after driving the leading shutter blade.

At the step S220: The camera generates a light emission start pulse for causing each slave flash device to begin to emit light.

At a step S221: In synchronism with the light emission start pulse from the camera, the slave flash device makes the main light emission according to the mode and amount of light emission designed at the step S214. When the main light emission is made in a normal manner, the slave flash device displays on the liquid crystal display 240 information about the main light emission.

At a step S222: The camera terminates the photo-taking operation by allowing the trailing shutter blade to travel after the lapse of a predetermined shutter opening time.

At a step S223: A check is made to find if the light emission mode is the automatic light control mode. If so, the flow proceeds to a step S224 to display the light control mode. If not, i.e., in the event of the manual light emission mode or the multiple light emission mode, the flow branches to a step S225.

At the step S224: In the automatic light control mode, the light control confirming display part of the intra-viewfinder LCD 24b is caused to make a display by lighting it up or putting it out for a predetermined period of time on the basis of the result of decision made at the step S213.

At the step S225: Upon completion of the exposure action, the photo-taking operation is terminated by moving down the main mirror 2 and the sub-mirror 25 which have been retracted from the photo-taking optical path and by causing the motor control circuit 108 and the film travel detecting circuit 109 to wind the film to an extent corresponding to one frame portion.

The actions of these flow charts are described in detail below with reference to a timing chart.

In the second embodiment, the built-in flash device of the camera is arranged to perform the wireless communication and light emission control actions which are performed by the master flash device in the case of the first embodiment. The following describes as a typical example only the actions to be performed for two-lighting automatic light control photo-taking, in the flash light emission mode, as shown in FIG. 34.

Figure 34:
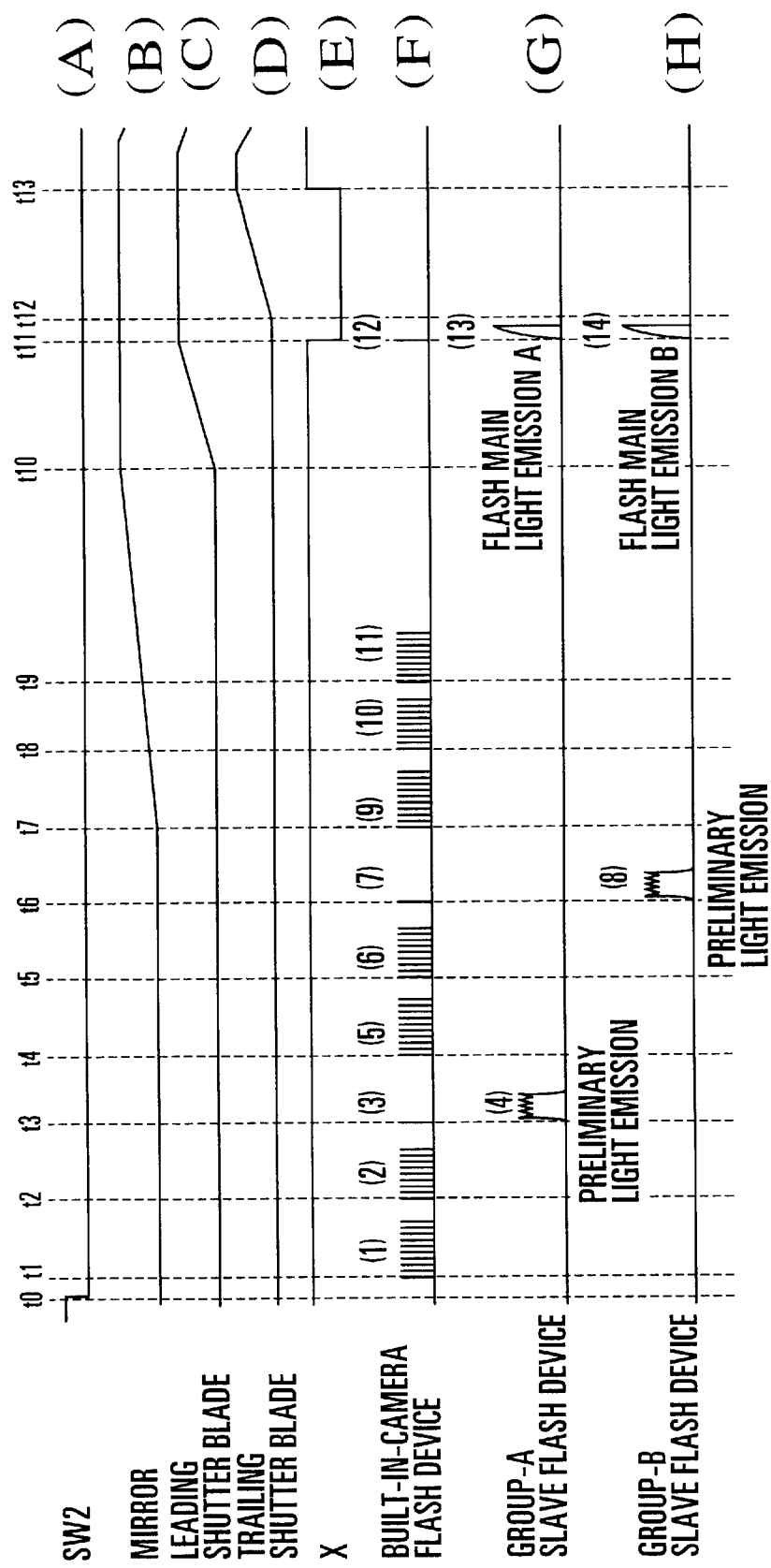
FIG. 34 is a timing chart for explaining the operations of the camera and the flash devices in the second embodiment.

FIG. 34 is a timing chart showing the actions to be performed for the two-lighting automatic light control photo-taking in the flash light emission mode.

In FIG. 34, a part (A) shows the state of the release start switch SW2 of the camera. A part (B) shows in a curve the move of the mirror 2 of the camera body. A low level part of the curve represents a moved-down position and a high level part a moved-up position of the mirror 2. A part (C) shows in a curve the travel of the leading blade of the shutter 8 of the camera body. A low level curve part represents a state before the travel and a high level part a state after the travel. A part (D) shows in a curve the travel of the trailing blade of the shutter 8. A low level curve part represents a state before the travel and a high level part after the travel. A part (E) shows in a line the state of the X contact of the camera body. A high level line part represents an open state and a low level part a short-circuiting state of the X contact. The short-circuiting state of the X contact takes place when the leading shutter blade opens. The open state of the X contact is obtained after completion of the travel of the trailing shutter blade. A part (F) shows the waveform of wireless communication conducted by emitting light from the built-in flash device of the camera.

A part (G) shows the light emission waveform of the slave flash device which is set as the group A.

A part (H) shows the light emission waveform of the slave flash device which is set as the group B.

The actions to be performed at various points of time shown in the timing chart of FIG. 34 are as follows.

At a point of time t0: When the release start switch SW2 turns on, the camera begins to perform control actions on the wireless slave flash devices.

At a point of time t1: To cause the group-A slave flash device to make preliminary light emission, the camera transmits the command 2 shown in FIG. 12 by emitting pulse light (1) from the built-in xenon tube 120.

At a point of time t2: The light emission amount data (2) is likewise transmitted.

At a point of time t3: The camera generates a light emission start pulse (3) for the purpose of causing the group-A slave flash device to begin preliminary light emission. Then, in synchronism with the light emission start signal of the camera, the group-A slave flash device makes preliminary light emission (4) for a predetermined light emission time and at a predetermined light emission intensity designated by the camera. While the group-A slave flash device is making the preliminary light emission (4), the camera measures reflection light from the photo-taking object.

At points of time t4, t5 and t6: By using the command 3 shown in FIG. 12, the group-B slave flash device is caused to make preliminary light emission and, then, the reflection light of the object is measured.

At a point of time t7: To start a photo-taking process, the camera begins to move the mirrors upward. At the same time, the camera obtains an amount of main light emission by adding a correction value corresponding to the light-quantity ratio between the group-A slave flash device and the group-B slave flash device set at the camera as shown in FIG. 17 to the main light emission amount of each of the slave flash devices of groups A and B. After that, whether light control is possible or not is decided on the basis of the main light emission amounts thus obtained for the slave flash devices of the groups A and B. Then, to command the slave flash devices to make main light emission, the built-in xenon tube 120 is caused to emit pulse light (9) to transmit the command 6 shown in FIG. 12.

At a point of time t8: The camera likewise transmits group-A slave-flash-device light emission data (10).

At a point of time t9: Group-B slave-flash-device light emission data (11) is likewise transmitted.

At points of time t10 to t13: Actions are carried out in a manner similar to the actions of the points of time t17 to t21 performed in the first embodiment in the two-lighting automatic light control photo-taking mode. A photo-taking operation is performed by causing the group-A slave flash device and the group-B slave flash device to emit light in an arbitrary light-quantity ratio which is designated by the camera.

The second embodiment described above have the following advantages.

1) In a flash system composed of a camera having a focal plane shutter and slave flash devices located at distances from the camera, the camera includes light emission mode selection means for selecting a flash light emission mode or a flat light emission mode according to a controlled shutter speed, and transmission means for transmitting, to the slave flash devices, flash-device control information including information on the selected light emission mode. Each of the slave flash devices includes receiving means for receiving the flash-device control information, and flash light emission means. The slave flash device is provided with light emission control means for controlling the flash light emission means either in the flash light emission mode or in the flat light emission mode according to the flash-device control information received. The arrangement enables the flash system to synchronize light emission with all shutter speeds even in a wireless mode.

2) In a flash system composed of a camera and slave flash devices located at distances from the camera, the camera includes selection means for selecting a flash-device-using exposure mode according to the photo-taking condition of the camera, and transmission means for transmitting information on the flash-device-using exposure mode selected according to the photo-taking action of the camera. Each of the slave flash devices includes receiving means for receiving the flash-device-using exposure mode information and flash light emission means. The slave flash device is provided with light emission control means for controlling light emission of the flash light emission means according to the flash-device-using exposure mode information received. One of modes including an automatic light control mode, a manual light emission mode and a multiple light emission mode is selected as the flash-device-using exposure mode. The arrangement enables the flash system to carry out a photo-taking operation in various light emission modes.

3) In a flash system composed of a camera and slave flash devices located at distances from the camera, the camera includes selection means for selecting a flash-device-using exposure mode according to the photo-taking condition of the camera, and transmission means for transmitting control information on flash-device light emission according to the photo-taking action of the camera. Each of the slave flash devices includes receiving means for receiving the control information and flash light emission means. The slave flash device is provided with display means for displaying information according to the flash-device light-emission control information received. The flash system is thus arranged to enable the user to know whether the slave flash device has correctly acted after receiving the information communicated from the camera.

A third embodiment of the invention is arranged to control a slave flash device set away from a camera by generating slave flash device controlling signals using a high luminance LED which is arranged within the camera to emit an auxiliary light for automatic focusing.

Figure 35:
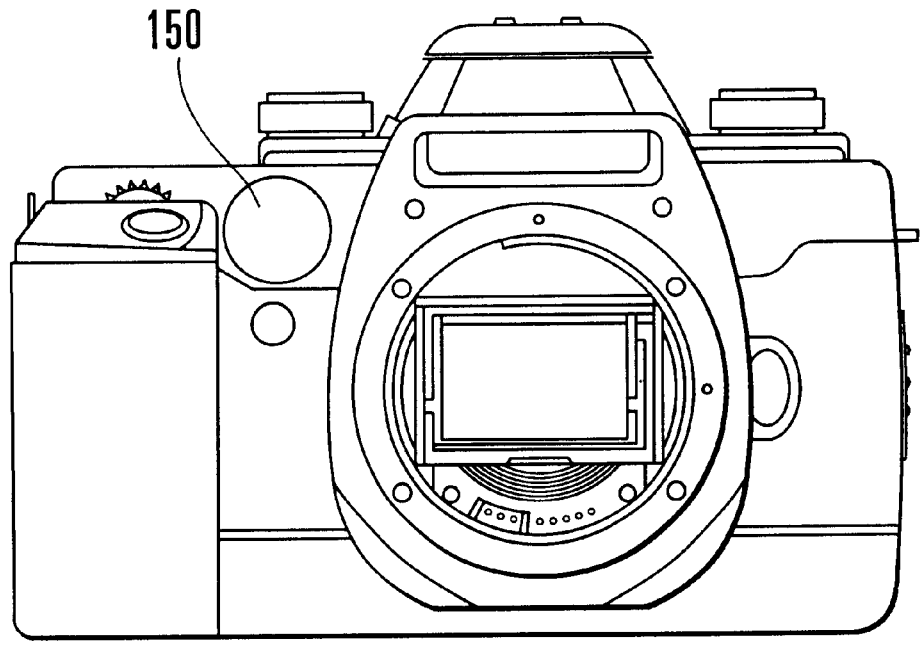
FIG. 35 is a front view of a camera according to a third embodiment of the invention.

FIG. 35 is a font view of the camera according to the third embodiment. The camera is provided with a window 150 for projecting the automatic focusing auxiliary light.

Figure 36:
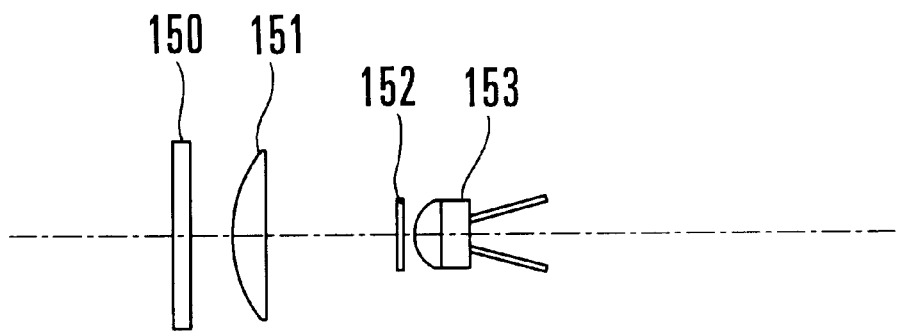
FIG. 36 is a side sectional view of an automatic focusing auxiliary light source in the third embodiment.

FIG. 36 is an optical cross section showing the auxiliary light in the third embodiment. The illustration of FIG. 36 includes the auxiliary light projecting window 150, an auxiliary light projecting lens 151, a film on which an auxiliary light projecting pattern is printed, and the high luminance LED 153 which emits the projecting light.

Figure 37:
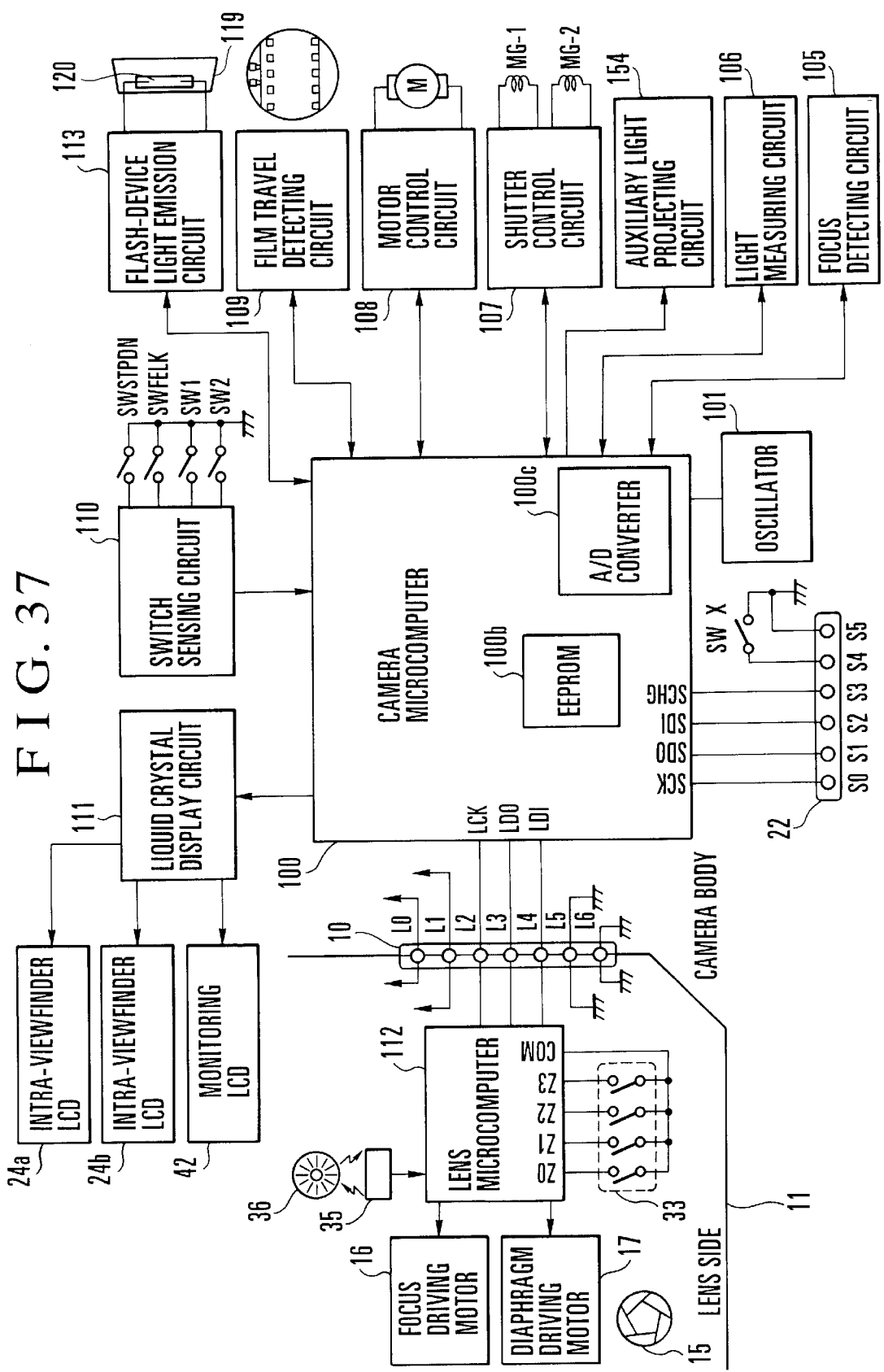
FIG. 37 is a block diagram showing the circuit arrangement of a camera system according to the third embodiment.

FIG. 37 is a block diagram showing the circuit arrangement of the third embodiment. All members that correspond to the members shown in FIG. 2 are indicated by the same reference numerals and symbols.

In FIG. 37, reference numeral 154 denotes an auxiliary light projecting circuit which is arranged to control the light emission of the auxiliary light LED.

The third embodiment uses the auxiliary light high luminance LED in place of the built-in flash device of the second embodiment. Since the actions of the third embodiment are similar to those of the second embodiment, the operation of the third embodiment is omitted from the description. The third embodiment also has about the same advantages as those of the second embodiment but, since the signal transmitting means of the third embodiment is the high luminance LED, the signal reachable distance is shorter than that of the second embodiment. However, compared with the second embodiment which is arranged to cause the xenon tube to emit light, the electric energy consumption of the third embodiment is mush less than that of the second embodiment, so that a wireless slave flash device control system can be arranged to have a small electric energy consumption by the arrangement of the third embodiment.

A fourth embodiment of the invention is arranged not only to permit prior confirmation of an apposite exposure, like in the case of the first, second or third embodiment, but also to permit making an adequate exposure with flash devices even in a case where a photo-taking object is not in the middle part of the photo-taking image plane.

In the fourth embodiment, the hardware arrangement is the same as that of the photo-taking system of the first embodiment. Therefore, the hardware arrangement of the fourth embodiment is omitted from the following description.

FIGS. 38(*a*) and 38(*b*) show by way of example displays to be made by the fourth embodiment within the viewfinder of the camera which is arranged as described in the foregoing description of the first, second or third embodiment. In FIGS. 38(*a*) and 38(*b*), reference numeral 24*a* denotes a first intra-viewfinder LCD which is arranged to display the light control level of the flash device and a natural light exposure level. Reference numeral 24*b* denotes a second intra-viewfinder LCD which includes a flash-device light control confirming display 400, a shutter display 401 and an aperture display 402.

The actions to be performed by the camera and flash devices in the fourth embodiment are next described with reference to FIGS. 39 to 42, which are flow charts. The actions shown in these flow charts are assumed to be performed in an automatic light control mode.

Figure 39:
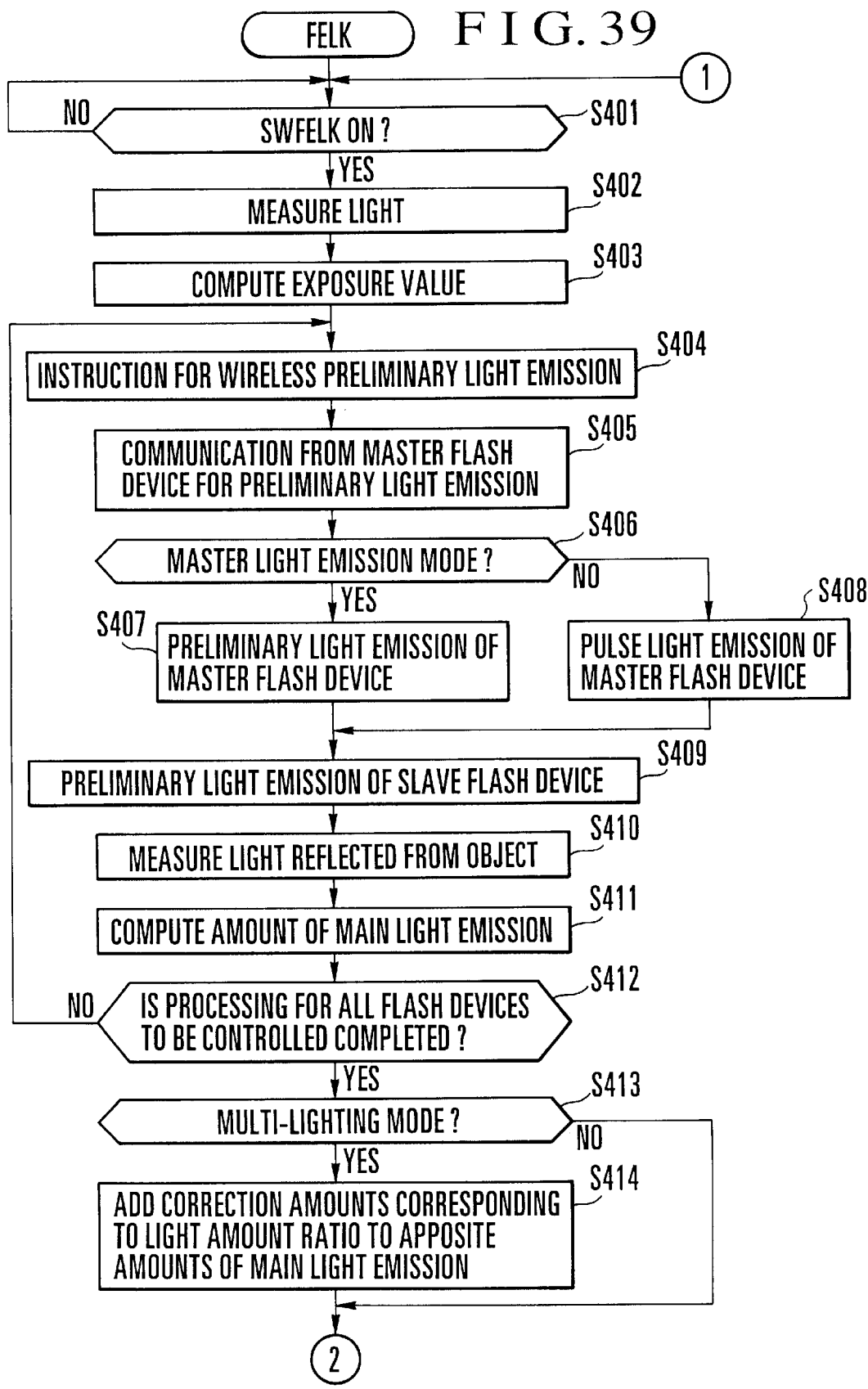
FIG. 39 is a flow chart showing the operation of the fourth embodiment.
Figure 40:
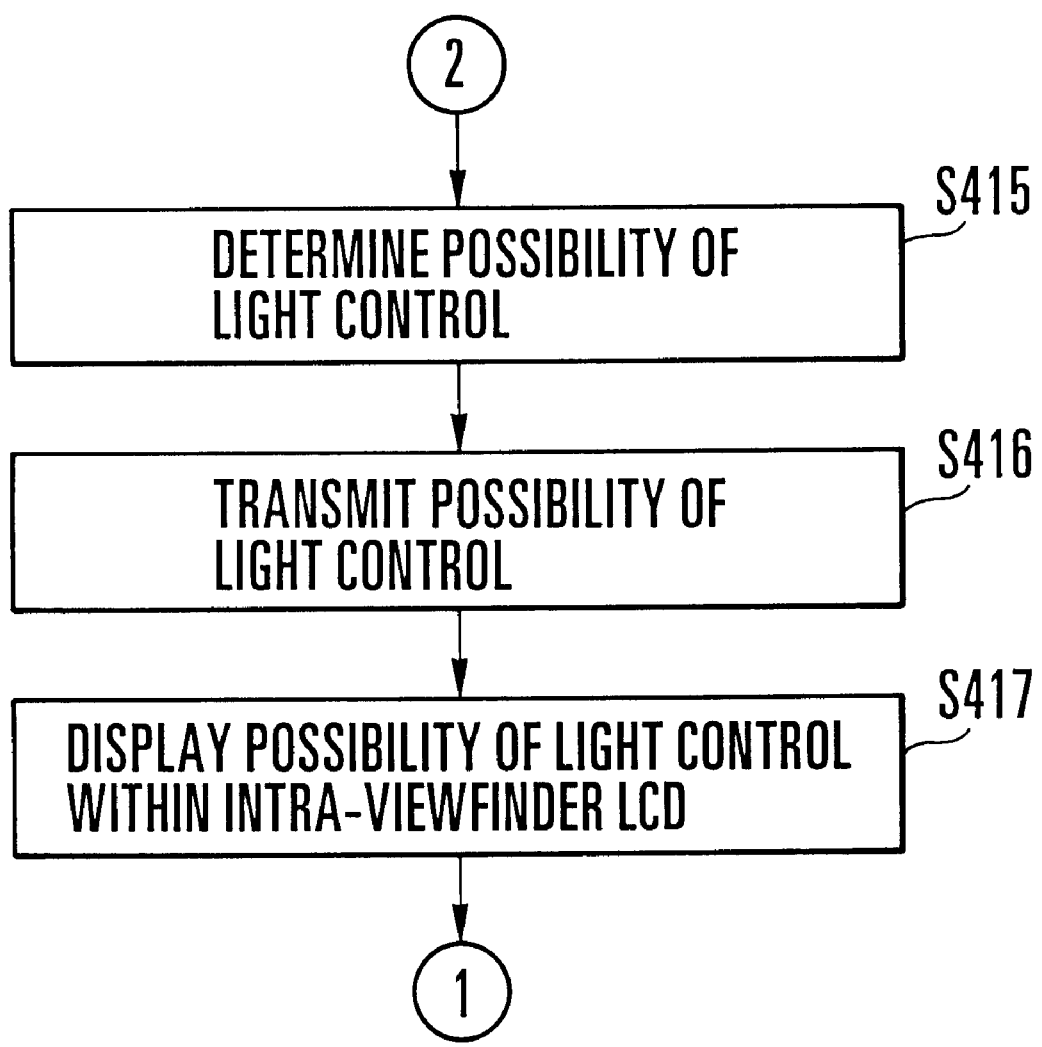
FIG. 40 is a flow chart showing the operation of the fourth embodiment.

At a step S401 of FIG. 39: If the switch SWFELK, which is provided for having test light emission before photo-taking, is found to have been turned on, the flow proceeds to a step S402.

At the step S402: The camera causes the light measuring circuit 106 to measure a luminance value Bv of the object obtained under natural light.

At a step S403: An apposite amount of exposure EvS is decided on the basis of the luminance of the object and the sensitivity of a film in use (EvS=Tv+Av). Then, in accordance with a set exposure mode, a shutter speed and an aperture are decided.

At a step S404: The camera commands the master flash device to make preliminary light emission by sending information on a predetermined light emission amount and light emission time to the master flash device through the serial communication line (CLK, DI and DO).

At a step S405: Upon receipt of the command for preliminary light emission from the camera, the master flash device sends to the slave flash device the command for preliminary light emission and data of intensity of the preliminary light emission as described above with reference to FIGS. 11 and 12. In this instance, the command 1 and the preliminary light emission intensity data which are as shown in FIG. 12 are sent in the case of the ratio-off mode, or some of commands 2, 3 and 4 is selected according to an applicable slave flash device and is sent together with the preliminary light emission intensity data in the case of the ratio mode, i.e., in a case where there are a plurality of slave flash devices.

At a step S406: A check is made to find if the master flash device MS is in the master light emission mode. If so, the flow proceeds to a step S407. If the master flash device MS is found to be the control-only mode, the flow branches to a step S408.

At the step S407: With the master flash device MS in the master light emission mode, the master flash device MS makes preliminary light emission in a manner as commanded by the camera, as shown at the part (4) in FIG. 11. Further, even in the master light emission mode, a pulse is emitted to cause an applicable slave flash device to make light emission, with the exception of preliminary light emission by the group-A slave flash device (see the part (3) of FIG. 11).

At the step S408: With the master flash device MS found to be in the control-only mode, the master flash device MS emits a pulse (3) as shown in FIG. 11 to cause the slave flash device to begin to light emission.

At a step S409: In synchronism with the light emission of the master flash device MS, the slave flash device makes preliminary light emission (5), as shown in FIG. 11, for the light emission time and at the light emission intensity as required by the command from the master flash device MS. Then, in the event of the ratio mode, the flash devices of the groups designated by the command are caused to make preliminary light emission.

At a step S410: The camera measures, with the light measuring sensor 7, reflection light of the object caused by the preliminary light emission of the master flash device or that of the slave flash device to obtain a value of object luminance BvF. The camera then obtains an exposure amount EvF of the preliminary light emission from the object luminance BvF and the film sensitivity SV. In order to measure only such a part of the reflection light of the object that results from the preliminary light emission of the flash device, excluding any natural ambient light, a measured value of object light obtained immediately before the preliminary light emission is subtracted from the reflection light of the object.

At a step S411: The camera computes an apposite main light emission amount (GAIN) by which an exposure value obtained by the preliminary light emission amount at the step S112 can be made into an apposite exposure amount EvS. A method for computing the apposite light emission amount of the flash device is the same as a method disclosed in detail in Japanese Laid-Open Patent Application No. HEI 9-33992. Therefore, the details of the computing method are omitted herein. However, in short, a difference between the object reflection light caused by the preliminary light emission and an apposite exposure amount is obtained, and then, the difference thus obtained is used as the main light emission amount relative to the preliminary light emission.

Further, in the case of multi-lighting control, apposite main light emission amounts are obtained by looping applicable steps as many times as the number of slave flash devices under control. In the case of a two-lighting mode (A:B), the flow of operation twice loops the steps S404 to S412. By the first looping, an apposite light emission amount (A-GAIN) for the group A is obtained by causing the group-A flash device to make preliminary light emission. By the second looping, an apposite light emission amount (B-GAIN) for the group B is obtained by causing the group-B flash device to make preliminary light emission. In case of a three-lighting mode (A:B:C), the same looping is repeated three times. Then, by the third looping, an apposite light emission amount (C-GAIN) for the group C is obtained by causing the group-C flash device to make preliminary light emission. The apposite light emission amounts thus obtained is stored in a RAM which is not shown but is disposed in the camera microcomputer 100.

At a step S412: As mentioned with regard to the step S411 above, the flow returns to the step S404 to repeat the light emission and light measuring processes until the preliminary light emission and light measurement are carried out a necessary number of times. Upon completion of the looping processes, the flow proceeds to a step S413.

At the step S413: A check is made to find if the system is in the multi-lighting mode. If so, the flow proceeds to a step S414. If not, the flow proceeds to a step S415.

At the step S414: If the multi-lighting mode is, for example, a two-lighting mode, the light emission correction amounts of groups A and B set according to a set light quantity ratio A:B as shown in FIG. 17 are added respectively to the apposite main light emission amounts of the groups (A-GAIN and B-GAIN) to obtain the main light emission amounts of the groups A and B. In the event of three-lighting mode, in addition to the above-stated process, the group-C light emission correction amount shown at the display part 323 of the liquid crystal display in FIG. 10(a) or 10(b) is further added to the apposite main light emission amount of the group C (C-GAIN). The main light emission amounts for all groups are thus obtained. The values thus obtained are stored in the RAM which is not shown but disposed inside of the camera microcomputer 100.

At the step S415: A decision is made as to whether or not light control can be made with the main light emission amount obtained in the above-stated manner.

If light emission is made with the preliminary light emission amount defined to be 1/n of a maximum amount of light emission, it is apparent that the maximum light emission amount of the slave flash device or the master flash device is n times as much as the preliminary light emission amount. Therefore, with an apposite light emission amount compared with the maximum light emission amount of the flash device, the light control is decided to be impossible, if the apposite light emission amount is found to be larger than the maximum light emission amount by more than a predetermined value, and to be possible if the former is less than the latter. In the case of the multi-lighting mode, if the main light emission amount of any of the flash device groups is thus found insufficient, the light control can be decided to be impossible.

At a step S416: The camera communicates the result of the decision made at the step S415 to the master flash device MS.

At a step S417: According to the result of decision made at the step S415, the camera displays the result of decision within the viewfinder as shown in FIGS. 38(a) and 38(b).

Figure 38A:
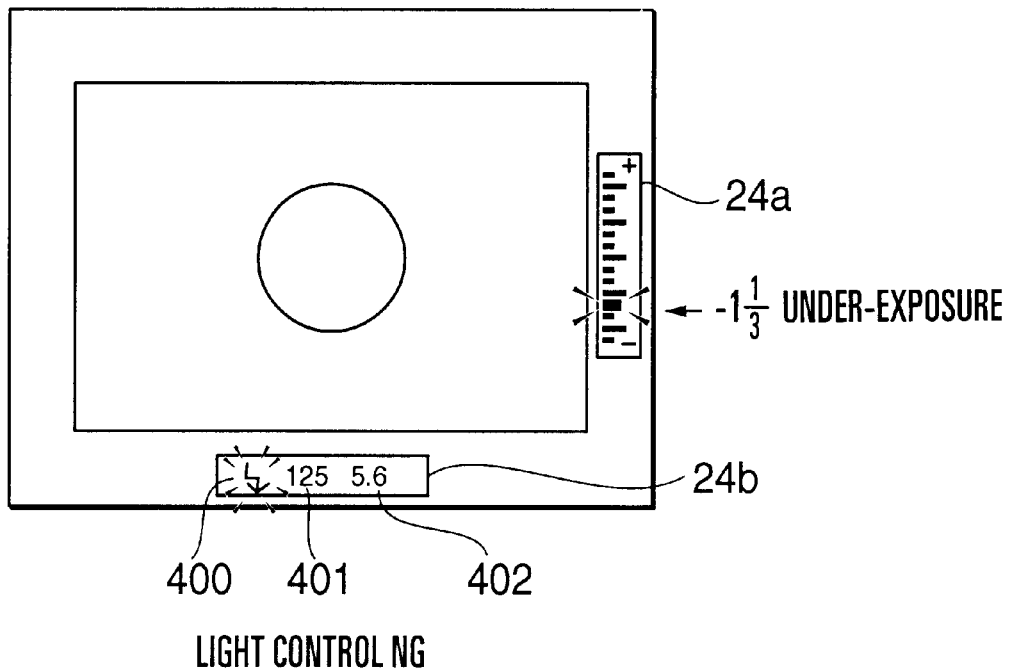
FIGS. 38(a) and 38(b) are diagrams showing examples of displays made within a viewfinder in a fourth embodiment of the invention.

FIG. 38(a) shows a display to be made in a case where the result of the decision made at the step S415 is not good. In this case, a warning is given by flickering the light control confirming display 400. At the same time, the light control level decided is displayed at the intra-viewfinder LCD display 24a. This display shows an amount deficiency of the result of computation obtained at the step S415 with respect to the maximum light emission amount. In the case of FIG. 38(a), the apposite light emission amount is lower by $1\frac{1}{3}$ step than the maximum light emission amount of the flash device.

Further, in the case of multi-lighting flash-device control, the light control level of a group which is the most insufficient among the light emitting groups (the groups A, B and C) is displayed by the display 24a.

Figure 38B:
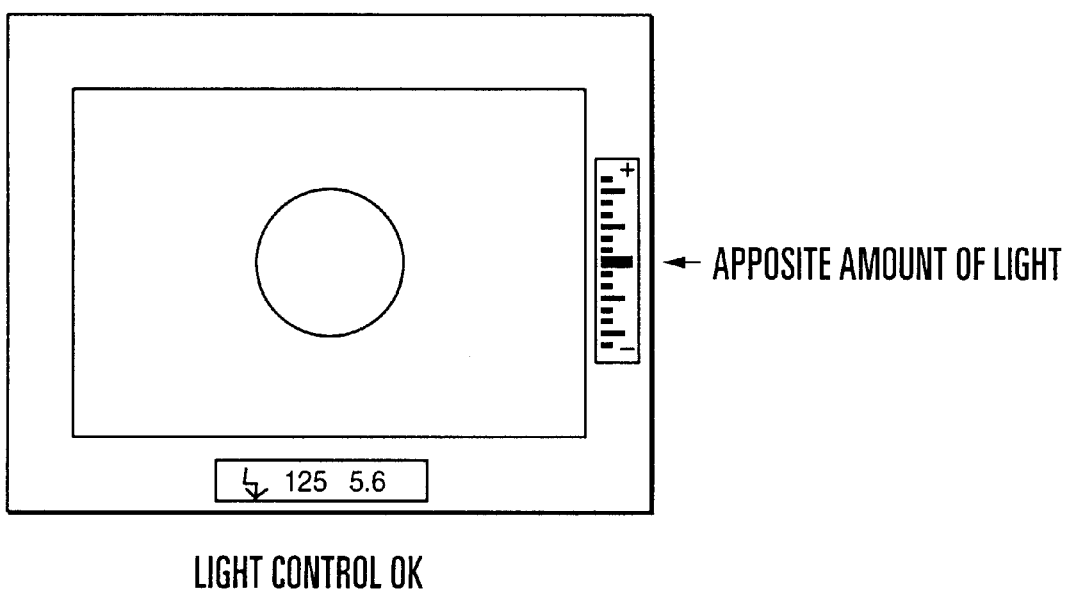

Meanwhile, FIG. 38(b) shows a case where the result of decision is affirmative (OK). In this case, the light control confirming display 400 is lighted up and the intra-viewfinder LCD display 24a indicates that an apposite light quantity can be obtained.

When the light measuring action, the exposure storing action and the display of whether light control is possible or not are finished in an FE locked state, the flow of operation returns to the step S401.

Figure 41:
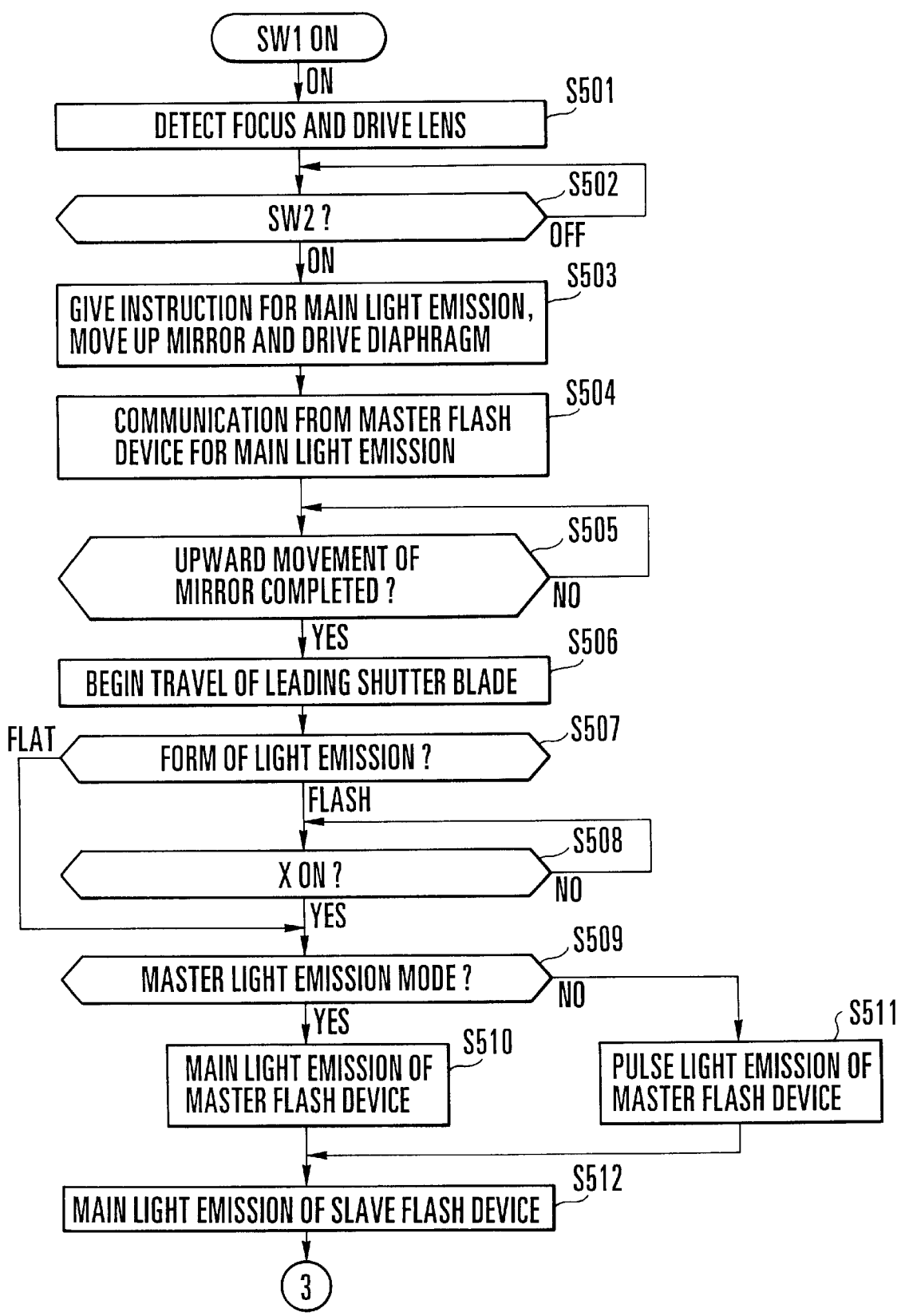
FIG. 41 is a flow chart showing the operation of the fourth embodiment.
Figure 42:
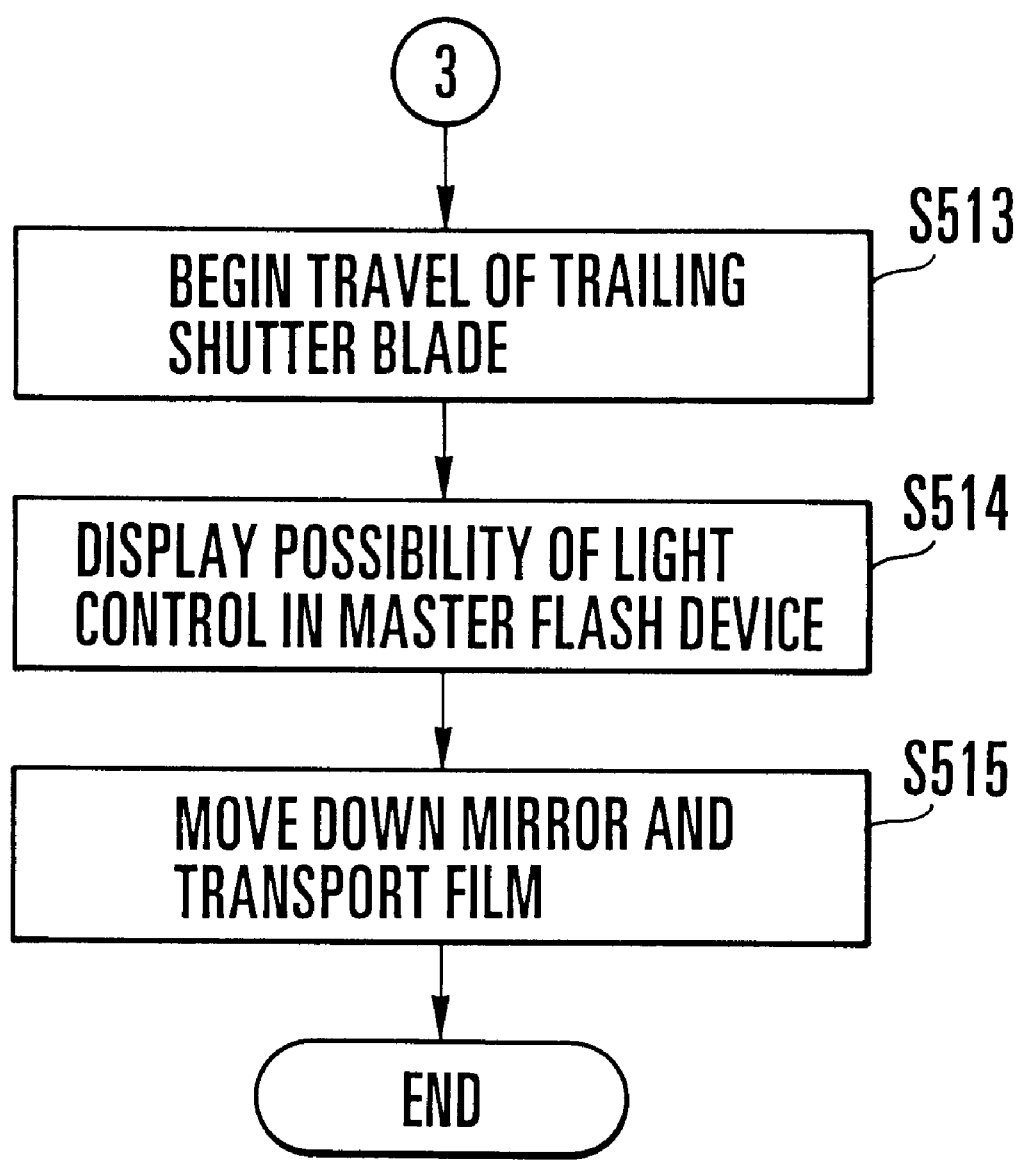
FIG. 42 is a flow chart showing the operation of the fourth embodiment.

Next, automatic light control photo-taking actions to be performed in the FE locked state are described below with reference to FIGS. 41 and 42, which are flow charts.

At a step S501: When the switch SW1 which is for starting light-measuring and distance-measuring actions is turned on after the FE lock action, a focus detecting action is performed by the camera focus detecting circuit 105 in a known manner. Then, a focus adjusting action is performed by commanding the lens microcomputer 112 to drive the focusing lens.

At a step S502: A check is made to find if the release start switch SW2 is in an on-state. If so, the flow proceeds to a step S503.

At the step S503: The camera communicates to the master flash device MS information on the main light emission, i.e., the light emission mode such as a flat or flash light emission mode, the light emission time, in the case of the flat light emission, and the amount of main light emission measured by the FELK action described above with reference to FIG. 39. Upon completion of sending the command to the flash device for the main light emission, the camera moves the main mirror 2 and the sub-mirror 25 upward to retract them from the photo-taking optical path. At the same time, the camera commands the lens microcomputer 112 to drive the diaphragm as necessary.

At a step S504: The master flash device communicates the command and data shown in FIG. 12 to the slave flash device on the basis of the information received, the light emission mode set at the master flash device (automatic light control mode) and the number of slave flash devices under control in the same manner as the above-stated transmission made for the preliminary light emission. For example, in the FE locked automatic light control mode, the master flash device sends, according to the number of slave flash devices under control, the command 5 and one byte of data for the single-lighting control (no light-quantity ratio), the command 6 and two bytes of data for two-lighting control, and the command 7 and three bytes of data for the three-lighting control.

Upon receipt of the communication for the main light emission, the slave flash device analyzes the command and prepares for the main light emission according to the amount of light emission of the group which coincides with the designated light emission mode.

At a step S505: The flow waits for completion of retraction of the mirrors from the optical path. Upon completion of it, the flow proceeds to a step S506.

At the step S506: With the main mirror 2 and the sub-mirror 25 having been retracted from the photo-taking optical path, an exposure action is allowed to begin by driving the leading shutter blade to travel.

At a step S507: In the case of the flat light emission mode, light emission is allowed to begin before the shutter is open by the travel of the leading shutter blade. If the light emission mode is found to be the flat light emission mode, the flow branches to a step S509. If the mode is the flash light emission mode, the flow proceeds to a step S508.

At the step S508: In the case of the flash light emission mode, the flow waits until the X contact comes to turn on with the leading shutter blade completely opened after the leading shutter blade is driven.

At the step S509: A check is made to find if the light emission mode of the master flash device is the master light emission mode. If so, the flow proceeds to a step S510. If the mode is found to be a transmission-only (control-only) mode, the flow branches to a step S511.

At the step S510: With the master flash device in the master light emission mode while the system is in the FE locked automatic light control mode, the master flash device makes the main light emission in the light emission mode designated by the camera. In other words, the main light emission is made according to the designated light emission intensity and light emission time in the case of the flat light emission mode or at the designated light emission amount if the mode is the flash light emission mode.

At the step S511: With the master flash device found in the control-only mode, the master flash device generates a light emission start signal (a pulse light emission from the xenon tube 19) for causing the slave flash device to begin to emit light.

At a step S512: In synchronism with the start of light emission by the master flash device at the step S510 or S511, the slave flash device makes main light emission according to information on the light emission mode and the light emission amount designated at the step S504. With the main light emission carried out in a normal manner, the slave flash device displays, at the liquid crystal display 240, information about the main light emission. For example, information on the light emission mode (automatic light control) is displayed at the display part 301. In the case of the flat light emission the display part 302 is lighted up.

These displays are made or updated by the slave flash device when the main light emission is carried out in a normal manner. The displays permit confirmation of the fact that the information from the master flash device is correctly received by the slave flash device.

At a step S513 (FIG. 42): After the lapse of a predetermined shutter opening time, the camera allows the trailing shutter blade to travel to bring the photo-taking operation to an end.

At a step S514: After the light emission, the master flash device causes the light control confirming LED 244 to display information from the camera on the result of decision as to whether or not light control is possible by lighting it up or having it extinct for a predetermined period of time.

Further, at the camera, a display which is the same as the display made at the step S417 is made inside of the viewfinder for a predetermined period of time.

At a step S515: Upon completion of an exposure action, the main mirror 2 and the sub-mirror 25 which have been retracted are moved down. The film is wound up to an extent corresponding to one frame portion thereof by the motor control circuit 108 and the film travel detecting circuit 109 to end the photo-taking operation.

In the operation described above, the signals to be transmitted by the flash device are the same as those of the first embodiment. Therefore, the description of them with a timing chart is omitted.

While the fourth embodiment described above is assumed to have the same structural arrangement as the first embodiment, the same advantageous effects are of course likewise attainable with the fourth embodiment arranged to have the same structural arrangement as that of the second or third embodiment.

As described above, the fourth embodiment is arranged to make test (preliminary) light emission, before a phototaking operation, by using a wireless flash system, to measure reflection light of the object resulting from the test light emission, to make a check on the basis of the result of the light measurement to find if an apposite exposure can be accomplished with the wireless flash system, and, if not, to find the degree of deficiency of lighting with the flash system before the photo-taking operation.

Further, the fourth embodiment is arranged to store a main light emission amount obtained by the test light emission and to make main light emission according to the stored value of main light emission. This arrangement enables the user to carry out flash photography in an apposite manner, even in a case where the object is not in the central part of the image plane, making the test light emission and storing an exposure value by varying the picture composition with the camera and by bringing the picture composition back to its original state in carrying out the photo-taking operation. Further, the arrangement for attaining this advantageous effect with the wireless multi-lighting flash system increases the latitude of allocation of flash devices to enhance the operability of the flash system.

FIG. 43 is a timing chart showing communication conducted with a flash device according to a fifth embodiment of the invention set in a slave mode and mounted on the hot shoe of a camera.

The fifth embodiment has the circuits of the flash device and the camera arranged in the same manner as those shown in FIGS. 2 and 3. The appearance of the flash device is as shown in FIGS. 4(a) and 4(b). The fifth embodiment conducts communication and control in the same manner as what has been described in the foregoing with reference to FIGS. 5, 11, 12 and 13.

In FIG. 43, a part (A) shows an operating state of the camera in a line. In the part (A), high level line parts indicate that the camera is in an off-state while a low level part indicates that the camera is in the operating state with a shutter button which is not shown having been operated to turn it on.

A part (B) of FIG. 43 shows a synchronizing clock signal generated for conducting serial communication in a known manner from the camera to the flash device. The clock signal is inputted to the terminal CLK of the microcomputer 238 of the flash device (FIG. 3).

A part (C) shows a data input signal to be sent by the serial communication and is arranged to be inputted to the terminal DI of the flash-device microcomputer 238.

A part (D) shows a data output signal to be sent also by the serial communication from the output terminal DO of the flash-device microcomputer 238.

A part (E) shows in a line how the receiving interruption is allowed for a wireless light signal to be received by the light receiving element 256 (FIG. 3) in the slave mode. High level line parts represent an interrupt enabling state and a low level line part represents an interrupt disabling state.

A part (F) shows in a line the mode of the flash device. High level line parts represent a slave mode and a low level line part represents a slave-mode inhibiting state.

Figure 44A:
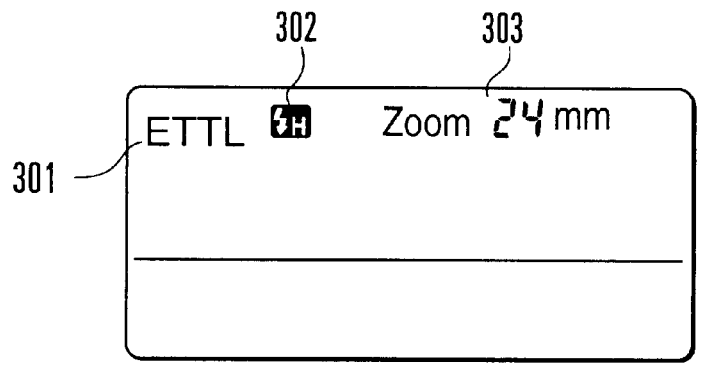
FIGS. 44(a) to 44(c) are diagrams showing examples of displays made on a display part of the flash device in the fifth embodiment.
Figure 44B:
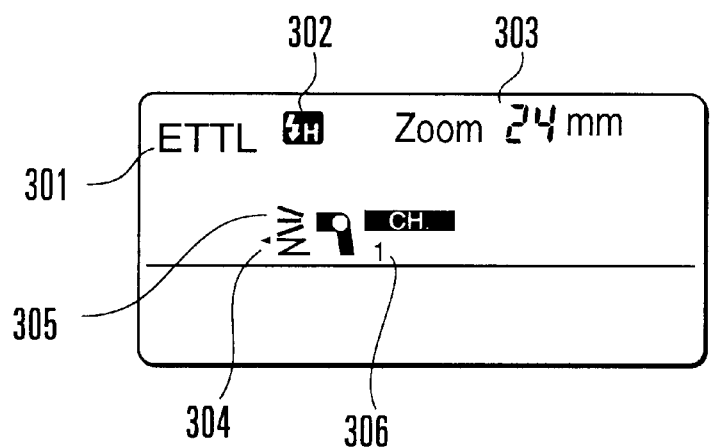
Figure 44C:
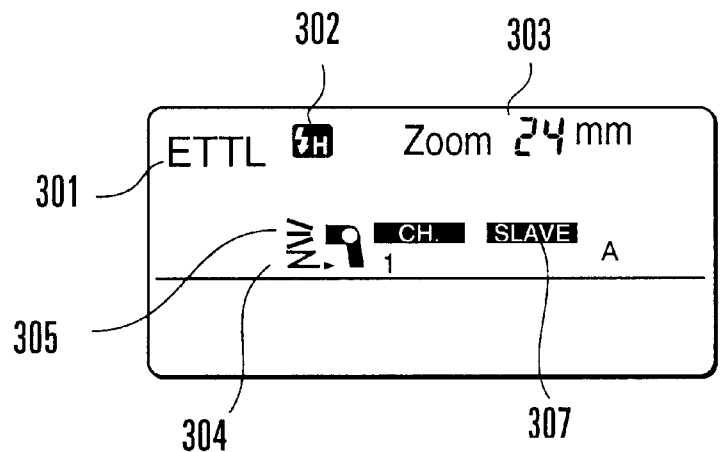

Referring to FIG. 43, when the power supply of the camera (not shown) is switched on at a point of time t1, the camera sets the terminals CLK and DO at a high level. Upon detection of the fact that the level of any of these terminals has become high, the flash device inhibits interruption of the wireless communication and is set in the above-stated master light emission mode. In this instance, a display which has been as shown in FIG. 44(c) changes to a display which is as shown in FIG. 44(a) or FIG. 44(b). At a point of time t2, the camera conducts serial data communication with the flash device as necessary.

At the next point of time t3, when the power supply of the camera is turned off, the camera again sets the terminals CLK and DO at a low level. The flash device, upon detecting that the level of either of these terminals has become low, allows interruption of wireless communication and is set in the slave mode. In that instance, the display returns to the display shown in FIG. 44(c).

The actions of the flash device to be performed when it is set in the slave mode are next described below with reference to FIG. 45, which is a flow chart.

Figure 45:
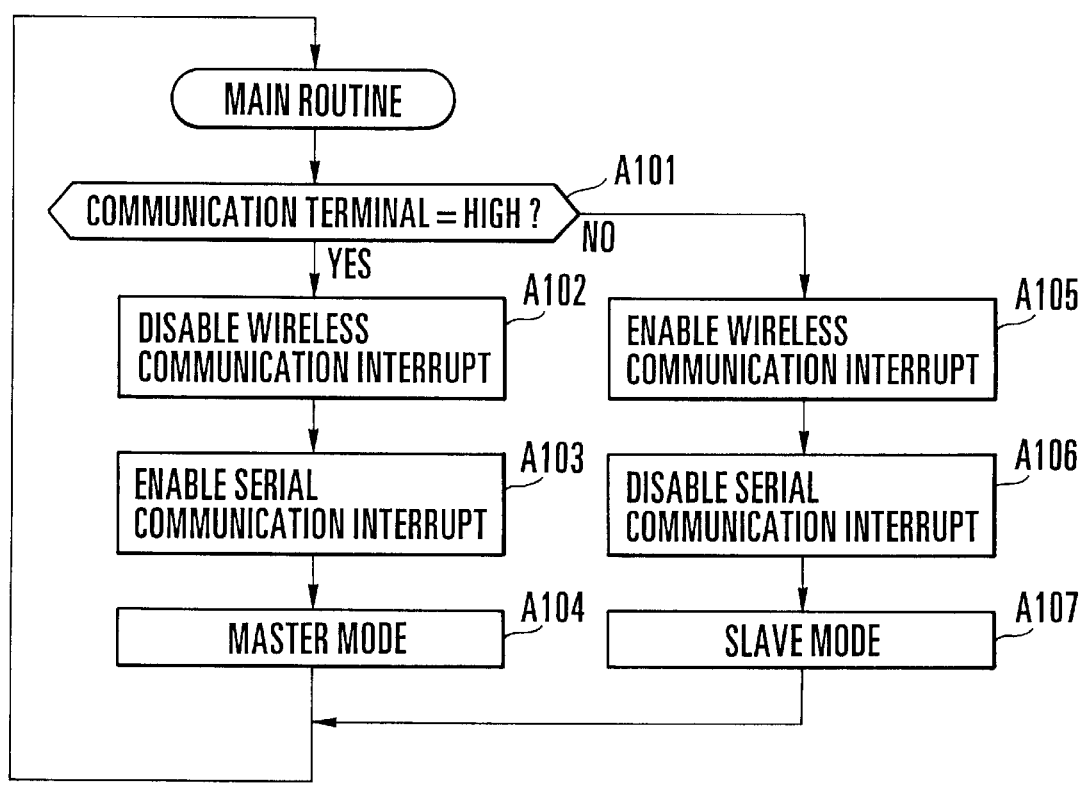
FIG. 45 is a flow chart for explaining the operations of the camera and the flash device according to the fifth embodiment.

At a step A101 of FIG. 45: A check is made to find if the level of terminals CLK or DI which is for communication from the camera, as shown in FIG. 43, is at a high level. If so, the flow of operation proceeds to a step A102 because the power supply of the camera is in an on-state in this instance. If not (if the level is low), the flow proceeds to a step A105 because, in that instance, either the flash device is away from the camera or the power supply of the camera is in an off-state.

At the step A102: With the communication terminal at a high level, interruption for wireless communication by the light receiving element 256 is inhibited.

At a step A103: To receive serial communication from the camera, the flash device allows interruption by serial communication.

At a step A104: The mode of the flash device is set in the wireless master mode.

By these steps, wireless slave mode is canceled to enable the flash device to make normal light emission.

Further, even if the master flash device is in the above-stated control-only mode before canceling the wireless slave mode, the above-stated arrangement for setting the master light emission mode effectively prevents the photo-taking operation from failing.

At the step A105: In a case where the level of the communication terminal is low, the interruption is allowed for wireless communication by the light receiving element 256.

At a step A106: Interruption by serial communication from the camera is inhibited for preventing a communication error from being caused by any noise that might enter through the communication terminal.

At a step A107: The flash device is set to the wireless slave mode.

By these steps, the flash device is set to the wireless slave mode to permit wireless light emission.

Figure 46:
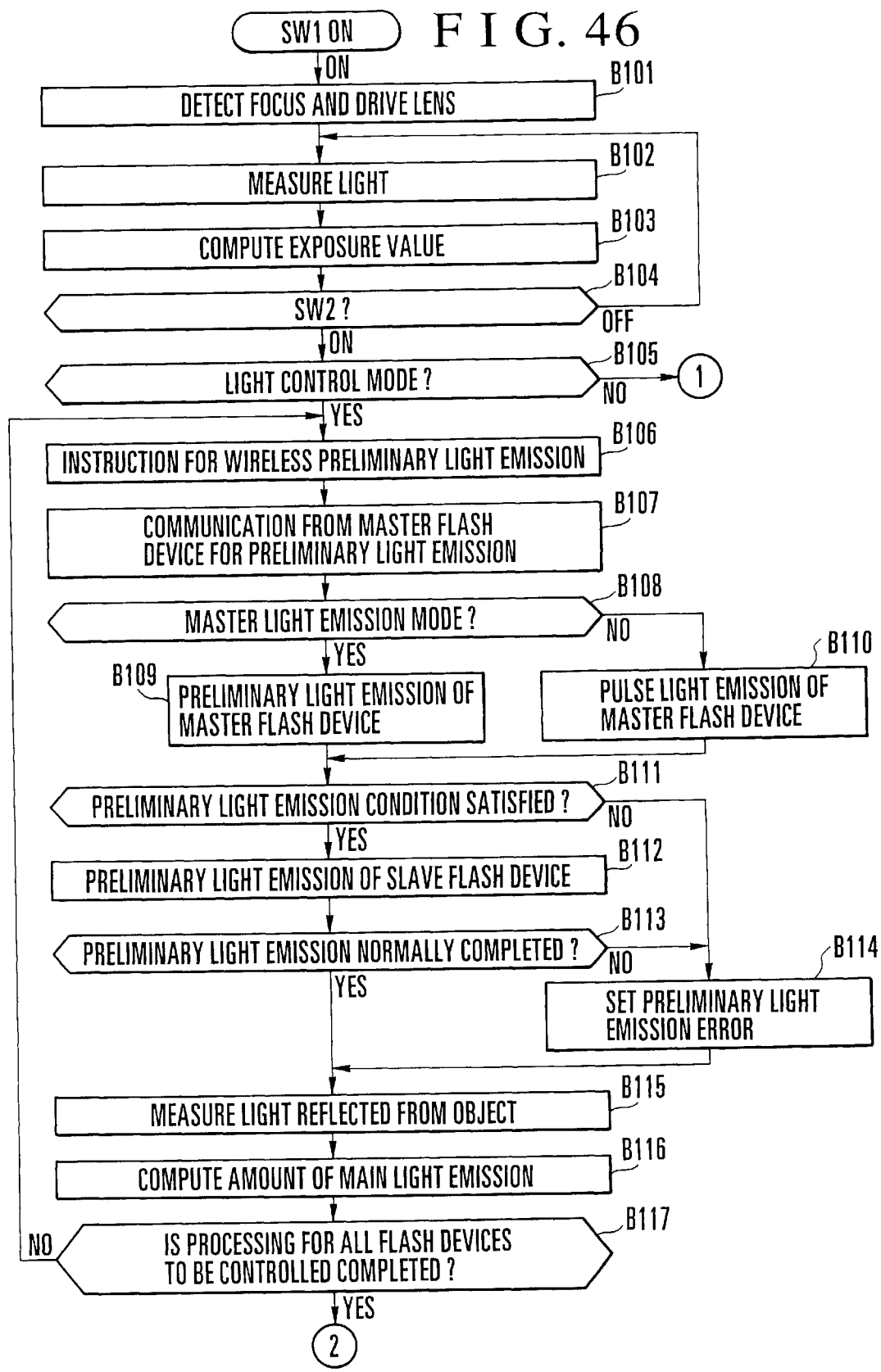
FIG. 46 is a flow chart for explaining the operations of a camera and flash devices according to a sixth embodiment of the invention.
Figure 47:
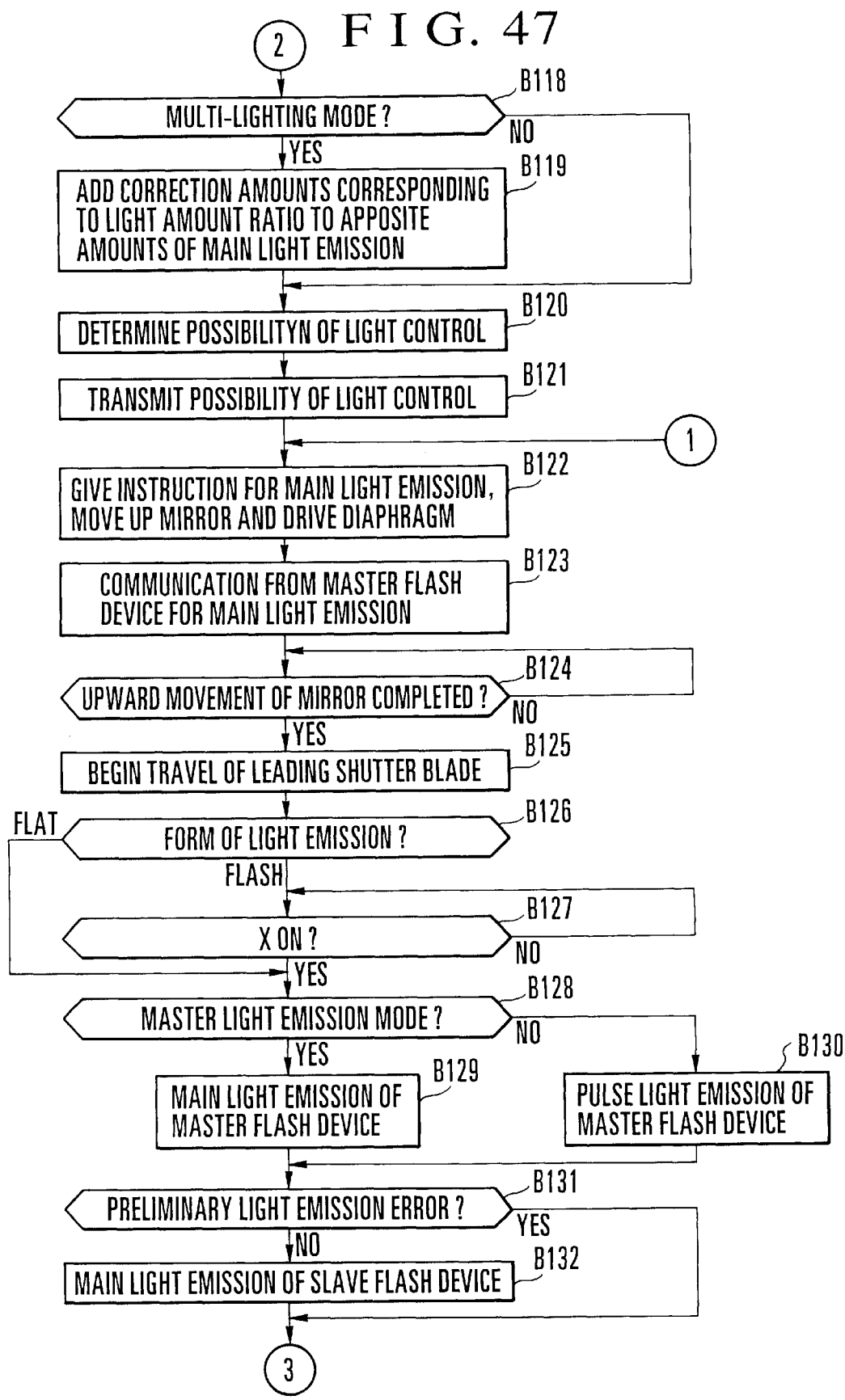
FIG. 47 is a flow chart for explaining the operations of the camera and the flash devices according to the sixth embodiment.
Figure 48:
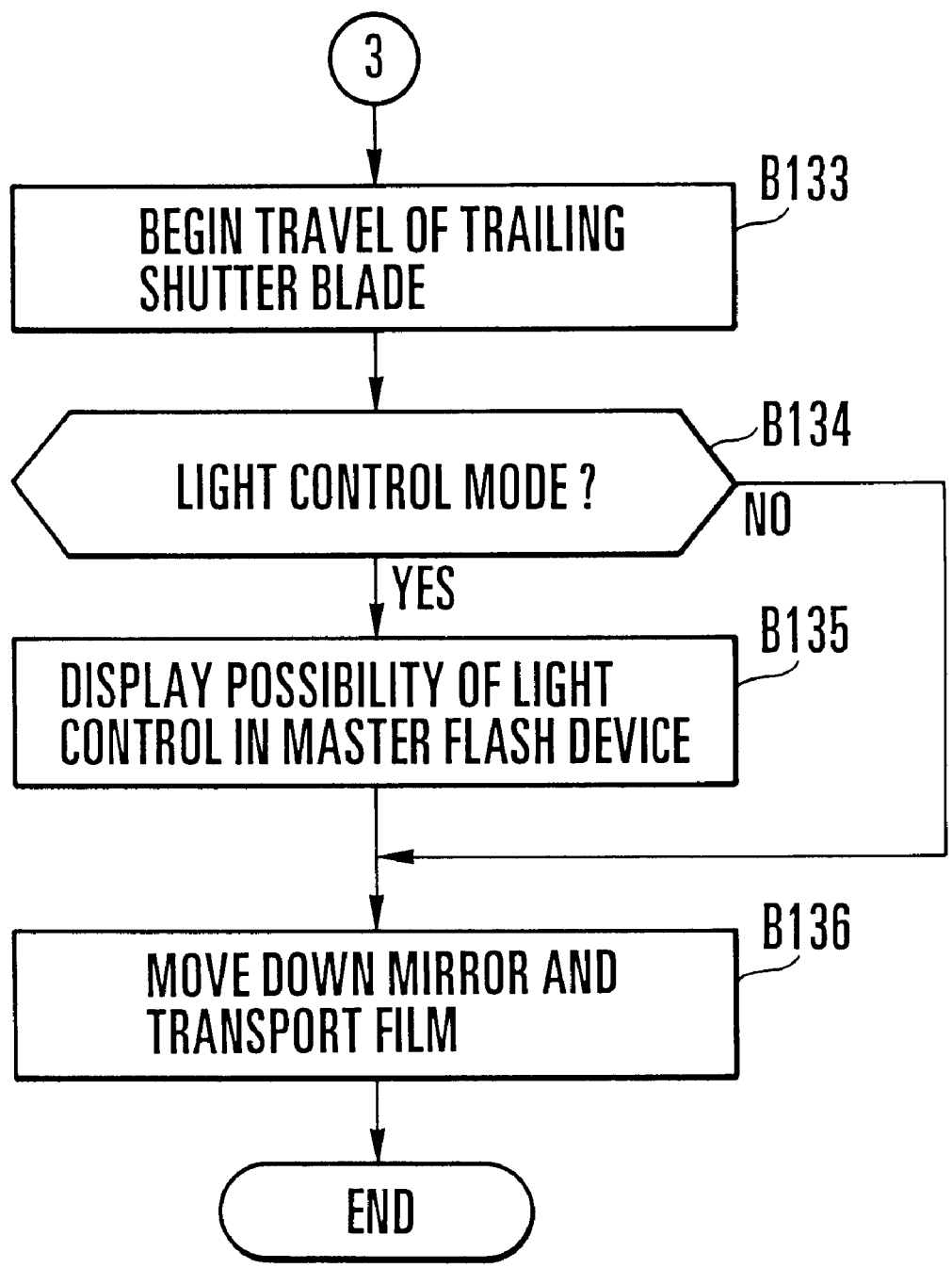
FIG. 48 is a flow chart for explaining the operations of the camera and the flash devices according to the sixth embodiment.

FIGS. 46 to 48 are flow charts showing actions to be performed by a camera and a flash device according to a sixth embodiment of the invention. The structural arrangement of the camera and that of the flash device in the sixth embodiment are the same as those in the first embodiment.

The light emitting actions of the camera and the flash device in a wireless (flash-device-using) photo-taking mode are as described below with reference to FIGS. 46 to 48. The operation of the sixth embodiment in a normal automatic light control mode has been disclosed, for example, in Japanese Laid-Open Patent Application No. HEI 9-061909 and is, therefore, omitted from the following description. Further, the circuit arrangement of the sixth embodiment relative to the flow of operation described below is the same as the circuit arrangement shown in FIGS. 2 and 3.

At a step B101 of FIG. 46: When the switch SW1 for the start of light and distance measuring actions is turned on after the camera is started, a focus detecting action is performed in a known phase-difference detecting method by the focus detecting circuit 105. The camera commands the lens microcomputer 112 to drive the focusing lens for focus adjustment.

At a step B102: The luminance value Bv of the object obtained under natural light is measured by the light measuring circuit 106.

At a step B103: An apposite amount of exposure EvS is decided on the basis of the luminance of the object and the sensitivity of a film in use (EvS=Tv+Av). Then, a shutter speed and an aperture are decided according to a set exposure mode.

At a step B104: If the release start switch SW2 is found to be in its on-state, the flow of operation proceeds to a step B105. If not, the flow returns to the step B102 to repeat the above stated processes.

At the step B105: A check is made for the light emission mode of the flash device. If the mode is the automatic light control mode, the flow proceeds to a step B106. If not (in the event of a mode such as the manual light emission mode or the multiple light emission mode), the flow branches to a step B122 (FIG. 47) as it is not necessary for the camera to decide the amount of main light emission by measuring the result of preliminary light emission from the flash device.

At the step B106: In the case of the automatic light control mode, the camera commands the master flash device to make preliminary light emission by sending information on a predetermined amount of light emission and light emission time to the master flash device through the serial communication line (CLK, DI and DO).

At a step B107: Upon receipt of the command for preliminary light emission from the camera, the master flash device sends to the slave flash device the command for preliminary light emission and data of intensity of the preliminary light emission as described above with reference to FIGS. 11 and 12. In this instance, the command 1 and the preliminary light emission intensity data which are as shown in FIG. 12 are sent in the case of the ratio-off mode, or one of the commands 2, 3 and 4 is selected according to an applicable slave flash device and is sent together with the preliminary light emission intensity data in the case of the ratio mode, i.e., in a case where there are a plurality of slave flash devices.

At a step B108: A check is made to find if the master flash device is in the master light emission mode. If so, the flow proceeds to a step B109. If it is found to be the control-only mode, the flow branches to a step B110.

At the step B109: With the master flash device MS in the master light emission mode, the master flash device MS makes preliminary light emission in a manner as commanded by the camera, as shown at the part (E) in FIG. 11. Further, in the master light emission mode, a pulse is emitted to cause an applicable slave flash device to make light emission, with the exception of preliminary light emission by the group-A slave flash device.

At the step B110: With the master flash device MS found at the step S108 to be in the control-only mode, the master flash device MS emits a pulse to cause the slave flash device to begin to emit light as shown at the part (D) in FIG. 11.

At a step B111: Before making the preliminary light emission, the slave flash device makes a check for conditions required for preliminary light emission. The conditions include completion of an electric energy charging process, coincidence of channel, no error in the light emission command and data received, etc. If any one of these conditions is found to be not satisfied, the flow branches to a step B114. With regard to any error in data, if the value of data is not within an expected range of values and is found, for example, to be above an upper limit or below a lower limit, the data is judged to be carpeted with some external noise.

At a step B112: With the conditions for preliminary light emission found to be all satisfied, the slave flash device makes, in synchronism with the light emission of the master flash device, the preliminary light emission as shown at the part (F) in FIG. 11, for the light emission time and at the light emission intensity as required by the command from the master flash device MS. Then, a preliminary-light-emission normally-ending flag is set in a RAM which is not shown but is disposed with the flash-device microcomputer 238.

At a step B113: The slave flash device is arranged to receive the result of the preliminary light emission by the light receiving element 31 and to integrate it by the light measuring integration circuit 236. Therefore, after completion of the preliminary light emission, an integral output voltage of the integration circuit 236 can be monitored through the terminal AD0 of the microcomputer 238. A check is made, therefore, through the terminal AD0 to find if the preliminary light emission has been carried out in a normal manner. If so, the flow proceeds to a step B115. If not, i.e., if the preliminary light emission has not been made due to, for example, some abnormality of the output of the trigger circuit 211 or the like, the flow branches to the step B114.

At the step B114: With preliminary light emission decided or found to be not performed by the checks made at the steps B111 and B113, the preliminary-light-emission normally-ending flag is reset (error flag setting).

At a step B115: Meanwhile, the camera measures reflection light from the object in synchronism with the preliminary light emission of the master flash device or the slave flash device made at the step B112. An object luminance value BvF is thus obtained. The camera then obtains an exposure value EvF from the object luminance value BvF and the sensitivity value SV of the film.

Further, in order to measure only such a part of the reflection light of the object that results from the preliminary light emission of the flash device, excluding any natural ambient light, a measured value of object light obtained immediately before the preliminary light emission is subtracted from the reflection light of the object.

At a step B116: The camera computes an apposite main light emission amount (GAIN) by which an exposure value obtained by the preliminary light emission amount at the step B115 can be made into an apposite exposure amount EvS.

A method for computing the apposite light emission amount of the flash device is the same as a method disclosed in detail in Japanese Laid-Open Patent Application No. HEI 9-33992. Therefore, the details of the computing method are omitted herein. However, in short, a difference between the object reflection light caused by the preliminary light emission and an apposite exposure amount is obtained, and then, the difference thus obtained is used as the main light emission amount relative to the preliminary light emission.

Further, in the case of a multi-lighting control, apposite main light emission amounts are obtained by looping applicable steps as many times as the number of slave flash devices under control. More specifically, in the case of a two-lighting mode (A:B), the flow of operation twice loops the steps B106 to B117. By the first looping, an apposite light emission amount (A-GAIN) for the group A is obtained by causing the group-A flash device to make preliminary light emission. By the second looping, an apposite light emission amount (B-GAIN) for the group B is obtained by causing the group-B flash device to make preliminary light emission. In the case of a three-lighting mode (A:B:C), the same looping is repeated three times. By the third looping, an apposite light emission amount (C-GAIN) for the group C is obtained by causing the group-C flash device to make preliminary light emission.

At a step B117: As mentioned for the step B116 above, the flow returns to the step B106 to repeat the light emission and light measuring processes until the preliminary light emission and light measurement are carried out the necessary number of times.

At the step B118 (FIG. 47): A check is made to find if the system is in the multi-lighting mode. If so, the flow proceeds to a step B119. If not, the flow proceeds to a step B120.

At the step B119: If the multi-lighting mode is, for example, a two-lighting mode, the light emission correction amounts of groups A and B which are set according to a set light quantity ratio A:B as shown in FIG. 17 are added respectively to the apposite main light emission amounts of the groups (A-GAIN and B-GAIN) to obtain the main light emission amounts of these groups. In the event of three-lighting mode, in addition to the above-stated process, the group-C light emission correction amount is further added to the apposite main light emission amount of the group C (C-GAIN). The main light emission amounts for all groups are thus obtained.

FIG. 17 is a table showing the light quantity correction amounts of groups A and B required for having the light emission amounts of them in a predetermined light quantity ratio. Referring to FIG. 17, the first column "indication of A:B" of the table shows light quantity ratios to be set by the master flash device. The second column "intermediate value" shows intermediate values of the light quantity ratios. The third column "correction value for A" shows light quantity correction values of the group-A flash device. The fourth column "correction value for B" shows light quantity correction values of the group-B flash device.

With the group-A and group-B flash devices used to illuminate one and the same object, the sum of the light quantities of the flash devices of the two groups A and B can be made apposite to the object by adding the light emission correction values of FIG. 17 respectively to the apposite light emission amounts of the flash devices of the groups A and B.

At the step B120: A decision is made as to whether or not light control can be made with the main light emission amount obtained in the above-stated manner.

If light emission is made with the preliminary light emission amount defined to be 1/n of a maximum amount of light emission, it is apparent that the maximum light emission amount of the slave flash device or the master flash device is n times as much as the preliminary light emission amount. Therefore, with an apposite light emission amount compared with the maximum light emission amount of the flash device, the light control is decided to be impossible, if the apposite light emission amount is found to be larger than the maximum light emission amount by more than a predetermined value, and to be possible if the former is less than the latter. In the case of the multi-lighting mode, if the main light emission amount of any of the flash device groups is thus found insufficient, the light control can be decided to be impossible.

At a step B121: The camera communicates the result of the decision made at the step B120 to the master flash device MS.

At the step B122: The camera communicates to the master flash device MS information on the main light emission, i.e., the light emission mode such as a flat or flash light emission mode, the amount of main light emission, and light emission time in the event of flat light emission. Upon completion of sending the command to the flash device for the main light emission, the camera moves the main mirror 2 and the sub-mirror 25 upward to retract them from the photo-taking optical path for photo-taking. At the same time, the camera commands the lens microcomputer 112 to drive the diaphragm.

At a step B123: The master flash device communicates, for the main light emission, the command and data shown in FIG. 12 to the slave flash device on the basis of the received information, the light emission mode set at the master flash device (an automatic light control mode, a manual light emission mode or a multiple light emission mode) and the number of slave flash devices under control, in the same manner as in the case of the above-stated transmission made for preliminary light emission. For example, in the automatic light control mode, the master flash device sends, according to the number of slave flash devices under control, the command 5 and one byte of data for the single-lighting control (no light-quantity ratio), the command 6 and two bytes of data for two-lighting control, and the command 7 and three bytes of data for the three-lighting control.

Upon receipt of the communication from the master flash device for the main light emission, the slave flash device analyzes the command and prepares for the main light emission according to the designated mode and amount of light emission.

At a step B124: The flow waits for completion of retraction of the mirrors from the optical path. Upon completion of it, the flow proceeds to a step B125.

At the step B125: With the main mirror 2 and the sub-mirror 25 having been retracted from the photo-taking optical path, an exposure action is allowed to begin by driving the leading shutter blade to travel.

At a step B126: In the case of the flat light emission mode, light emission is allowed to begin before the shutter is opened by the travel of the leading shutter blade. If the light emission mode is found to be the flat light emission mode, the flow branches to a step B128. If the mode is the flash light emission mode, the flow proceeds to a step B127.

At the step B127: In the case of the flash light emission mode, the flow waits until the X contact comes to turn on with the leading shutter blade completely opened after the leading shutter blade is driven.

At the step B128: A check is made to find if the light emission mode of the master flash device is the master light emission mode. If so, the flow proceeds to a step B129. If the mode is found to be the control-only mode mentioned above, the flow branches to a step B130.

At the step B129: With the master flash device in the master light emission mode while the system is in the automatic light control mode, the master flash device makes the main light emission in the light emission mode designated by the camera, which is either the flat light emission mode or the flash light emission mode. In the case of any mode that is not the automatic light control mode, the master flash device makes the main flash emission in a mode set there.

At the step B130: With the master flash device found to be in the control-only mode, the master flash device generates a light emission start signal (a pulse light emission from the xenon tube 19) for causing the slave flash device to begin light emission.

At a step B131: In the case of the automatic light control mode, a check is made for any error made in the preliminary light emission. If the preliminary light emission is found to have been carried out not in a normal manner, i.e., if a preliminary-light-emission normally-made flag is not set (in the event of error setting), the flow proceeds to a step B133 without performing any main light emission.

Further, no preliminary light emission is made in the case of any mode other than the automatic light control mode. In such a case, since no preliminary light emission error is made, the main light emission control is performed on the basis of the current charging state and the consistency of the command and data received from the master flash device.

At a step B132: In a case where the preliminary light emission in the automatic light control mode is found at the step B131 to have been carried out in a normal state, or in the case of any mode other than the automatic light control mode, the slave flash device makes the main light emission in synchronism with the start of light emission by the master flash device at the step B129 or B130 and according to information on the light emission mode, light emission amount, etc., designated at the step B123.

With the light emission made in a normal manner, the slave flash device displays information about the main light emission on the liquid crystal display 240.

The display by the slave flash device is made and updated in a case where the main light emission is carried out in a normal manner. The display indicates that the information from the master flash device is accurately received by the slave flash device and the light emission is made on the basis of the information.

At the step B133 (FIG. 48): After the lapse of a predetermined shutter opening time, the camera allows the trailing shutter blade to travel to bring the photo-taking operation to an end.

At a step B134: A check is made for the light emission mode set at the master flash device. If the mode is found to be the automatic light control mode, the flow proceeds to a step B135. If not (in the case of the manual light emission mode or the multiple light emission mode), the flow branches to a step B136.

At the step B135: In the case of the automatic light control mode, the master flash device displays the result of decision made about light control by causing the light control confirming LED 244 to light up or to be extinct for a predetermined period of time after the end of light emission.

At the step B136: Upon completion of the exposure action, the main mirror 2 and the sub-mirror 25 are moved down. One frame portion of the film is wound up by the motor control circuit 108 and the film travel detecting circuit 109 to terminate the photo-taking operation.

The processes of the flow of operation described above are performed as shown in the timing chart of FIG. 18 when the main emission is made in the flash light emission mode, in the single-lighting mode (ratio-off mode) and as shown in the timing chart of FIG. 19 when the main light emission is made in the flat light emission mode.

In the case of the foregoing description of the timing charts of FIGS. 18 and 19, the preliminary light emission of the slave flash device is assumed to be made in a normal manner. However, as mentioned above with reference to the flow charts of FIGS. 46 to 48, the slave flash device is inhibited from making the main light emission in cases where preliminary light emission is not carried out by the slave flash device.

For example, in a case where preliminary light emission is to be made by both the master and slave flash devices with the master flash device set in the master light emission mode, if the slave flash device fails to perform the preliminary light emission due to some reason such as incompletion of an electric charging process or the like, the camera decides the amount of main light emission by measuring object reflection light resulting only from the preliminary light emission of the master flash device and, then, the main light emission is carried out on the basis of the main light emission amount thus decided. In such a case, if the electric charging process on the slave flash device happens to be completed before the main light emission and the slave flash device is allowed to make also the main light emission as in the master flash device, a picture would be taken by an over exposure which is excessive by the unexpected amount of light emission by the slave flash device. However, since the sixth embodiment is arranged to inhibit the slave flash device from participating in the main light emission if it fails to make preliminary light emission in a normal manner, the arrangement of the sixth embodiment ensures that a picture can be taken with an apposite exposure.

This arrangement applies also to a case where a plurality of slave flash devices are used and some of them fails to make preliminary light emission due to unevenness of completion timing of electric charging actions on them. The arrangement of the sixth embodiment likewise ensures an apposite exposure in such a case.

Further, even in a case where pictures are to be taken with only one slave flash device, if the check for normal preliminary light emission of the sixth embodiment described above is not made, for example, in continuously taking shots in the wireless flash device mode, some of the continuous shots tends to be taken with approximately full light emission to give an extremely overexposed picture, which would make the user distrustful of the system. However, the arrangement for making the check for normal preliminary light emission effectively prevents taking such an unacceptable picture.

The advantage of the sixth embodiment described above is recapitulated as follows.

In a flash (flash-photography) system composed of a camera and a slave flash device (or slave flash devices) located at a distance from the camera, the camera is arranged to have transmission means for transmitting light emission control information to the slave flash device, to command by the transmission means the slave flash device to make preliminary light emission, to have light measuring means for measuring object reflection light resulting from the preliminary light emission and arithmetic means for computing an amount of main light emission on the basis of the object reflection light measured, to command the slave flash device to make main light emission at the computed main light emission amount.

In the flash system, the slave flash device has signal receiving means for receiving the control information, flash light emission means, light emission control means for controlling the flash light emission means according to the flash-device control information received, and deciding means for deciding whether or not preliminary light emission is carried out in a normal manner when the slave flash device is commanded to make the preliminary light emission. The flash system is thus arranged to include light emission inhibiting means for inhibiting the main light emission when the deciding means decides that the preliminary light emission has not been carried out in a normal manner, so that the main light emission can be prevented from being made in an inapposite manner to give an unacceptable photograph.

Figure 49:
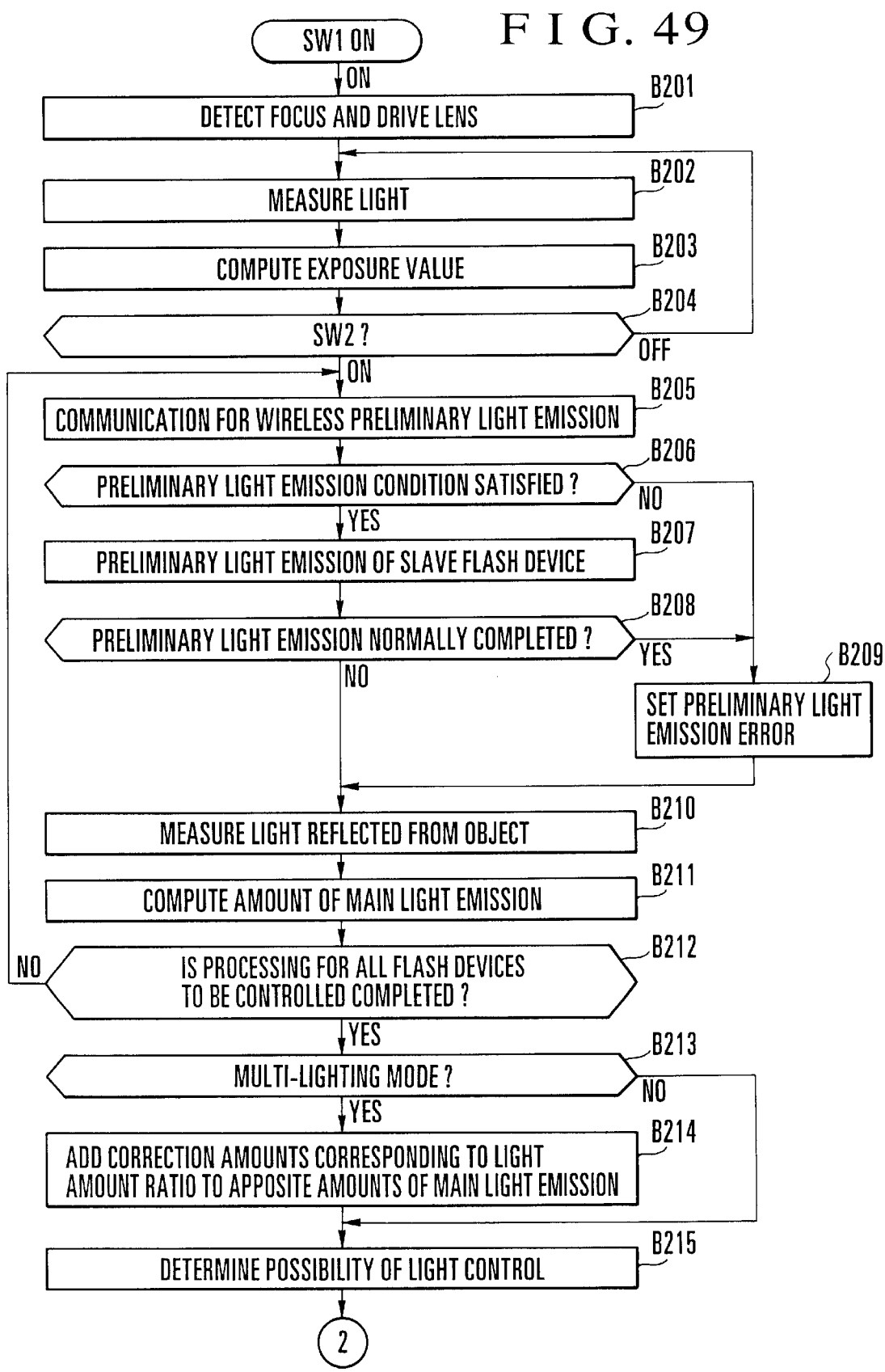
FIG. 49 is a flow chart for explaining the operations of a camera and flash devices according to a seventh embodiment of the invention.
Figure 50:
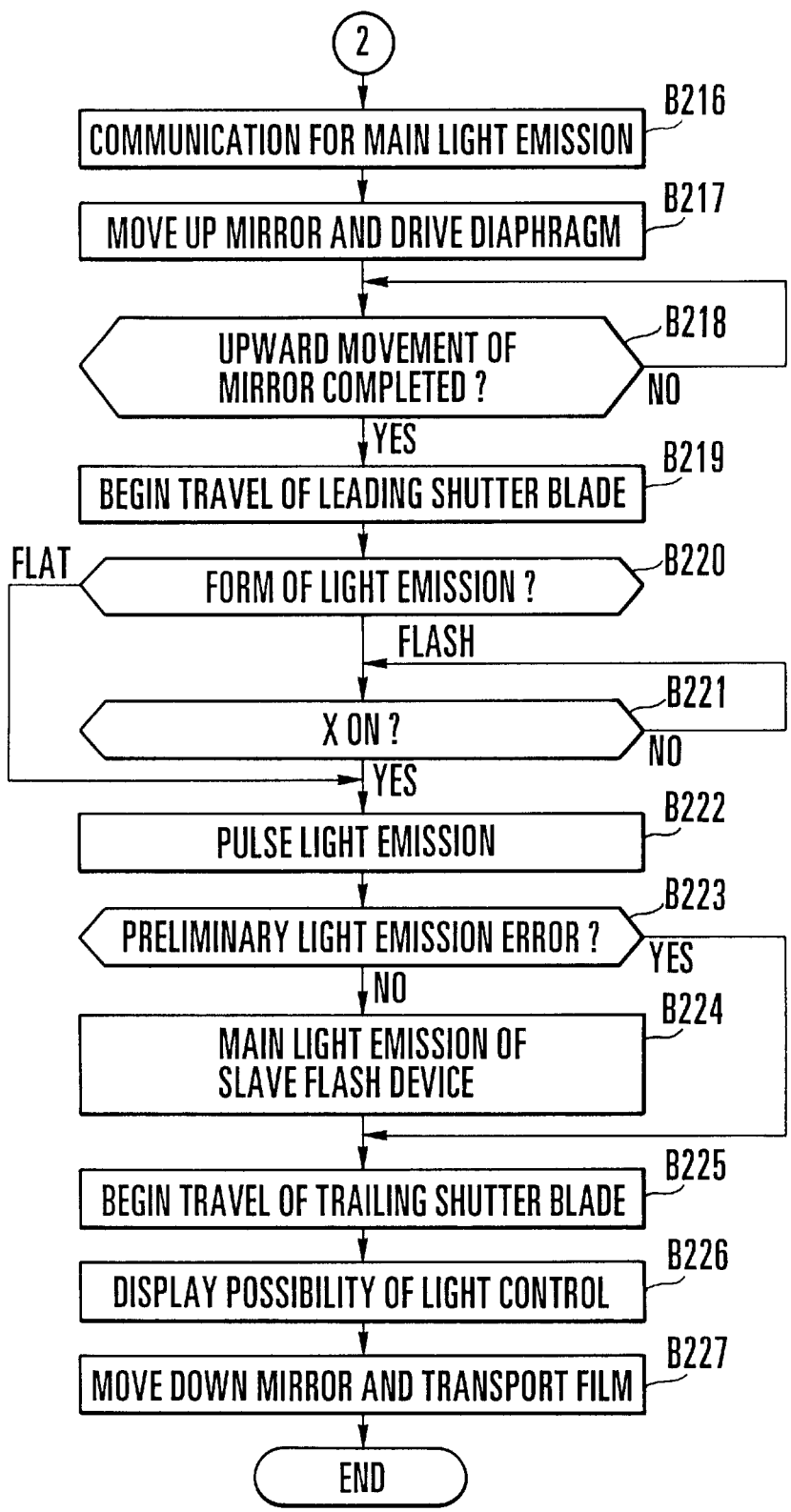
FIG. 50 is a flow chart for explaining the operations of the camera and the flash devices according to the seventh embodiment.

FIGS. 49 and 50 are flow charts showing control actions to be performed according to a seventh embodiment of the invention. The seventh embodiment includes a camera having a built-in flash device and arranged in the same manner as the second embodiment described in the foregoing.

The following describes, with reference to FIGS. 49 and 50, the actions of the camera and the flash device in the seventh embodiment to be performed in an automatic light control mode.

At a step B201: When the switch SW1 for the start of light and distance measuring actions is turned on after the camera is started, a focus detecting action is performed in a known phase-difference detecting method by the focus detecting circuit 105. The camera commands the lens microcomputer 112 to drive the focusing lens for focus adjustment.

At a step B202: The luminance value Bv of the object obtained under natural light is measured by the light measuring circuit 106.

At a step B203: An apposite amount of exposure EvS is decided on the basis of the luminance of the object and the sensitivity of a film in use (EvS=Tv+Av). Then, in accordance with a set exposure mode, a shutter speed and an aperture are decided.

At a step B204: If the release start switch SW2 is found to be in its on-state, the flow of operation proceeds to a step B205. If not, the flow returns to the step B202 to repeat the above stated processes.

At the step B205: The camera sends to the slave flash device a preliminary light emission command and data of a preliminary light emission intensity described above with reference to FIGS. 11 and 12.

In this instance, if the flash system is in the ratio-off mode, the camera sends the command 1 and the preliminary light emission intensity data of FIG. 12. In the case of the ratio mode, i.e., if there are plurality of slave flash devices under control, one of the commands 2, 3 and 4 is sent together with the preliminary light emission intensity according to the group of the slave flash device to be caused to emit light. Then, pulse light is emitted for causing the slave flash device to begin light emission.

At a step B206: Before making the preliminary light emission, the slave flash device makes a check for conditions required for preliminary light emission. The conditions include completion of an electric energy charging process, coincidence of channel, no error in the light emission command and data received, etc. If any one of these conditions is found to be not satisfied, the flow branches to a step B209.

At a step B207: With the conditions for preliminary light emission found to be all satisfied, the slave flash device makes, in synchronism with the light emission of the master flash device, the preliminary light emission as shown in FIG. 11, for the light emission time and at the light emission intensity as required by the command from the master flash device MS. Then, a preliminary-light-emission normally-ending flag is set in a RAM which is not shown but is disposed within the flash-device microcomputer 238.

At a step B208: The slave flash device is arranged to receive the result of the preliminary light emission by the light receiving element 31 and to integrate it by the light measuring integration circuit 236. Therefore, after completion of the preliminary light emission, an integral output voltage of the integration circuit 236 can be monitored through the terminal AD0 of the microcomputer 238. A check is made, therefore, through the terminal AD0 to find if the preliminary light emission has been carried out in a normal manner. If so, the flow proceeds to a step B210. If not, i.e., if the preliminary light emission has not been made due to, for example, some abnormality of the output of the trigger circuit 211 or the like, the flow branches to the step B209.

At the step B209: With preliminary light emission decided or found to be not performed by the checks made at the steps B206 and B208, the preliminary-light-emission normally-ending flag is reset.

At the step B210: Meanwhile, the camera measures the reflection light of the object resulting from the preliminary light emission of the slave flash device to obtain an object luminance value BvF. The camera then obtains an exposure value EvF from the object luminance value BvF and the sensitivity value SV of the film.

Further, in order to measure only such a part of the reflection light of the object that results from the preliminary light emission of the flash device, excluding any natural ambient light, a measured value of object light obtained immediately before the preliminary light emission is subtracted from the reflection light of the object.

At a step B211: The camera computes, for each of the slave flash devices to be controlled in the same manner as in the case of the sixth embodiment, an apposite main light emission amount (GAIN) by which an exposure value obtained by the preliminary light emission amount at the step B210 can be made into an apposite exposure amount EvS obtained by the step B203.

At a step B212: The flow returns to the step B205 to repeat the light emission and light measuring processes until the preliminary light emission and light measurement are carried out a necessary number of times.

At a step B213: A check is made to find if the flash system is in the multi-lighting mode. If so, the flow proceeds to a step B214. If not, the flow proceeds to a step B215.

At the step B214: In the multi-lighting mode, the light emission correction amount of each group is added to the apposite main light emission amount of the group in the same manner as in the case of the sixth embodiment.

At the step B215: A decision is made as to whether or not light control can be made with the main light emission amount obtained in the above-stated manner.

At a step B216: The camera communicates a command and data for main light emission information shown in FIG.

11 to the slave flash device in the same manner as in the case of the sixth embodiment.

At a step B217: At the same time as sending the main light emission command to the flash device, the camera moves the main mirror 2 and the sub-mirror 25 upward to retract them from the photo-taking optical path. The camera then commands the lens microcomputer 112 to drive the diaphragm as necessary.

On the other hand, upon receiving the main light emission command from the camera, the slave flash device analyzes the command and prepares for the main light emission in accordance with the mode and amount of light emission designated.

At a step B218: The flow waits for completion of retraction of the mirrors from the optical path. Upon completion of it, the flow proceeds to a step B219.

At the step B219: With the main mirror 2 and the sub-mirror 25 having been retracted from the photo-taking optical path, an exposure action is allowed to begin by driving the leading shutter blade to travel.

At a step B220: A check is made for the mode of light emission. If the light emission mode is found to be the flat light emission mode, the flow proceeds to a step B222 to allow light emission to begin before the shutter is open by the travel of the leading shutter blade. If the mode is found to be the flash light emission mode, the flow branches to a step B221.

At the step B221: In the case of the flash light emission mode, the flow waits until the X contact comes to turn on with the leading shutter blade completely opened after the leading shutter blade is driven.

At the step B222: The camera emits pulse light for causing the slave flash device to begin light emission.

At a step B223: A check is made for any error made in the preliminary light emission. If the preliminary light emission is found to have been carried out not in a normal manner, i.e., if a preliminary-light-emission normally-ending flag is not set, the flow proceeds to a step B225 without performing any main light emission.

At a step B224: In a case where the preliminary light emission in the automatic light control mode is found to have been carried out in a normal state, the slave flash device makes the main light emission in synchronism with the light emission start signal of the camera. With the light emission made in a normal manner, the slave flash device displays information about the main light emission on the liquid crystal display 240.

The display by the slave flash device is made and updated in a case where the main light emission is carried out in a normal manner. The display enables the user to know that the information from the master flash device is accurately received by the slave flash device and the light emission is made on the basis of the information.

At a step B225: After the lapse of a predetermined shutter opening time, the camera allows the trailing shutter blade to travel to bring the photo-taking operation to an end.

At a step B226: After completion of light emission, a display is made by causing a light control confirming LED which is disposed within the viewfinder of the camera to light up or to be extinct for a predetermined period of time on the basis of the result of the check made at the step B215 for the possibility of light control.

At a step B227: Upon completion of the exposure action, the main mirror 2 and the sub-mirror 25 are moved down. One frame portion of the film is wound up by the motor control circuit 108 and the film travel detecting circuit 109 to terminate the photo-taking operation.

The processes of the flow of operation shown in FIGS. 49 and 50 and described above are applicable also to the camera of the third embodiment described in the foregoing.

Figure 51:
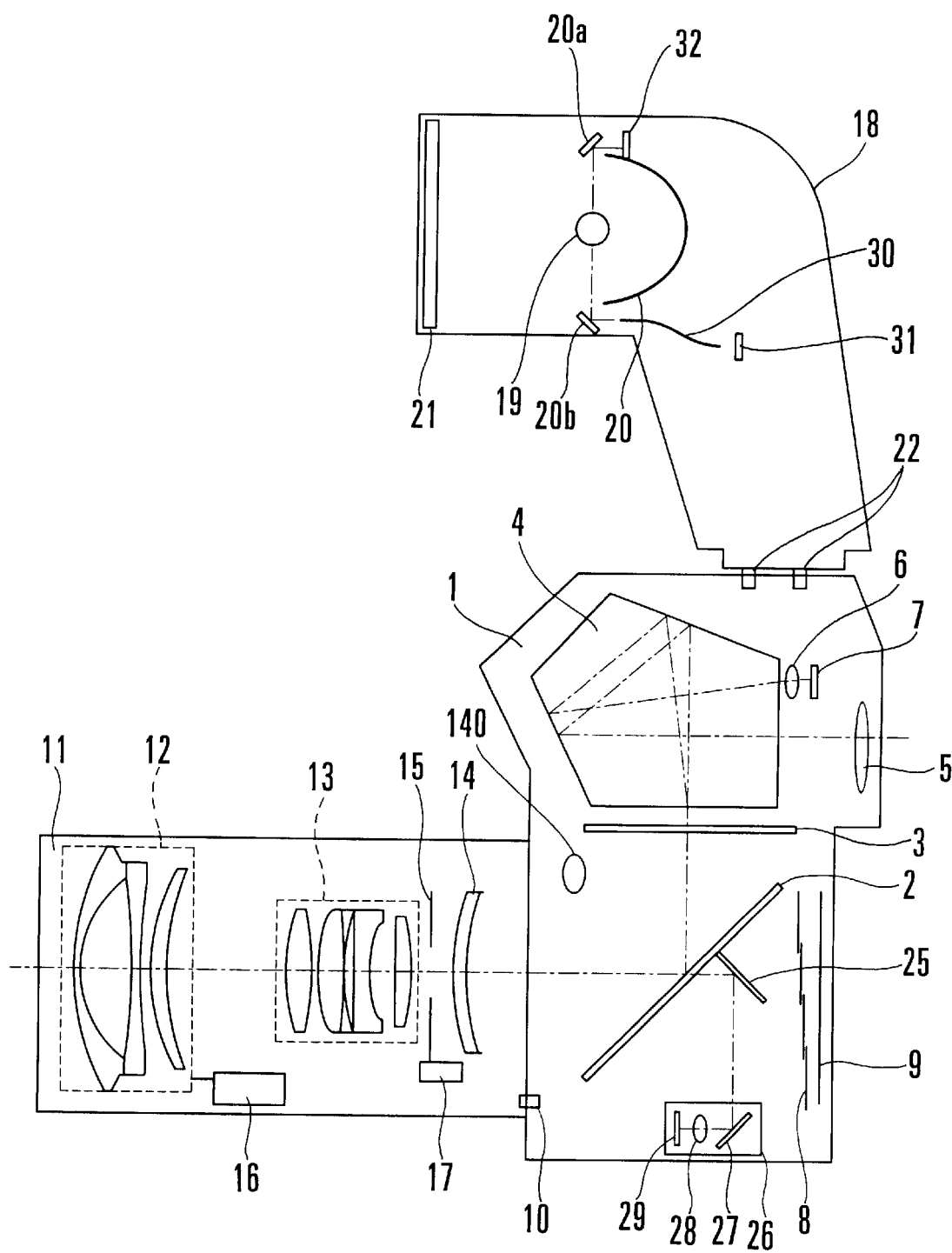
FIG. 51 is a side sectional view showing a flash-device controlling camera system according to an eighth embodiment of the invention.

FIG. 51 is a side sectional view for explaining mainly the optical arrangement of a flash-device controlling camera system according to an eighth embodiment of the invention. In FIG. 51, the constituent parts similar to those shown in FIG. 1 are denoted by the same reference numerals as in FIG. 1. The camera system shown in FIG. 51 differs from the camera system shown in FIG. 1 only in such a point that a test light emission switch 140 for test light emission for a flash device is provided on an apron part of the camera.

Figure 52:
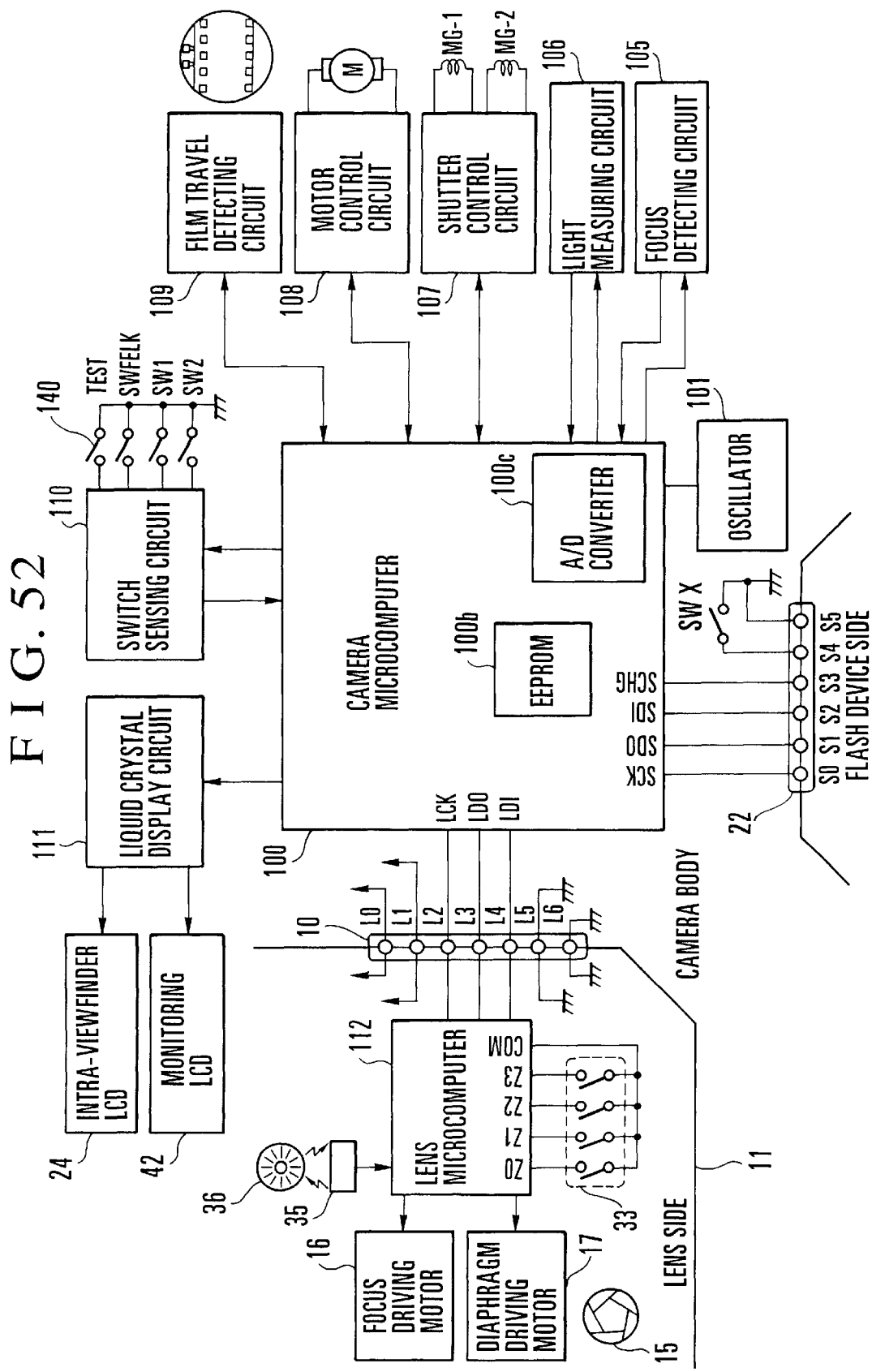
FIG. 52 is a block diagram showing the circuit arrangement of a camera and a lens shown in FIG. 51.

FIG. 52 shows the circuit arrangement of the camera. In FIG. 52, the constituent parts similar to those shown in FIG. 2 are denoted by the same reference numerals as in FIG. 2. The circuit arrangement shown in FIG. 52 differs from the circuit arrangement shown in FIG. 2 only is such a point that the intra-viewfinder LCDs 24a and 24b are integrated into one intra-viewfinder LCD 24 and the test light emission switch 140 is provided.

Figure 53:
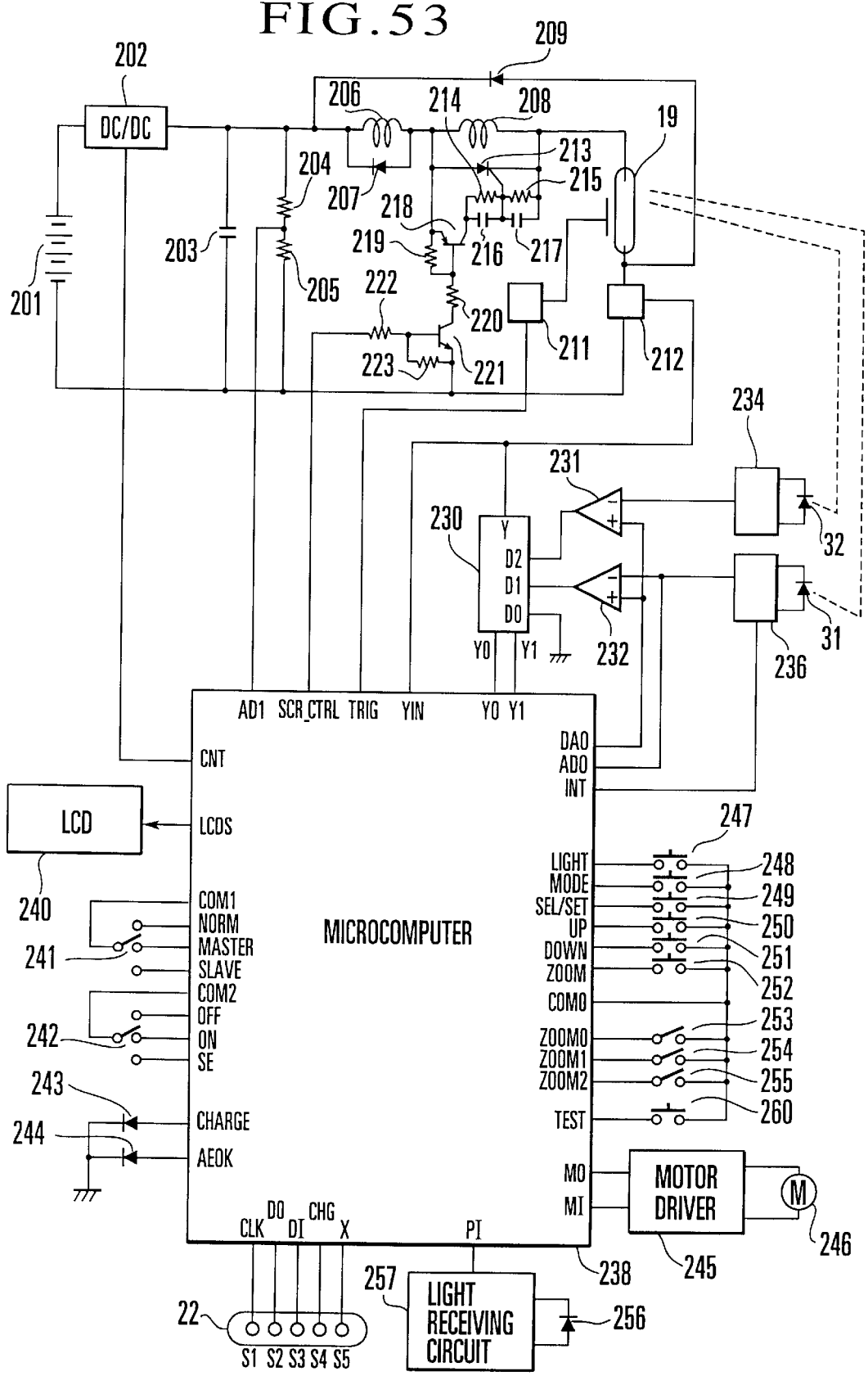
FIG. 53 is a block diagram showing the circuit arrangement of a flash device shown in FIG. 51.

FIG. 53 shows the circuit arrangement of a flash device shown in FIG. 51. In FIG. 53, the constituent parts similar to those shown in FIG. 3 are denoted by the same reference numerals as in FIG. 3. The circuit arrangement shown in FIG. 53 differs from the circuit arrangement shown in FIG. 3 only is such a point that a test light emission switch 260 is provided.

Figure 54A:
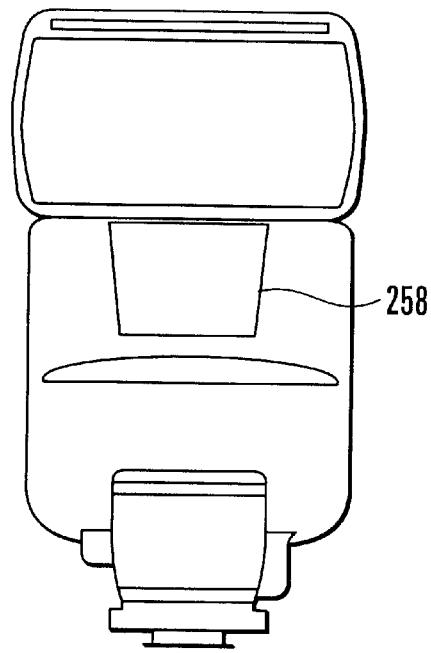
FIGS. 54(a) and 54(b) are diagrams showing the appearance of the flash device in the eighth embodiment.
Figure 54B:
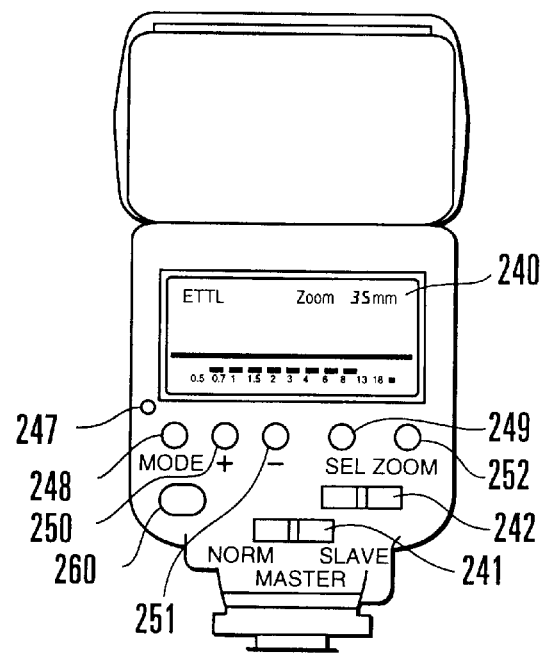

FIGS. 54(a) and 54(b) show the appearance of the flash device according to the eighth embodiment. Switches and indication parts provided on the flash device are denoted by the same reference numerals as in FIG. 53, and are, therefore, omitted from the description here. Incidentally, reference numeral 258 denotes a light receiving window for a photodiode 256 serving as the information receiving means, and the photodiode 256 is disposed inside the light receiving window 258.

The manner of usage, display and communication in the eighth embodiment is approximately the same as that in the first embodiment. However, in the eighth embodiment, as shown in FIG. 55, a command 14 (test light emission) is provided in addition to the commands 1 to 13.

Light emitting operations of the master flash device and the slave flash devices during test light emission are described below with reference to the flow chart of FIG. 56.

Figure 56:
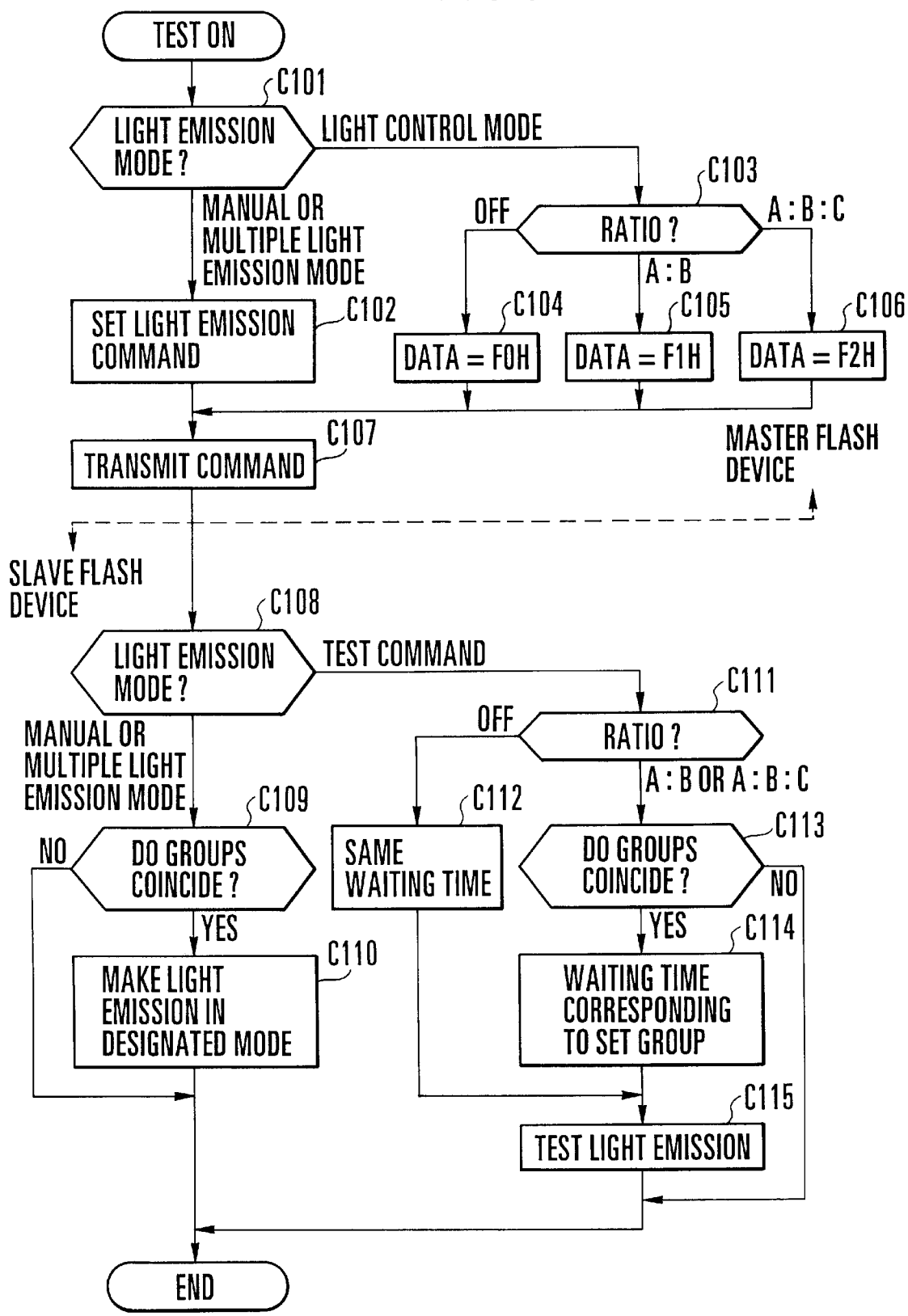
FIG. 56 is a flow chart for explaining the operations of the camera and the flash devices in the eighth embodiment.

In FIG. 56, steps C101 to C107 represent the operation of the master flash device serving as a master transmission device (wireless control device), and steps C108 to C115 represent the operation of the slave flash device. Here, the master flash device is set in such a state that the wireless-mode selection switch 241 is connected to the terminal MASTER, and the slave flash device is set in such a state that the wireless-mode selection switch 241 is connected to the terminal SLAVE.

The flow chart of FIG. 56 represents a routine to be executed when the test light emission switch 140 of the camera or the test light emission switch 260 of the flash device has been turned on. In a case where the test light emission switch 140 of the camera has been turned on, a known serial communication is performed through serial communication interface terminals SCK, SDI and SDO between the camera and the flash device to give, from the camera to the flash device, a notice that the test light emission switch 140 of the camera has been turned on. On the other hand, in a case where the test light emission switch 260 of the flash device has been turned on, the flash-device microcomputer 238 directly detects the turning-on the test light emission switch 260.

At a step C101, when the test light emission switch 140 of the camera or the test light emission switch 260 of the flash device has been turned on, a check is made for the light emission mode set in the master flash device so as to make test light emission in various manners according to the light emission mode. If the light emission mode is the manual light emission mode or the multiple light emission mode, the flow branches to a step C102. If the light emission mode is the automatic light control mode, the flow branches to a step C103. Incidentally, in the automatic light control mode, a main object of the test light emission is to confirm the position of the slave flash device, or may be to confirm beforehand the amount of light emission of the main light emission in the manual light emission mode or the multiple light emission mode.

At the step C102, preparation is made for transmitting the following light emission command and data, as shown in FIG. 55, in the case of the manual light emission mode or the multiple light emission mode.

1) Manual one-lighting (ratio-off) mode: the command 8 and the amount of light emission set in the master flash device.

2) Manual two-lighting mode: the command 9 and the amount of light emission of the group-A flash device and the amount of light emission of the group-B flash device set in the master flash device.

3) Manual three-lighting mode: the command 10 and the amount of light emission of the group-A flash device, the amount of light emission of the group-B flash device and the amount of light emission of the group-C flash device set in the master flash device.

1) Multiple one-lighting (ratio-off) mode: the command 11 and the amount of light emission, the number of times of light emission and the frequency of light emission set in the master flash device.

2) Multiple two-lighting mode: the command 12 and the amount of light emission of the group-A flash device, the amount of light emission of the group-B flash device, the number of times of light emission and the frequency of light emission set in the master flash device.

3) Multiple three-lighting mode: the command 13 and the amount of light emission of the group-A flash device, the amount of light emission of the group-B flash device, the amount of light emission of the group-C flash device, the number of times of light emission and the frequency of light emission set in the master flash device.

At the step C103, a check is made for the setting in ratio of the master flash device in the case of the automatic light control mode. If the setting in ratio is "ratio-off", the flow branches to a step C104. If the setting in ratio is "A:B", the flow branches to a step C105. If the setting ratio is "A:B:C", the flow branches to a step C106.

At the step C104, in the case of "ratio-off", preparation is made for transmitting the command 14 and data "F0H" shown in FIG. 55.

At the step C105, in the case of "A:B", preparation is made for transmitting the command 14 and data "F1H" shown in FIG. 55.

At the step C106, in the case of "A:B:C", preparation is made for transmitting the command 14 and data "F2H" shown in FIG. 55.

At a step C107, the master flash device transmits the command and data to the slave flash device in the manner similar to that described with reference to FIG. 11.

At a step C108, when the slave flash device receives the command and data transmitted from the master flash device at the step C107, a check is made for the received command. If the received command is the command 14, i.e., test command, the flow branches to a step C111. If the received command is any one of the commands 8 to 13, i.e., manual or multiple light emission command, the flow branches to step C109.

At the step C109, a check is made to find if the received command and light emission data of each group coincide with those of the group to which the slave flash device itself is set. If not, no test light emission is performed, and, therefore, the flow skips a step C110.

More specifically, in the case of the ratio-off mode in which all the flash devices set in the same channel make light emission under the same condition, the test light emission is performed irrespectively of the setting in group of the slave flash device. On the other hand, in a case where an erroneous group setting of the slave flash device is performed in the ratio-on mode (A:B or A:B:C), for example, in a case where the slave flash device is erroneously set to the group C in the case of the two-lighting (A:B) light emission mode, the slave flash device is made not to perform test light emission. Therefore, it is possible to make the photographer recognize the erroneous group setting.

At the step C110, in the case of coincidence of light emission groups, the slave flash device perform test light emission in the light emission mode and light emission data as designated. For example, in the case of the manual light emission mode, the slave flash device performs test light emission at the amount of light emission set in the master flash device.

At the step C111, when the command received from the master flash device is the command 14 indicative of the test light emission in the automatic light control mode, a check is made for data following the command 14. If the data is "F0H" indicative of the ratio-off mode, the flow branches to a step C112. If the data is other than "F0H", the flow branches to a step C113.

At the step C112, since, in the case of the ratio-off mode, the slave flash devices make light emission under the same condition irrespectively of the group setting, waiting time periods to the test light emission are set into the same predetermined value.

At the step C113, in the case of the ratio-on mode, a check is made to find if the received data coincides with data in group set in the slave flash device itself. If not, no test light emission is performed, and, therefore, the flow skips the subsequent light emission processing.

More specifically, in a case where the slave flash device is erroneously set to the group C in the case of the two-lighting (A:B) light emission mode, the slave flash device is made not to perform test light emission. Therefore, it is possible to make the photographer recognize the erroneous group setting.

At a step C114, the test light emission is waited for a predetermined period of time corresponding to the set group.

For example, 0.3 sec is provided for the group-A flash device, 0.6 sec is provided for the group-B flash device, and 0.9 sec is provided for the group-C flash device (at increments of 0.3 sec).

At a step C115, the test light emission is made at the predetermined amount of light emission.

Next, the typical operation at the time of test light emission is described with reference to the timing charts of FIGS. 57 and 58.

Figure 57:
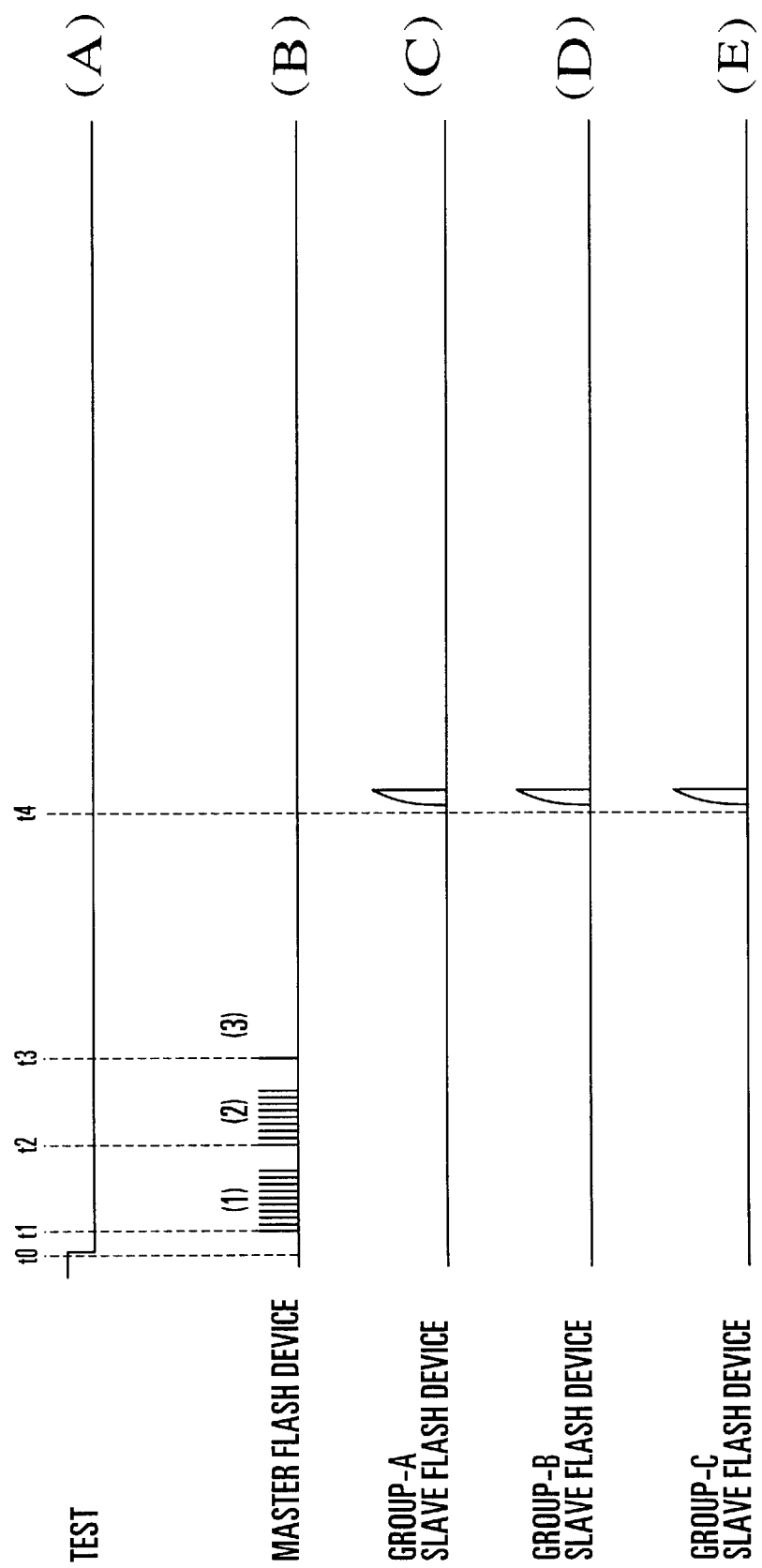
FIG. 57 is a timing chart for explaining the operations of the camera and the flash devices in the eighth embodiment.

FIG. 57 shows the state of the test light emission in the automatic light control and ratio-off mode, in which, since the amounts of light emission of the selected flash devices are the same, it is not necessary to recognize the difference in amount of light emission between the flash devices and it is necessary only to identify the selected flash devices, so that the flash devices of the various groups make light emission at the same time. FIG. 58 shows the state of the test light emission in the automatic light control and A:B:C mode, in which, since each flash device in the automatic light control mode need not make light emission at an amount of light emission for the main light emission and it is necessary only to individually identify the selected flash devices, the flash devices make light emission time-serially.

Figure 58:
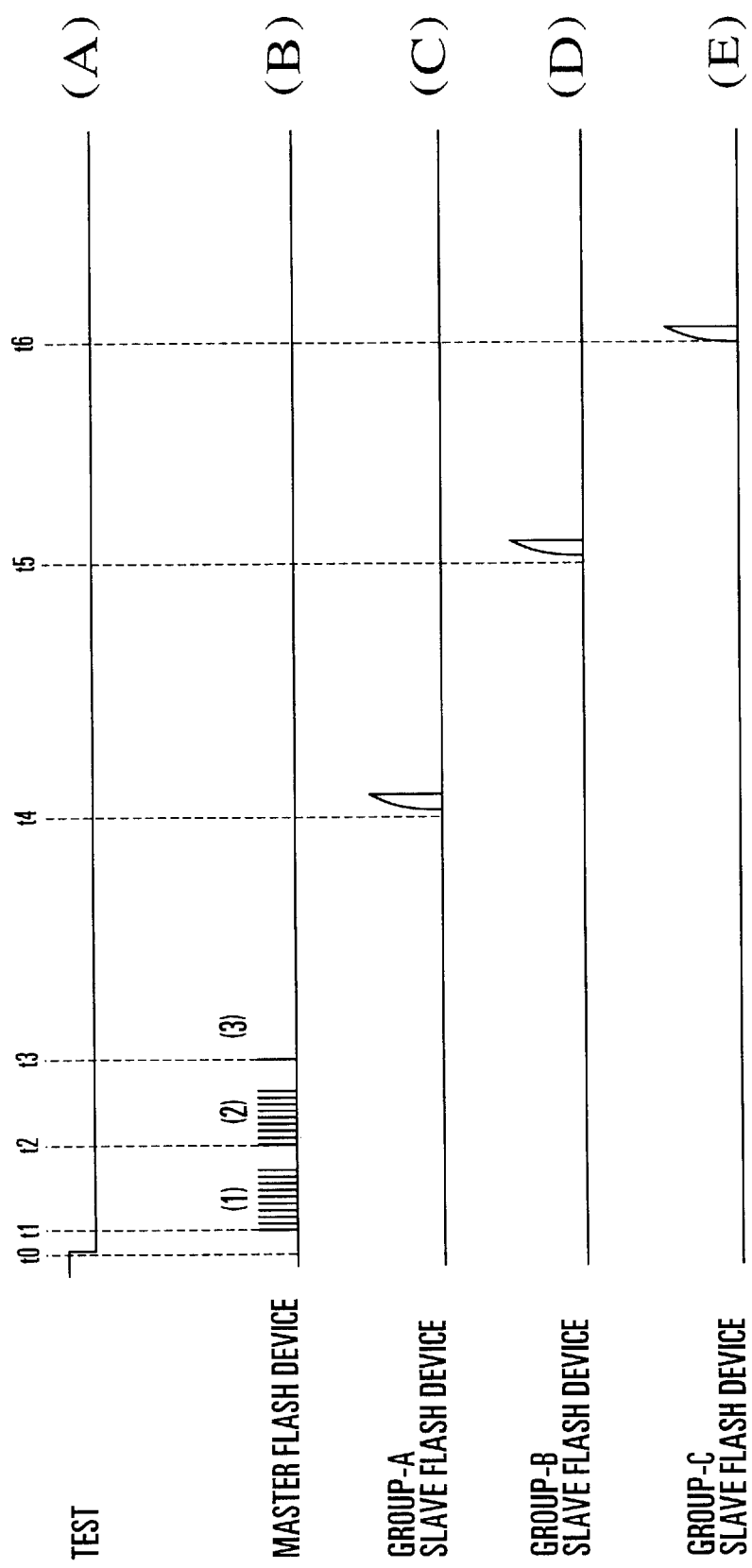
FIG. 58 is a timing chart for explaining the operations of the camera and the flash devices in the eighth embodiment.

In each of FIGS. 57 and 58, part (A) indicates the state of the test light emission switch 260 of the master flash device or the state of the test light emission switch 140 of the camera, part (B) indicates the waveform of light emission of the Xe tube of the master flash device, part (C) indicates the waveform of light emission of the slave flash device set to the group A, part (D) indicates the waveform of light emission of the slave flash device set to the group B, and part (E) indicates the waveform of light emission of the slave flash device set to the group C.

Referring first to FIG. 57, at a point of time t0, the test light e mission switch is turned on.

At a point of time t1, the master flash device causes the Xe tube 19 to emit pulse light to transmit the command 14 (1) shown in FIG. 55.

At a point of time t2, because of the ratio-off and automatic light control mode, the master flash device transmits data "F0H" (2) shown in FIG. 55.

At a point of time t3, the master flash device causes the Xe tube 19 to emit pulse light to transmit a light emission start timing signal (3) to the slave flash devices.

On the other hand, each of the slave flash devices receives the command (1) and the data (2), analyzes those to recognize the identical test light emission, and counts a predetermined waiting time irrespectively of the group setting of the slave flash device itself.

At a point of time t4, after the lapse of the predetermined waiting time, the slave flash devices make light emission at the same time at the predetermined amount of light emission irrespectively of the setting of light emission groups.

Accordingly, in the case of the ratio-off and identical light emission mode, light emission is performed irrespectively of the group setting of the slave flash devices. Therefore, the setting of light emission groups of the slave flash devices is erroneously performed by the photographer, light emission is performed correctly.

Next, referring to FIG. 58, at a point of time t0, the test light emission switch is turned on.

At a point of time t1, the master flash device causes the Xe tube 19 to emit pulse light to transmit the command 14 (1) shown in FIG. 55.

At a point of time t2, because of the A:B:C and automatic light control mode, the master flash device transmits data "F2H" (2) shown in FIG. 55.

At a point of time t3, the master flash device causes the Xe tube 19 to emit pulse light to transmit a light emission start timing signal (3) to the slave flash devices.

On the other hand, each of the slave flash devices receives the command (1) and the data (2), analyzes those to recognize the test light emission A:B:C, and counts a predetermined waiting time according to the group setting of the slave flash device itself, thereby waiting for the test light emission.

At a point of time t4, after the lapse of the predetermined waiting time for the group A, the slave flash device set to the group A makes test light emission at a predetermined amount of light emission.

At a point of time t5, after the lapse of the predetermined waiting time for the group B, the slave flash device set to the group B makes test light emission at a predetermined amount of light emission.

At a point of time t6, after the lapse of the predetermined waiting time for the group C, the slave flash device set to the group C makes test light emission at a predetermined amount of light emission.

Here, in a case where the photographer has erroneously set the group setting of the slave flash devices to "A, C, C" although intending to perform the three-lighting photography of A:B:C, the slave flash device intended to be set to the group B does not make light emission. Therefore, it is possible to make the photographer recognize such an error in group setting.

Further, in particular, after turning-on of the test light emission switch, the slave flash devices serially make light emission at the delay of an equal interval. Therefore, in the case of an erroneous group setting of the slave flash devices, the rhythm of test light emission of the slave flash devices would break, so that it is possible to make the photographer easily recognize the slave flash device the group setting of which is erroneous.

Incidentally, in the automatic light control mode only, temporal delays are provided for the test light emission of the slave flash devices according to the group setting, and, in the modes other than the automatic light control mode, no time difference is provided for the test light emission of the slave flash devices and the test light emission is performed under the set light emission condition (the amount of light emission, the frequency of light emission and the number of times of light emission). The reason for this is as follows. In particular, in the case of the manual light emission mode, the test light emission is frequently used also for determining an exposure value by using a known flash-device exposure meter located near an object, and, unless the slave flash devices make light emission at the same time, it becomes impossible to perform light measurement using the flash-device exposure meter. However, in a case where the test light emission is used only for the confirmation of responses of the slave flash devices, the responses of the slave flash devices may be varied by using a delay time or the like, as in the automatic light control mode.

Further, although the light emission by the Xe tube of the master flash device is used as a transmission means for flash-device control information, it goes without saying that the same advantageous effect can be obtained even when the flash-device control information is transmitted by using an infrared ray with an infrared filter attached to the front of the Xe tube, or when the flash-device control information is transmitted by using a high-luminance LED or the like, or when the flash-device control information is transmitted by using ultrasonic wave or radio wave.

As described above, the eighth embodiment has the following advantageous effects.

In a case where test light emission of slave flash devices is performed prior to photo-taking in a multi-lighting flash system arranged to control light emission of a plurality of slave flash devices, when a multi-lighting light emission mode is selected, the form of the test response is varied, for example, the delay time to the test light emission is varied, according to the light emission group of the slave flash device, so that it is possible to easily confirm the positions or responses of the slave flash devices of the respective groups.

Further, the wireless flash-device control device has a plurality of light emission modes, and test light emission information corresponding to the set light emission mode is transmitted to the slave flash device, so that it is possible to perform apposite test light emission according to the set light emission mode.

A ninth embodiment of the invention is an example in which the test response of the slave flash device is confirmed with the sound by using a sound generator.

Figure 59:
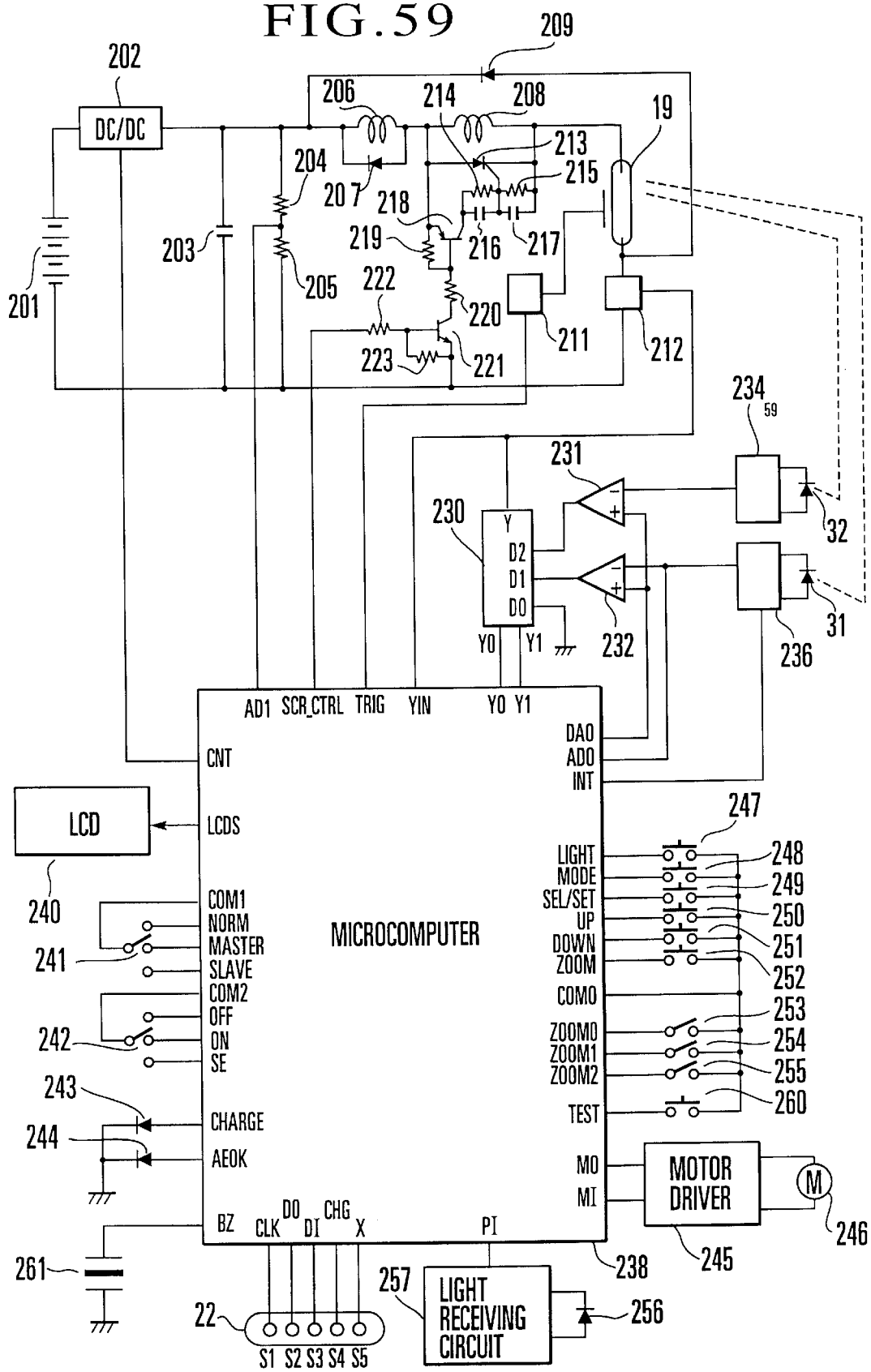
FIG. 59 is a block diagram showing the circuit arrangement of a flash device according to a ninth embodiment of the invention.

FIG. 59 is a block diagram showing the circuit arrangement of the flash device according to the ninth embodiment of the invention. In FIG. 59, parts similar to those shown in FIG. 53 are omitted from the description.

In FIG. 59, reference numeral 261 denotes a sound generator such as a piezoelectric buzzer, which, when receiving a driving voltage of a predetermined frequency, generates the sound of a frequency (interval) corresponding to the driving voltage.

Also, an output terminal BZ of the microcomputer 238 is a driving output terminal for the sound generator 261, at which a driving signal having a predetermined frequency and a predetermined amplitude is outputted.

Next, light emitting operations of the master flash device and the slave flash devices during test light emission are described below with reference to the flow chart of FIG. 60.

Figure 60:
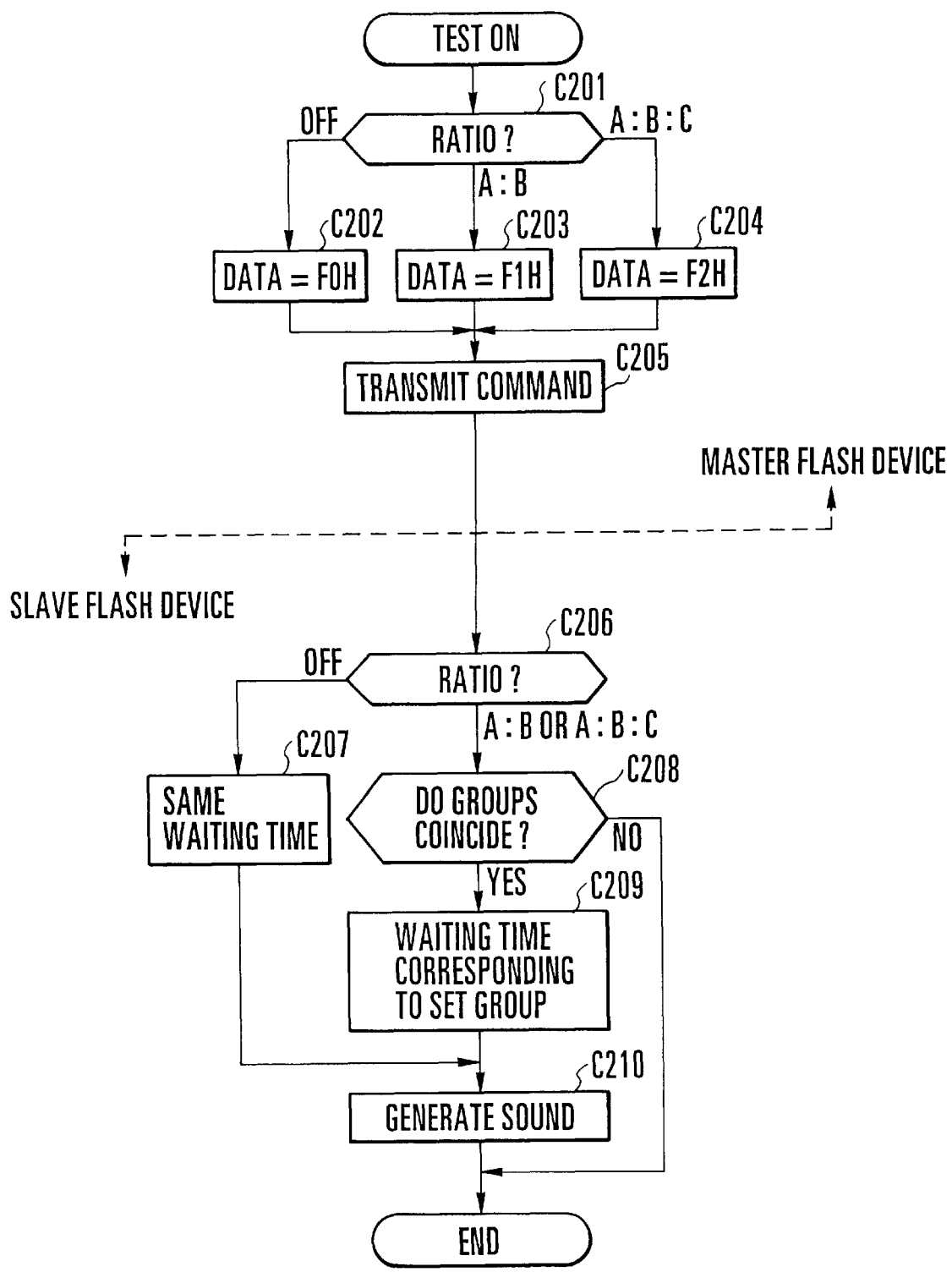
FIG. 60 is a flow chart for explaining the operations of the camera and the flash devices in the ninth embodiment.

The flow chart of FIG. 60 represents, as in the eighth embodiment, a routine to be executed when the test light emission switch 140 of the camera or the test light emission switch 260 of the flash device has been turned on. In a case where the test light emission switch 140 of the camera has been turned on, a known serial communication is performed through serial communication interface terminals SCK, SDI and SDO between the camera and the flash device to give, from the camera to the flash device, a notice that the test light emission switch 140 of the camera has been turned on. On the other hand, in a case where the test light emission switch 260 of the flash device has been turned on, the flash-device microcomputer 238 directly detects the turning-on the test light emission switch 260.

At a step C201, when the test light emission switch 140 of the camera or the test light emission switch 260 of the flash device has been turned on, a check is made for the setting in ratio of the master flash device. If the setting in ratio is "ratio-off", the flow branches to a step C202. If the setting in ratio is "A:B", the flow branches to a step C203. If the setting ratio is "A:B:C", the flow branches to a step C204.

At the step C202, in the case of "ratio-off", preparation is made for transmitting the command 14 and data "F0H" shown in FIG. 55.

At the step C203, in the case of "A:B", preparation is made for transmitting the command 14 and data "F1H" shown in FIG. 55.

At the step C204, in the case of "A:B:C", preparation is made for transmitting the command 14 and data "F2H" shown in FIG. 55.

At a step C205, the master flash device transmits the command and data to the slave flash device in the manner similar to that described with reference to FIG. 11.

At a step C206, when the slave flash device receives the command and data transmitted from the master flash device at the step C205, a check is made for data following the command 14. If the data is "F0H" indicative of the ratio-off mode, the flow branches to a step C207. If the data is other than "F0H", the flow branches to a step C208.

At the step C207, since, in the case of the ratio-off mode, the slave flash devices make light emission under the same condition irrespectively of the group setting, waiting time periods to the test light emission are set into the same predetermined value.

At the step C208, in the case of the ratio-on mode (A:B or A:B:C), a check is made to find if the received data coincides with data in group set in the slave flash device itself. If not, no test light emission is performed, and, therefore, the flow skips the subsequent light emission processing.

More specifically, in a case where the slave flash device is erroneously set to the group C in the case of the two-lighting (A:B) light emission mode, the slave flash device is made not to perform test light emission. Therefore, it is possible to make the photographer recognize the erroneous group setting.

At a step C209, the test light emission is waited for a predetermined period of time corresponding to the set group.

For example, 0.3 sec is provided for the group-A flash device, 0.6 sec is provided for the group-B flash device, and 0.9 sec is provided for the group-C flash device (at increments of 0.3 sec).

At a step C210, the sound generator 261 generates sound at a predetermined frequency.

Next, the typical operation at the time of test light emission is described with reference to the timing charts of FIGS. 61 and 62.

Figure 61:
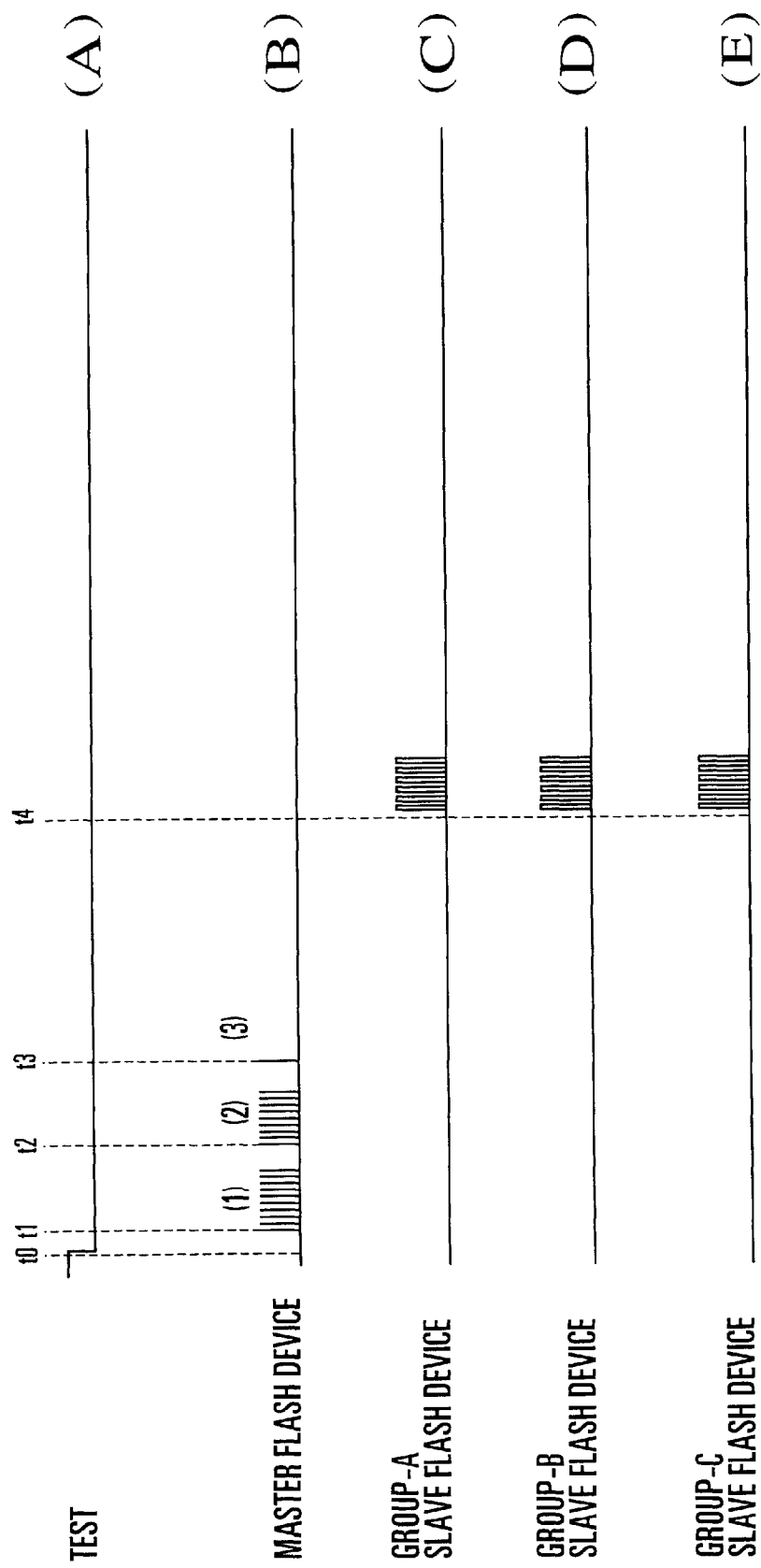
FIG. 61 is a timing chart for explaining the operations of the camera and the flash devices in the ninth embodiment.
Figure 62:
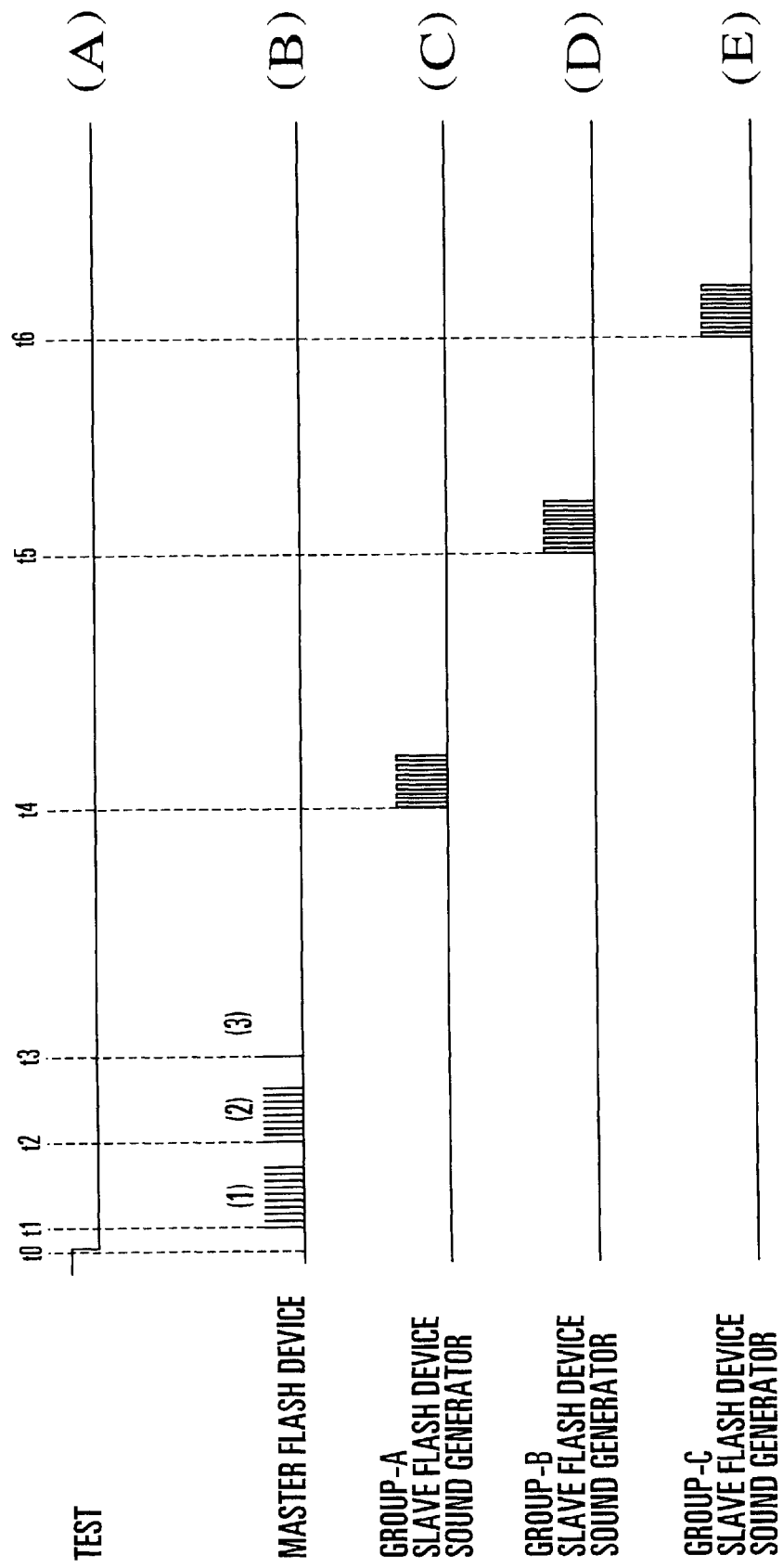
FIG. 62 is a timing chart for explaining the operations of the camera and the flash devices in the ninth embodiment.

FIG. 61 shows the state of the test response at the time of the ratio-off mode, and FIG. 62 shows the state of the test response at the time of the A:B:C mode.

In each of FIGS. 61 and 62, part (A) indicates the state of the test light emission switch 260 of the master flash device or the state of the test light emission switch 140 of the camera, part (B) indicates the waveform of light emission of the Xe tube of the master flash device, part (C) indicates the waveform of sound generation of the sound generator 261 of the slave flash device set to the group A, part (D) indicates the waveform of sound generation of the sound generator 261 of the slave flash device set to the group B, and part (E) indicates the waveform of sound generation of the sound generator 261 of the slave flash device set to the group C.

Referring first to FIG. 61, at a point of time t0, the test light emission switch is turned on.

At a point of time t1, the master flash device causes the Xe tube 19 to emit pulse light to transmit the command 14 (1) shown in FIG. 55.

At a point of time t2, because of the ratio-off mode, the master flash device transmits data "F0H" (2) shown in FIG. 55.

At a point of time t3, the master flash device causes the Xe tube 19 to emit pulse light to transmit a light emission start timing signal (3) to the slave flash devices.

On the other hand, each of the slave flash devices receives the command (1) and the data (2), analyzes those to recognize the identical test response, and counts a predetermined waiting time irrespectively of the group setting of the slave flash device itself to wait for generation of the test response.

At a point of time t4, after the lapse of the predetermined waiting time, the slave flash devices generate sound at the same time at the predetermined frequency.

Next, referring to FIG. 62, at a point of time t0, the test light emission switch is turned on.

At a point of time t1, the master flash device causes the Xe tube 19 to emit pulse light to transmit the command 14 (1) shown in FIG. 55.

At a point of time t2, because of the A:B:C and automatic light control mode, the master flash device transmits data "F2H" (2) shown in FIG. 55.

At a point of time t3, the master flash device causes the Xe tube 19 to emit pulse light to transmit a light emission start timing signal (3) to the slave flash devices.

On the other hand, each of the slave flash devices receives the command (1) and the data (2), analyzes those to recognize the test light emission A:B:C, and counts a predetermined waiting time according to the group setting of the slave flash device itself.

At a point of time t4, after the lapse of the predetermined waiting time for the group A, the slave flash device set to the group A generates sound at the predetermined frequency.

At a point of time t5, after the lapse of the predetermined waiting time for the group B, the slave flash device set to the group B generates sound at the predetermined frequency.

At a point of time t6, after the lapse of the predetermined waiting time for the group C, the slave flash device set to the group C generates sound at the predetermined frequency.

Here, in a case where the photographer has erroneously set the group setting of the slave flash devices to "A, C, C" although intending to perform the three-lighting photography of A:B:C, the slave flash device intended to be set to the group B does not generate sound. Therefore, it is possible to make the photographer recognize such an error in group setting.

Further, in particular, after turning-on of the test light emission switch, the slave flash devices serially generate sound at the delay of an equal interval. Therefore, in the case of an erroneous group setting of the slave flash devices, the rhythm of test response of the slave flash devices would break, so that it is possible to make the photographer easily recognize the slave flash device the group setting of which is erroneous.

Further, if the frequencies (intervals) of sound generation of the respective slave flash devices are made different from each other, it becomes possible to more clearly discriminate the responses of the respective slave flash devices.

Incidentally, since in the ninth embodiment the test response is effected by the sound generation of the sound generator, it is impossible to say that light measurement using a flash-device exposure meter is performed at the time of the manual light emission mode. Therefore, temporal delays are applied to the responses of the respective slave flash devices according to the group setting, without distinction among the automatic light control mode, the manual light emission mode and the multiple light emission mode.

Further, although the light emission by the Xe tube of the master flash device is used as a transmission means for flash-device control information, it goes without saying that the same advantageous effect can be obtained even when the flash-device control information is transmitted by using an infrared ray with an infrared filter attached to the front of the Xe tube, or when the flash-device control information is transmitted by using a high-luminance LED or the like, or when the flash-device control information is transmitted by using ultrasonic wave or radio wave.

Further, one and the same slave flash device may be arranged to be capable of selecting one of the test response by the light emission as described in the eighth embodiment and the test response by the sound generation of the sound generator as described in the ninth embodiment.

As described above, the ninth embodiment has the following advantageous effects.

In a case where test light emission of slave flash devices is performed prior to photo-taking in a multi-lighting flash system arranged to control light emission of a plurality of slave flash devices, when a multi-lighting light emission mode is selected, the form of the test response is varied, for example, the delay time to the test response by sound is varied or the interval of the sound is varied, according to the light emission group of the slave flash device, so that it is possible to easily confirm the positions or responses of the slave flash devices of the respective groups.

A tenth embodiment of the invention is an example in which a flash device incorporated in (built in) a camera is used to generate a signal for controlling a slave flash device located at a distance from the camera.

Figure 63:
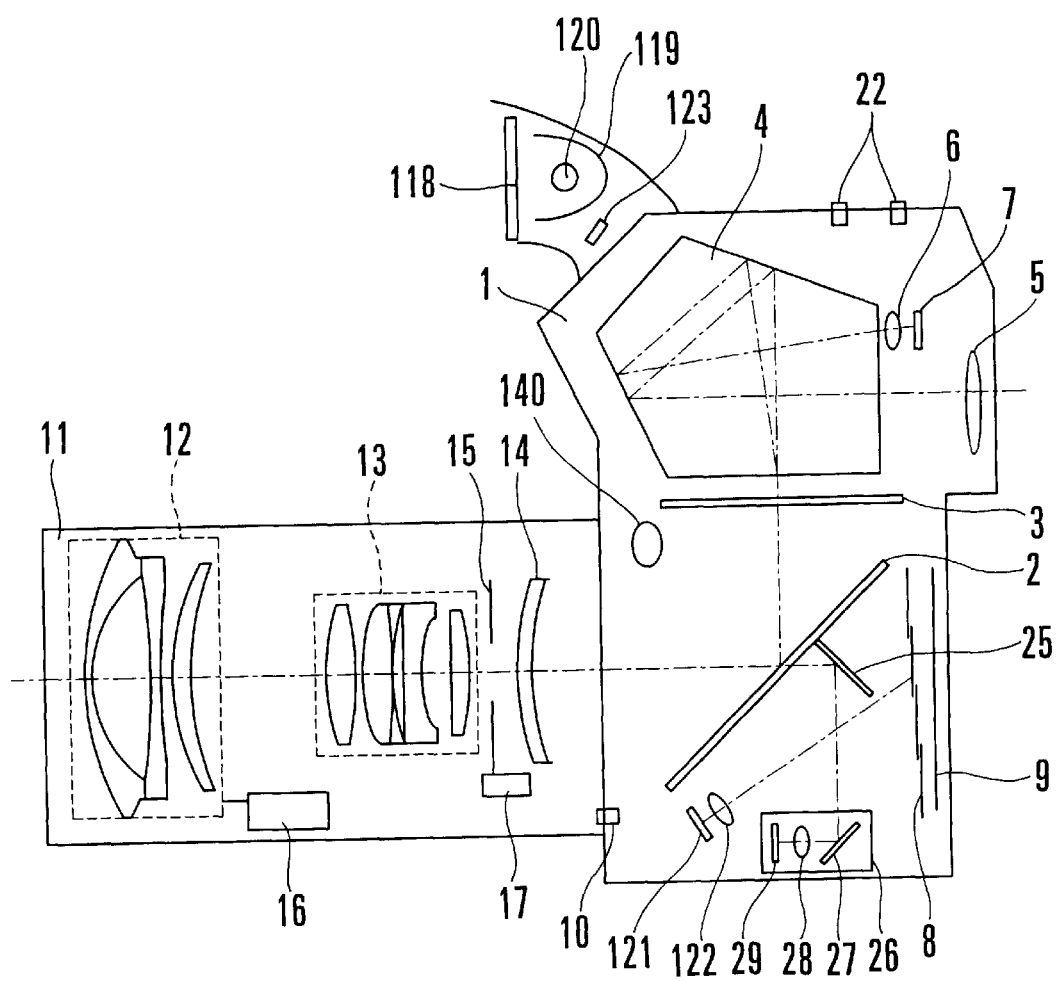
FIG. 63 is a side sectional view of a camera system according to a tenth embodiment of the invention.

FIG. 63 is a side sectional view of the camera according to the tenth embodiment. In FIG. 63, members corresponding to those shown in FIG. 51 are denoted by the same reference numerals as in FIG. 51, and are, therefore, omitted from the description.

In FIG. 63, reference numerals 118 and 119 respectively denote a Fresnel lens and a reflector, which have the function of efficiently condense light emission energy toward an object. Reference numeral 120 denotes a xenon tube serving as light emission means.

Reference numeral 121 denotes a light receiving sensor for monitoring reflected light from a film surface to perform a TTL automatic light control of the built-in flash device. Reference numeral 122 denotes a lens for imaging light from the film surface onto the light receiving sensor 121. Reference numeral 123 denotes a light receiving sensor for directly monitoring the amount of light emission of the Xe tube 120.

Figure 64:
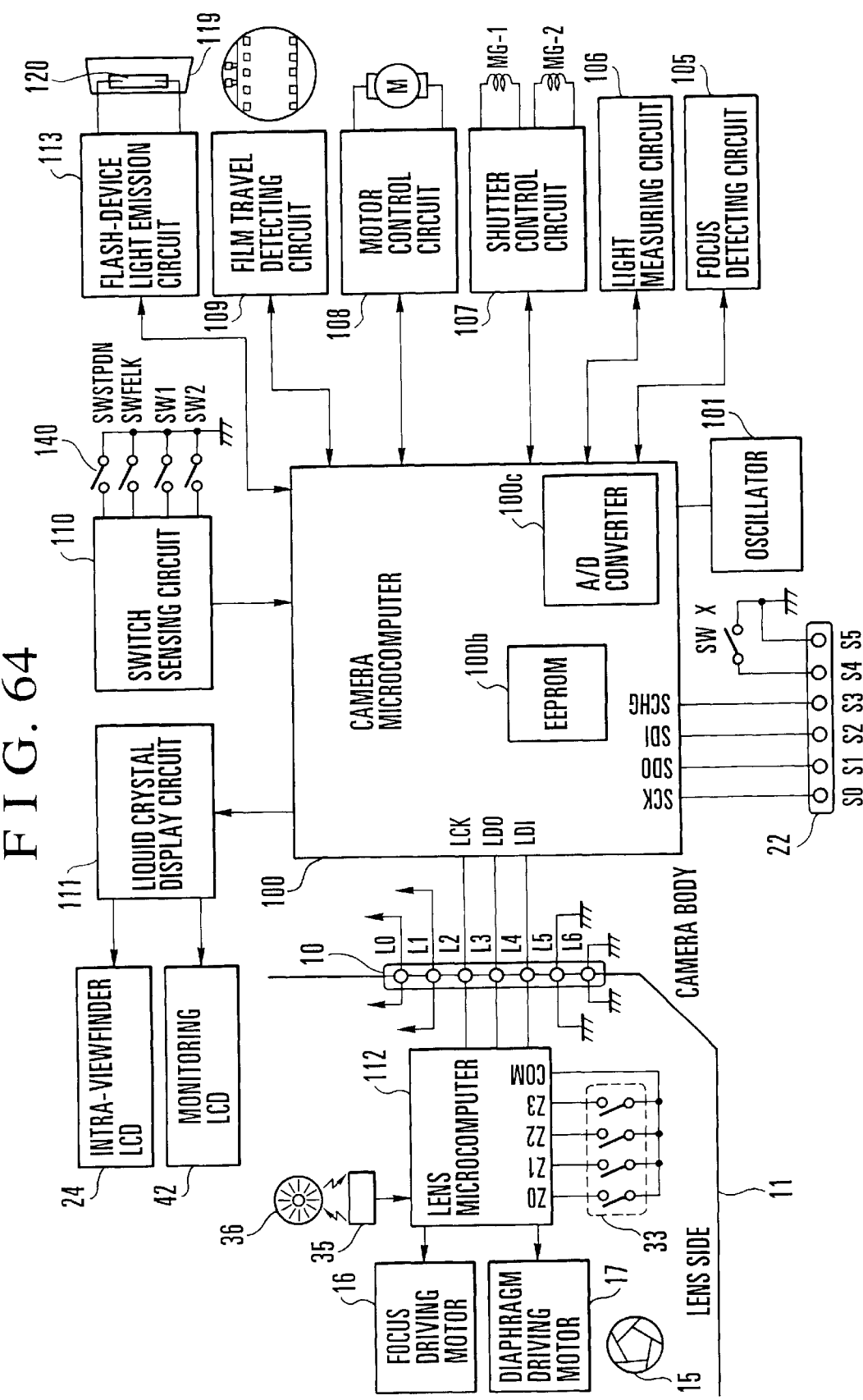
FIG. 64 is a block diagram showing the circuit arrangement of a camera and a lens in the tenth embodiment.

FIG. 64 is a block diagram showing the circuit arrangement of the tenth embodiment. In FIG. 64, members corresponding to those shown in FIG. 2 are denoted by the same reference numerals as in FIG. 2. In FIG. 64, reference numeral 113 denotes a flash-device light emission circuit for controlling the light emission of a flash device.

Figure 65:
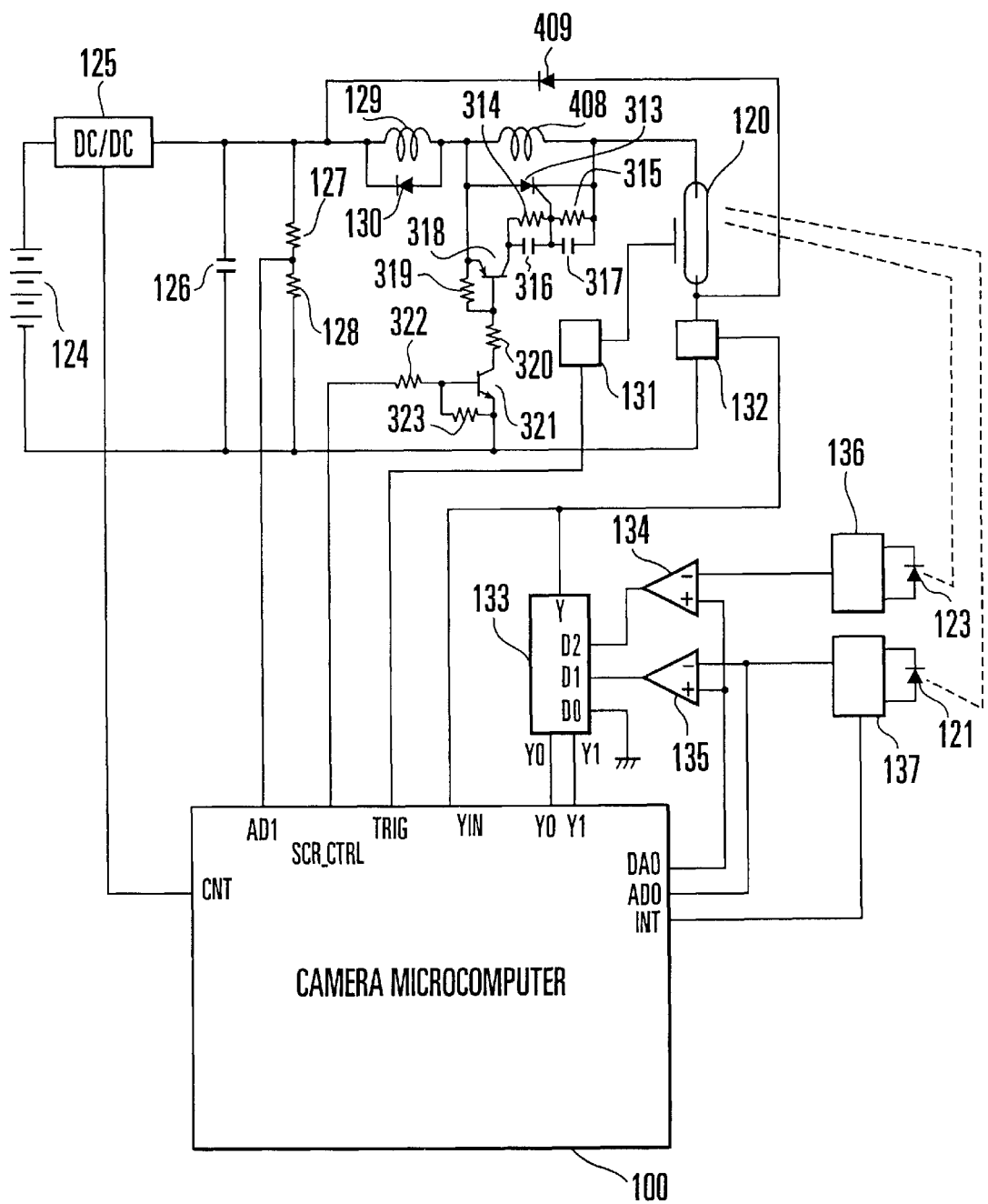
FIG. 65 is a block diagram showing the circuit arrangement of a flash device incorporated in the camera in the tenth embodiment.

FIG. 65 is a circuit diagram for explaining the internal arrangement of the flash-device light emission circuit 113.

Referring to FIG. 65, the flash-device light emission circuit 113 includes the light receiving sensor 121 for receiving reflected light from a film surface to perform a TTL automatic light control, the light receiving sensor 123 for directly monitoring the light emission of the Xe tube 120, a battery 124 serving as a power supply, and a known DC-DC converter 125 arranged to boost the battery voltage to a few hundred V.

The flash-device light emission circuit 113 further includes a main capacitor 126 arranged to store light emission energy, resistors 127 and 128 arranged to divide the voltage of the main capacitor 126 into a predetermined ratio, a first coil 129 arranged to limit a light emission current, and a first diode 130 arranged to absorb a back electromotive voltage which is generated at the coil 129 at the time of stopping of light emission.

The flash-device light emission circuit 113 further includes a trigger generating circuit 131, a light emission control circuit 132 such as an IGBT, and a data selector 133, which is arranged to select one of outputs D0, D1 and D2 according to the combination of two inputs Y0 and Y1 and to output the selected output from a terminal Y.

The flash-device light emission circuit 113 further includes a comparator 134 arranged to adjust the amount of light emission of the Xe tube 120 at the time of the wireless pulse light emission, a comparator 135 arranged to adjust the amount of light emission at the time of the TTL light control, a light measuring circuit 136 arranged to amplify a minute current flowing to the light receiving sensor 123 and to convert a photo-current into a voltage, and an integration circuit 137 arranged to integrate object-reflected light received at the light receiving sensor 121.

The flash-device light emission circuit 113 further includes a second coil 408 arranged to limit a light emission current, and a diode 409 arranged to feed back a back electromotive voltage which is generated at the coil 408 at the time of stopping of light emission.

The flash-device light emission circuit 113 further includes a thyristor 313 which is a switching element for bypassing the coil 408, a resistor 314 arranged to cause a current to flow to the gate, i.e., control electrode, of the thyristor 313 so as to turn on the thyristor 313, a gate-potential stabilizing resistor 315 arranged to prevent the thyristor 313 from being turned on by the application of noise to the gate of the thyristor 313 when the thyristor 313 is in the off-state, a capacitor 316 arranged to cause the thyristor 313 to be rapidly turned on, a noise absorbing capacitor 317 arranged to prevent the thyristor 313 from being turned on by the application of noise to the gate of the thyristor 313 when the thyristor 313 is in the off-state, a transistor 318 arranged to perform switching of the gate current of the thyristor 313, resistors 319 and 320, a transistor 321 arranged to perform switching the transistor 318, and resistors 322 and 323.

The circuit arrangement of the built-in flash device is essentially the same as that of the flash device described in the first embodiment, and is, therefore, omitted from the description.

Figure 66:
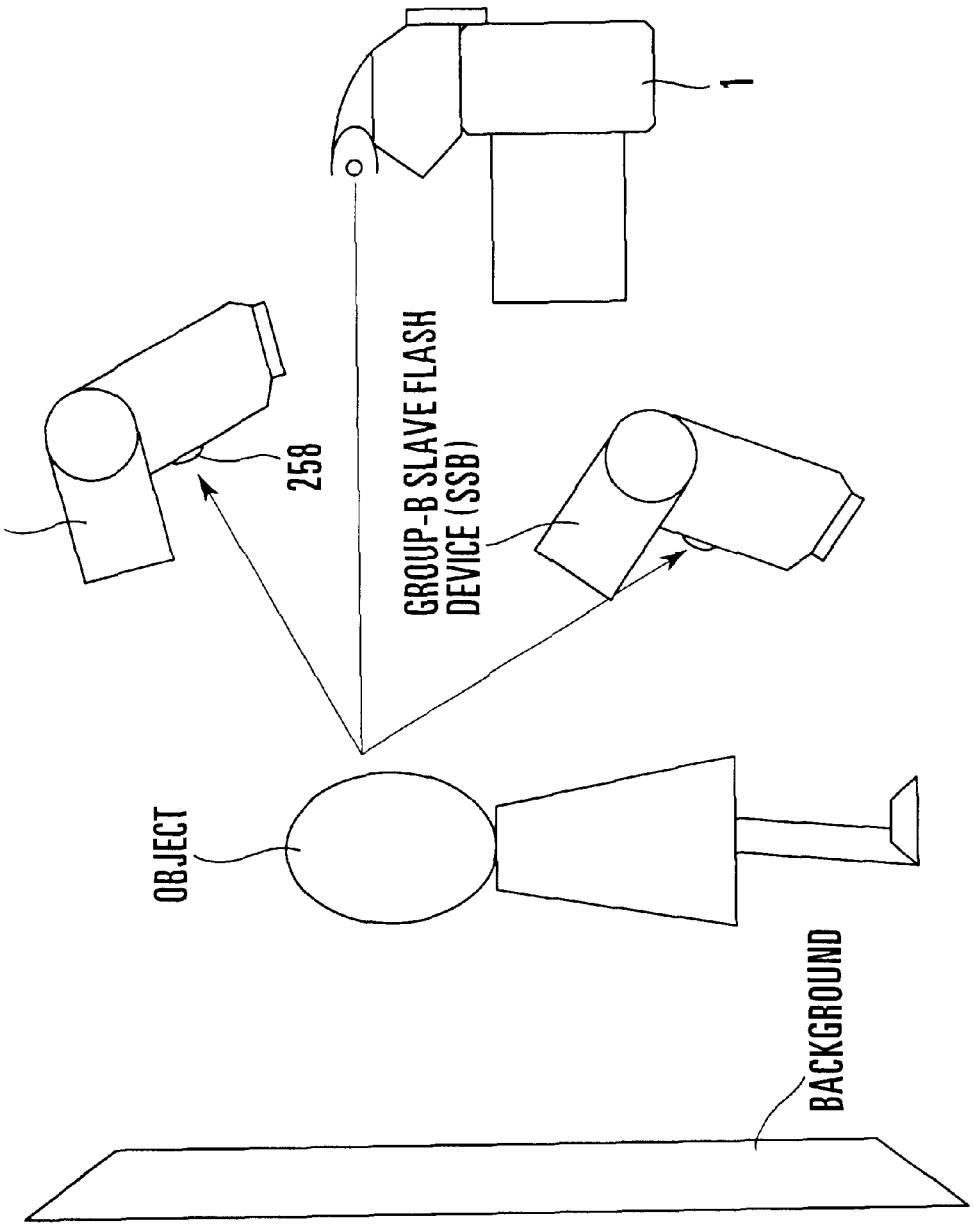
FIG. 66 is a diagram showing an example of photo-taking operation in the tenth embodiment.

Next, FIG. 66 is a diagram showing an example of photo-taking situation using the flash system according to the tenth embodiment, in which the built-in flash device of the camera is used to control two slave flash devices. In the tenth embodiment, as in the eighth embodiment, the flash device incorporated in the camera generates a wireless light signal for controlling the slave flash devices to transmit control information to the slave flash devices, which are located at distances from the camera, so that it is possible to perform a wireless slave-flash-device photography.

The operations of the camera and the slave flash devices when the test light emission switch of the camera is turned on are described below with reference to the flow charts of FIGS. 67 and 68.

FIG. 67 shows the state of the test light emission at the time of the automatic light control and ratio-off mode, and FIG. 68 shows the state of the test light emission at the time of the automatic light control and A:B mode.

In each of FIGS. 67 and 68, part (A) indicates the state of the test light emission switch 140 of the camera, part (B) indicates the waveform of light emission of the Xe tube of the camera, part (C) indicates the waveform of light emission of the slave flash device set to the group A, and part (D) indicates the waveform of light emission of the slave flash device set to the group B.

Referring first to FIG. 67, at a point of time t0, the test light emission switch is turned on.

At a point of time t1, the camera causes the Xe tube 120 of the built-in flash device to emit pulse light to transmit the command 14 (1) shown in FIG. 55.

At a point of time t2, because of the automatic light control and ratio-off mode, the built-in flash device transmits data "F0H" (2) shown in FIG. 55.

At a point of time t3, the built-in flash device causes the Xe tube 120 to emit pulse light to transmit a light emission start timing signal (3) to the slave flash devices.

On the other hand, each of the slave flash devices receives the command (1) and the data (2), analyzes those to recognize the identical test light emission, and counts a predetermined waiting time irrespectively of the group setting of the slave flash device itself.

At a point of time t4, after the lapse of the predetermined waiting time, the slave flash devices make test light emission at the same time at the predetermined amount of light emission.

Next, referring to FIG. 68, at a point of time t0, the test light emission switch 140 of the camera is turned on.

At a point of time t1, the built-in flash device causes the Xe tube 120 to emit pulse light to transmit the command 14 (1) shown in FIG. 55.

At a point of time t2, because of the automatic light control and A:B, the built-in flash device transmits data "F1H" (2) shown in FIG. 55.

At a point of time t3, the built-in flash device causes the Xe tube 120 to emit pulse light to transmit a light emission start timing signal (3) to the slave flash devices.

On the other hand, each of the slave flash devices receives the command (1) and the data (2), analyzes those to recognize the test light emission A:B, and counts a predetermined waiting time according to the group setting of the slave flash device itself, thereby waiting for light emission.

At a point of time t4, after the lapse of the predetermined waiting time for the group A, the slave flash device set to the group A makes test light emission at a predetermined amount of light emission.

At a point of time t5, after the lapse of the predetermined waiting time for the group B, the slave flash device set to the group B makes test light emission at a predetermined amount of light emission.

Here, in a case where the photographer has erroneously set the group setting of the slave flash devices to "A, C" although intending to perform the two-lighting photography of A:B, the slave flash device set to the group C does not make light emission. Therefore, it is possible to make the photographer recognize such an error in group setting.

Further, in particular, after turning-on of the test light emission switch, the slave flash devices serially make light emission at the delay of an equal interval. Therefore, in the case of an erroneous group setting of the slave flash devices, the rhythm of test light emission of the slave flash devices would break, so that it is possible to make the photographer easily recognize the slave flash device the group setting of which is erroneous.

Incidentally, in the tenth embodiment, the same advantageous effect as in the eighth embodiment can be obtained if, in the automatic light control mode, temporal delays are provided for the test light emission of the slave flash devices, and, in the modes other than the automatic light control mode, no time difference is provided for the test light emission of the slave flash devices and the test light emission is performed under the set light emission condition (the amount of light emission, the frequency of light emission and the number of times of light emission).

Further, in the tenth embodiment, the response of the slave flash device may be the generation of sound, as in the ninth embodiment. Thus, with transmission effected by the built-in flash device of the camera, the same objects and effects as in the eighth and ninth embodiments can be obtained as a matter of course.

FIGS. 69(a) to 69(i) are diagrams showing examples of displays on the display device 240 provided on the back side of the flash device according to an eleventh embodiment of the invention.

The arrangement and operation, such as communication, of the camera and the flash device in the eleventh embodiment are the same as in the first embodiment.

In FIGS. 69(a) to 69(i), which show examples of displays provided on the liquid crystal display device 240 at the time of one-lighting wireless photo-taking, FIGS. 69(a), 69(b) and 69(c) show examples of displays provided at the time of the automatic light control mode, FIGS. 69(d), 69(e) and 69(f) show examples of displays provided at the time of the manual light emission mode, and FIGS. 69(g), 69(h) and 69(i) show examples of displays provided at the time of the multiple light emission mode.

Further, FIGS. 69(a), 69(d) and 69(g) show examples of displays provided on the master flash device at the time of the master light emission mode, FIGS. 69(b), 69(e) and 69(h) show examples of displays provided on the master flash device at the time of the control-only mode, and FIGS. 69(c), 69(f) and 69(i) show examples of displays provided at the time of the slave mode.

In FIGS. 69(a) to 69(i), reference numeral 301 denotes a light emission mode indication of the flash device. In the case of the master flash device (the first and second rows), one of the automatic light control mode (ETTL), the manual light emission mode (M) and the multiple light emission mode (MULTI) is selected and displayed according to the light emission mode. On the other hand, in the case of the slave mode (the third row), the light emission mode designated by the master flash device is displayed.

Reference numeral 302 denotes an indication icon indicative of the setting of the flat light emission mode. The indication icon 302 is displayed when the flat light emission is enabled at the time of the master light emission mode, and is displayed when an instruction for the flat light emission is received from the master flash device at the time of the slave mode.

Reference numeral 303 denotes a zoom indication indicative of the set zoom position. Reference numerals 304 and 305 denote icons indicative of the wireless communication mode. In the case of the master mode (the first and second rows), the icon 304 has an outward indication, and, in the case of the slave mode (the third row), the icon 304 has an inward indication. The icon 305, which is a front-side light emission mark provided at the time of the wireless communication mode, is displayed in the case of the master light emission mode (the first row) and is put off in the case of the control-only mode (the second row) to visually express the control-only mode.

Reference numeral 306 denotes a channel indication, by which the set channel is indicated so as to prevent communication interference in a case where the flash system is used by a plurality of photographers.

Reference numeral 307 denotes a slave mode indication which is displayed when the slave mode is selected. In the eleventh embodiment, one of three letters "A", "B" and "C" is displayed adjacent to the slave mode indication 307.

Reference numeral 308 denotes an indication indicative of the amount of light emission set for the manual light emission at the time of the manual light emission mode, or an indication indicative of the amount of light emission for one emission of the multiple light emission at the time of the multiple light emission mode. By the indication 308, a value which is set at the master flash device is displayed in the event of the master mode (the first and second rows), and a value which is designated by the master flash device is displayed in the event of the slave mode (the third row).

Reference numeral 309 denotes an indication indicative of the number of times of light emission set at the time of the multiple light emission mode. By the indication 309, a value which is set at the master flash device is displayed in the event of the master mode (the first and second rows), and a value which is designated by the master flash device is displayed in the event of the slave mode (the third row). Incidentally, the mark "--" displayed by the number-of-times-of-light-emission indication 309 shown in FIG. 69(h) indicates that the number of times of light emission is a value which is automatically set according to the shutter opening time.

Reference numeral 310 denotes an indication indicative of the frequency of light emission set at the time of the multiple light emission mode. By the indication 310, a value which is set at the master flash device is displayed in the event of the master mode (the first and second rows), and a value which is designated by the master flash device is displayed in the event of the slave mode (the third row).

Next, the wireless communication for transmitting light emission information from the master flash device to the slave flash device is described with reference to FIG. 70.

Figure 70:
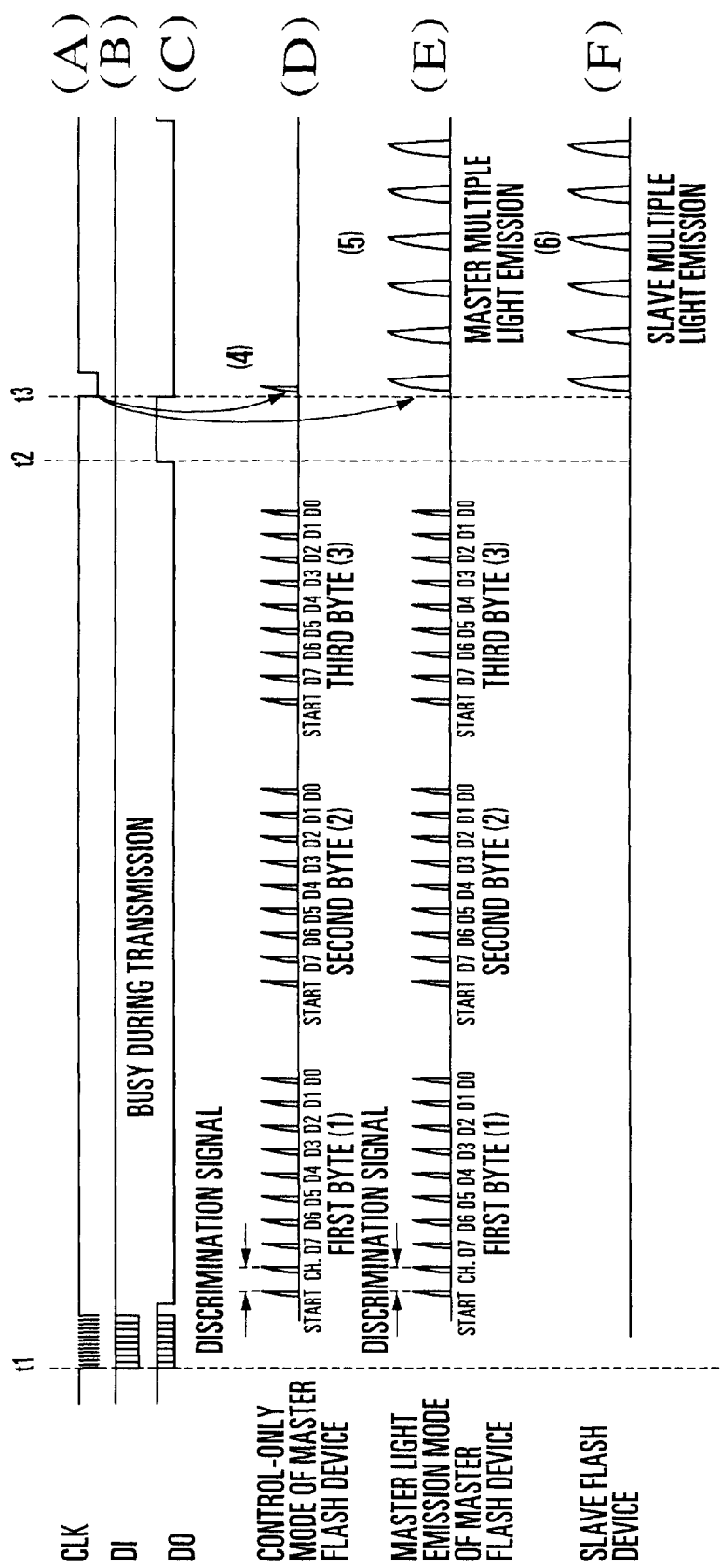
FIG. 70 is a timing chart for explaining wireless communication in the eleventh embodiment.

FIG. 70 is a timing chart for explaining a wireless light control signal which the master flash device MS generates when causing one slave flash device to make multiple light emission.

In FIG. 70, part (A) indicates a synchronizing clock signal for serial communication from the camera to the flash device, part (B) indicates a data output signal sent from the camera to the flash device, and part (C) indicates a data output signal sent from the flash device to the camera.

Further, each of parts (D) and (E) indicates a wireless light communication signal to the slave flash device, which the master flash device generates by causing the Xe tube 19 to intermittently make light emission in a pulse-like manner. The wireless light communication signal indicated by the part (D) is a light emission signal generated when the master flash device is in the control-only mode, and the wireless light communication signal indicated by the part (E) is a light emission signal generated when the master flash device is in the master light emission mode. Part (F) indicates the manner of light emission of the slave flash device.

Referring to FIG. 70, when an instruction for the main light emission is given from the camera through the serial communication line, the master flash device generates the wireless light communication signal indicated by the part (D) or (E).

The first byte of the wireless light communication signal is composed of data of a total of 10 bits, i.e., a pulse START, a pulse CH and pulses D7 to D0. The interval between the pulse START and the pulse CH indicates a channel discrimination signal, and the subsequent pulses D7 to D0 having the predetermined interval indicate data of one byte. The data of one byte is composed of a combination of light pulses D7 to D0 and constitutes compressed information on the light emission mode (the preliminary light emission, the main light emission, the manual light emission and the multiple light emission), the flash or flat light emission mode, the light emission time at the time of the flat light emission, etc.

In the second byte or the subsequent byte, a pulse START and pulses D7 to D0 having the predetermined interval indicate data of one byte, which represents the amount of light emission corresponding to the light emission mode, etc. Further, the communication data length of the wireless light communication signal is beforehand defined to be a predetermined length according to the light emission mode. In the case of the communication for the one-lighting multiple light emission, as shown in FIG. 70, the predetermined length is the length corresponding to three bytes. Incidentally, the reason why the channel discrimination signal is added only to the first byte and is not added to the second and subsequent bytes is that it is intended to shorten the communication length.

The master flash device MS keeps the D0 communication line at a low level during process of the wireless transmission, and brings the D0 communication line back to a high level upon completion of the wireless transmission.

At a point of time t2, the camera recognizes that the D0 communication line has returned to a high level, and, at a point of time t3, the camera lowers the level of the CLK signal line to give an instruction for starting light emission.

The master flash device MS detects that the level of the CLK signal line has been lowered, and, in the case of the control-only mode, generates a light emission start light pulse (4) as shown in the part (D) of FIG. 70, or, in the case of the master light emission mode, makes multiple light emission (5) as shown in the part (E) of FIG. 70 at the predetermined frequency, the predetermined number of times of light emission and the predetermined amount of light emission which are designated by the camera.

On the other hand, the slave flash device receives from the master flash device the first to third bytes of the wireless light communication signal, decodes information on a channel code (a channel number indicated by the channel discrimination signal), the light emission mode, the frequency of light emission, the number of times of light emission, the amount of light emission, etc., and makes multiple light emission (6) as shown in the part (F) of FIG. 70 at the predetermined amount of light emission, the predetermined frequency and the predetermined number of times of light emission in synchronism with the multiple light emission of the master flash device.

Next, light emitting operations of the camera and the flash device during the wireless communication photo-taking operation according to the eleventh embodiment are described with reference to the flow charts of FIGS. 71 and 72.

At a step D101, when the operation of the camera is started and the light-measurement and distance-measurement start switch SW1 is turned on, the camera causes the focus detecting circuit 105 to perform a focus detecting operation using a known phase-difference detection method, and instructs the lens microcomputer 112 to drive the focusing lens so as to adjust focus.

At a step D102, the camera causes the light measuring circuit 106 to measure an object luminance value Bv under natural light.

At a step D103, the camera decides an apposite exposure amount EvS (=Tv+Av) from the object luminance value and the film sensitivity, and decides a shutter speed and an aperture value according to a set exposure mode.

At a step D104, a check is made to find if the release start switch SW2 is turned on. If so, the flow proceeds to a step D105. If not, the flow returns to the step D102 to repeat the above process.

At a step D105, the camera communicates main light emission information (the flash light emission mode and the control shutter speed) to the master flash device MS, and, after completion of the instruction for the main light emission to the master flash device, moves up the main mirror 2 and the sub-mirror 25 to cause them to retreat from a photo-taking optical path for the purpose of making preparation for exposure, and, at the same time, instructs the lens microcomputer 112 to drive the diaphragm.

At a step D106, the master flash device obtains a computed number of times of light emission from the received shutter speed information (the shutter opening time) and the frequency of light emission included in the parameters of the multiple light emission (the frequency of light emission, the number of times of light emission and the amount of light emission per emission of the multiple light emission) set at the master flash device, using the following formula:

$$\text{Computed number of times of light emission}$$
$$\text{Shutter opening time/Frequency of light emission}$$

At a step D107, a check is made to find if the number of times of light emission of the multiple light emission set at the master flash device is an automatically set value (the indication 309 shown in FIG. 69(h) is "--"). If so, the flow branches to a step D110. If the number of times of light emission of the multiple light emission set at the master flash device is a value set by the photographer, the flow branches to a step D108.

At the step D108, a check is made to find if the number of times of light emission set at the master flash device is greater than the computed number of times of light emission. If so, the flow branches to the step D110. If the set number of times of light emission is not greater than the computed number of times of light emission, the flow branches to a step D109.

At the step D109, the transmitted number of times of light emission, which is to be transmitted to the slave flash device, is set to the set number of times of light emission.

At the step D110, if the set number of times of light emission is an automatically set value or if the set number of times of light emission is greater than the computed number of times of light emission, the transmitted number of times of light emission, which is to be transmitted to the slave flash device, is set to the computed number of times of light emission.

At a step D111, the master flash device communicates, to the slave flash device, in the same way as in the wireless light emission transmission, the command and data shown in FIG. 12, on the basis of the computed number of times of light emission of the multiple light emission obtained at the step D106, the frequency of light emission, the amount of light emission per emission of the multiple light emission and the number of controlled slave flash devices. For example, in the case of the one-lighting multiple light emission, the master flash device transmits the command 11, data of one byte of the amount of light emission and data of one byte of a combination of the frequency of light emission and the number of times of light emission, i.e., a total of three bytes. In the case of the two-lighting multiple light emission, the master flash device transmits the command 12, data of one byte of the amount of light emission for the group A, data of one byte of the amount of light emission for the group B, and data of one byte of a combination of the frequency of light emission and the number of times of light emission, i.e., a total of four bytes. In the case of the three-lighting multiple light emission, the master flash device transmits the command 13, data of one byte of the amount of light emission for the group A, data of one byte of the amount of light emission for the group B, data of one byte of the amount of light emission for the group C, and data of one byte of a combination of the frequency of light emission and the number of times of light emission, i.e., a total of five bytes. On the other hand, the slave flash device receives, from the master flash device, the communication for the main light emission, analyzes the received command, and makes preparation for the predetermined multiple light emission at the amount of light emission according to the designated light emission parameters and the set light emission group of the slave flash device itself.

At a step D112, the flow continues to wait for the mirrors to retreat from the optical path, and, upon completion of retreating of the mirrors, proceeds to a step D113.

At the step D113, after the main mirror 2 and the sub-mirror 25 have retreated form the photo-taking optical path, the camera drives the leading shutter blade to start an exposure operation.

At a step D114, since the multiple light emission is the flash light emission mode, after the leading shutter blade is driven, the master flash device waits for the X contact to be turned on in response to the full opening of the leading shutter blade.

At a step D115, a check is made for the light emission mode of the master flash device. If the light emission mode of the master flash device is the master light emission mode, the flow branches to a step D116. If the light emission mode of the master flash device is the control-only mode, the flow branches to a step D117.

At the step D116, if the master flash device is in the master light emission mode, the master flash device makes multiple light emission at the amount of light emission and the frequency of light emission which are set at the master flash device itself and at the number of times of light emission obtained as described above.

At the step D117, if the master flash device is in the control-only mode, the master flash device generates a light emission start signal (pulse light emission of the Xe tube 19) for causing the slave flash device to begin light emission.

At a step D118, the slave flash device makes multiple light emission at the designated amount of light emission, the designated frequency of light emission and the designated number of times of light emission in synchronism with the light emission of the master flash device. When the light emission has been performed normally, the slave flash device displays at the liquid crystal display device 240 information on the main light emission. In the case of the multiple light emission mode, the designated amount of light emission, the designated number of times of light emission and the designated frequency of light emission are displayed at the indications 308, 309 and 310, respectively.

Accordingly, since a display on the slave flash device is made and updated when the main light emission has been preformed normally, it is possible to confirm the fact that the slave flash device has correctly received information from the master flash device and has made light emission.

At a step D119, after the lapse of a predetermined shutter opening time, the camera causes the trailing shutter blade to travel so as to end the exposure operation.

At a step D120, after completion of the exposure operation, the camera moves down the main mirror 2 and the sub-mirror 25 which have retreated from the photo-taking optical path, winds the film for one frame by using the motor control circuit 108 and the film travel Be detecting circuit 109, and ends the photo-taking operation.

Figure 71:
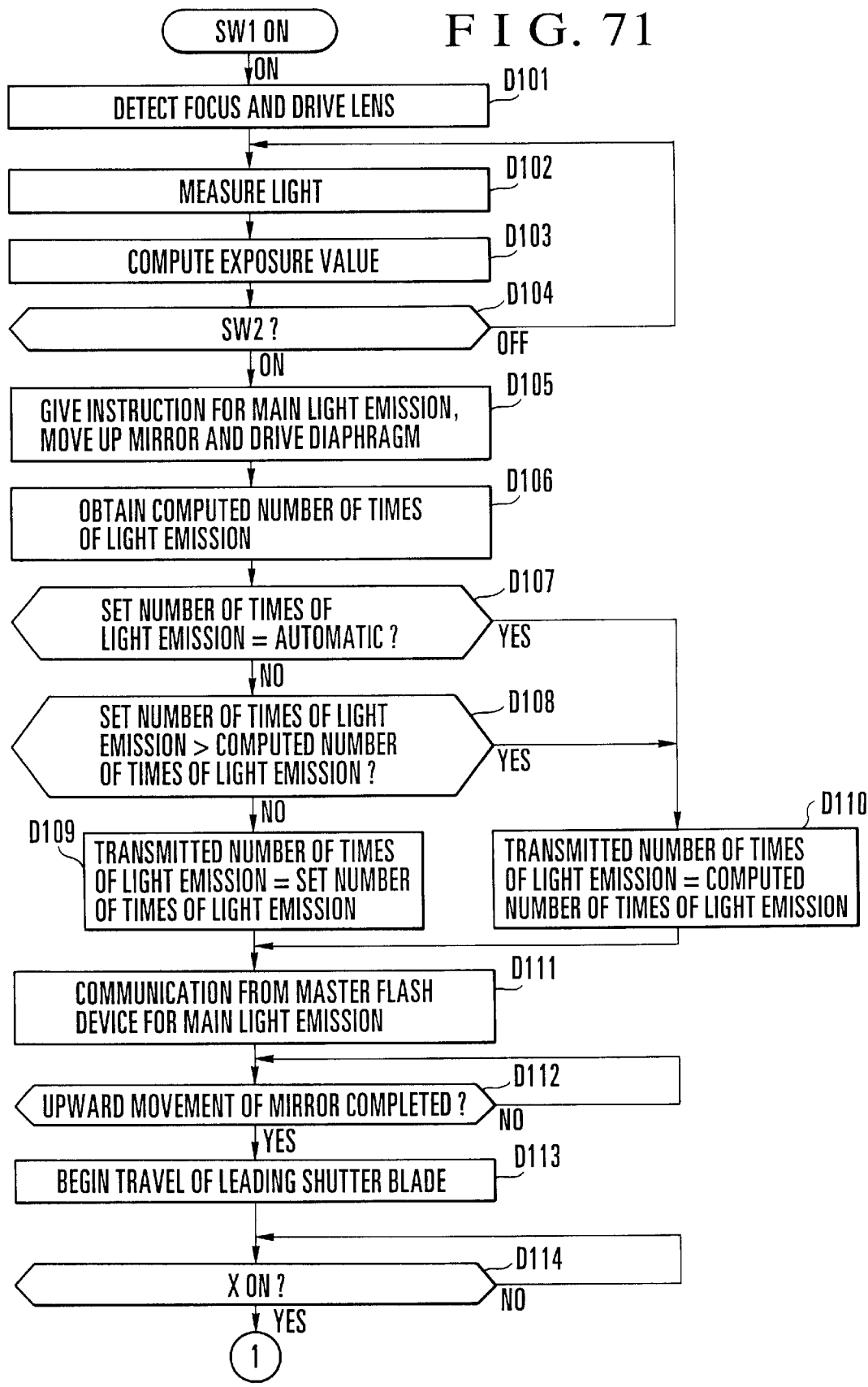
FIG. 71 is a flow chart for explaining the operations of a camera and flash devices in the eleventh embodiment.
Figure 72:
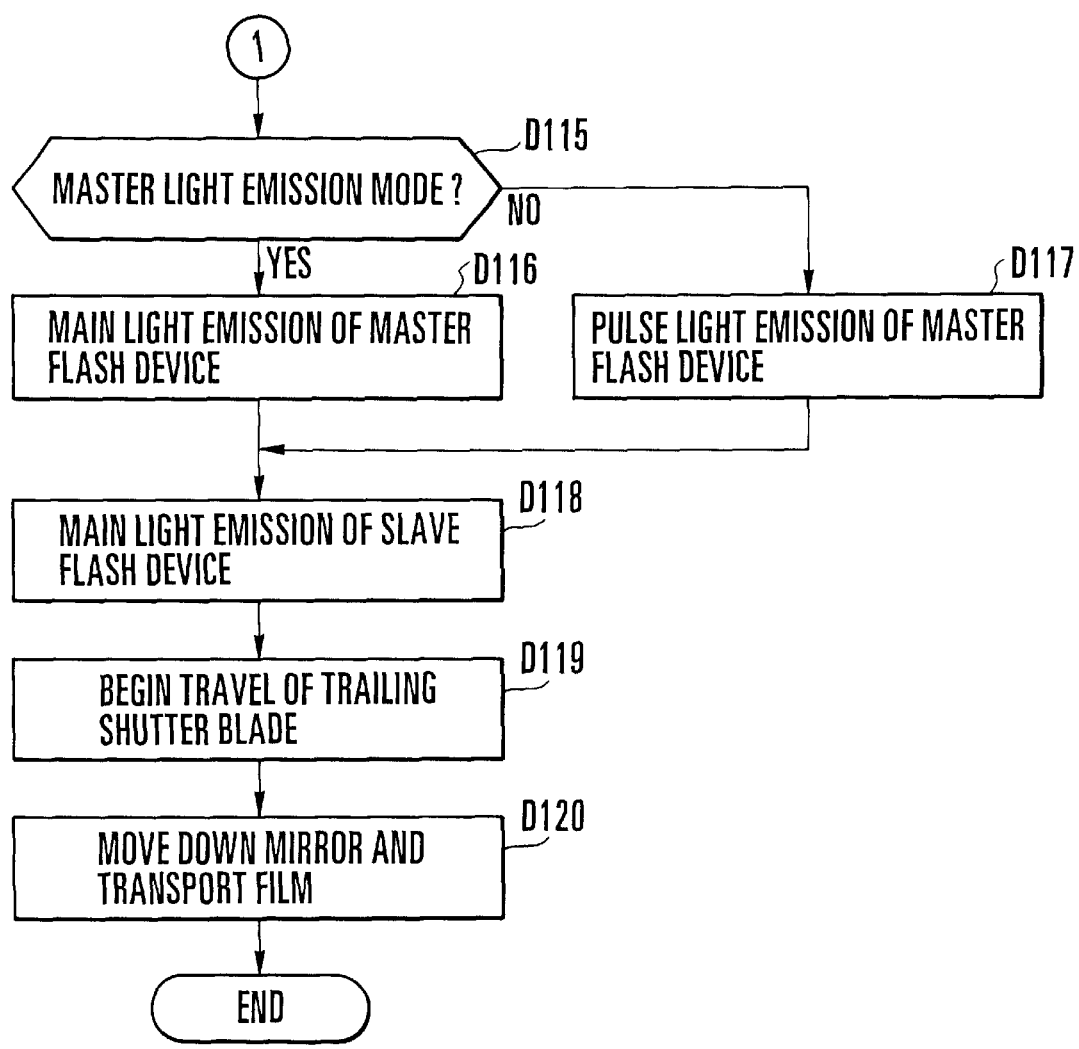
FIG. 72 is a flow chart for explaining the operations of the camera and the flash devices in the eleventh embodiment.
Figure 73:
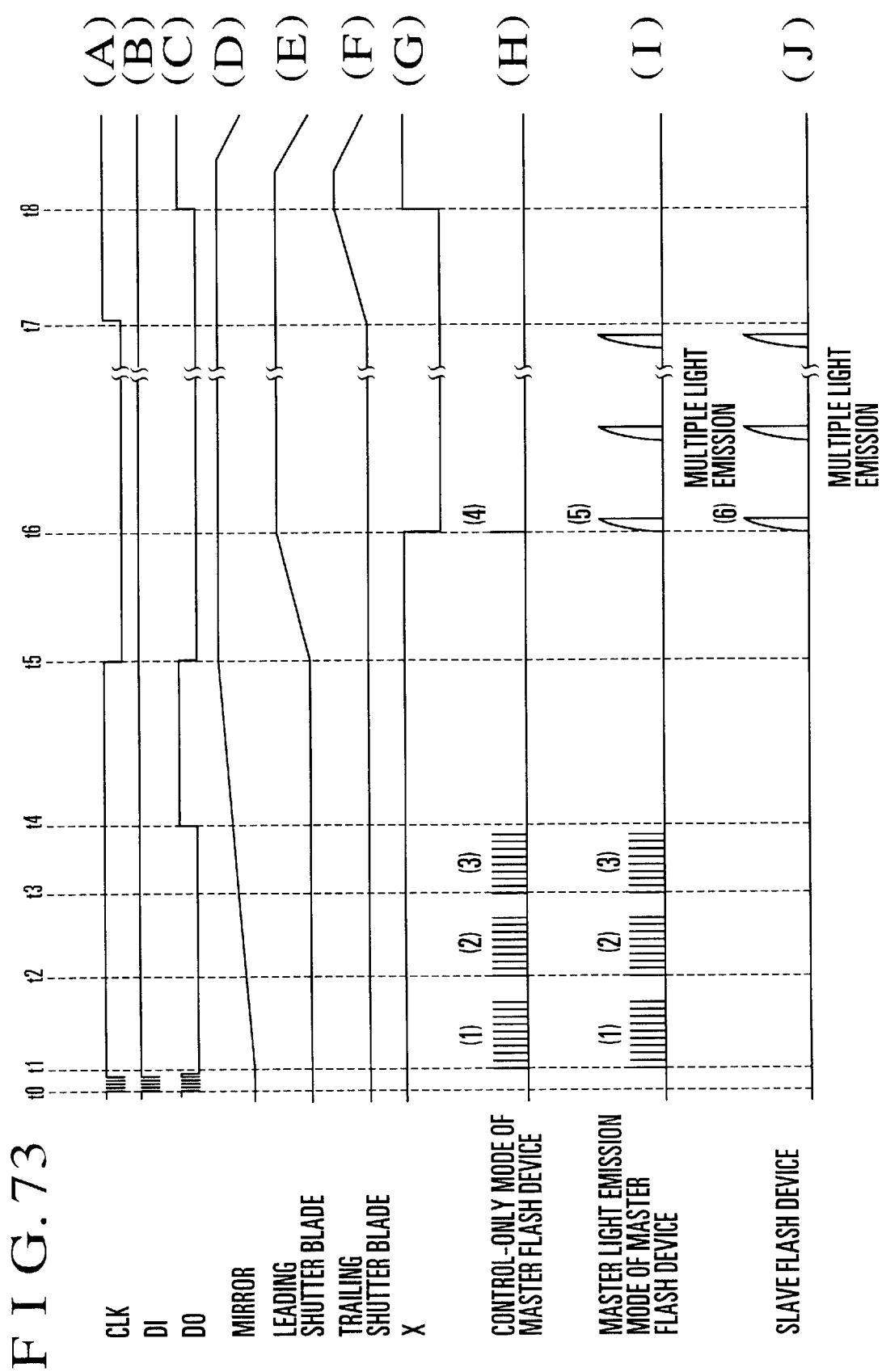
FIG. 73 is a timing chart for explaining the operations of the camera and the flash devices in the eleventh embodiment.

Next, the operation in the flow charts of FIGS. 71 and 72 is described by using FIG. 73, which is a timing chart showing the operation during the multiple light emission in the one-lighting mode (ratio-off).

In FIG. 73, signals indicated by parts (A) to (C) are the same as those shown in FIG. 70, and are, therefore, omitted from the description.

In FIG. 73, part (D) indicates the operation of the mirror 2 of the camera, in which the low level corresponds to the down-state of the mirror 2 and the high level corresponds to the up-state of the mirror 2, part (E) indicates the traveling state of the leading blade of the shutter 8 of the camera, part (F) indicates the traveling state of the trailing blade of the shutter 8 of the camera, in which the low level corresponds to the state before traveling and the high level corresponds to the state after traveling, and part (G) indicates the state of the X contact of the camera, in which the high level corresponds to the open state and the low level corresponds to the short-circuit state. The X contact is brought into the short-circuit state when the leading shutter blade has opened, and is brought into the open state when the travel of the trailing shutter blade has been completed.

Part (H) indicates a wireless communication waveform obtained when the master flash device is set to the control-only mode. Similarly, part (I) indicates a wireless communication waveform and a waveform of the main light emission obtained when the master flash device is set to the master light emission mode. Part (J) indicates a light emission waveform of the master flash device.

At a point of time t0, the camera transmits, to the master flash device by serial communication, the form of the main light emission (flash light emission) and the shutter speed. Further, the camera starts to move up the mirror so as to begin a photo-taking operation.

At a point of time t1, the master flash device MS causes the Xe tube 19 to emit pulse light (1), thereby transmitting the command 11 shown in FIG. 12.

At a point of time t2, similarly to the above, the master flash device MS transmits data (2) of the amount of light emission.

At a point of time t3, similarly to the above, the master flash device MS transmits data (3) of the frequency of light emission and the number of times of light emission.

At a point of time t4, after completion of the transmission, the master flash device brings the terminal Do back to the high level.

At a point of time t5, after completion of the up movement of the mirror, the camera causes the leading shutter blade to begin traveling, and brings the terminal CLK to the low level, thereby transmitting to the master flash device the fact that the leading shutter blade has begun traveling.

At a point of time t6, when the travel of the leading shutter blade has been completed, the X contact of the camera becomes conductive. In the case of the flash light emission mode, at this point of time t6, the master flash device generates a light emission start pulse (4) in the case of the control-only mode, or makes multiple light emission (5) under the light emission condition of the multiple light emission set at the master flash device in the case of the master light emission mode. The slave flash device also makes multiple light emission (6) under the light emission condition designated by the master flash device in synchronism with the light emission of the master flash device MS.

At a point of time t7, after a predetermined shutter time has elapsed, the camera causes the trailing shutter blade to begin traveling.

At a point of time t8, when the travel of the trailing shutter blade has been completed, the X contact of the camera becomes non-conductive. After that, the camera performs the operation including the winding of the film, the charging of the shutter and the down r movement of the mirror, thereby ending a series of processing.

Incidentally, each of the operations in the two-lighting multiple light emission mode and the three-lighting multiple light emission mode is the same as the above-described operation in the one-lighting multiple light emission mode, except that the communication information which the master flash device generates is the command 12, the amount of light emission for the group-A flash device, the amount of light emission for the group-B flash device, the frequency of light emission and the number of times of light emission in the case of the two-lighting multiple light emission mode or is the command 13, the amount of light emission for the group-A flash device, the amount of light emission for the group-B flash device, the amount of light emission for the group-C flash device, the frequency of light emission and the number of times of light emission in the case of the three-lighting multiple light emission mode. Therefore, the operations in the two-lighting multiple light emission mode and the three-lighting multiple light emission mod e are omitted from the illustration in timing chart and the description.

As described above, the eleventh embodiment has the following advantageous effects.

The wireless control device located on the camera side sets the frequency of light emission in the multiple light emission, computes the number of times of light emission on the basis of the shutter opening time set at the camera and the set frequency of light emission and transmits to the slave flash device flash-device control information including the frequency of light emission and the number of times of light emission. The slave flash device receives the flash-device control information to control light emission. Accordingly, without connecting the flash device to the camera with a communication cable, or without setting parameters, such as the frequency of light emission and the number of times of light emission, at the flash device located at a distance from the camera, it is possible to easily perform the wireless multiple light emission photo-taking. Further, even if, in the case of manually setting the number of times of light emission, the number of times of light emission would exceed the shutter opening time due to the setting error, it is possible to perform the wireless multiple light emission synchronized with the shutter opening time, by correcting the actual number of times of light emission to the number of times obtained by the above computation.

In a twelfth embodiment of the invention, the hardware arrangement of which is the same as that of the eleventh embodiment, the number of times of light emission in the multiple light emission of the slave flash device is not obtained from the shutter opening time and the frequency of light emission, but is obtained in the following way. The camera transmits only the amount of light emission per emission and the frequency of light emission to the slave flash device, and the multiple light emission of the slave flash device is stopped by receiving a light emission stop signal from the camera upon completion of the exposure operation.

This way has an advantage that it is possible to cope with the case where the shutter opening time is not beforehand known, for example, the case of a bulb photo-taking operation.

First, light emitting operations of the camera and the flash device during the wireless communication photo-taking operation according to the twelfth embodiment are described with reference to the flow charts of FIGS. 74 and 75.

At a step D201, when the operation of the camera is started and the light-measurement and distance-measurement start switch SW1 is turned on, the camera causes the focus detecting circuit 105 to perform a focus detecting operation using a known phase-difference detection method, and instructs the lens microcomputer 112 to drive the focusing lens so as to adjust focus.

At a step D202, the camera causes the light measuring circuit 106 to measure an object luminance value Bv under natural light.

At a step D203, the camera decides an apposite exposure amount EvS (=Tv+Av) from the object luminance value and the film sensitivity, and decides a shutter speed and an aperture value according to a set exposure mode.

At a step D204, a check is made to find if the release start switch SW2 is turned on. If so, the flow proceeds to a step D205. If not, the flow returns to the step D202 to repeat the above process.

At a step D205, the camera communicates main light emission information (the flash light emission mode and the control shutter speed) to the master flash device MS, and, after completion of the instruction for the main light emission to the master flash device, moves up the main mirror 2 and the sub-mirror 25 to cause them to retreat from a photo-taking optical path for the purpose of making preparation for exposure, and, at the same time, instructs the lens microcomputer 112 to drive the diaphragm.

At a step D206, the master flash device communicates, to the slave flash device, in the same way as in the wireless light emission transmission, the command and data shown in FIG. 12, on the basis of the received information of the shutter speed, the parameters (the frequency of light emission and the amount of light emission per emission of the multiple light emission) set at the master flash device and the number of controlled slave flash devices.

For example, in the case of the one-lighting multiple light emission, the master flash device transmits the command 11, data of one byte of the amount of light emission and data of one byte of a combination of the frequency of light emission and the number of times of light emission, i.e., a total of three bytes. Further, in the twelfth embodiment, the light emission command and the transmission data, which are described in the eleventh embodiment, are set such that when the parameter for the number of times of light emission is set to "0", the multiple light emission is ended by the light emission stop signal.

On the other hand, the slave flash device receives, from the master flash device, the communication for the main light emission, analyzes the received command, and makes preparation for the predetermined multiple light emission at the designated light emission parameters.

At a step D207, the flow continues to wait for the mirrors to retreat from the optical path, and, upon completion of retreating of the mirrors, proceeds to a step D208.

At the step D208, after the main mirror 2 and the sub-mirror 25 have retreated form the photo-taking optical path, the camera drives the leading shutter blade to start an exposure operation.

At a step D209, since the multiple light emission is the flash light emission mode, after the leading shutter blade is driven, the master flash device waits for the X contact to be turned on in response to the full opening of the leading shutter blade.

At a step D210, a check is made for the light emission mode of the master flash device. If the light emission mode of the master flash device is the master light emission mode, the flow branches to a step D211. If the light emission mode of the master flash device is the control-only mode, the flow branches to a step D212.

At the step D211, if the master flash device is in the master light emission mode, the master flash device makes multiple light emission at the amount of light emission and the frequency of light emission which are set at the master flash device itself.

At the step D212, if the master flash device is in the control-only mode, the master flash device generates a light emission start signal (pulse light emission of the Xe tube 19) for causing the slave flash device to begin light emission.

At a step D213, the slave flash device makes multiple light emission at the designated amount of light emission and the designated frequency of light emission in synchronism with the light emission of the master flash device.

At a step D214, after the lapse of a predetermined shutter opening time, the camera causes the trailing shutter blade to travel and brings the terminal CLK back to the high level so as to end the exposure operation.

At a step D215, upon detection of the high level of the terminal CLK, the master flash device emits a light emission stop pulse.

Incidentally, the timing of emission of the light emission stop pulse is such that the emission is made at a point in a period during which no multiple light emission is made, i.e., at a point between one emission and the next emission, upon detection of the timing of the multiple light emission by the master flash device itself. However, the light emission of the slave flash device may be monitored by the light receiving sensor 256 of the master flash device (the flash device set to the master mode) so as to generate the light emission stop pulse at a point in a period during which no multiple light emission is made.

Further, the light emission stop pulse almost may be generated after completion of the travel of the trailing shutter blade. However, since, in some cases, there is a possibility that a slit exposure occurs, it is preferred that the light emission stop pulse is generated immediately after the start of travel of the trailing shutter blade.

At a step D216, upon receiving the light emission stop signal emitted at the step D215, the slave flash device ends light emission. When the light emission has been performed normally, the slave flash device displays at the liquid crystal display device 240 information on the main light emission. In the case of the multiple light emission mode, the designated amount of light emission, the designated number of times of light emission and the designated frequency of light emission are displayed at the indications 308, 309 and 310, respectively.

Accordingly, since a display on the slave flash device is made and updated when the main light emission has been preformed normally, it is possible to confirm the fact that the slave flash device has correctly received information from the master flash device and has made light emission. In the case of the twelfth embodiment, since the number of times of light emission is made not to be transmitted, the number-of-times-of-light-emission indication 309 becomes "--" as shown in FIG. 69(h). Further, in a case where the light emission stop signal can not be received from the master flash device, the slave flash device ends light emission at a predetermined number of times, for the purpose of ensuring stability.

At a step D217, after completion of the exposure operation, the camera moves down the main mirror 2 and the sub-mirror 25 which have retreated from the photo-taking optical path, winds the film for one frame by using the motor control circuit 108 and the film travel detecting circuit 109, and ends the photo-taking operation.

Figure 74:
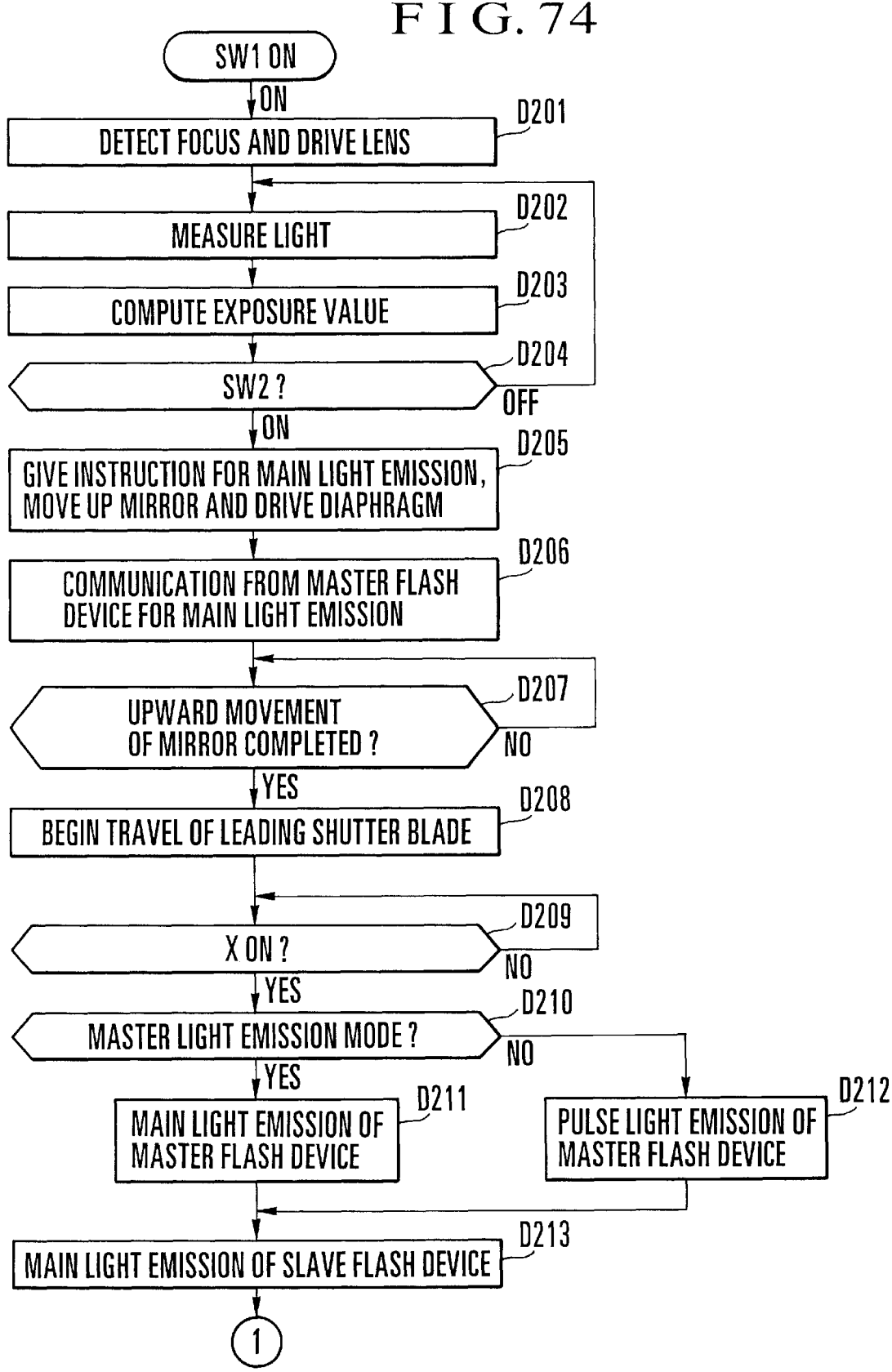
FIG. 74 is a flow chart for explaining the operations of a camera and flash devices in a twelfth embodiment of the invention.
Figure 75:
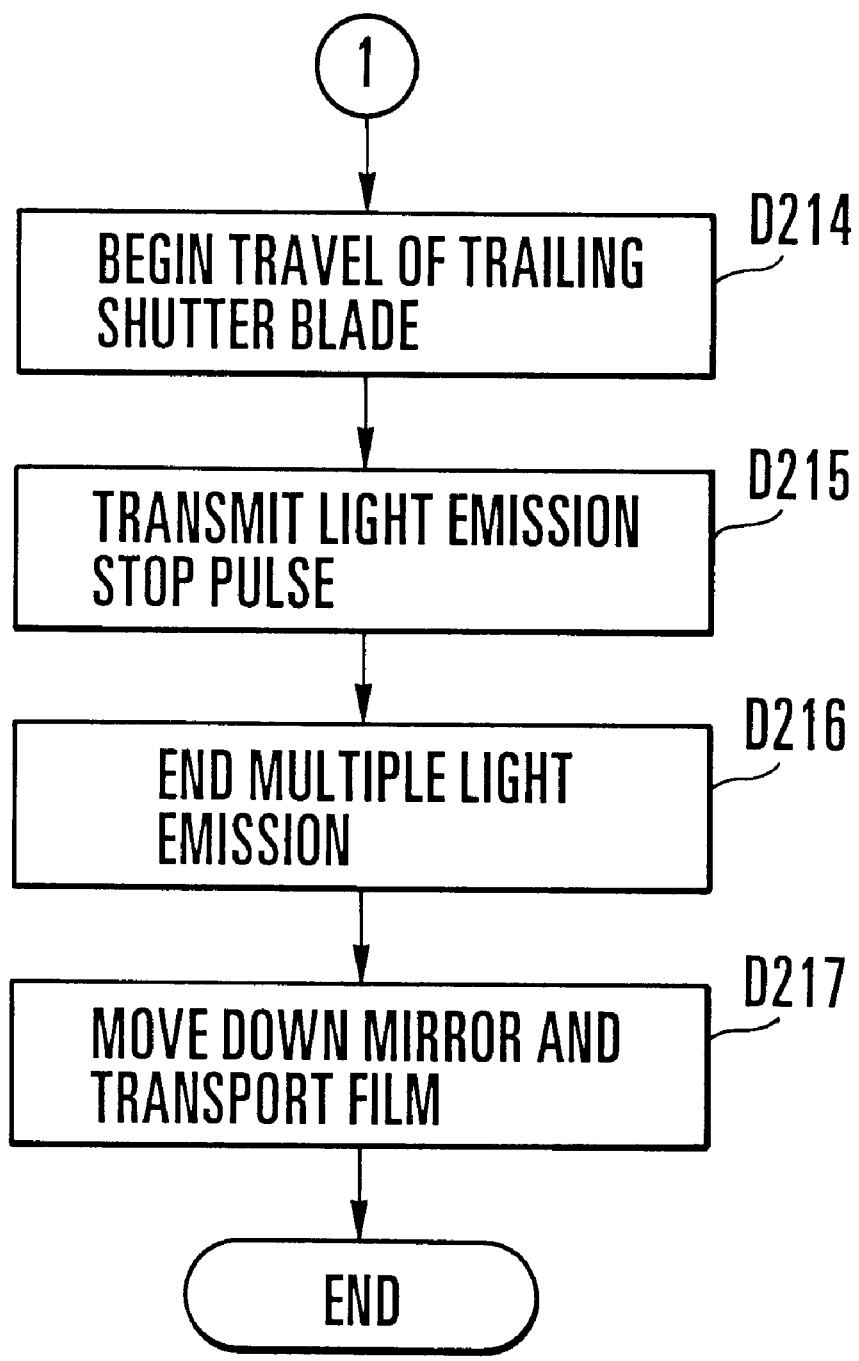
FIG. 75 is a flow chart for explaining the operations of the camera and the flash devices in the twelfth embodiment.
Figure 76:
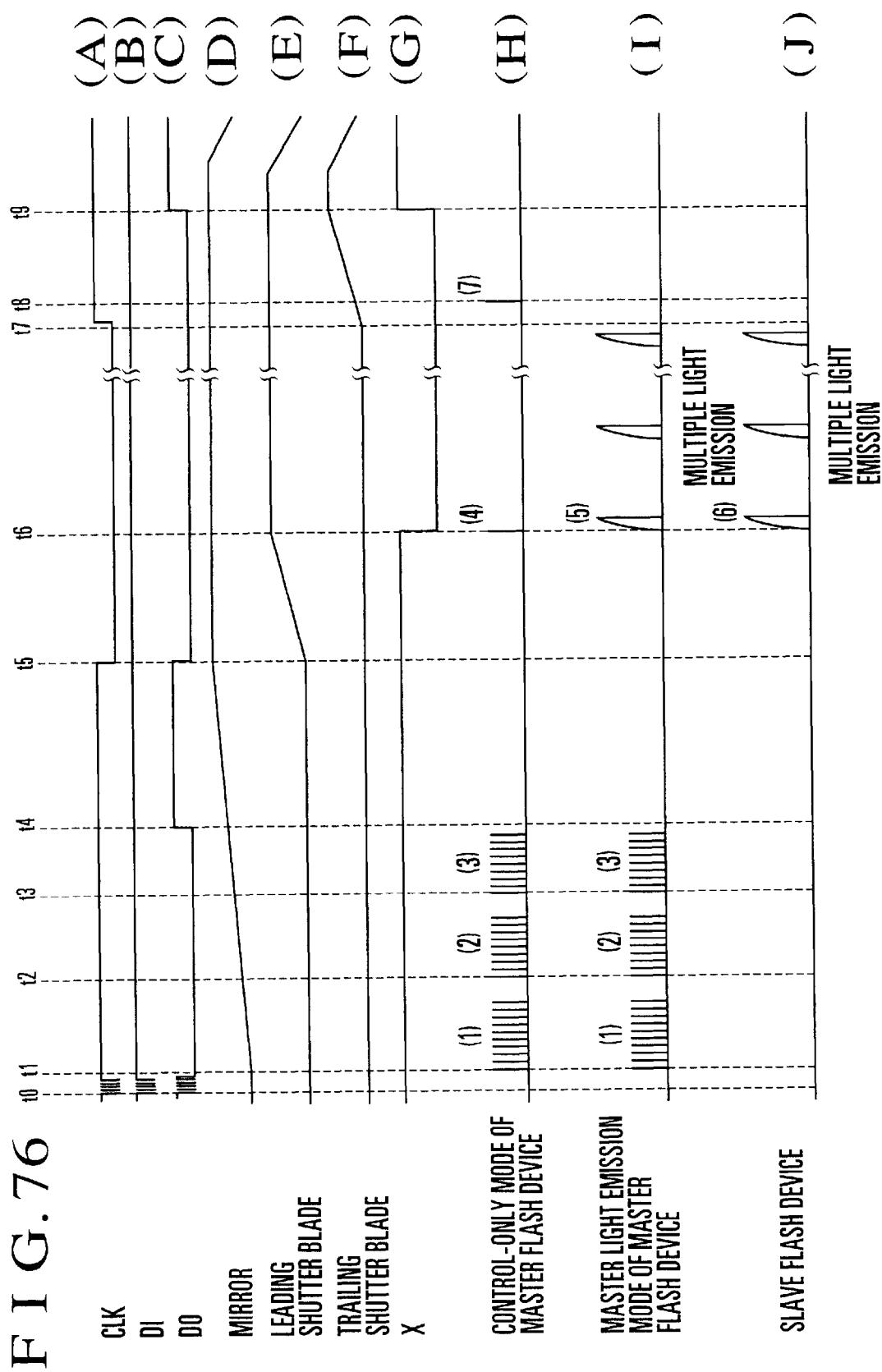
FIG. 76 is a timing chart for explaining the operations of the camera and the flash devices in the twelfth embodiment.

Next, the operation in the flow charts of FIGS. 74 and 75 is described by using FIG. 76, which is a timing chart showing the operation during the multiple light emission in the one-lighting mode (ratio-off).

In FIG. 76, signals indicated by parts (A) to (J) are the same as those shown in FIG. 73, and are, therefore, omitted from the description.

At a point of time t0, the camera transmits, to the master flash device by serial communication, the form of the main light emission (flash light emission) and the shutter speed. Further, the camera starts to move up the mirror so as to begin a photo-taking operation.

At a point of time t1, the master flash device MS causes the Xe tube 19 to emit pulse light (1), thereby transmitting the command 11 shown in FIG. 12.

At a point of time t2, similarly to the above, the master flash device MS transmits data (2) of the amount of light emission.

At a point of time t3, similarly to the above, the master flash device MS transmits data (3) of the frequency of light emission and the number of times of light emission.

At a point of time t4, after completion of the transmission, the master flash device brings the terminal DO back to the high level.

At a point of time t5, after completion of the up movement of the mirror, the camera causes the leading shutter blade to begin traveling, and brings the terminal CLK to the low level, thereby transmitting to the master flash device the fact that the leading shutter blade has begun traveling.

At a point of time t6, when the travel of the leading shutter blade has been completed, the X contact of the camera becomes conductive. The master flash device generates a light emission start pulse (4) in the case of the control-only mode, or makes multiple light emission (5) under the light emission condition of the multiple light emission set at the master flash device in the case of the master light emission mode. The slave flash device also makes multiple light emission (6) under the light emission condition designated by the master flash device in synchronism with the light emission of the master flash device MS.

At a point of time t7, after a predetermined shutter time has elapsed, the camera causes the trailing shutter blade to begin traveling and brings the terminal CLK back to the high level.

At a point of time t8, upon detection of the high level of the terminal CLK, the master flash device generates a light emission stop pulse (7) at a point in a period between one emission and the next emission of the multiple light emission of the slave flash device in synchronism with a multiple light emission timer incorporated in the master flash device. On the other hand, upon detection of generation of the light emission stop pulse from the output of the light receiving sensor 256, the slave flash device ends multiple light emission.

At a point of time t9, when the travel of the trailing shutter blade has been completed, the X contact of the camera becomes non-conductive. After that, the camera performs the operation including the winding of the film, the charging of the shutter and the down movement of the mirror, thereby ending a series of processing.

Incidentally, each of the operations in the two-lighting multiple light emission mode and the three-lighting multiple light emission mode is the same as the above-described operation in the one-lighting multiple light emission mode, except for the data code and the length of data shown in FIG. 12. Therefore, the operations in the two-lighting multiple light emission mode and the three-lighting multiple light emission mode are omitted from the illustration in timing chart and the description.

As described above, the twelfth embodiment has the following advantageous effects.

The wireless control device located on the camera side transmits to the slave flash device flash-device control information including the frequency of light emission and the amount of light emission per emission of the multiple light emission. The slave flash device receives the flash-device control information to control light emission. Then, the wireless control device located on the camera side detects the end of the exposure operation upon the travel of the trailing shutter blade and transmits the light emission stop signal to the slave flash device. The slave flash device detects the light emission stop signal and ends multiple light emission. Accordingly, without connecting the flash device to the camera with a communication cable, or without setting parameters, such as the frequency of light emission and the number of times of light emission, at the flash device located at a distance from the camera, it is possible to easily perform the wireless multiple light emission photo-taking.

Further, it is possible to cope with the case where the shutter opening time is not beforehand known, for example, the case of a bulb photo-taking operation.

A thirteenth embodiment of the invention is an example in which the same processing as in the eleventh and twelfth embodiments is performed by using a flash device incorporated in a camera.

The structural arrangement of a camera and a built-in flash device in the thirteenth embodiment is the same as that in the second embodiment.

Figure 77:
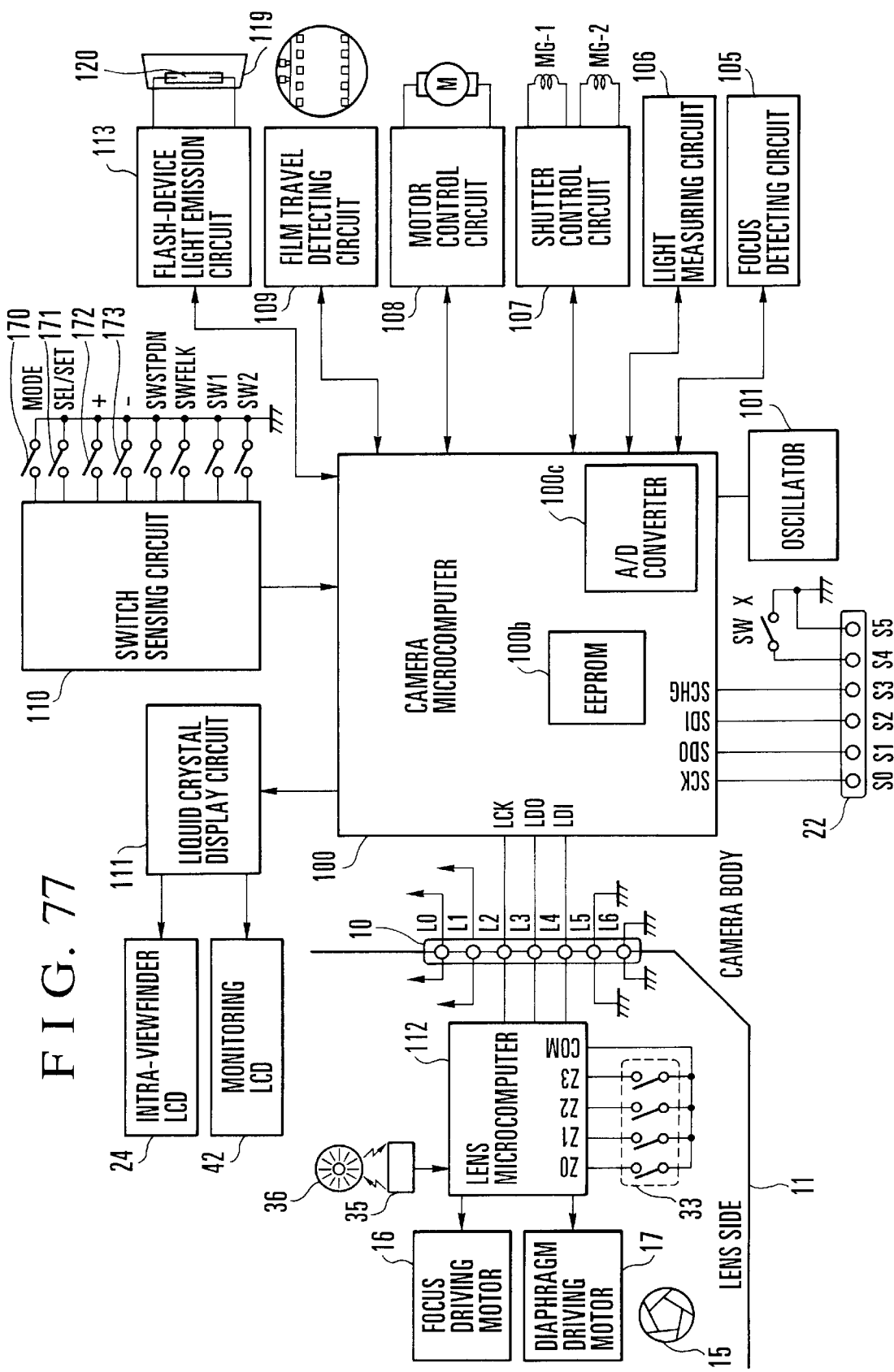
FIG. 77 is a block diagram showing the circuit arrangement of a camera and a lens according to a thirteenth embodiment of the invention.

FIG. 77 is a block diagram showing the circuit arrangement of the camera in the thirteenth embodiment. In FIG. 77, parts similar to those in FIG. 28 are denoted by the same reference numerals as in FIG. 28.

The characteristic arrangement in FIG. 77, which differs from that in FIG. 28, is described below.

In FIG. 77, reference numeral 170 denotes a mode switch (MODE) arranged to select a light emission mode of the built-in flash device and having the same function as that of the mode switch 248 of the external flash device. Reference numeral 171 denotes a selection switch (SEL) arranged to select setting parameters of the built-in flash device and having the same function as that of the selection switch 249 of the external flash device. Reference numeral 172 denotes an up switch arranged to increase the setting parameters of the built-in flash device and having the same function as that of the switch 250 of the external flash device. Reference numeral 173 denotes a down switch arranged to decrease the setting parameters of the built-in flash device and having the same function as that of the switch 251 of the external flash device.

In the thirteenth embodiment, the flash device incorporated in the camera (built-in flash device) generates a wireless light signal for controlling the slave flash device, as in the eleventh embodiment, to transmit control information to the slave flash device, which is located at a distance from the camera, so that it is possible to perform the wireless slave-flash-device photo-taking operation. Examples of displays on the monitoring LCD 42 of the camera during the wireless communication mode in the thirteenth embodiment are the same as those shown in FIGS. 31(*a*) to 31(*c*).

The operation in the thirteenth embodiment is essentially the same as that in each of the eleventh and twelfth embodiments except that the operation of the external flash device set to the master mode in each of the eleventh and twelfth embodiments is replaced with the control operation of the camera microcomputer 100 on the Xe tube 120 of the built-in flash device, and is, therefore, omitted from the description. Further, it goes without saying that the advantageous effect of the thirteenth embodiment is the same as that of each of the eleventh and twelfth embodiments.

Figure 78:
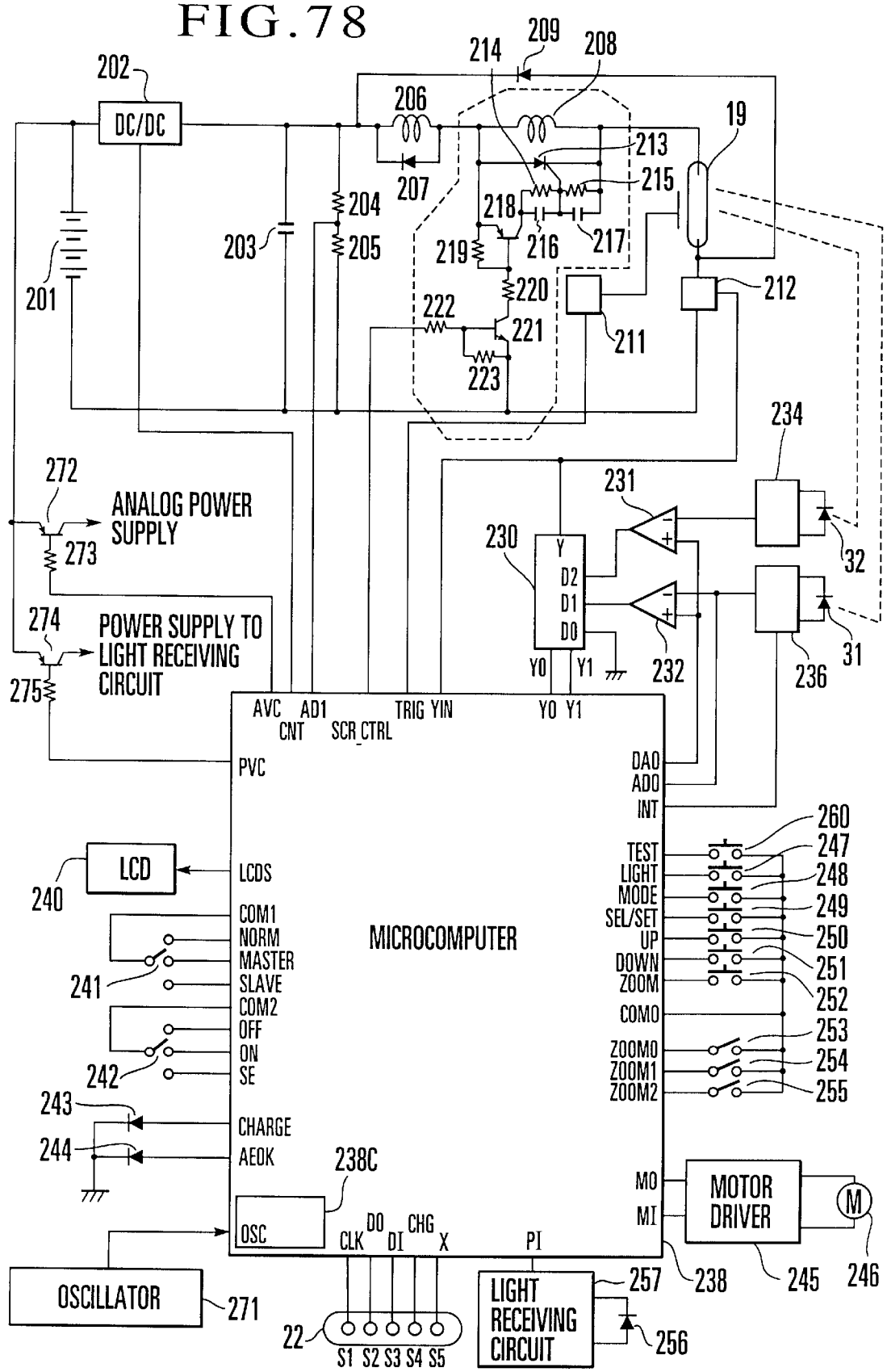
FIG. 78 is a block diagram showing the circuit arrangement of a flash device according to a fourteenth embodiment of the invention.

FIG. 78 is a block diagram showing the circuit arrangement of a wireless flash system according to a fourteenth embodiment of the invention. In FIG. 78, parts similar to those in the first embodiment shown in FIG. 3 are denoted by the same reference numerals as those in FIG. 3. Only points different from the arrangement of the first embodiment shown in FIG. 3 are described below.

In FIG. 78, reference numeral 271 denotes an oscillator, such as a known ceramic vibrator or crystal oscillator, arranged to supply an operation clock signal to the microcomputer 238. Upon receipt of the operation clock signal, an oscillation control circuit 238C disposed inside the microcomputer 238 supplies operation clock signals to the various parts of the microcomputer 238. The oscillation control circuit 238C, when dividing the frequency of the inputted operation clock signal to supply the frequency-divided clock signals to the various parts of the microcomputer 238, can vary the frequency-dividing ratio according to a program. Accordingly, the microcomputer 238 can select one of a high-speed mode having no frequency division and a low-speed mode having frequency-dividing ratios of 1/64, 1/256 and 1/1024. When the microcomputer 238 is set to the low-speed mode, the consumption of electric current of the microcomputer 238 can be extremely reduced according to the frequency-dividing ratio.

Reference numeral 272 denotes a transistor arranged to control the supply of electric power to analog circuits (operation circuit parts), such as the light measuring circuit 234, the light measuring integration circuit 236, the comparators 231 and 232, the data selector 230 and the motor driver 245.

Reference numeral 273 denotes a base resistor, reference numeral 274 denotes a transistor arranged to control the supply of electric power to the light receiving circuit 257 for wireless communication, and reference numeral 274 denotes a base resistor.

The terminals of the microcomputer 238 include, in addition to the above-mentioned terminals, an input terminal TEST for the test light emission switch 260, an operation clock input terminal OSC for the oscillation circuit 271, a control terminal AVC for controlling the supply of power to analog circuits, and a control terminal PVC for controlling the supply of power to the wireless light receiving parts.

The appearance of the flash device in the fourteenth embodiment is the same as that shown in FIGS. 54(*a*) and 54(*b*).

Next, examples of displays on the liquid crystal display device 240 provided on the back side of the flash device are described.

FIGS. 79(*a*) to 79(*d*) show the examples of displays of the liquid crystal display device 240 of the flash device at the time of the one-lighting wireless photo-taking operation. FIG. 79(*a*) shows the example of display in a case where the flash device is set to the normal mode, FIG. 79(*b*) shows the example of display in a case where the flash device is set to the wireless master mode, FIG. 79(*c*) shows the example of display in a case where the flash device is set to the wireless slave mode, and FIG. 79(*d*) shows the example of display in a case where the flash device is set, during the slave mode, to an SE (save energy) mode in which the operation of the boosting circuit is stopped while supplying power to the light receiving circuit.

In FIGS. 79(a) to 79(d), reference numeral 301 denotes a light emission mode indication of the flash device. In the case of the normal mode shown in FIG. 79(a) or the master mode shown in FIG. 79(b), one of the automatic light control mode (ETTL), the manual light emission mode (M) and the multiple light emission mode (MULTI) is selected and displayed according to the light emission mode.

Figure 79A:
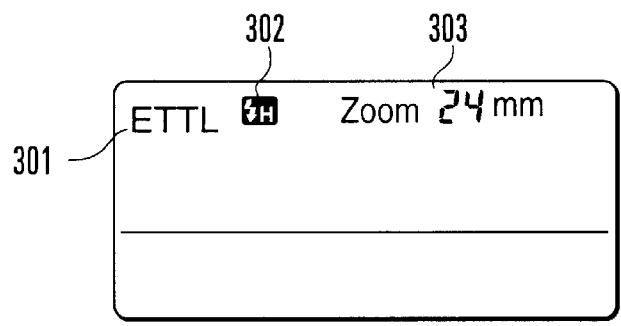
FIGS. 79(a) to 79(d) are diagrams showing examples of displays made on a display part of the flash device in the fourteenth embodiment.
Figure 79B:
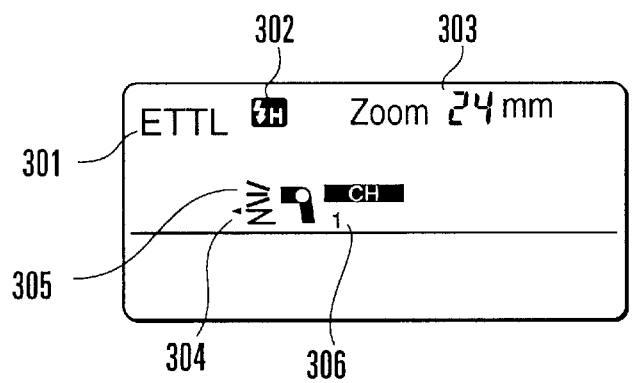
Figure 79C:
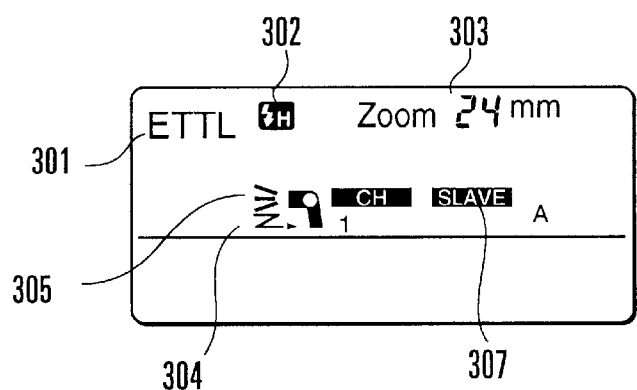

On the other hand, in the case of the slave mode shown in FIG. 79(c), the light emission mode designated by the master flash device is displayed.

Reference numeral 302 denotes an indication icon indicative of the setting of the flat light emission mode. The indication icon 302 is displayed when the flat light emission is enabled at the time of the normal mode or the master mode, and is displayed when an instruction for the flat light emission is received from the master flash device at the time of the slave mode.

Reference numeral 303 denotes a zoom indication indicative of the set zoom position. Reference numerals 304 and 305 denote icons indicative of the wireless communication mode. In the case of the master mode shown in FIG. 79(b), the icon 304 has an outward indication, and, in the case of the slave mode shown in FIG. 79(c), the icon 304 has an inward indication.

Reference numeral 306 denotes a channel indication, by which the set channel is indicated so as to prevent communication interference in a case where the flash system is used by a plurality of photographers.

Reference numeral 307 denotes a slave mode indication which is displayed when the slave mode is selected. Adjacent to the slave mode indication 307, one of three letters "A", "B" and "C" is displayed to indicate the selection of a group in the multi-lighting light emission.

Reference numeral 308 denotes an indication indicative of the save energy mode.

The manner of the wireless communication between the master flash device MS and the slave flash device SS and the circuit arrangement of the camera are the same as those in the first embodiment.

Further, typical commands for the wireless communication in the fourteenth embodiment are the same as the commands listed in the communication table shown in FIG. 55. In addition, the light emitting operation including the wireless communication light emitting operation is the same as that described in the first embodiment.

Next, the operation of the flash-device microcomputer 238 in a case where the flash device is set to the slave mode is described with reference to the flow chart of FIG. 80.

At a step E100, when the power supply is turned on, the microcomputer 238 initializes input and output ports.

At a step E101, the microcomputer 238 sets an operation clock mode thereof to the high-speed clock mode, and initializes and starts an inner timer (timer 1) which counts the operation time of the flash device.

At a step E102, the microcomputer 238 sets the terminal AVC to the low level to make the transistor 272 conductive, thereby supplying power to the analog circuits.

At a step E103, the microcomputer 238 sets the terminal PVC to the low level to make the transistor 274 conductive, thereby supplying power to the wireless light receiving circuit 257.

At a step E104, the microcomputer 238 sets the terminal CNT to the low level to enable the operation of the boosting circuit 202.

At a step E105, the microcomputer 238 enables the generation of the wireless communication interrupt.

At a step E106, a check is made for the operation clock mode of the microcomputer 238. If the operation clock mode is the high-speed mode (normal operation state), the flow branches to a step E107. If the operation clock mode is the low-speed mode (SE operation mode), the flow branches to a step E116.

At a step E107, when the operation clock mode is the high-speed mode, a check is made to find if a count value of the inner timer 1 of the microcomputer 238, which counts the elapsed time of the high-speed mode, is not less than a first predetermined value (SE mode shifting time). If the count value is less than the first predetermined value, the flow branches to a step E108. If the count value is not less than the first predetermined value, the flow branches to a step E111. A condition for resetting the inner timer 1 is described later.

At the step E108, the microcomputer 238, which is in the normal operation state, controls the main capacitor 203 so as to have a predetermined voltage by setting the terminal CNT to the low level to operate the boosting circuit 202 if the voltage of the main capacitor 203 monitored at the input terminal Ad1 is lower than a predetermined voltage, or by setting the terminal CNT to the high level to stop the boosting circuit 202 if the voltage of the main capacitor 203 monitored at the input terminal Ad1 is higher than the predetermined voltage.

At a step E109, if the voltage of the main capacitor 203 monitored at the input terminal Ad1 is higher than the predetermined voltage, which enables the light emission of the flash device, the charging-completion LED 243 is turned on. If lower, the charging-completion LED 243 is put off.

At a step E110, the display shown in FIG. 79(c) is performed according to the state of the flash device.

At the step E111, when the timer 1 has reached the first predetermined value (SE mode shifting time), i.e., when the wireless information has not been received and the light emitting process has not been performed, the microcomputer 238 sets the terminal CNT to the high level (high impedance) to stop the operation of the boosting circuit 202.

At a step E112, the microcomputer 238 sets the terminal AVC to the high level (high impedance) to stop the supply of power to the analog circuits.

Figure 79D:
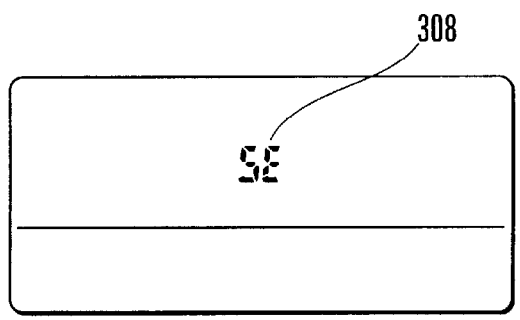

At a step E113, the display shown in FIG. 79(d) is performed to indicate that the microcomputer 238 has shifted to the SE mode. Further, the charging-completion LED 243 and the light-control confirmation LED 244 are put off.

At a step E114, the operation clock mode of the microcomputer 238 is set to the low-speed mode.

At a step E115, the inner timer 1 is reset and restarted so as to measure the elapsed time of the SE mode.

The above-described processing operation from the step E111 to the step E114 causes the flash device to come into the state in which electric power is supplied only to the microcomputer 238 and the light receiving circuit 256, and further causes the operation clock mode (normal operation mode) of the microcomputer 238 to shift to the low-speed mode (low-electric-power consumption mode in which the consumption of electric power is lower than in the normal operation mode), so that the entirety of the flash device comes into the state in which the consumption of electric power is extremely low.

At the step E116, on the other hand, when the operation of the flash device is in the SE mode, the timer 1, which measures the elapsed time of the SE mode, is monitored, and a check is made to find if a count value of the inner timer 1 is not less than a second predetermined value (SE mode ending time). If the count value is less than the second predetermined value, the flow returns to the step E106. If the count value is not less than the second predetermined value, the flow branches to a step E117.

At the step E117, when the light emission control signal has not been received for the second predetermined time after the shifting to the SE mode, the microcomputer 238 sets the terminal PCV to the high level (high impedance) to stop the supply of power to the light receiving circuit 257 for the purpose of performing a power turning-off process.

At a step E118, the LCD 240 is put off.

At a step E119, the operation clock signal to the microcomputer 238 is stopped and the consumption of electric power is cut off, so that the flash device stops its operation.

Figure 81:
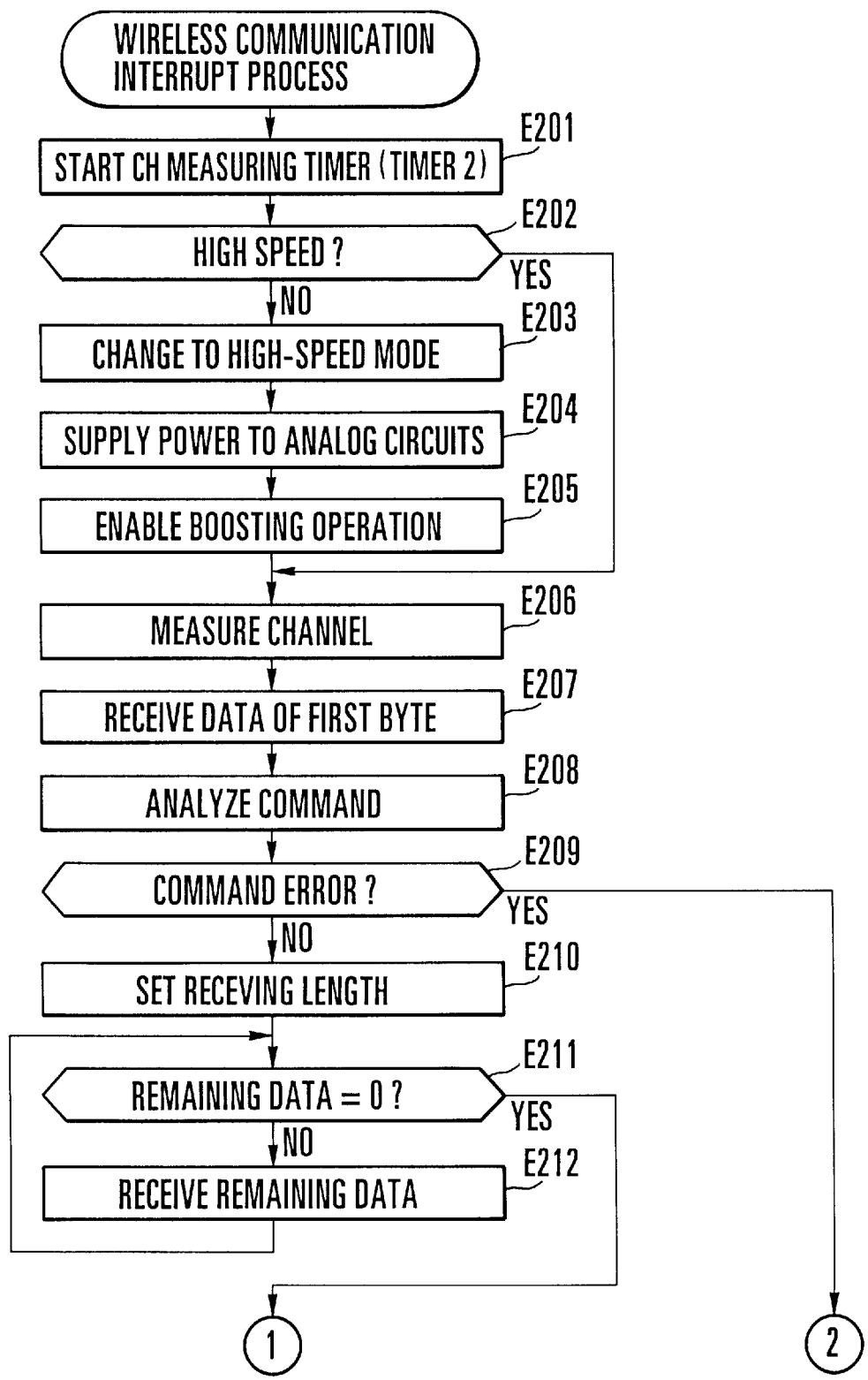
FIG. 81 is a flow chart for explaining the operation of the slave flash device at the time of receiving wireless communication signals in the fourteenth embodiment.
Figure 82:
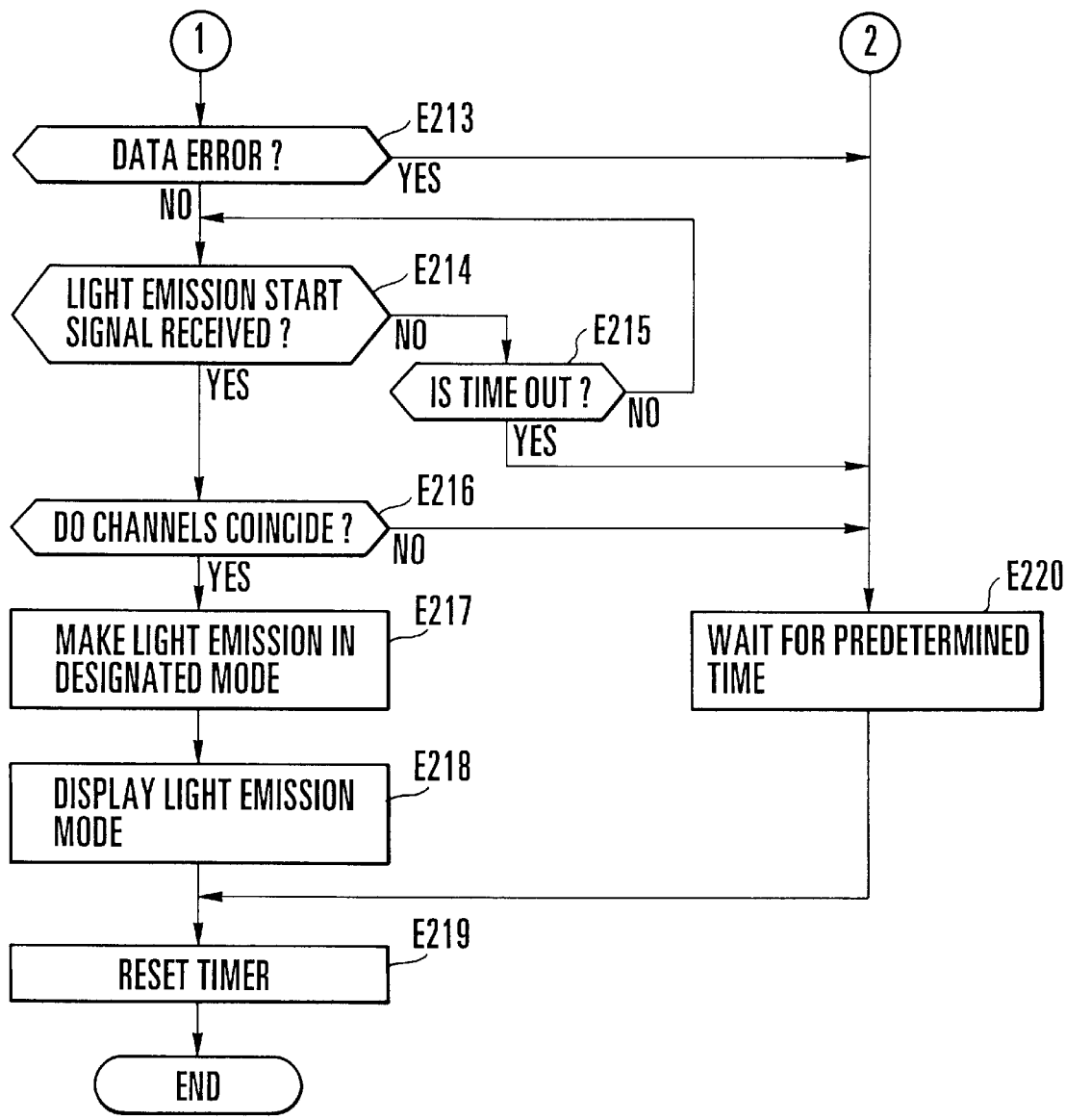
FIG. 82 is a flow chart, continued from FIG. 81, for explaining the operation of the slave flash device at the time of receiving wireless communication signals in the fourteenth embodiment.

Next, the processing operation of the flash device when having received the light emission control signal is described with reference to the flow charts of FIGS. 81 and 82.

When the slave flash device has received, at the photodiode 256 serving as a receiving means, the wireless information signal from the master flash device, the wireless information signal is amplified and filtered by the light receiving circuit 257. Accordingly, only a signal having a rapid rise, such as a light pulse, is inputted to the terminal PI of the microcomputer 238. When the first START pulse (the START pulse shown in the part (D) or (E) of FIG. 11) is inputted, the wireless communication interrupt is generated, so that the following processing operation is performed.

At a step E201, an inner timer 2 (CH measuring timer) of the microcomputer 238 is started to measure the interval for the discrimination signal.

At a step E202, a check is made for the operation clock mode of the microcomputer 238. If the operation clock mode is the high-speed mode (normal operation state), the flow branches to a step E206. If the operation clock mode is the low-speed mode (SE mode state), the flow branches to a step E203.

At the step E203, the operation clock mode of the microcomputer 238 is set to the high-speed mode.

At a step E204, the terminal AVC is set to the low level to turn off the transistor 272, thereby supplying electric power to the analog circuits.

At a step E205, the operation of the boosting circuit 202 is enabled and started.

At the step E206, when the channel discrimination pulse has been inputted, the CH measuring timer (timer 2), which has started at the step E201, is stopped. Then, a channel is discriminated by measuring the time interval from the START pulse to the channel discrimination pulse.

At a step E207, data of the first byte is received by sampling, at an equal interval, data pulses of the first byte subsequent to the channel discrimination pulse.

At a step E208, the microcomputer 238 analyzes data composed of pulses D7 to D0 received at the step E207 to find if the data coincides with a command listed in the command table shown in FIG. 55.

At a step E209, if the received data of the first byte does not coincide with a command listed in the command table shown in FIG. 55, it is determined that a command error occurs, and the flow branches to a step E220.

At a step E210, a receiving length for the remaining data to be received is set according to the received command.

At a step E211, if the remaining data to be received data is "0", the data receiving processing is ended, and the flow branches to a step E213.

At a step E212, similarly to the step E207, data subsequent to the START pulse of the remaining wireless communication is received.

At the step E213, a check is made to find if the received data is appropriate. If not, the flow branches to the step E220 without proceeding to the light emission processing.

At a step E214, a check is made to find if the light emission start signal (3) shown in the part (D) of FIG. 11 or the rise signal of the light emission (4) shown in the part (E) of FIG. 11 is received from the master flash device. If so, the flow proceeds to a step E216. If not, the flow branches to a step E215.

At the step E215, if the light emission start signal has not been received for a predetermined time, it is determined that the time is out, and the flow branches to the step E220. If the time is not yet out, the flow returns to the step E214.

At the step E216, if the channel measured at the step E206 does not coincide with the channel of the slave flash device, the flow branches to the step E220 without performing the light emission processing.

At a step E217, if the voltage of the main capacitor 203 is a value equal to or greater than a light-emission enabling voltage, a light emitting operation according to the received command and data is performed.

At a step E218, the state of the performed light emission (the form of light emission: flash light emission or flat light emission, the light emission mode: automatic light control, manual light emission or multiple light emission, and the light emission parameters: the amount of light emission, the number of times of light emission, the frequency of light emission, etc.) is displayed at the liquid crystal display device 240.

Figure 80:
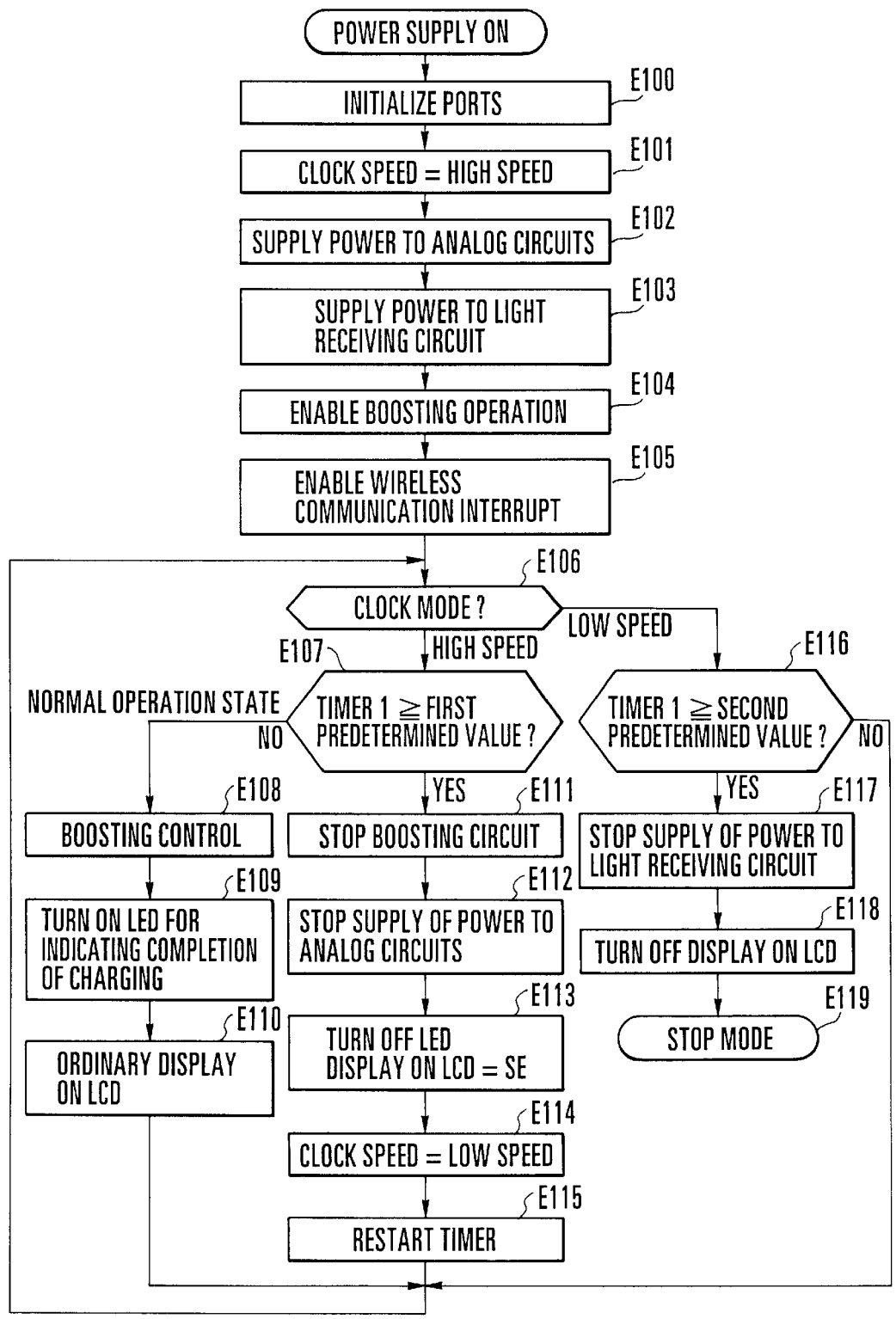
FIG. 80 is a flow chart for explaining the operation of a slave flash device in the fourteenth embodiment.

At a step E219, the timer 1, which is a timer for measuring the operation time of the flash device, as described in the flow chart of FIG. 80, is reset to "0".

At the step E220, in the case of occurrence of the command error or the data error, the flow waits for a predetermined time without performing the light emission processing. After that, the wireless communication interrupt processing is ended while waiting for receiving the next data.

Next, the operation of the inner timer 1 and the modes of the flash device described above are described with reference to the timing chart of FIG. 83.

Figure 83:
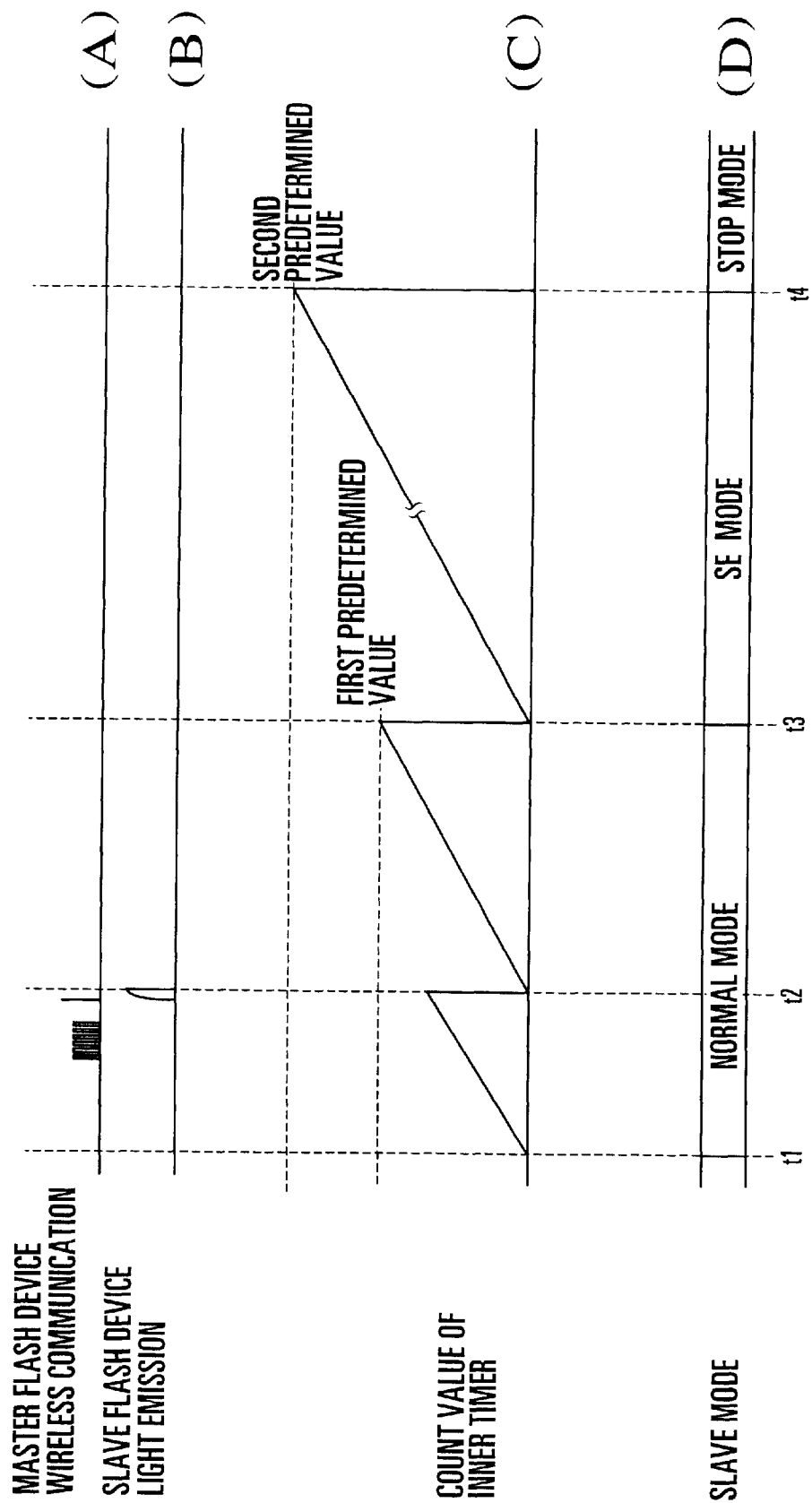
FIG. 83 is a timing chart for explaining the transition of modes of the slave flash device in the fourteenth embodiment.

In FIG. 83, part (A) indicates a wireless communication waveform of the flash device set to the master mode, part (B) indicates a light emission waveform of the flash device set to the slave mode, part (C) indicates the count state of the inner timer 1 of the microcomputer 238 when the flash device is set to the slave mode, and part (D) indicates the operation clock mode of the flash device set to the slave mode.

Referring to FIG. 83, when the power supply of the slave flash device is turned on at a point of time t1, the slave flash device is in the normal mode in which all the circuits including the boosting circuit are operative, as described above, and the inner timer 1 of the microcomputer 238 increases a count value according to elapsed time.

When the wireless communication is received from the master flash device at a point of time t2, the slave flash device makes light emission under the light emission condition designated by the master flash device, and the inner timer 1 is reset to "0".

After that, the inner timer 1 increases a count value according to elapsed time. When the inner timer 1 has reached a first predetermined count value, at a point of time t3, the oscillation circuit is stopped, as described above, so that the supply of electric power to the analog circuits other than the light receiving circuit is stopped, and the operation mode of the microcomputer 238 is shifted to the SE mode with the operation clock mode changed to the low-speed mode. Incidentally, in a case where the wireless communication form the master flash device to the slave flash device has been performed during the SE mode, the operation clock mode of the microcomputer 238 is returned to the high-speed mode and the operation of the oscillation circuit is started, as described above, so that electric power is supplied to the analog circuits and the slave flash device returns to the normal mode which is obtained at the point of time t1 in FIG. 83 with the inner timer 1 being reset. In this instance, if the voltage of the main capacitor 203 is a value equal to or greater than the light-emission enabling voltage, the light emission having the light emission condition designated by the master flash device is made.

On the other hand, if the wireless communication from the master flash device has not been received, at a point of time t4 at which the inner timer 1 has reached a second predetermined count value, the supply of power to the light receiving circuit is also stopped, as described above, and the microcomputer 238 comes into the stop state in which the operation clock signal is stopped.

Next, the method of setting the time after the lapse of which the microcomputer is shifted to the SE mode and the method of setting the time after the lapse of which the power supply is shut off since the microcomputer is shifted to the SE mode are described.

Figure 84A:
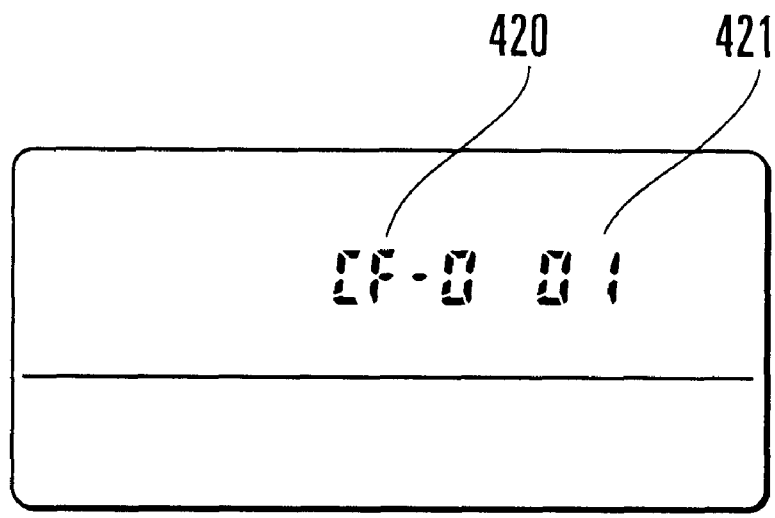
FIGS. 84(a) and 84(b) are diagrams for explaining examples of displays made on a display part of the flash device in the fourteenth embodiment.
Figure 84B:
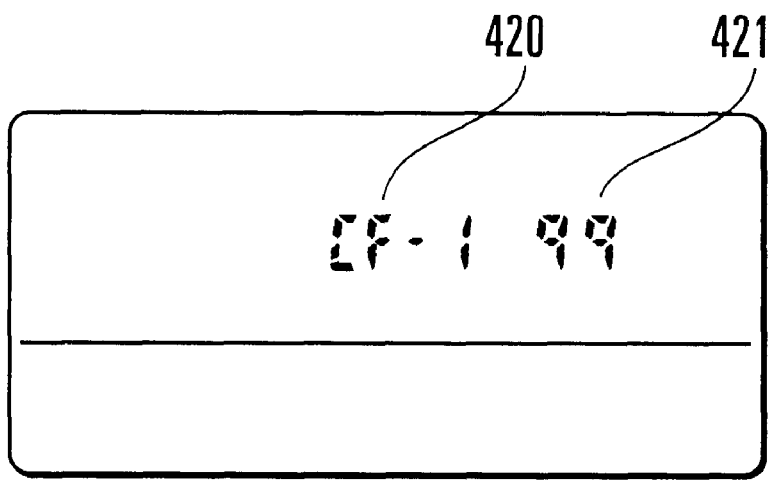

FIGS. 84(a) and 84(b) are diagrams showing examples of displays on the liquid crystal display device 240. FIG. 84(a) shows a setting picture for setting the time after the lapse of which the microcomputer is shifted to the SE mode, and FIG. 84(b) shows a setting picture for setting the time after the lapse of which the power supply is shut off since the microcomputer is shifted to the SE mode.

In FIGS. 84(a) and 84(b), reference numeral 420 denotes an indication indicative of a custom function "CF-0" or "CF-1", which is a mode for enabling the photographer to individually set the various functions of the flash device. When an illumination switch 247 shown in FIG. 78 is kept pressed for a predetermined time, the display on the liquid crystal display device 240 becomes a custom function setting picture.

In the fourteenth embodiment, the custom function "CF-0" is the mode for setting the time after the lapse of which the microcomputer is shifted to the SE mode, and the custom function "CF-1" is the mode for setting the time after the lapse of which the power supply is shut off since the microcomputer is shifted to the SE mode.

The value of the CF number is incremented each time the selection switch 249 shown in FIG. 78 is pushed, so that it is possible to select a number of the custom function which the photographer desires to set.

Further, reference numeral 421 denotes a setting value of the custom function. For example, in the display shown in FIG. 84(a), the setting time for the custom function "CF-0" is "01" (one hour). In the display shown in FIG. 84(b), the setting time for the custom function "CF-1" is "01" (99 hours). The parameter (setting value) 421 for the custom function can be incremented or decremented by pushing the up switch 250 or the down switch 251 shown in FIG. 78, and is fixed by pushing the selection switch 249 or after a predetermined period elapses after the operation of the switch 250 or 251.

Further, the custom function setting picture is canceled by pushing again the illumination switch 247. Accordingly, the photographer can freely set, in compliance with the desired photo-taking condition, the time after the lapse of which the microcomputer is shifted to the SE mode and the time after the lapse of which the power supply is shut off since the microcomputer is shifted to the SE mode.

As described above, in the flash system according to the fourteenth embodiment, in a case where the photographer continuously performs the photo-taking operation, the boosting means always operates. Therefore, it is possible to perform the wireless photo-taking operation responsive to the light emission of the master flash device. In a case where the photo-taking operation is temporarily stopped, the supply of electric power to circuits other than the CPU and the light receiving circuit is stopped after the lapse of a predetermined time, and the flash device comes into the low-power-consumption mode (SE mode) in which the operation of the boosting means is stopped. Therefore, it becomes possible to prevent the battery from being wastefully consumed, as much as possible. Further, if, in the low-power-consumption mode (SE mode), an instruction for the test light emission or the like is given from the master flash device, the supply of electric power to the various parts is restarted immediately, and the operation of the boosting means is started. Therefore, it is possible to attain a wireless flash system having a very excellent operability, which is capable of returning to the photo-taking enabling state even if the operation of again turning on the power supply of the slave flash device is not performed. Further, in a case where the SE mode has continued for a predetermined time, the flash device is shifted to the power-off state in which the supply of power to the light receiving circuit is also shut off. Therefore, it is possible to provide a wireless slave flash device having high safety.

Further, it is possible to freely set the time after the lapse of which the flash device is shifted to the SE mode and the time after the lapse of which the flash device is shifted to the power-off state. Therefore, it is possible to provide a wireless slave flash device which is easily operable in compliance with the photo-taking condition desired by the photographer.

While, in the fourteenth embodiment, the invention is applied to an intelligent wireless flash system in which a command and data are transmitted to control a slave flash device, a fifteenth embodiment of the invention is described below about a wireless flash system having the so-called slave light emission mode in which a slave flash device makes light emission in synchronism with the rise of light emission of a master flash device.

Figure 85:
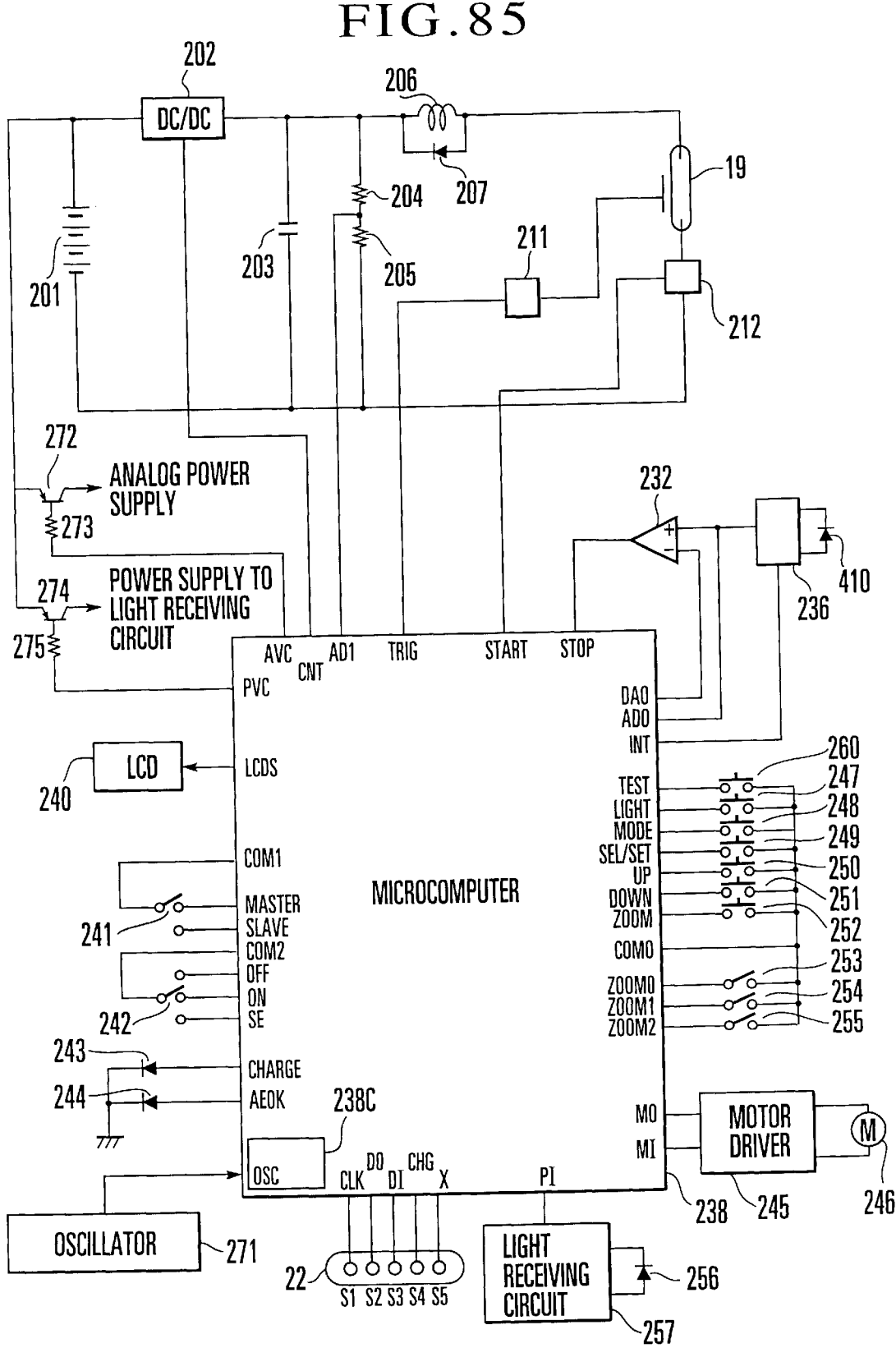
FIG. 85 is a block diagram showing the circuit arrangement of a flash device according to a fifteenth embodiment of the invention.

FIG. 85 is a block diagram showing the circuit arrangement of the wireless flash system according to the fifteenth embodiment of the invention. The circuit arrangement shown in FIG. 85 is essentially the same as that in the fourteenth embodiment shown in FIG. 78 except that circuit parts enclosed by the broken line in FIG. 78, which are provided for performing wireless data communication, are omitted, and is, therefore, the same as that of a general flash device. Further, in FIG. 85, the data selector 230 shown in FIG. 78 is omitted, so that the output of the comparator 232 is directly inputted to an interrupt terminal STOP of the microcomputer 238.

Further, the light emission control circuit 212 is controlled directly by the microcomputer 238 at a output terminal START thereof.

In FIG. 85, reference numeral 410 denotes a light receiving element arranged to measure reflected light from an object. The light receiving sensor 410 is disposed on the front side of the flash device while being directed to the object.

In FIG. 85, parts similar to those in FIG. 78 are denoted by the same reference numerals as in FIG. 78, and are, therefore, omitted from the description.

Figure 86A:
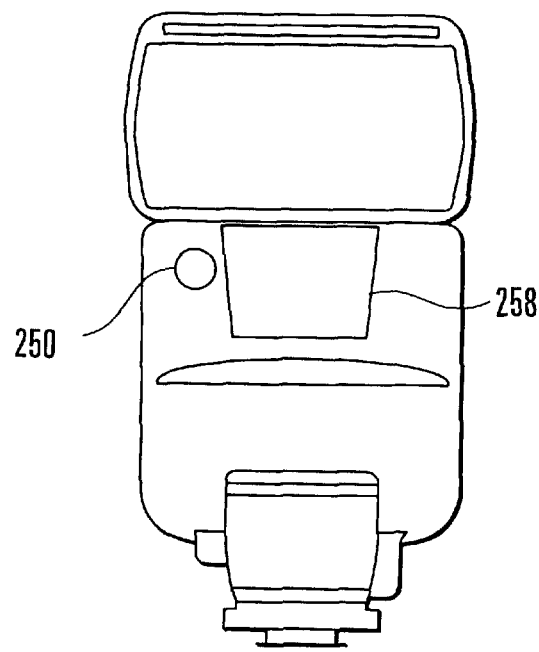
FIGS. 86(a) and 86(b) are diagrams showing the appearance of the flash device according to the fifteenth embodiment.
Figure 86B:
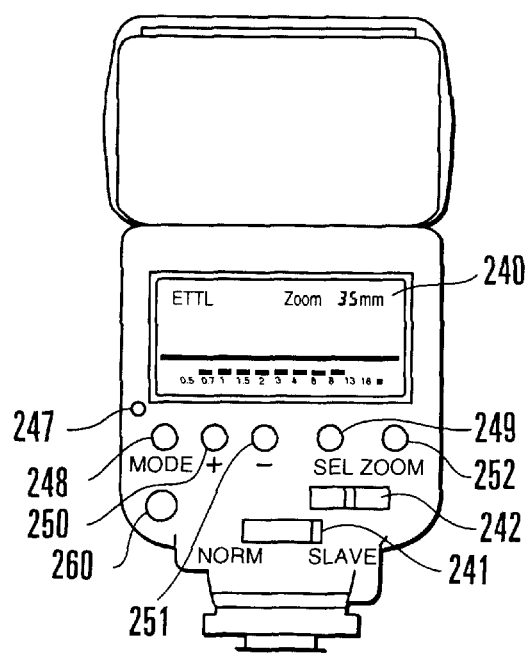

FIGS. 86(a) and 86(b) are diagrams showing the appearance of the flash device in the fifteenth embodiment. The various switches and indications of the flash device are denoted by the same reference numerals as in FIGS. 54(*a*) and 54(*b*), and are, therefore, omitted from the description. In FIGS. 86(*a*) and 86(*b*), reference numeral 258 denotes a light receiving window for the photo-diode 256 serving as the information receiving means. The photo-diode 256 is disposed inside the light receiving window 258. Reference numeral 280 denotes a light receiving window for measuring reflected light from the object. The above-mentioned light receiving element 410 is disposed inside the light receiving window 280 while being directed to the object. Further, since, in the fifteenth embodiment, the flash device has not the master mode in which a command is transmitted to control the slave flash device, differently from the fourteenth embodiment, the mode of the wireless-mode selection switch 241 includes only a normal mode (NORM) and a slave mode (SLAVE).

Figure 87A:
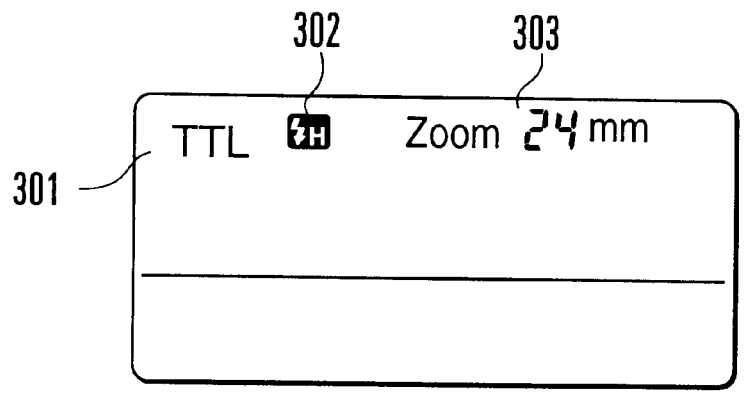
FIGS. 87(a) to 87(c) are diagrams for explaining examples of displays made on a display part of the flash device in the fifteenth embodiment.
Figure 87B:
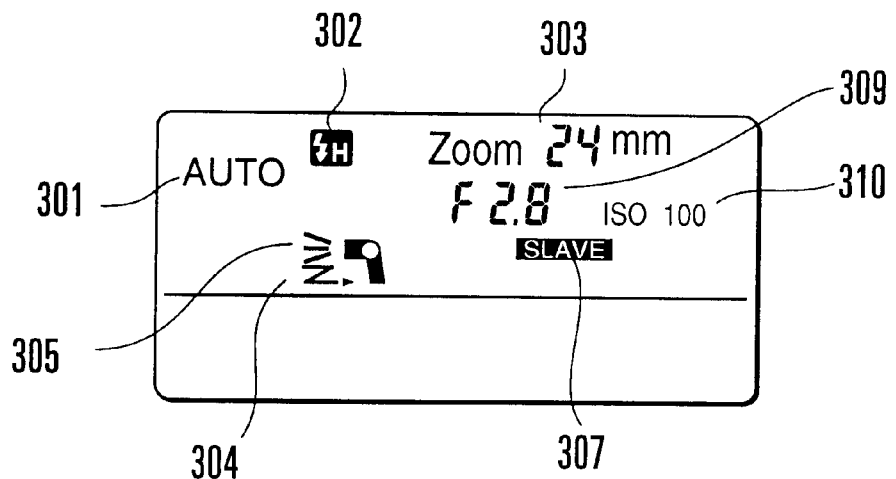

Next, examples of displays on the liquid crystal display device 240 in the fifteenth embodiment are described with reference to FIGS. 87(*a*) to 87(*c*). FIG. 87(*a*) shows the display obtained at the time of the normal mode, FIG. 87(*b*) shows the display obtained at the time of the wireless slave mode, and FIG. 87(*c*) shows the display obtained at the time of the above-mentioned SE state.

In FIGS. 87(*a*) to 87(*c*), only parts different from those in the fourteenth embodiment are described. "TTL" indicated at the mode indication 301 in the display of the normal mode shown in FIG. 87(*a*) indicates that the camera performs a known TTL light control operation.

In the display of the slave mode shown in FIG. 87(*b*), "AUTO" indicated at the mode indication 301 indicates that the camera is in the so-called external light control mode, reference numeral 309 denotes a setting value for the diaphragm, and reference numeral 310 denotes a setting value for ISO sensitivity. The values 309 and 310 are values set in the camera, and with the two parameters (setting values) 309 and 310 set in the slave flash device, the slave flash device performs the so-called external light control operation in which reflected light from the object is measured by the above-mentioned light receiving element 410 to perform apposite light emission control.

Next, the light emitting operation of the slave flash device is described with reference to the timing chart of FIG. 88.

Figure 88:
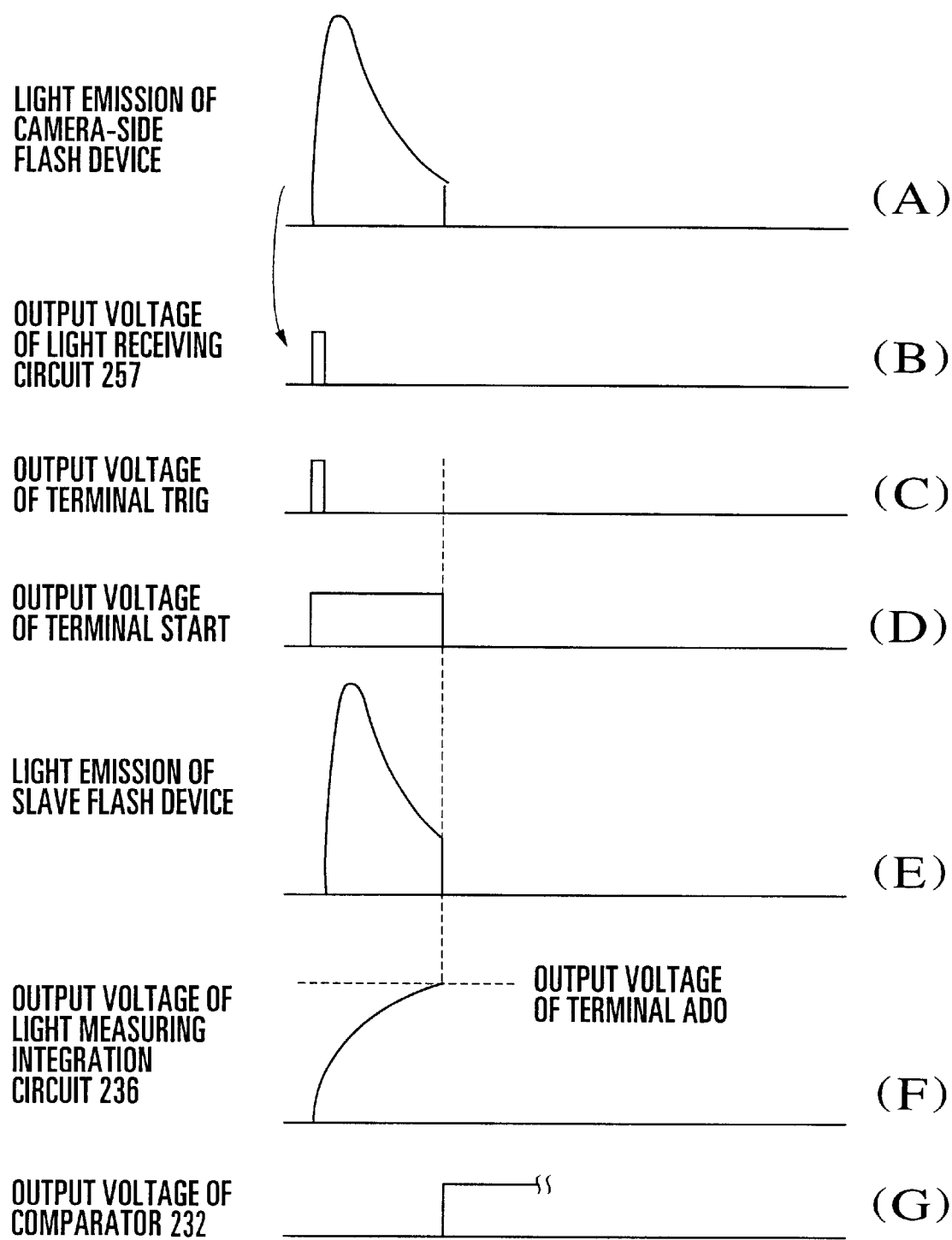
FIG. 88 is a timing chart for explaining a light emitting operation in the fifteenth embodiment.

In FIG. 88, part (A) indicates a light emission waveform of the camera-side flash device, and part (B) indicates an output voltage of the light receiving circuit 257. As shown in FIG. 88, the light receiving circuit 257 is a known light receiving circuit arranged to generate a predetermined pulse output in response to steep light as the light emission waveform of another flash device. Part (C) indicates the output voltage of the terminal TRIG of the microcomputer 238, in response to which the trigger circuit 211 applies a triggering high voltage to the trigger electrode of the Xe tube 19. Part (D) indicates the output voltage of the terminal START of the microcomputer 238. During the period when the output voltage (D) is at a high level, the light emission control circuit 212 is made conductive. Accordingly, in response to the application of the trigger voltage caused by the output voltage (C) and the turning-on of the light emission control circuit 212 caused by the output voltage (D), the Xe tube 19 makes light emission in the light emission waveform shown in part (E). Part (F) indicates the output voltage of the light measuring integration circuit 236, which is an output voltage obtained by integrating an output of the light receiving sensor 410 receiving reflected light from an object. The output voltage of the light measuring integration circuit 236 is applied to the positive input terminal of the comparator 232. On the other hand, to the negative input terminal of the comparator 232, a predetermined voltage for obtaining an apposite amount of light emission according to the aperture setting value and the ISO sensitivity setting value is applied from the output terminal DA0 of the microcomputer 238. Therefore, when a predetermined amount of exposure has been reached, the output voltage of the comparator 236 indicated by part (G) changes from a low level to a high level. The microcomputer 238 detects the change of the output voltage of the comparator 236 and, then, brings the output terminal START to a low level, thereby turning off the light emission control circuit 212 to stop the light emission of the Xe tube 19.

Next, the operation of the flash-device microcomputer 238 when the flash device is set to the slave mode is described with reference to the flow chart of FIG. 89.

At a step E300, when the power supply is turned on, the microcomputer 238 initializes input and output ports.

At a step E301, the microcomputer 238 sets an operation clock mode thereof to the high-speed clock mode, and initializes and starts an inner timer (timer 1) which counts the operation time of the flash device.

At a step E302, the microcomputer 238 sets the terminal AVC to the low level to make the transistor 272 conductive, thereby supplying power to the analog circuits.

At a step E303, the microcomputer 238 sets the terminal PVC to the low level to make the transistor 274 conductive, thereby supplying power to the wireless light receiving circuit 257.

At a step E304, the microcomputer 238 sets the terminal CNT to the low level to enable the operation of the boosting circuit 202.

At a step E305, the microcomputer 238 enables the generation of the slave interrupt.

At a step E306, a check is made for the operation clock mode of the microcomputer 238. If the operation clock mode is the high-speed mode (normal operation state), the flow branches to a step E307. If the operation clock mode is the low-speed mode (SE operation mode), the flow branches to a step E316.

At a step E307, when the operation clock mode is the high-speed mode, a check is made to find if a count value of the inner timer 1 of the microcomputer 238, which counts the elapsed time of the high-speed mode, is not less than a first predetermined value (SE mode shifting time). If the count value is less than the first predetermined value, the flow branches to a step E308. If the count value is not less than the first predetermined value, the flow branches to a step E311. A condition for resetting the inner timer 1 is described later.

At the step E308, the microcomputer 238, which is in the normal operation state, controls the main capacitor 203 so as to have a predetermined voltage by setting the terminal CNT to the low level to operate the boosting circuit 202 if the voltage of the main capacitor 203 monitored at the input terminal Ad1 is lower than a predetermined voltage, or by setting the terminal CNT to the high level to stop the boosting circuit 202 if the voltage of the main capacitor 203 monitored at the input terminal Ad1 is higher than the predetermined voltage.

At a step E309, if the voltage of the main capacitor 203 monitored at the input terminal Ad1 is higher than the predetermined voltage, which enables the light emission of the flash device, the charging-completion LED 243 is turned on. If lower, the charging-completion LED 243 is put off.

At a step E310, the display shown in FIG. 87(*b*) is performed according to the state of the flash device.

At the step E311, when the timer 1 has reached the first predetermined value (SE mode shifting time), i.e., when the wireless information has not been received and the light emitting process has not been performed, the microcomputer 238 sets the terminal CNT to the high level (high impedance) to stop the operation of the boosting circuit 202.

At a step E312, the microcomputer 238 sets the terminal AVC to the high level (high impedance) to stop the supply of power to the analog circuits.

Figure 87C:
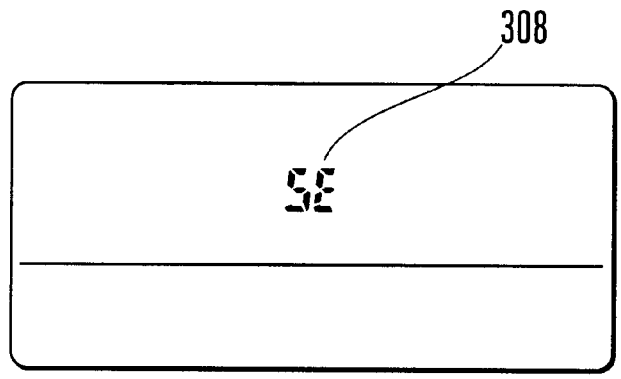

At a step E313, the display shown in FIG. 87(c) is performed to indicate that the microcomputer 238 has shifted to the SE mode. Further, the charging-completion LED 243 and the light-control confirmation LED 244 are put off.

At a step E314, the operation clock mode of the microcomputer 238 is set to the low-speed mode.

At a step E315, the inner timer 1 is reset and restarted so as to measure the elapsed time of the SE mode.

The above-described processing operation from the step E311 to the step E314 causes the flash device to come into the state in which electric power is supplied only to the microcomputer 238 and the light receiving circuit 256, and further causes the operation clock mode of the microcomputer 238 to shift to the low-speed mode, so that the entirety of the flash device comes into the state in which the consumption of electric power is extremely low.

At the step E316, on the other hand, when the operation of the flash device is in the SE mode, the timer 1, which measures the elapsed time of the SE mode, is monitored, and a check is made to find if a count value of the inner timer 1 is not less than a second predetermined value (SE mode ending time). If the count value is less than the second predetermined value, the flow returns to the step E306. If the count value is not less than the second predetermined value, the flow branches to a step E317.

At the step E317, when the light emission control signal has not been received for the second predetermined time after the shifting to the SE mode, the microcomputer 238 sets the terminal PCV to the high level (high impedance) to stop the supply of power to the light receiving circuit 257 for the purpose of performing a power turning-off process.

At a step E318, the LCD 240 is put off.

At a step E319, the operation clock signal to the microcomputer 238 is stopped and the consumption of electric power is cut off, so that the flash device stops its operation.

Figure 90:
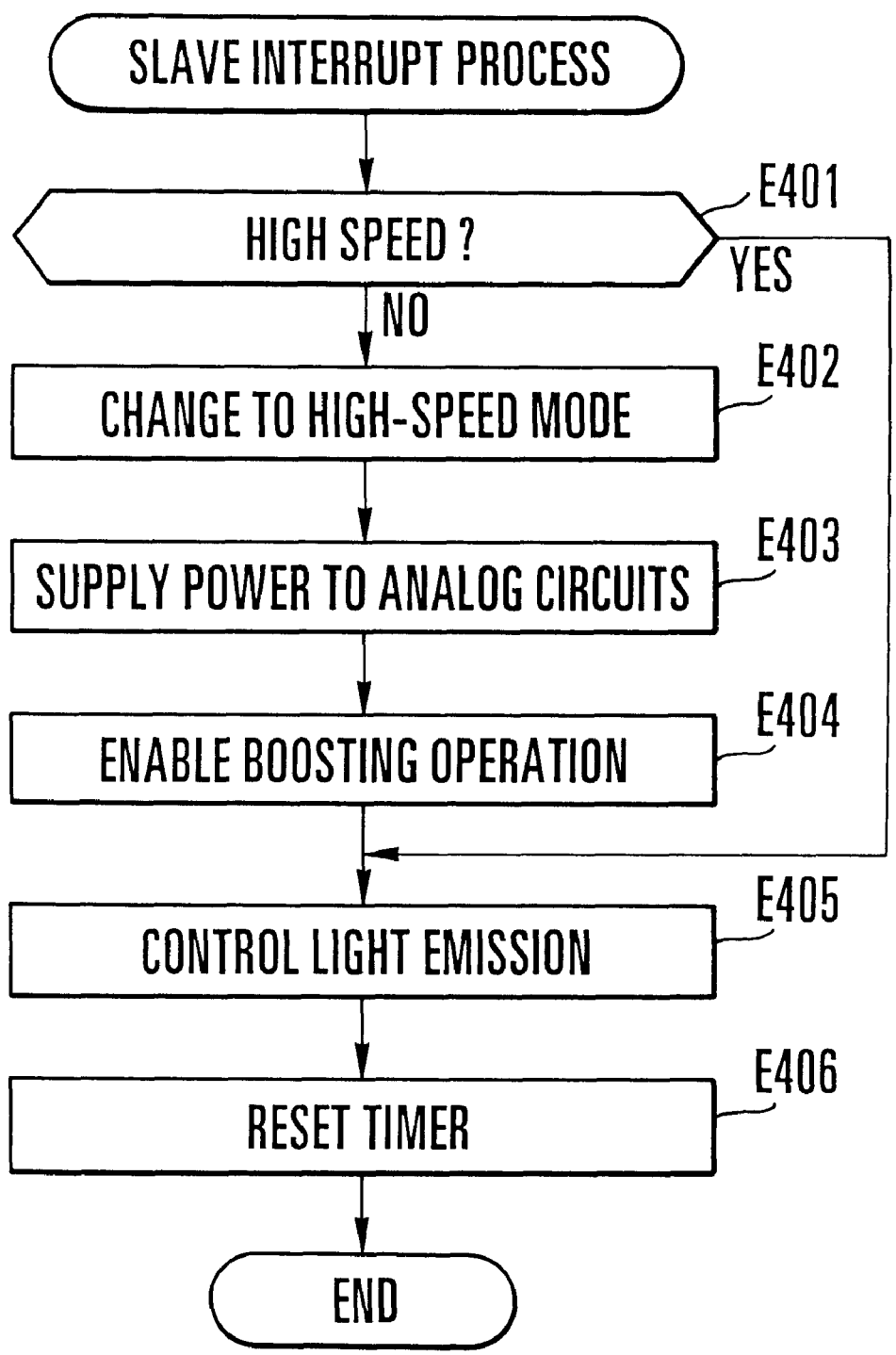
FIG. 90 is a flow chart for explaining the operation of the slave flash device at the time of slave light emission in the fifteenth embodiment.

Next, the processing operation of the slave flash device when having received the light emission control signal is described with reference to the flow chart of FIG. 90.

When the flash device on the camera side has made light emission, the light receiving circuit 257 of the slave flash device detects the light emission and generates a pulse signal of a predetermined amplitude, as described above. Then, the microcomputer 238 detects the rising edge of the pulse signal to generate the slave interrupt, so that the following processing operation is performed.

At a step E401, a check is made for the operation clock mode of the microcomputer 238. If the operation clock mode is the high-speed mode (normal operation state), the flow branches to a step E405. If the operation clock mode is the low-speed mode (SE mode state), the flow branches to a step E402.

At the step E402, the operation clock mode of the microcomputer 238 is set to the high-speed mode.

At a step E403, the terminal AVC is set to the low level to turn off the transistor 272, thereby supplying electric power to the analog circuits.

At a step E404, the operation of the boosting circuit 202 is enabled and started.

At a step E405, if the voltage of the main capacitor 203 is a value equal to or higher than a predetermined voltage for enabling light emission, the light emission control processing described with reference to the above-mentioned timing chart of FIG. 88 is performed.

Figure 89:
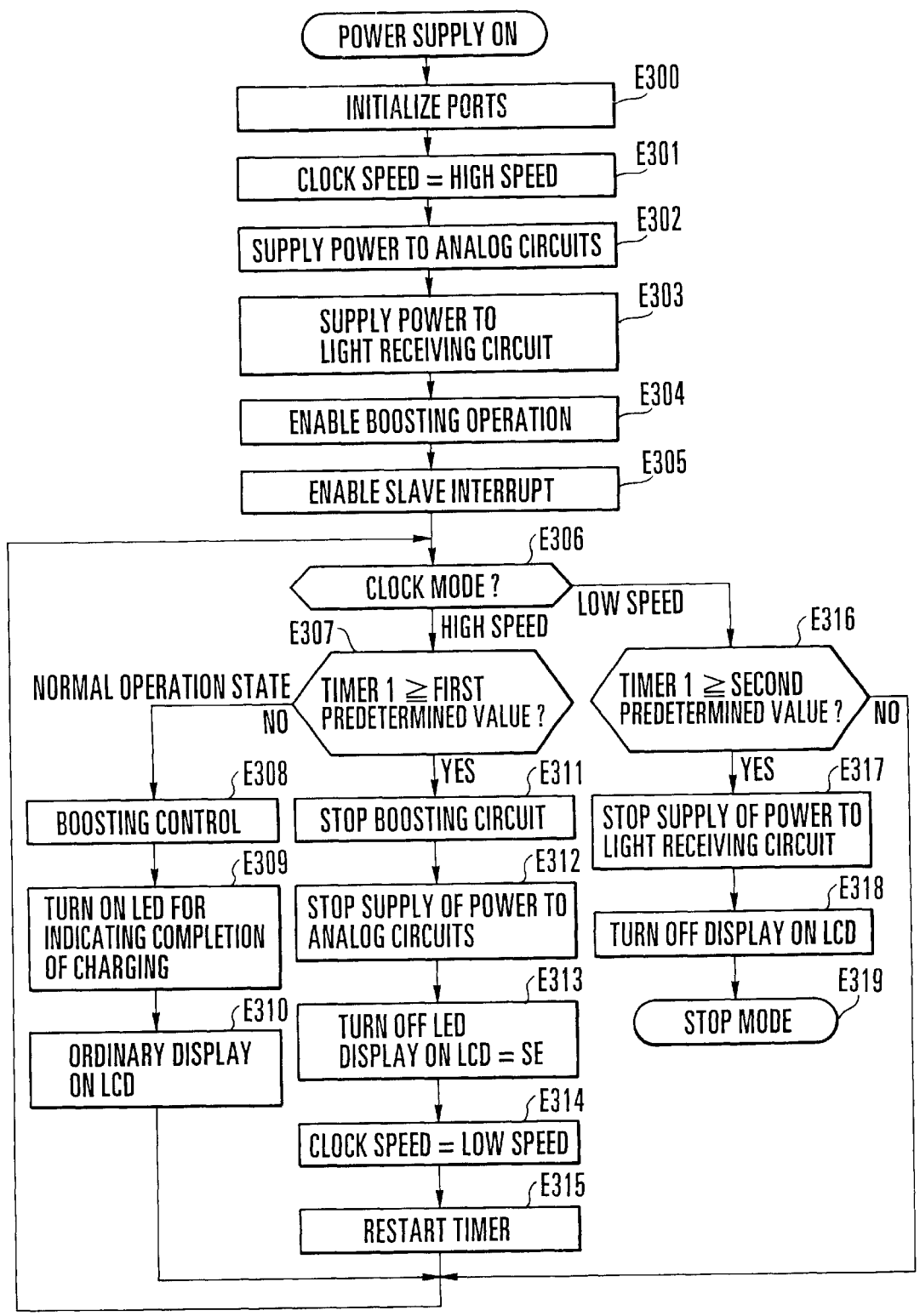
FIG. 89 is a flow chart for explaining the operation of a slave flash device in the fifteenth embodiment.

At a step E406, the timer 1, which is a timer for measuring the operation time of the flash device, as described in the flow chart of FIG. 89, is reset to "0".

Figure 91:
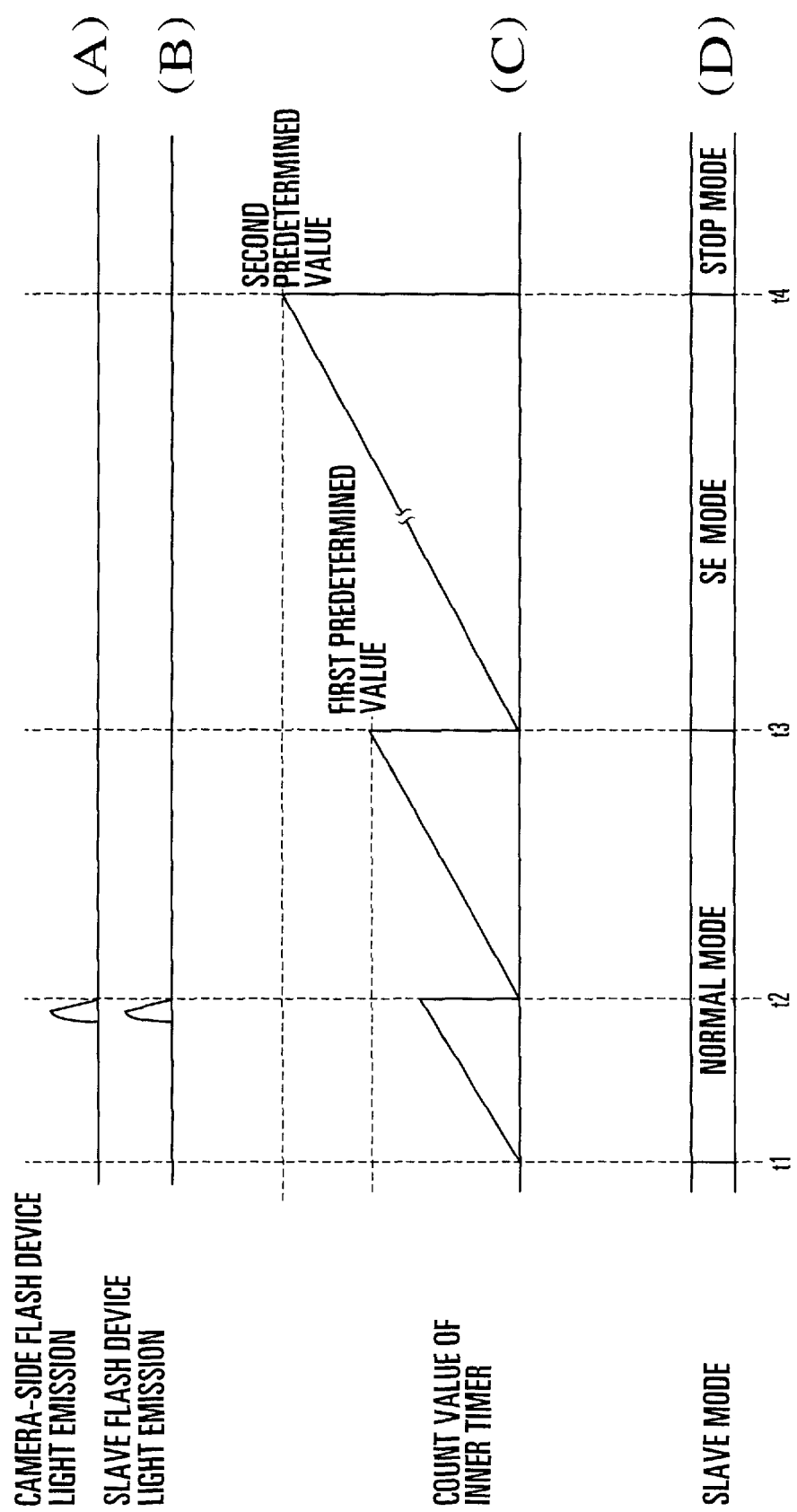
FIG. 91 is a timing chart for explaining the transition of modes of the slave flash device in the fifteenth embodiment.

Next, the above-described operation of the inner timer 1 and the modes of the flash device are shown in the timing chart of FIG. 91. In FIG. 91, part (A) is the same as the part (A) shown in FIG. 83, except that the light emission is performed at the camera-side flash device. Further, the operation shown in FIG. 91 is the same as that shown in FIG. 83, i.e., the operation of the fourteenth embodiment, except that the part (A) of FIG. 83 relates to the wireless communication of the master flash device and the part (A) of FIG. 91 relates to the light emission of the camera-side flash device, and is, therefore, omitted from the description.

As described above, in the flash system according to the fifteenth embodiment, also, in a case where the photographer continuously performs the photo-taking operation, the boosting means always operates. Therefore, it is possible to perform the wireless photo-taking operation responsive to the light emission of the master flash device. In a case where the photo-taking operation is temporarily stopped, the supply of electric power to circuits other than the CPU and the light receiving circuit is stopped after the lapse of a predetermined time, and the flash device comes into the low-power-consumption mode (SE mode) in which the operation of the boosting means is stopped. Therefore, it becomes possible to prevent the battery from being wastefully consumed, as much as possible. Further, if, in the low-power-consumption mode (SE mode), an instruction for the test light emission or the like is given from the master flash device, the supply of electric power to the various parts is restarted immediately, and the operation of the boost in g means is started. Therefore, it is possible to attain a wireless flash system having a very excellent operability, which is capable of returning to the photo-taking enabling state even if the operation of again turning on the power supply of the slave flash device is not performed. Further, in a case where the SE mode has continued for a predetermined time, the flash device is shifted to the power-off state in which the supply of power to the light receiving circuit is also shut off. Therefore, it is possible to provide a wireless slave flash device having high safety.

Further, the setting of the time after the lapse of which the flash device is shifted to the SE mode according to the custom function mode and the setting of the time after the lapse of which the flash device is shifted to the power-off state are the same as those in the fourteenth embodiment, and are, therefore, omitted from the illustration and description.

Next, a sixteenth embodiment of the invention is described below. The arrangement, etc., of the flash device and the camera in the sixteenth embodiment are the same as those in the first embodiment, and are, therefore, omitted from the description. The light emitting operation in the camera and the flash device during the wireless flat automatic light control photo-taking operation when the flash device is set to the master light emission mode is described below with reference to the timing charts of FIGS. 92 and 93.

Figure 92:
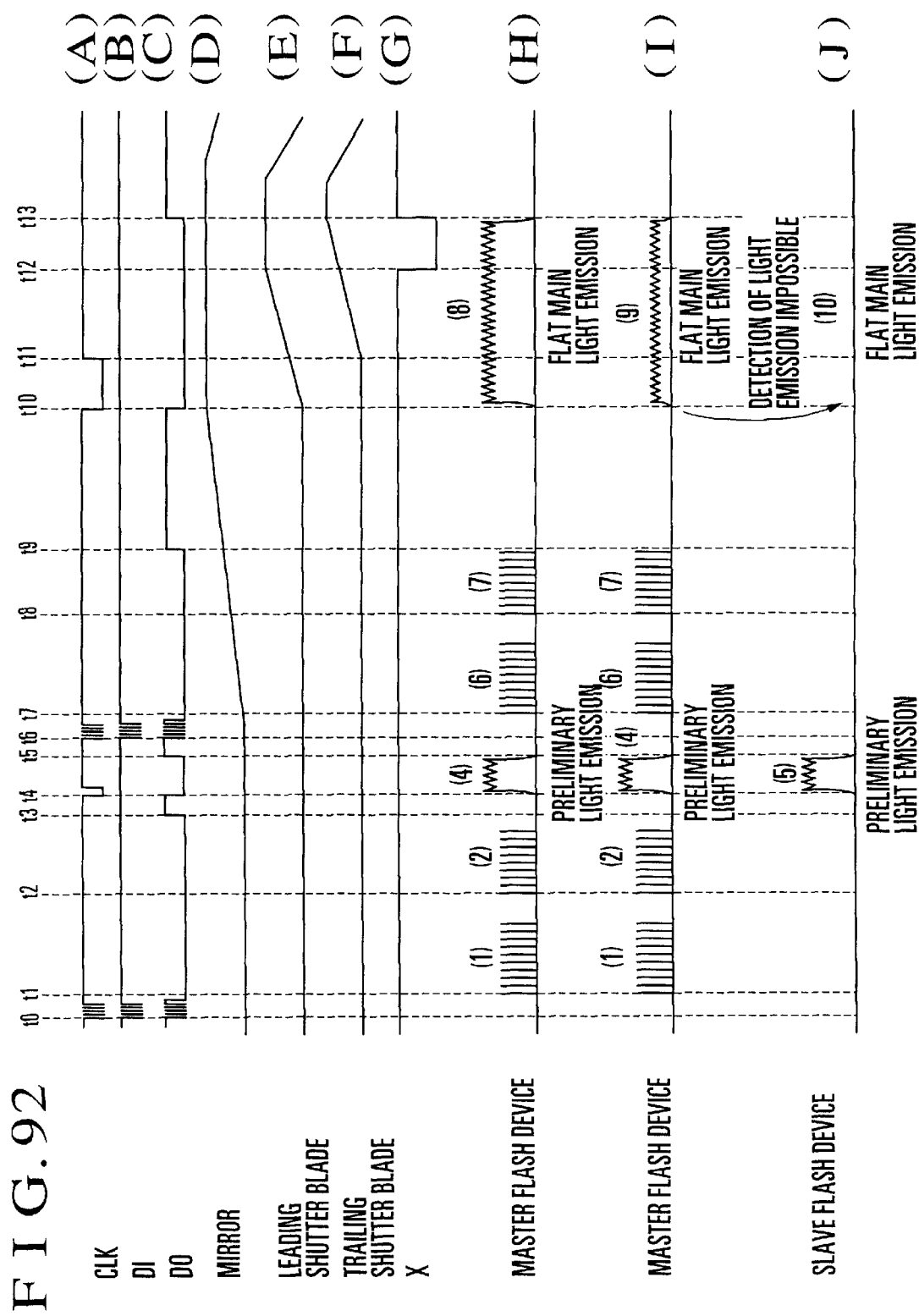
FIG. 92 is a timing chart for explaining inconvenient operations of a camera and flash devices in a sixteenth embodiment of the invention.
Figure 93:
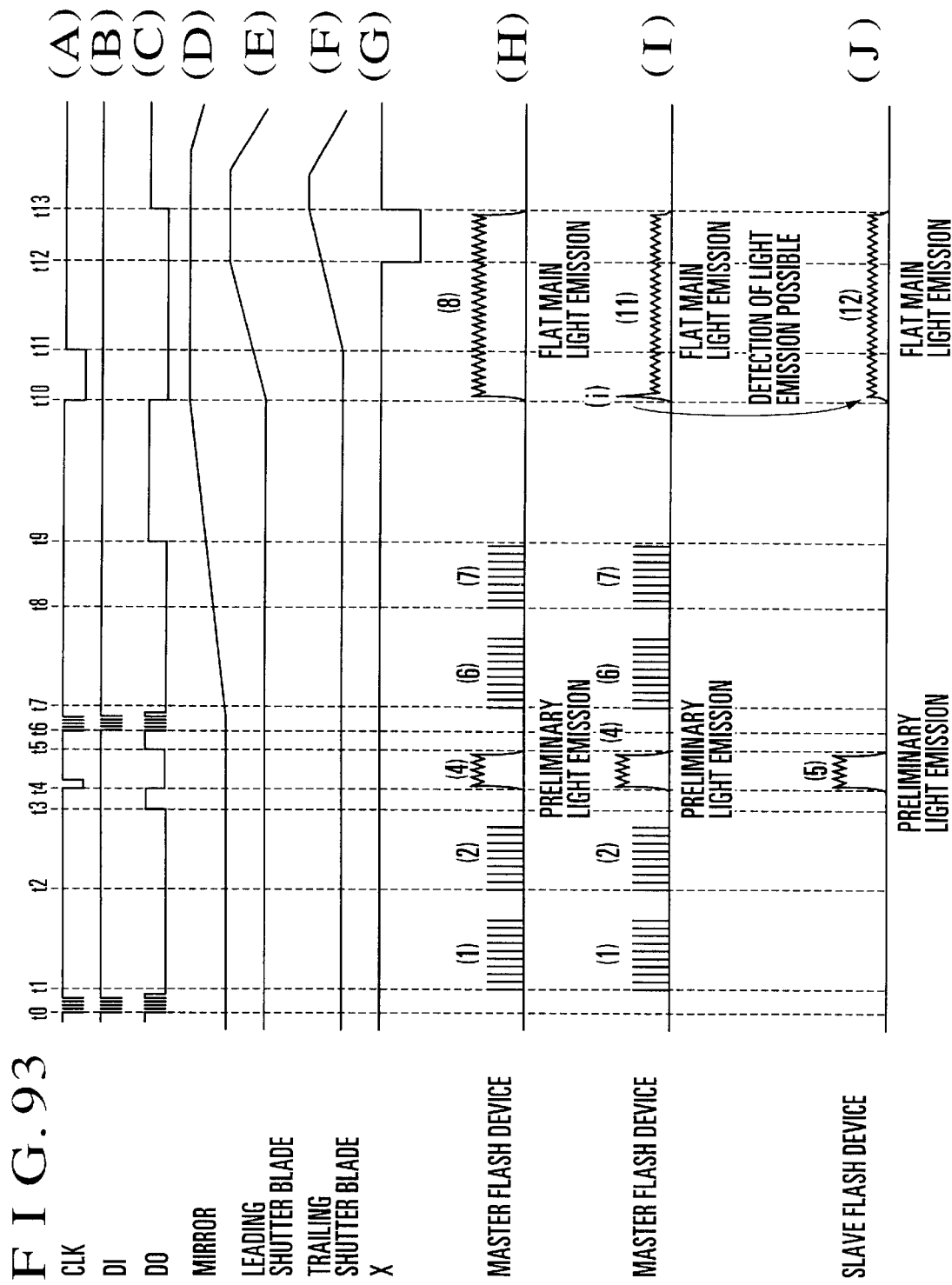
FIG. 93 is a timing chart for explaining the operations of the camera and the flash devices in the sixteenth embodiment.

FIGS. 92 and 93 are timing charts showing the operation in a case where the main light emission is flat light emission. In the case of the operation shown in FIG. 92, the light emission luminous intensity of the flat light emission of the master flash device is made constant, and in the case of the operation shown in FIG. 93, the light emission luminous intensity at the time of start of light emission of the flat light emission of the master flash device is heightened, according to the sixteenth embodiment.

In FIGS. 92 and 93, parts (A) to (C) indicate the states of serial communication lines between the camera and the flash device. Part (D) indicates the operation of the mirror 2 in the camera, in which the low level represents the down state of the mirror 2 and the high level represents the up state of the mirror 2.

Part (E) indicates the state of drive of the leading blade of the shutter 8 in the camera, and (F) indicates the state of drive of the trailing blade of the shutter 8 in the camera, in which the low level represents the state before the travel and the high level represents the state after the travel. Part (G) indicates the state of the X contact of the camera, in which the high level represents the open state and the low level represents the short-circuit state. The X contact comes into the short-circuit state when the leading blade of the shutter 8 is opened, and comes into the short-circuit state when the travel of the trailing blade of the shutter 8 is completed.

Each of parts (H) and (I) indicates the light emission waveform of the master flash device during the master light emission mode. The part (H) represents a case where the light emission luminous intensity is low, and the part (I) represents a case where the light emission luminous intensity is high. Part (J) indicates the light emission waveform of the slave flash device.

At a point of time t0, the camera performs predetermined serial communication to the master flash device to give an instruction for the wireless preliminary light emission.

At a point of time t1, the master flash device MS causes the Xe tube 19 to emit pulse light (1), thereby transmitting the command 1 shown in FIG. 12.

At a point of time t2, similarly to the above, the master flash device MS transmits data (2) of the light emission luminous intensity.

At a point of time t3, after completion of the transmission, the master flash device brings the terminal D0 back to the high level.

At a point of time t4, the camera drops the terminal CLK to the low level for a predetermined time so as to cause the preliminary light emission to begin.

On the one hand, the master flash device, upon detection of the terminal CLK being at the low level, makes preliminary light emission (4) for a predetermined light emission time and at a predetermined light emission luminous intensity as designated by the camera.

On the other hand, the slave flash device, in synchronism with the preliminary light emission of the master flash device, makes light emission (5) for a predetermined light emission time and at a predetermined light emission luminous intensity as designated by the master flash device.

Further, the camera measures reflected light from an object during the preliminary light emission of the master flash device or the slave flash device, thereby computing an apposite amount of light emission for the main light emission.

At a point of time t5, when the preliminary light emission has been completed, the master flash device brings the terminal DO back to the high level.

At a point of time t6, the camera communicates, to the master flash device by serial communication, permission or inhibition of the main light emission, the form of the main light emission (flash light emission and flat light emission), and the amount of light emission for the main light emission in the case of the flash light emission or the intensity of light emission and the light emission time in the case of the flat light emission according to the setting shutter speed of the camera.

At a point of time t7, the master flash device MS causes the Xe tube 19 to emit pulse light (6), thereby transmitting the command 5 shown in FIG. 12. On the other hand, the camera begins to move up mirror 2 so as to start a photo-taking operation.

At a point of time t8, similarly to the above, the master flash device MS transmits data (7) of the light emission luminous intensity.

At a point of time t9, after completion of the transmission, the master flash device brings the terminal DO back to the high level.

At a point of time t10, after completion of the up movement of the mirror, the camera causes the leading shutter blade to begin traveling, and brings the terminal CLK to the low level, thereby transmitting to the master flash device the fact that the leading shutter blade has begun traveling. On the other hand, the master flash device, upon detection of the drop of the terminal CLK, begins the flat main light emission (8) or (9) for the predetermined time and at the predetermined intensity of light emission as designated by the camera.

Here, the flat main light emission (8) corresponds to a case where the light emission luminous intensity for the main light emission is high, i.e., a case where an object is located at a long distance, a case where a lens diaphragm is stopped down or a case where a low-sensitivity film is used. The flat light emission (9) corresponds to a case where the light emission luminous intensity for the main light emission is low, i.e., a case where an object is located at a short distance, a case where a lens diaphragm is opened or a case where a high-sensitivity film is used.

On the other hand, it is natural that the slave flash device, in synchronism with the light emission of the master flash device MS, receives emitted light of the master flash device at the light receiving element 256, detects the rising of the light emission and performs the flat main light emission (12) for the predetermined time and at the predetermined intensity of light emission as designated by the master flash device. As shown in FIG. 92, in a case (8) where the light emission luminous intensity for the main light emission is high, i.e., equal to or higher than the light emission luminous intensity for the wireless communication pulse, the slave flash device can detect the light emission of the master flash device to make light emission on the basis of light emission information transmitted from the master flash device. However, in a case (9) where the light emission luminous intensity for the main light emission is low, i.e., lower than the light emission luminous intensity for the wireless communication pulse, the slave flash device can not detect the light emission of the master flash device to make light emission in synchronism with the light emission of the master flash device.

Here, when the case where an object is located at a short distance is the cause for lowering the light emission luminous intensity, since it seems that the distance between the slave flash device and the master flash device is relatively short, the light emission of the master flash device is easy to detect. However, when the other cases are the cause for lowering the light emission luminous intensity, there is a high possibility that it is impossible to detect the light emission of the master flash device.

Further, in a case where the flat light emission is used for a photo-taking operation, since there is a high possibility that the photo-taking operation is performed outdoors at a place where the ambient light luminance is high, it becomes still more impossible to detect the light emission of the master flash device, which would be covered with the ambient light.

Therefore, according to the sixteenth embodiment, as shown by pulse light (i) in part (I) of FIG. 93, the master flash device heightens the light emission luminous intensity for a predetermined time at the start of light emission for the flat main light emission, thereby ensuring that the slave flash device can surely detect the start of the light emission of the master flash device.

The control over the master flash device in that instance will be described later in detail. Incidentally, since such high-luminous-intensity light emission is performed immediately before the leading shutter blade appears in the photo-taking image plane, no uneven exposure occurs in the photo-taking image plane.

At a point of time t11, after a predetermined shutter time has elapsed, the camera causes the trailing shutter blade to begin traveling.

At a point of time t12, when the travel of the trailing shutter blade has been completed, the X contact of the camera becomes non-conductive. After that, the camera performs the operation including the winding of the film, the charging of the shutter and the down movement of the mirror, thereby ending a series of processing.

In the sixteenth embodiment, the light emission luminous intensity at the time of start of flat light emission is not heightened during the preliminary light emission, and is heightened only during the main light emission. The reason for this is as follows. Since the preliminary light emission is used for the light measurement by the camera, an erroneous light measurement might be performed if the light emission luminous intensity at the time of start of light emission is heightened. Therefore, the erroneous light measurement must be prevented. Further, since the light emission luminous intensity for the preliminary light emission has a predetermined value, which is detectable by the slave flash device, to enable the stable light measurement, it is unnecessary to dare to vary the light emission luminous intensity. However, if the camera is arranged such that the preliminary light emission for a predetermined time at the time of start of light emission is not used for the light measurement, the processing for heightening the light emission luminous intensity for the preliminary light emission may be performed similarly to the main light emission.

Further, in a case where the light emission luminous intensity for the flat light emission used for obtaining an apposite exposure is higher than the predetermined light emission luminous intensity required for the wireless communication, it goes without saying that the master flash device may make light emission, from the start, at the light emission luminous intensity corresponding to the apposite exposure amount.

Next, the operation of the circuit arrangement of the master flash device or the slave flash device corresponding to the above-described operation is described with reference to FIG. 3.

The wireless communication light emitting operation is the same as that in the first embodiment, and is, therefore, omitted from the description.

The control over the flat light emission, which is a characteristic feature of the sixteenth embodiment, is described below in detail with reference to the timing charts of FIGS. 94 to 96.

Figure 94:
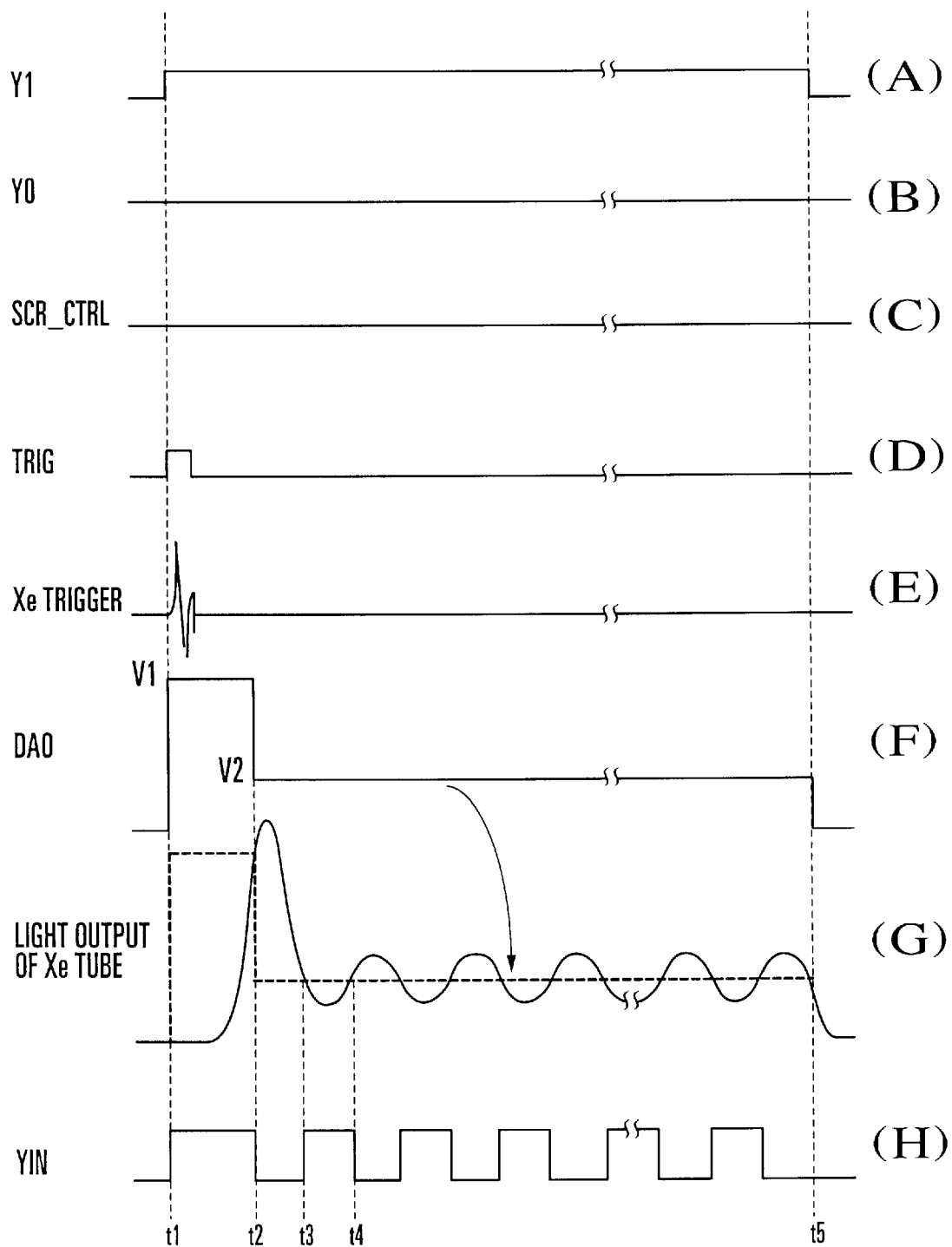
FIG. 94 is a timing chart for explaining an operation of flat light emission of a master flash device in the sixteenth embodiment.

FIG. 94 shows an example of light emission waveform in which the light emission luminous intensity for the flat light emission is continuously varied.

Figure 95:
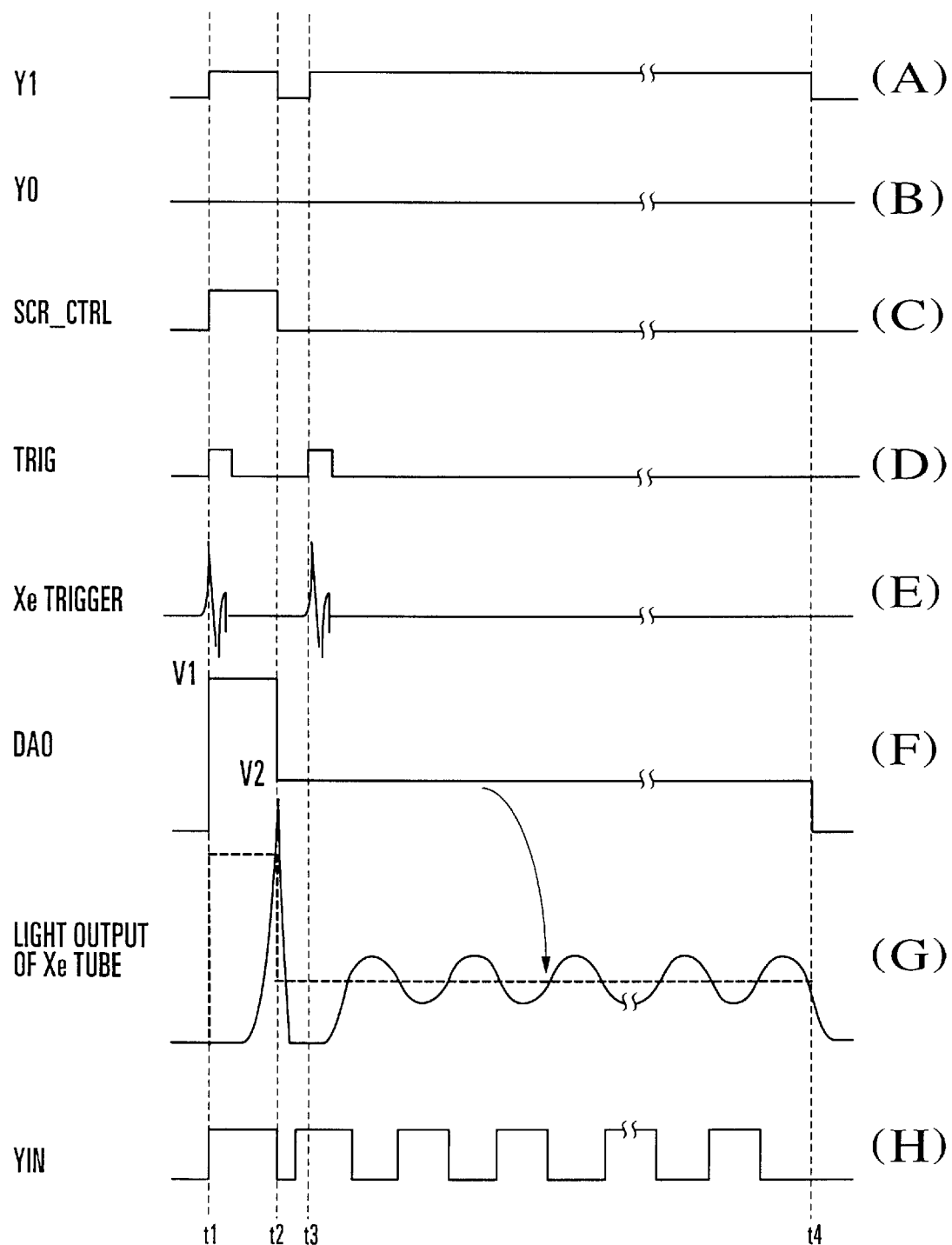
FIG. 95 is a timing chart for explaining another operation of flat light emission of the master flash device in the sixteenth embodiment.

FIG. 95 shows an example of light emission waveform in which pulse light is added to the front of the flat light emission.

Figure 96:
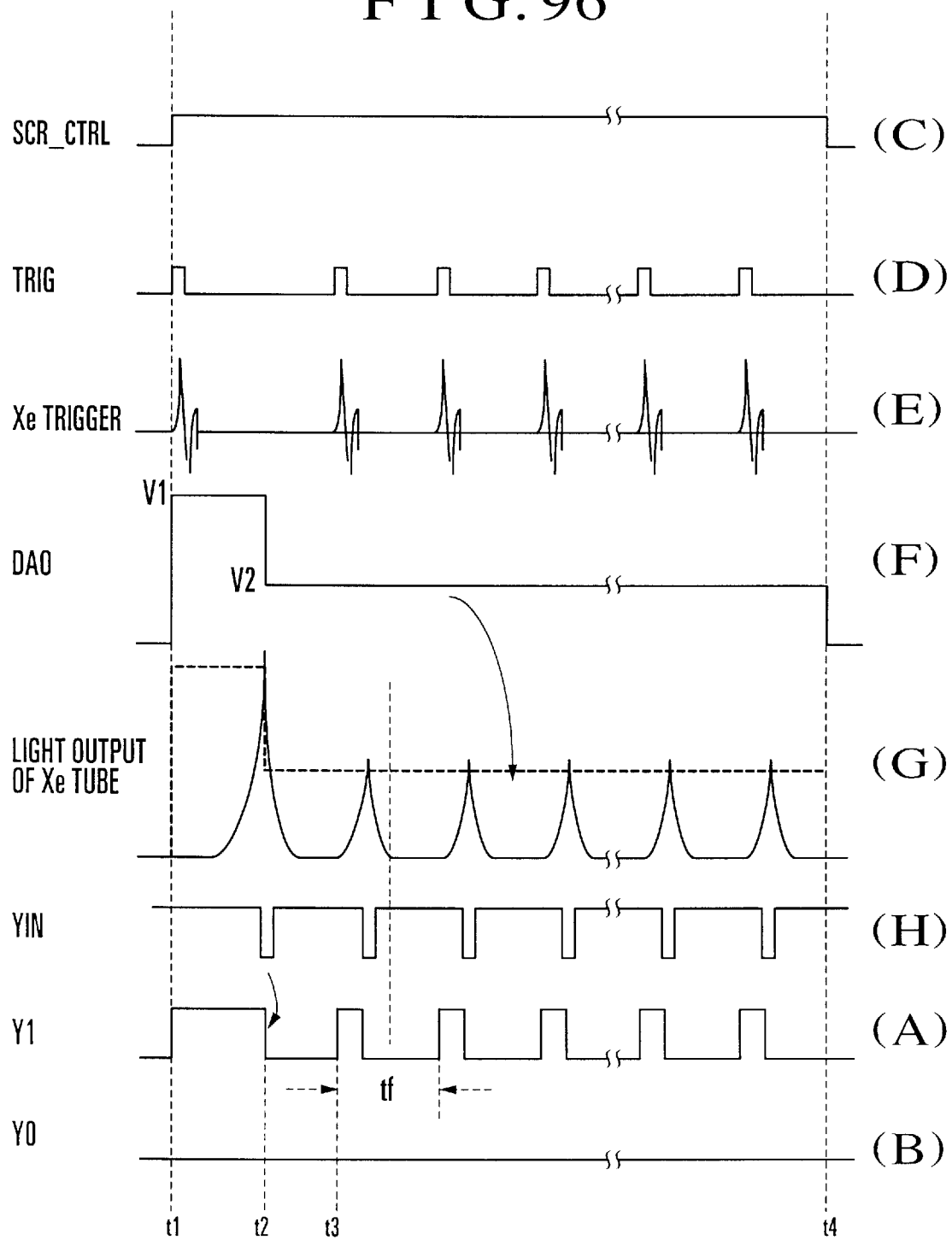
FIG. 96 is a timing chart for explaining a further operation of flat light emission of the master flash device in the sixteenth embodiment.

FIG. 96 shows an example of light emission waveform in which the light emission luminous intensity of the first pulse in the flat light emission composed of intermittent pulses is varied.

In each of FIGS. 94 to 96, part (A) indicates the output from the terminal Y1 of the microcomputer 238, part (B) indicates the output from the terminal Y0 of the microcomputer 238, part (C) indicates the output from the terminal SCR_CTRL of the microcomputer 238, part (D) indicates the output from the terminal TRIG of the microcomputer 238, part (E) indicates the output of the trigger circuit 131 which is applied to the trigger electrode of the Xe tube 19, part (F) indicates the output from the terminal DA0 of the microcomputer 238, part (G) indicates the output voltage of the light receiving circuit 234 corresponding to the light output of the Xe tube 19, part (H) indicates the output of the comparator 231, which is supplied through the data selector 230 to the light emission control circuit 212 and the terminal YIN of the microcomputer 238.

The timing chart of FIG. 94 is first described.

At a point of time t1, in order to make preparation for light emission, the flash-device microcomputer 238 sets a predetermined voltage V1 at the output terminal DA0. The predetermined voltage V1 corresponds to a voltage obtained at the output terminal DA0 when controlling light emission pulses during the process of the wireless communication, and corresponds to the light emission luminous intensity which is sufficiently detectable by the slave flash device.

At the same time, the microcomputer 238 sets the terminal Y0 to the low level and the terminal Y1 to the high level to select the input D2 of the data selector 230. In this instance, since the Xe tube 19 has not yet made light emission, light current does not flow to the sensor 32, and, therefore, the output of the comparator 231 is at the high level. Accordingly, the input to the terminal YIN shown in part (H) of FIG. 94 is set to the high level, and the light emission control circuit 212 becomes conductive.

At the same time, when a high-level signal is outputted from the terminal TRIG for a predetermined time, the Xe tube 19 begins light emission because the light emission control circuit 212 is in the conductive state.

In this instance, since the terminal SCR_CTRL is set in the low-level state, the transistors 221 and 218 are in the off-sate, and the thyristor 213 is also in the off-state. Therefore, a current flowing to the Xe tube 19 flows through the capacitor 203, the coil 206 and the coil 208.

At a point of time t2, light emission is started, and the light emission luminous intensity of the Xe tube 19 increases. Then, when the negative-input voltage of the comparator 231 supplied from the light receiving sensor 32 has become higher than the voltage set at the terminal DA0, i.e., when the set light emission luminous intensity has been reached, the output of the comparator 231 is inverted to the low level. The low-level output of the comparator 231 is supplied to the terminal YIN of the microcomputer 238 through the input terminal D2 of the data selector 230, so that the level of the input terminal YIN of the microcomputer 238 becomes low.

Upon detection of the low level of the input terminal YIN, in order to cause the flash device to make flat light emission at the appropriate light emission luminous intensity as designated by the camera, the microcomputer 238 sets, at the terminal DA0, a voltage corresponding to the appropriate light emission luminous intensity.

On the other hand, when the level of the output of the comparator 231 has become low, the light emission control circuit 212 becomes nonconductive, so that the light emission luminous intensity of the Xe tube 19 gradually lowers while a current flowing to the Xe tube 19 is fed back through the diode 207.

Subsequent control over the flat light emission is performed such that the light emission luminous intensity of the Xe tube 19 is controlled on the basis of the voltage at the terminal DA0 corresponding to the appropriate light emission luminous intensity.

At a point of time t3, when the light emission luminous intensity has lowered and the negative-input voltage of the comparator 231 has become lower than the positive-input voltage thereof, the output of the comparator 231 is inverted to the high level. The high-level output of the comparator 231 then causes the light emission control circuit 212 to become conductive, so that a light emission current to the Xe tube 19 flows through the light emission control circuit 212. Then, when the over-shooting state has terminated, the light emission luminous intensity increases.

At a point of time t4, when the light emission luminous intensity has again increased and the negative-input voltage of the comparator 231 has become higher than the positive-input voltage thereof, the output of the comparator 231 is inverted to the low level. The low level output of the comparator 231 then causes the light emission control circuit 212 to become non-conductive, so that when the over-shooting state has terminated, the light emission luminous intensity decreases.

With the above operations at the points of time t3 and t4 repeated, the Xe tube 19 continues to make light emission at the almost constant light emission luminous intensity.

At a point of time t5, when the predetermined light emission time designated by the camera has elapsed, the microcomputer 238 sets the terminal Y1 to the low level and the terminal Y0 to the low level, so that the light emission control circuit 212 becomes non-conductive, thereby terminating the light emission.

The timing chart of FIG. 95 is next described. FIG. 95 shows an example in which pulse light emission for causing the slave flash device to begin light emission is performed immediately before the flat light emission is made. In FIG. 95, parts similar to those shown in FIG. 94 are omitted from the description.

At a point of time t1, in order to make preparation for light emission, the flash-device microcomputer 238 sets a predetermined voltage V1 at the output terminal DA0. At the same time, the microcomputer 238 sets the terminal Y0 to the low level and the terminal Y1 to the high level.

At the same time, when a high-level signal is outputted from the terminal TRIG for a predetermined time, the Xe tube 19 begins light emission because the light emission control circuit 212 is in the conductive state. In this instance, since the terminal SCR_CTRL is set in the high-level state, the transistors 221 and 218 are in the on-sate, and the thyristor 213 is also in the on-state. Therefore, a current flowing to the Xe tube 19 flows through the capacitor 203, the coil 206 and the thyristor 213, so that a steep light pulse is generated.

At a point of time t2, with the light emission started, when the light emission luminous intensity of the Xe tube 19 has increased to reach a predetermined light emission luminous intensity, the output of the comparator 231 is inverted to cut off the current flowing to the Xe tube 19, so that the Xe tube 19 stops making light emission.

On the other hand, when the output of the comparator 231 has been inverted to bring the input to the terminal YIN to the low level, in order to cause the flash device to make flat light emission at the apposite light emission luminous intensity designated by the camera, the microcomputer 238 outputs to the terminal DA0 a voltage corresponding to the apposite light emission luminous intensity and returns the terminal SCR_CTRL to the low level.

At a point of time t3, when the microcomputer 238 brings the terminal Y1 to the high level again, the terminal Y0 to the low level and the terminal TRIG to the high level for a predetermined time, light emission is started. Subsequently, flat light emission at the predetermined light emission luminous intensity is performed until a point of time t4 at which the predetermined light emission time elapses, as described with reference to FIG. 94.

The timing chart of FIG. 96 is next described. FIG. 96 shows an example in which the light emission luminous intensity of the first pulse of the flat light emission composed of intermittent pulses is varied.

The flat light emission may be composed of intermittent pulses as shown in FIG. 94 or 96.

In a case where the flat light emission is effected by such repetition of pulse light emission, small coils can be used as the current limiting coils 206 and 208, thereby contributing to the minimization of the flash device.

At a point of time t1, in order to make preparation for light emission, the flash-device microcomputer 238 sets a predetermined voltage V1 at the output terminal DA0. At the same time, the microcomputer 238 sets the terminal Y0 to the low level, the terminal Y1 to the high level and the terminal SCR_CTRL to the high level.

At the same time, when a high-level signal is outputted from the terminal TRIG for a predetermined time, the Xe tube 19 begins light emission because the light emission control circuit 212 is in the conductive state. In this instance, since the terminal SCR_CTRL is set in the high-level state, the transistors 221 and 218 are in the on-sate, and the thyristor 213 is also in the on-state. Therefore, a current flowing to the Xe tube 19 flows through the capacitor 203, the coil 206 and the thyristor 213, so that a steep light pulse is generated.

At a point of time t2, with the light emission started, when the light emission luminous intensity of the Xe tube 19 has increased to reach a predetermined light emission luminous intensity, the output of the comparator 231 is inverted to cut off the current flowing to the Xe tube 19. In this instance, any current is not flowing to the coil 208 and energy stored in the coil 206 is discharged through the diode 207. Therefore, the Xe tube 19 rapidly stops light emission.

On the other hand, when the output of the comparator 231 has bee n inverted to bring the input to the terminal YIN to the low level, in order to cause the flash device to make flat light emission at the apposite light emission luminous intensity designated by the camera, the microcomputer 238 outputs to the terminal DA0 a voltage corresponding to the apposite light emission luminous intensity and returns the terminal Y1 to the low level, thereby cutting off the light emission.

At a point of time t3, subsequently, the microcomputer 238 sets, at intervals of a period tf, the terminal TRIG to the high level for a predetermined time and the terminal Y1 to the high level for a predetermined time until a point of time t4 at which the predetermined light emission time elapses, so that the flat light emission of the pulse light emission type is effected.

Incidentally, in the example shown in FIG. 96, the coil 208 is bypassed with the thyristor 313. Therefore, a light emission waveform changing circuit including the coil 208 may be omitted from the circuit arrangement shown in FIG. 3, so that the circuit arrangement of the flash device can be simplified.

As has been described above, the sixteenth embodiment has the following advantage.

In a flash system composed of a camera having a focal plane shutter, a master flash device detachably mounted on the camera, and a slave flash device located at a distance from the camera, the master flash device has flash emitting means and transmits light emission control information to the slave flash device by causing the flash emitting means to make pulse light emission, and the slave flash device makes light emission according to the received light emission control information. When flat light emission is performed by the flash emitting means, the light emission luminous intensity at the initial time of the flat light emission is heightened or a light emission pulse for starting light emission of the slave flash device is generated prior to the flat light emission. Accordingly, even if the light emission luminous intensity of the flat light emission is low, the slave flash device can securely make light emission in synchronism with light emission of the master flash device by receiving a light emission start signal having high light emission luminous intensity transmitted prior to the flat light emission.

Further, as a modification of the sixteenth embodiment, the built-in-camera flash device described in the second embodiment may be used as the master flash device.

What is claimed is:

1. A flash system having a master transmission device and a slave flash device located at a distance from said master transmission device, in which said slave flash device is controlled through communication from said master transmission device, said master transmission device comprising light-emission-mode selecting circuit which select a light emission mode from between a flash light emission mode and a flat light emission mode, and transmission circuit which transmit, to said slave flash device, flash-device control information including the selected light emission mode, and said slave flash device comprising receiving circuit which receives the flash-device control information, flash light emission circuit, and light emission control circuit which control said flash light emission circuit in the flash light emission mode or the flat light emission mode according to the received flash-device control information.

2. A flash system according to claim 1, wherein the flash-device control information includes information indicative of one of the flash light emission mode and the flat light emission mode, and, if the flat light emission mode is selected, a light emission time corresponding to a shutter speed and a shutter curtain travel speed.

3. A flash system according to claim 1, wherein the flash-device control information is a serial information signal composed of a plurality of bytes, the first byte of which is a channel discrimination signal indicative of a control channel.

4. A flash system according to claim 1, wherein the flash-device control information includes, if the flat light emission mode is selected, a timing signal for instructing said slave flash device to begin light emission immediately before a shutter of a camera begins to make an exposure on a film, and, if the flash light emission mode is selected, a timing signal for instructing said slave flash device to begin light emission when the shutter of the camera has fully opened.

5. A flash system according to claim 1, wherein said transmission circuit is releasably attachable to a camera, and includes receiving circuit which receives light emission control information from the camera, detection circuit which detect photo-taking timing information of the camera, and information output circuit which send the light emission control information and the photo-taking timing information to said slave flash device.

6. A flash system according to claim 5, wherein said information output circuit is flash light emission circuit.

7. A flash system according to claim 1, wherein said transmission circuit is flash light emission circuit incorporated in a camera.

8. A flash system according to claim 1, wherein said transmission circuit is an auxiliary light source for automatic focusing.

9. A flash system having a master transmission device and a slave flash device located at a distance from said master transmission device, in which said slave flash device is controlled through communication from said master transmission device, said master transmission device comprising selection means for selecting a flash light emission mode corresponding to a photo-taking condition, and transmission means for transmitting control information including the selected flash light emission mode according to a photo-taking operation of a camera, and said slave flash device comprising receiving means for receiving the control information, flash light emission means, and light emission control means for controlling light emission of said flash light emission means according to the received control information.

10. A flash system according to claim 9, wherein the flash light emission mode includes an automatic light control mode and a photo-taking mode other than the automatic light control mode.

11. A flash system according to claim 10, wherein the photo-taking mode other than the automatic light control mode is a manual light emission mode or a multiple light emission mode.

12. A flash system according to claim 9, wherein the control information includes, if the flash light emission mode is a manual light emission mode, information related to an amount of light emission of said slave flash device.

13. A flash system according to claim 9, wherein the control information includes, if the flash light emission mode is a multiple light emission mode, information related to an amount of light emission, a frequency of light emission and number of times of light emission of said slave flash device.

14. A flash system according to claim 9, wherein the control information includes, if said slave flash device includes a plurality of slave flash devices, information related to amounts of light emission which are set independently for the respective slave flash devices.

15. A flash system according to claim 9, wherein said transmission means is releasably attachable to the camera, and includes receiving means for receiving light emission control information from the camera, detection means for detecting photo-taking timing information of the camera, selection means for selecting photo-taking information, setting means for setting information accompanying the selected photo-taking information, and information output means for transmitting the information including the selected flash light emission mode and the information accompanying the selected photo-taking information according to a photo-taking operation of the camera.

16. A flash system according to claim 15, wherein the information accompanying the selected photo-taking information is, if the flash light emission mode is a manual light emission mode, information on an amount of light emission of said slave flash device, and is, if the flash light emission mode is a multiple light emission mode, information on a frequency of light emission and number of times of light emission of said slave flash device.

17. A flash system according to claim 15, wherein said information output means is flash light emission means.

18. A flash system according to claim 9, wherein said slave flash device further comprises display means for displaying the received control information including the selected flash light emission mode.

19. A flash system having a master transmission device and a slave flash device, in which optical communication from said master transmission device to said slave flash device is made so as to control said slave flash device,
said master transmission device comprising a communication circuit which transmits a plurality of groups of data, each group of data being composed of a digitally-coded light pulse string of a predetermined length, the plurality of groups of data being transmitted time-serially as a series of information.

20. A flash system according to claim 19, wherein the plurality of groups of data include a first group composed of a pulse string indicative of a light emission mode, and a second group composed of a pulse string indicative of a condition of light emission or an amount of light emission in the light emission mode.

21. A flash system according to claim 20, wherein, during communication from said master transmission device, the pulse string of the second group is transmitted after the pulse string of the first group is transmitted.

22. A flash system according to claim 20, wherein, after communication of the plurality of groups of data, said master transmission device transmits pulse light for causing said slave flash device to begin light emission.

23. A flash system according to claim 20, wherein said master transmission device is composed of a flash device, and wherein, after communication of the plurality of groups of data, the flash device of said master transmission device makes light emission, and the light emission of the flash device of said master transmission device causes said slave flash device to begin light emission.

24. A flash system according to claim 19, wherein said master transmission device is composed of a flash device mounted on or incorporated in a camera, and wherein the flash device of said master transmission device forms the plurality of groups of data of light pulse strings by emitting pulse light from a flash tube thereof.

25. A flash system according to claim 24, wherein the flash device of said master transmission device has a first mode and a second mode, and wherein, in the first mode, after communication of the plurality of groups of data, the flash device of said master transmission device performs a light emitting operation in a light emission waveform used for photo-taking with the flash tube, and, in the second mode, the flash device of said master transmission device performs a communicating operation using pulse light only.

26. A flash system according to claim 25, wherein, in the second mode, after communication of the plurality of groups of data, the flash device of said master transmission device causes the flash tube to form pulse light.

27. A flash system according to claim 25, wherein said slave flash device begins light emission upon detection of emitted light resulting from the light emitting operation of the flash device of said master transmission device after communication of the plurality of groups of data in the first mode, and said slave flash device begins light emission upon detection of pulse light resulting from the communication operation of the flash device of said master transmission device in the second mode.

28. A flash system having a master flash device and a plurality of slave flash devices, in which optical communication from said master flash device is performed onto said plurality of slave flash devices,
said master flash device comprising a communication circuit which performs optical communication of information composed of a series of data including data for designating a slave flash device from among said plurality of slave flash devices and data for indicating a condition of light emission or an amount of light emission of the designated slave flash device, and
each of said plurality of salve flash devices comprising a control circuit which causes the slave flash device as designated by the designating data to make light emission on the basis of the data for indicating a condition of light emission or an amount of light emission.

29. A flash system according to claim 28, wherein said master flash device, after performing communication of the information, makes light emission for causing the slave flash device as designated by the designating data to make light emission, and the slave flash device as designated by the designating data makes light emission in response to the light emission of said master flash device.

30. A flash system according to claim 28, wherein said master flash device is a flash device mounted on or incorporated in a camera, and forms the series of data by making light emission with a coded light pulse string of a predetermined length from a flash tube thereof.

31. A flash system according to claim 30, wherein said master flash device, after making light emission with the coded light pulse string for communication of the information, causes the flash tube to emit pulse light so as to cause the designated slave flash device to make light emission.

32. A flash system according to claim 30, wherein said master flash device, after making light emission with the coded light pulse string for communication of the information, causes the flash tube to emit light used for photo-taking so as to cause the designated slave flash device to begin light emission in response to the light emitted from the flash tube.

33. A flash system having a master flash device and a plurality of slave flash devices, in which transmission of information to said plurality of slave flash devices is performed through optical communication from said master flash device,
said master flash device comprising a communication circuit which performs optical communication of a series of data including data for designating a predetermined number of slave flash devices from among said plurality of slave flash devices and light-emission-amount data for each of the designated slave flash devices for indicating an amount of light emission of each of the designated slave flash devices,
each of said plurality of slave flash devices comprising a control circuit which controls an amount of light emission of each of the designated slave flash devices according to the light-emission-amount data for each of the designated slave flash devices.

34. A flash system having a master flash device and a slave flash device, said slave flash device having a plurality of receiving channels, in which optical communication is performed from said master flash device to said slave flash device, said master flash device comprising a communication circuit which communicates data indicative of a predetermined channel and data representative of light emission information to said slave flash device, and said slave flash device comprising a control circuit which determines the data indicative of the predetermined channel communicated from said master flash device, and, if the predetermined channel coincides with the current receiving channel of said slave flash device, causes said slave flash device to make light emission according to the light emission information.

35. A flash device releasably mountable on a camera, said flash device comprising:

mounting means for releasably mounting said flash device on the camera;

flash light emission means;

setting means for setting a slave mode;

receiving means for receiving wireless control information;

light emission control means for controlling said flash light emission means according to the received control information;

detection means for detecting an operating state of the camera through a communication terminal with the camera; and setting canceling means for, when the operating state of the camera is detected by said detection means with said flash device set to the slave mode by said setting means and mounted on the camera, canceling the setting of the slave mode and enabling said flash light emission means to make light emission according to an instruction received from the camera through the communication terminal.

36. A flash device according to claim 35, wherein said detection means detects that the camera is operating, when a signal voltage level of the communication terminal with the camera has changed from a low level to a high level.

37. A flash device according to claim 35, wherein the communication terminal with the camera is a serial communication terminal for performing serial data communication.

38. A flash device according to claim 35, further comprising:

display means for displaying setting of the slave mode and a normal mode; and a display circuit which, if said setting canceling means cancels setting of the slave mode, changes displaying of said display means from the setting of the slave mode to the setting of the normal mode.

39. A flash system having a master transmission device including a camera, and one or a plurality of slave flash devices located at distances from said master transmission device, in which said slave flash device is controlled through communication from said master transmission device, said master transmission device comprising transmission means for transmitting control information including at least preliminary light emission information for giving an instruction for preliminary light emission to said slave flash device, and said slave flash device comprising receiving means for receiving the control information from said master transmission device, light emission control means for controlling light emission of flash light emission means according to the received control information, preliminary light emission determining means for determining whether said flash light emission means can normally make preliminary light emission when the control information for the preliminary light emission has been received, and light emission inhibiting means for inhibiting main light emission when said preliminary light emission determining means determines that said flash light emission means can not normally make preliminary light emission.

40. A flash system having a master transmission device including a camera, and one or a plurality of slave flash devices located at distances from said master transmission device, in which said slave flash device is controlled through communication from said master transmission device, said master transmission device comprising transmission means for transmitting control information including at least preliminary light emission information for giving an instruction for preliminary light emission to said slave flash device, and said slave flash device comprising receiving means for receiving the control information from said master transmission device, light emission control means for controlling light emission of flash light emission means according to the received control information, preliminary light emission determining means for determining whether said flash light emission means has normally made preliminary light emission when the control information for the preliminary light emission has been received, and light emission inhibiting means for inhibiting main light emission when said preliminary light emission determining means determines that said flash light emission means has not normally made preliminary light emission.

41. A flash system according to claim 39, wherein said preliminary light emission determining means determines that said flash light emission means can not normally make preliminary light emission, when charging of said flash light emission means for preliminary light emission has not yet been completed.

42. A flash system according to claim 39, wherein said preliminary light emission determining means determines that said flash light emission means can not normally make preliminary light emission, when the control information for the preliminary light emission has not normally been received.

43. A flash system according to claim 40, wherein said preliminary light emission determining means determines that said flash light emission means has not normally made preliminary light emission, when light resulting from the preliminary light emission of said flash light emission means has not been received by light receiving means.

44. A flash system having a master transmission device and a plurality of grouped slave flash devices, in which light emission of each slave flash device is controlled by control information transmitted from said master transmission device, said master transmission device having, as the control information, at least group information or flash-device information of a slave flash device selected from among said plurality of grouped slave flash devices, light emission mode information and test mode information, and each of said plurality of grouped slave flash devices comprising receiving and light emission control means for causing flash light emission means to make light emission in a predetermined timing, if group information indicative of each slave flash device itself or flash-device information indicative of each slave flash device itself is included in the control information when the test mode information is received.

45. A flash system having a master transmission device and a plurality of grouped slave flash devices, in which light emission of each slave flash device is controlled by control information transmitted from said master transmission device, said master transmission device having, as the control information, at least group information or flash-device information of a slave flash device selected from among said plurality of grouped slave flash devices, light emission mode information and test mode information, and each of said plurality of grouped slave flash devices comprising receiving and light emission control means for causing flash light emission means to make light emission in a timing different from a timing of light emission of a slave flash device of another group, if group information indicative of each slave flash device itself or flash-device information indicative of each slave flash device itself is included in the control information when the test mode information is received.

46. A flash system having a master transmission device and a plurality of grouped slave flash devices, in which light emission of each slave flash device is controlled by control information transmitted from said master transmission device, said master transmission device having, as the control information, at least group information or flash-device information of a slave flash device selected from among said plurality of grouped slave flash devices, light emission mode information and test mode information, and each of said plurality of grouped slave flash devices comprising receiving and light emission control means for causing flash light emission means to make light emission in the same timing as a timing of light emission of a slave flash device of another group and at a set intensity of light emission, if group information indicative of each slave flash device itself or flash-device information indicative of each slave flash device itself is included in the control information and the light emission mode information indicates a light emission mode other than an automatic light control mode when the test mode information is received.

47. A flash system having a master transmission device and a plurality of grouped slave flash devices, in which light emission of each slave flash device is controlled by control information transmitted from said master transmission device, said master transmission device having, as the control information, at least group information or flash-device information of a slave flash device selected from among said plurality of grouped slave flash devices, light emission mode information and test mode information, and each of said plurality of grouped slave flash devices comprising sound-generator control means for causing a sound generator to generate sound in a predetermined timing, if group information indicative of each slave flash device itself or flash-device information indicative of each slave flash device itself is included in the control information when the test mode information is received.

48. A flash system composed of a wireless flash-device control device and a slave flash device, said wireless flash-device control device having a plurality of light emission modes, being incorporated in or mounted on a camera, and comprising test light emission command means, transmission means for transmitting flash-device control information to said slave flash device, and a control circuit which causes said transmission means to transmit, to said slave flash device in accordance with an instruction of said test light emission command means, the flash-device control information for performing test light emission according to a selected light emission mode, and said slave flash device comprising receiving means for receiving the flash-device control information, flash light emission means, light emission control means for controlling said flash light emission means according to the received flash-device control information, and a control circuit which causes said flash light emission means to perform test light emission on the basis of the received flash-device control information for the test light emission.

49. A flash system having a master transmission device and a slave flash device located at a distance from said master transmission device, in which light emission of said slave flash device is controlled by light emission control information transmitted from said master transmission device to said slave flash device, said master transmission device comprising number-of-times-of-light-emission computing means for, when the light emission control information indicates a multiple light emission mode, obtaining number of times of light emission from a shutter opening time and a set frequency of light emission, and transmission means for transmitting, as the light emission control information, information including the number of times of light emission obtained by said number-of-times-of-light-emission computing means, and said slave flash device comprising light emission control means for causing flash light emission means to perform multiple light emission on the basis of the received information on the number of times of light emission in the multiple light emission mode.

50. A flash system having a master transmission device and a slave flash device located at a distance from said master transmission device, in which light emission of said slave flash device is controlled by light emission control information transmitted from said master transmission device to said slave flash device, said master transmission device comprising number-of-times-of-light-emission computing means for, when the light emission control information indicates a multiple light emission mode, obtaining number of times of light emission from a shutter opening time and a set frequency of light emission, manual number-of-times-of-light-emission setting means for manually setting number of times of light emission, and transmission means for comparing a first number of times of light emission obtained by said number-of-times-of-light-emission computing means with a second number of times of light emission set by said manual number-of-times-of-light-emission setting means and for transmitting, as the light emission control information, information including the second number of times of light emission with the first number of times of light emission set as a limit, said slave flash device comprising light emission control means for causing flash light emission means to perform multiple light emission on the basis of the received information on the number of times of light emission in the multiple light emission mode.

51. A flash system having a master transmission device and a slave flash device located at a distance from said master transmission device, in which light emission of said slave flash device is controlled by light emission control information transmitted from said master transmission device to said slave flash device, said master transmission device comprising transmission means for, when the light emission control information indicates a multiple light emission mode, time-serially transmitting information on a set frequency of light emission and information on a light emission stop signal, and said slave flash device comprising light emission control means for causing flash light emission means to perform multiple light emission on the basis of the received information on the frequency of light emission until the light emission stop signal is received.

52. A photo-taking apparatus arranged to control a predetermined operating state in response to a wireless signal from a master transmission device, said photo-taking apparatus comprising:

a computer arranged to control the operating state and having a first operation mode and a second operation mode in which said computer operates in a lower electric power consumption state than in the first operation mode; and a receiving circuit arranged to receive the wireless signal, wherein said computer operates in the first operation mode during a first period of time, and, if the wireless signal is not received by said receiving circuit during the first period of time for the first operation mode, said computer shifts to the second operation mode.

53. A photo-taking apparatus according to claim 52, wherein said computer, after shifting to the second operation mode, operates in the second operation mode during a second period of time, and, if the wireless signal is not received by said receiving circuit during the second period of time, said computer shifts to a third operation mode in which said computer operates in a lower electric power consumption state than in the second operation mode.

54. A flash device arranged to be controlled by receiving a wireless signal from a master transmission device, said flash device comprising:

a boosting circuit for boosting a battery voltage;

a receiving circuit for receiving the wireless signal; and a control circuit, said control circuit having a first state to bring said boosting circuit and said receiving circuit into an operative state during a first period of time, and a second state to inhibit operation of said boosting circuit and keep said receiving circuit into an operative state, said control circuit shifting from the first state to the second state if the wireless signal is not received by said receiving circuit during the first period of time in the first state.

55. A flash device according to claim 54, wherein said control circuit, after shifting to the second state, operates in the second state during a second period of time, and, if the wireless signal is not received by said receiving circuit during the second period of time, said control circuit shifts to a third state to bring said receiving circuit into an inoperative state while inhibiting operation of said boosting circuit.

56. A flash device arranged to be controlled by receiving a wireless signal from a master transmission device, said flash device comprising:

an operation circuit part;

a receiving circuit for receiving the wireless signal; and a control circuit, said control circuit having a first state to bring said operation circuit part and said receiving circuit into a power-supplied state during a first period of time, and a second state to inhibit supply of power to said operation circuit part and keep said receiving circuit into a power-supplied state, said control circuit shifting from the first state to the second state if the wireless signal is not received by said receiving circuit during the first period of time in the first state.

57. A flash system having a master flash device and one or a plurality of slave flash devices located at distances from said master flash device, in which each slave flash device is controlled by flat light emission of said master flash device, said master flash device comprising light emission control means for setting initial light emission intensity of the flat light emission to a level higher than a predetermined level, and each slave flash device comprising detection means for detecting a light emitting state of said master flash device in response to initial light emission of the flat light emission of said master flash device.

58. A flash system having a master flash device and one or a plurality of slave flash devices located at distances from said master flash device, in which each slave flash device is controlled by flat light emission of said master flash device, said master flash device comprising light emission control means for adding, to the flat light emission, light-emission start pulse light higher than light emission intensity of the flat light emission, and each slave flash device comprising detection means for detecting a light emitting state of said master flash device by receiving the light-emission start pulse light from said master flash device.

* * * * *

UNITED STATES PATENT AND TRADEMARK OFFICE
CERTIFICATE OF CORRECTION

PATENT NO.     : 6,404,987 B1
DATED          : June 11, 2002
INVENTOR(S)    : Hajime Fukui It is certified that error appears in the above-identified patent and that said Letters Patent is hereby corrected as shown below:

Column 13,
Line 30, delete "know" and insert -- known --.

Column 22,
Line 27, delete "S10S" and insert -- S105 --.

Column 43,
Line 55, delete "font" and insert -- front --.

Column 44,
Line 16, delete "mush" and insert -- much --.

Column 74,
Line 19, after "emission" insert -- = --.

Column 76,
Line 44, delete "Do" and insert -- DO --.

Column 77,
Line 3, after "down" delete "r".
Line 21, delete "mod e" and insert -- mode --.

Column 96,
Line 47, delete "off-sate," and insert -- off-state, --.

Column 98,
Line 50, delete "h as bee n" and insert -- has been --.

UNITED STATES PATENT AND TRADEMARK OFFICE
CERTIFICATE OF CORRECTION

PATENT NO. : 6,404,987 B1
DATED : June 11, 2002
INVENTOR(S) : Hajime Fukui

It is certified that error appears in the above-identified patent and that said Letters Patent is hereby corrected as shown below:

Column 102,
Line 18, delete "salve" and insert -- slave --.

Signed and Sealed this

Eleventh Day of March, 2003

JAMES E. ROGAN
*Director of the United States Patent and Trademark Office*